United States Patent
Kobayashi

(10) Patent No.: US 7,538,894 B2
(45) Date of Patent: May 26, 2009

(54) COORDINATE INPUT APPARATUS, CONTROL METHOD THEREOF, AND PROGRAM

(75) Inventor: Kiwamu Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 382 days.

(21) Appl. No.: 11/401,389

(22) Filed: Apr. 11, 2006

(65) Prior Publication Data
US 2006/0232792 A1    Oct. 19, 2006

(30) Foreign Application Priority Data

| Apr. 15, 2005 | (JP) | ............................. 2005-118971 |
| Apr. 15, 2005 | (JP) | ............................. 2005-118979 |
| Sep. 12, 2005 | (JP) | ............................. 2005-264426 |

(51) Int. Cl.
   *G01B 11/14* (2006.01)
(52) U.S. Cl. .................... 356/614; 356/622; 345/175
(58) Field of Classification Search ................ 356/614, 356/622; 250/559.29; 345/175
   See application file for complete search history.

(56) References Cited

U.S. PATENT DOCUMENTS

| 4,507,557 | A | 3/1985 | Tsikos .................... 250/341 |
| 4,886,943 | A | 12/1989 | Suzuki et al. |
| 4,887,245 | A | 12/1989 | Mori et al. |
| 4,910,363 | A | 3/1990 | Kobayashi et al. |
| 4,931,965 | A | 6/1990 | Kaneko et al. |
| 4,980,518 | A | 12/1990 | Kobayashi et al. |
| 5,070,325 | A | 12/1991 | Tanaka et al. |
| 5,097,102 | A | 3/1992 | Yoshimura et al. |
| 5,142,106 | A | 8/1992 | Yoshimura et al. |
| 5,239,138 | A | 8/1993 | Kobayashi et al. |
| 5,500,492 | A | 3/1996 | Kobayashi et al. |
| 5,539,678 | A | 7/1996 | Tanaka et al. |
| 5,565,893 | A | 10/1996 | Sato et al. |
| 5,714,698 | A | 2/1998 | Tokioka et al. |
| 5,726,686 | A | 3/1998 | Taniishi et al. |
| 5,736,979 | A | 4/1998 | Kobayashi et al. |
| 5,805,147 | A | 9/1998 | Tokioka et al. |
| 5,818,429 | A | 10/1998 | Tanaka et al. |
| 5,831,603 | A | 11/1998 | Yoshimura et al. |
| 5,936,207 | A | 8/1999 | Kobayashi et al. |
| 6,415,240 | B1 | 7/2002 | Kobayashi et al. |
| 6,429,856 | B1 | 8/2002 | Omura ....................... 345/175 |
| 6,570,103 | B1 | 5/2003 | Saka ....................... 178/18.01 |
| 6,608,619 | B2 * | 8/2003 | Omura et al. ................ 345/175 |
| 6,636,199 | B2 | 10/2003 | Kobayashi et al. |
| 6,862,019 | B2 | 3/2005 | Kobayashi et al. |
| 7,075,524 | B2 | 7/2006 | Kobayashi et al. |
| 2003/0006973 | A1 * | 1/2003 | Omura et al. ................ 345/175 |
| 2006/0202973 | A1 | 9/2006 | Kobayashi et al. |

FOREIGN PATENT DOCUMENTS

| JP | 03-244017 | 10/1991 |
| JP | 2000-105671 | 4/2000 |
| JP | 2001-142642 | 5/2001 |
| JP | 2002-055770 | 2/2002 |
| JP | 2003-303046 | 10/2003 |

* cited by examiner

*Primary Examiner*—Roy Punnoose
(74) *Attorney, Agent, or Firm*—Fitzpatrick, Cella, Harper & Scinto

(57) ABSTRACT

The point state of a pointer in a coordinate input region is determined on the basis of the number and intensities of shadows which are present in light intensity distributions obtained from a plurality of sensors in accordance with pointing by the pointer.

32 Claims, 96 Drawing Sheets

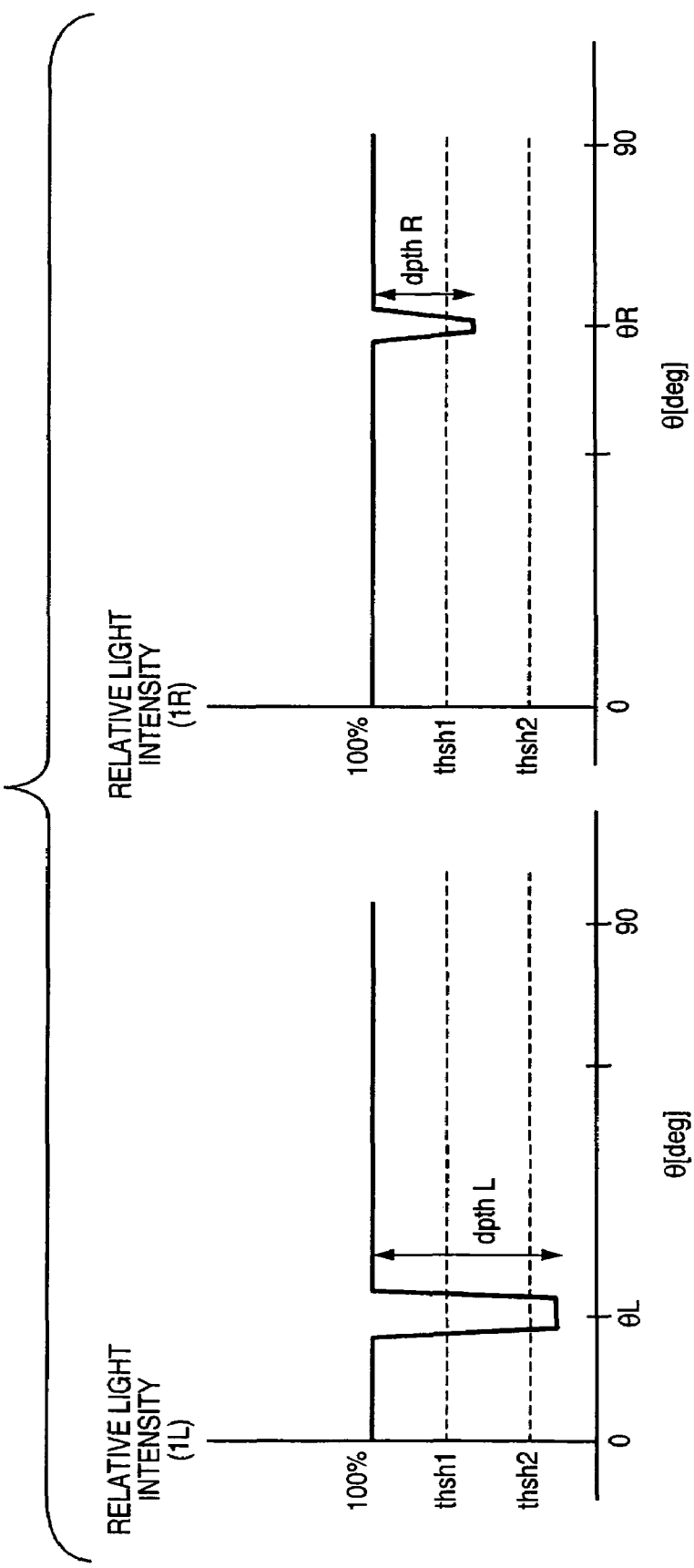

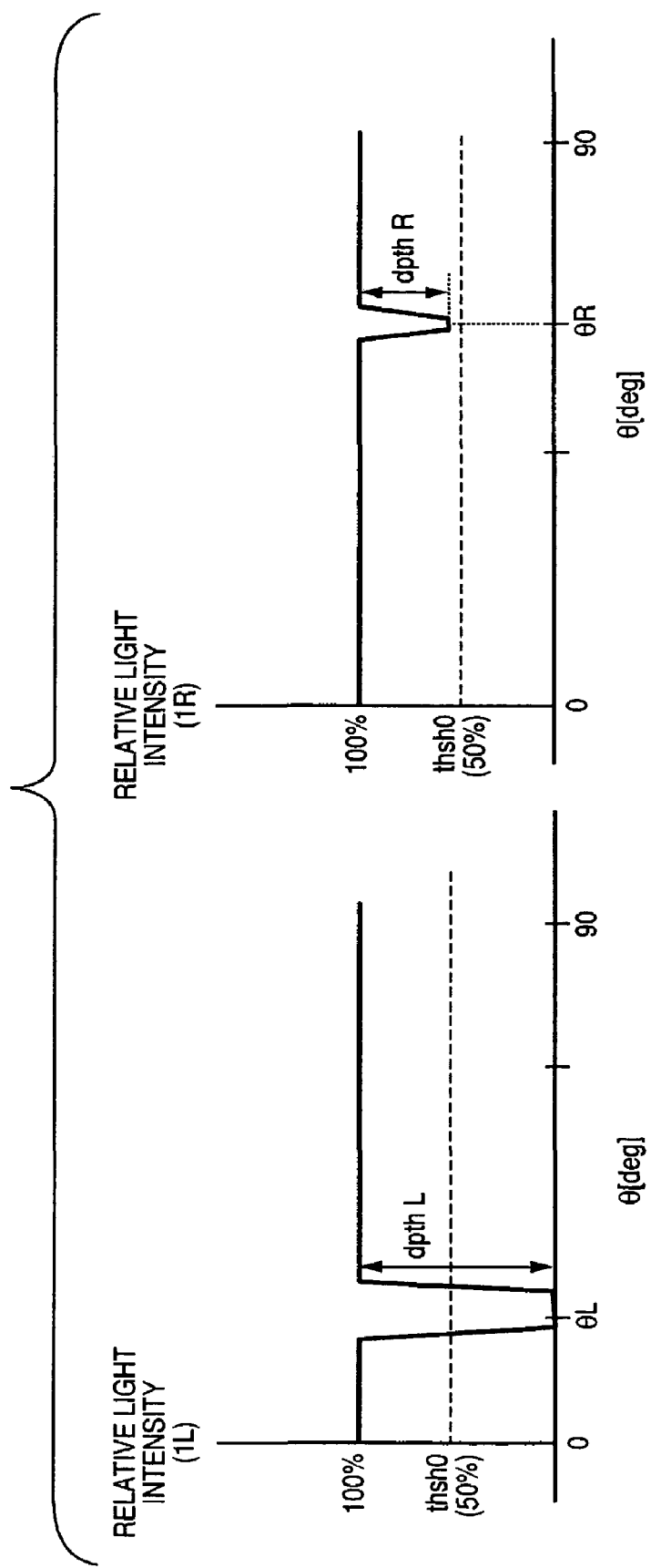

F I G. 14
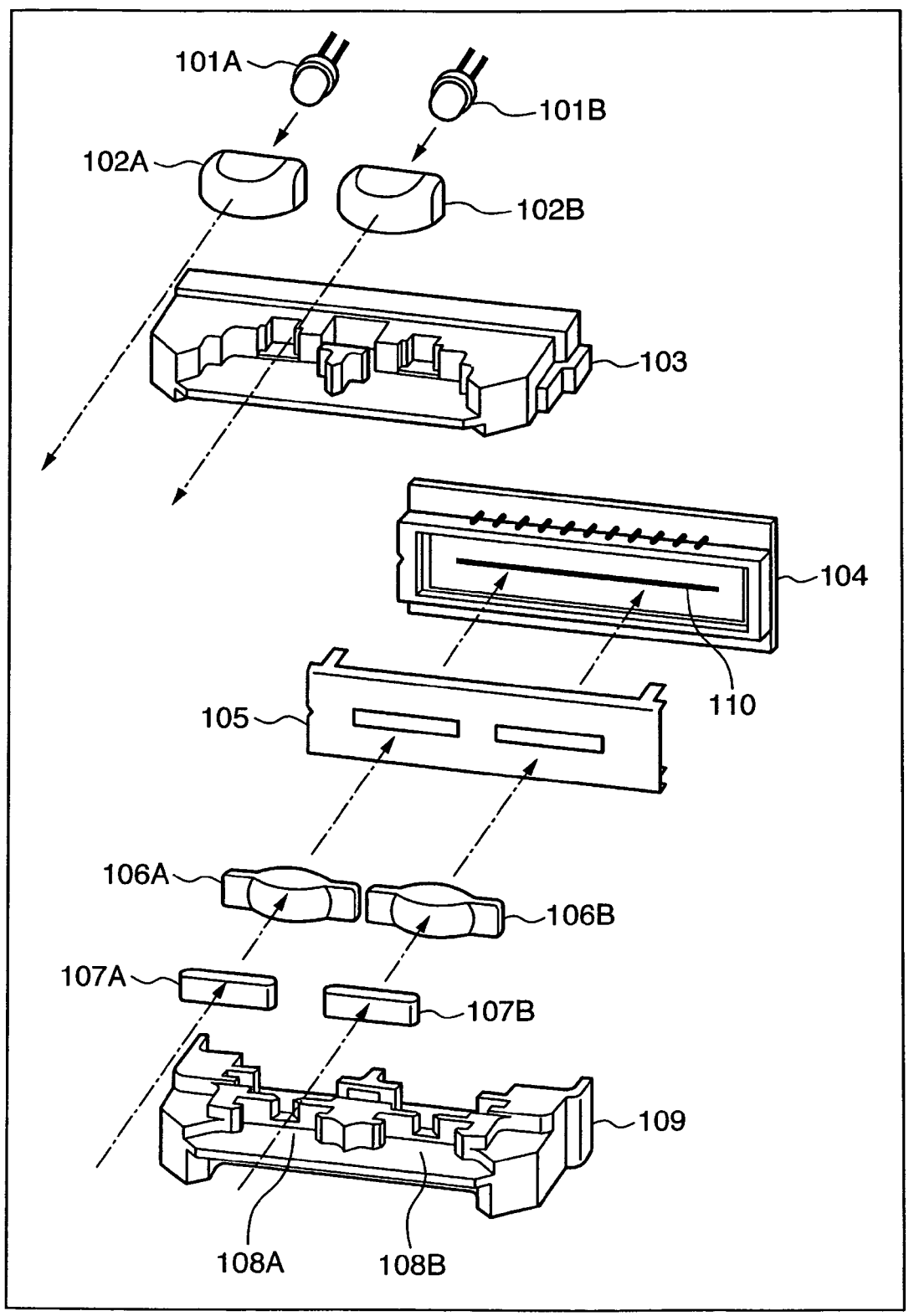

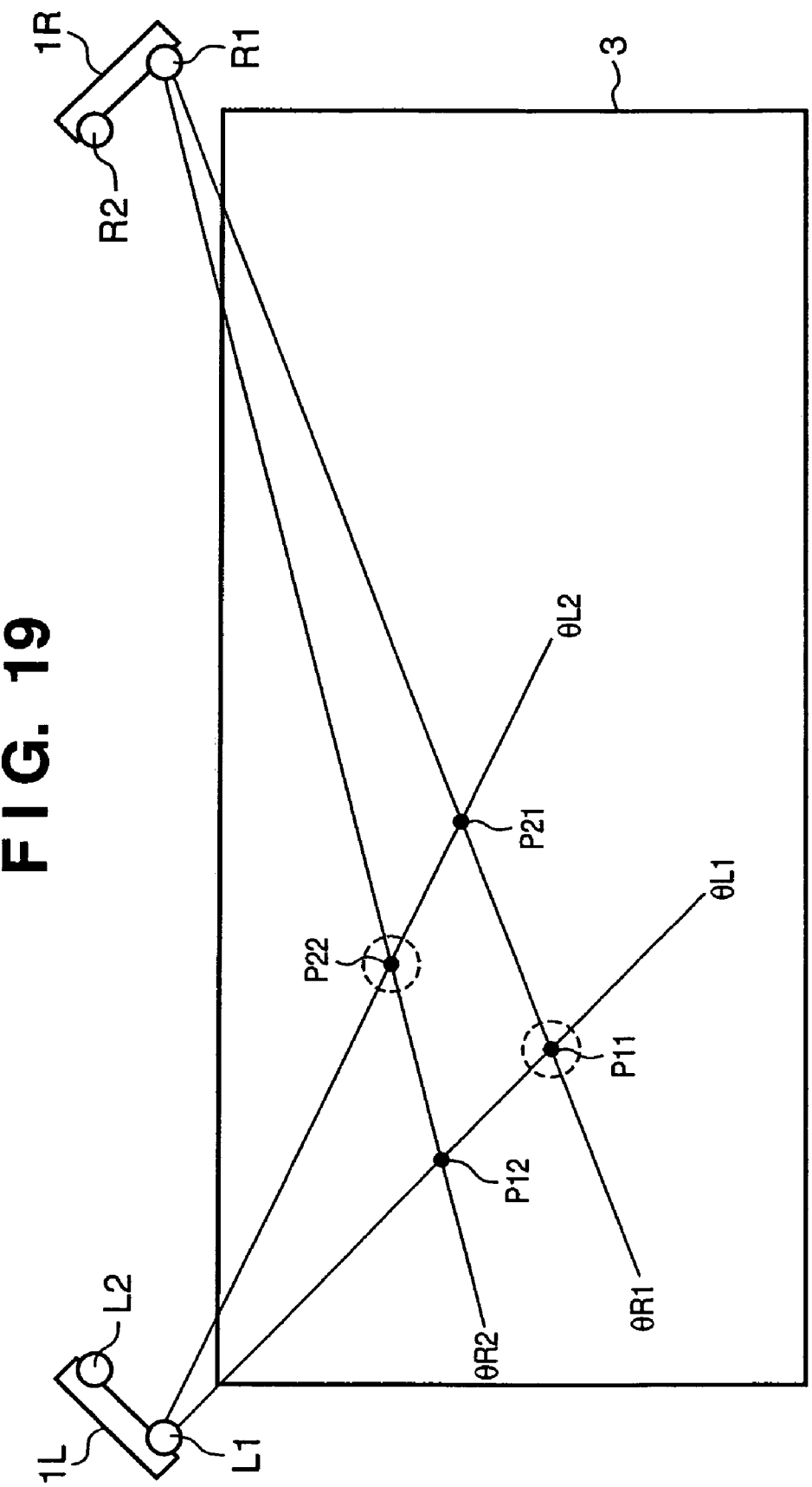

F I G. 32
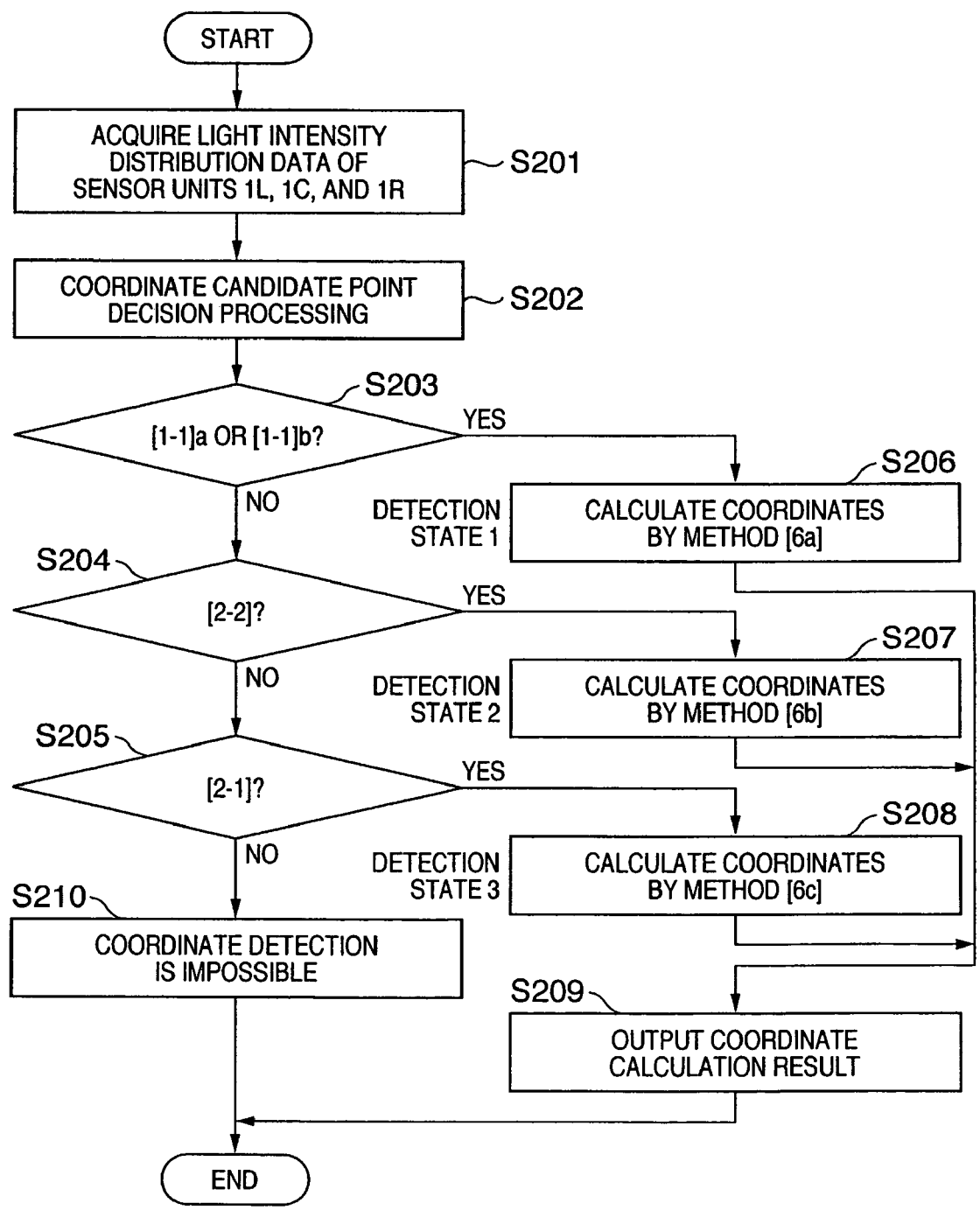

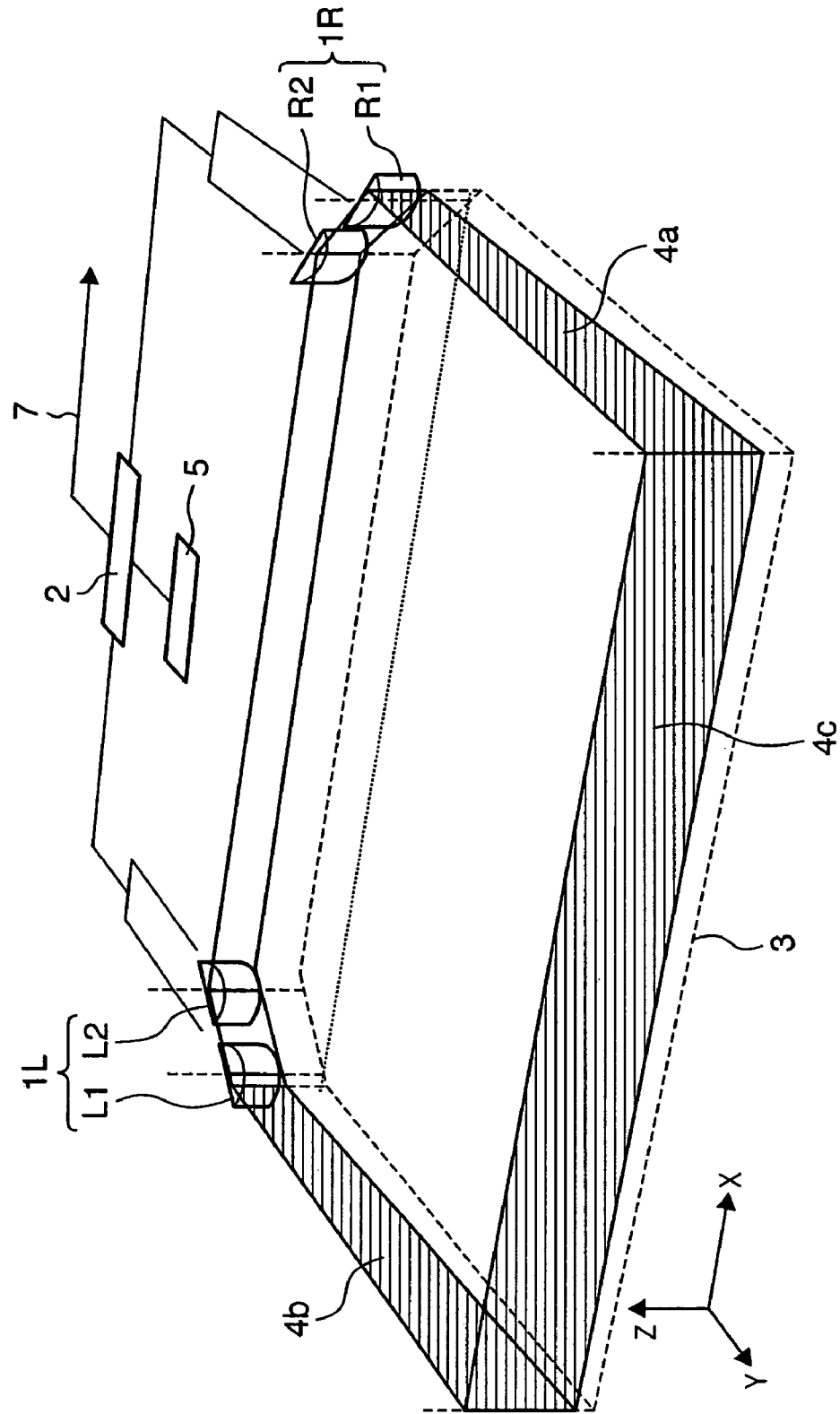

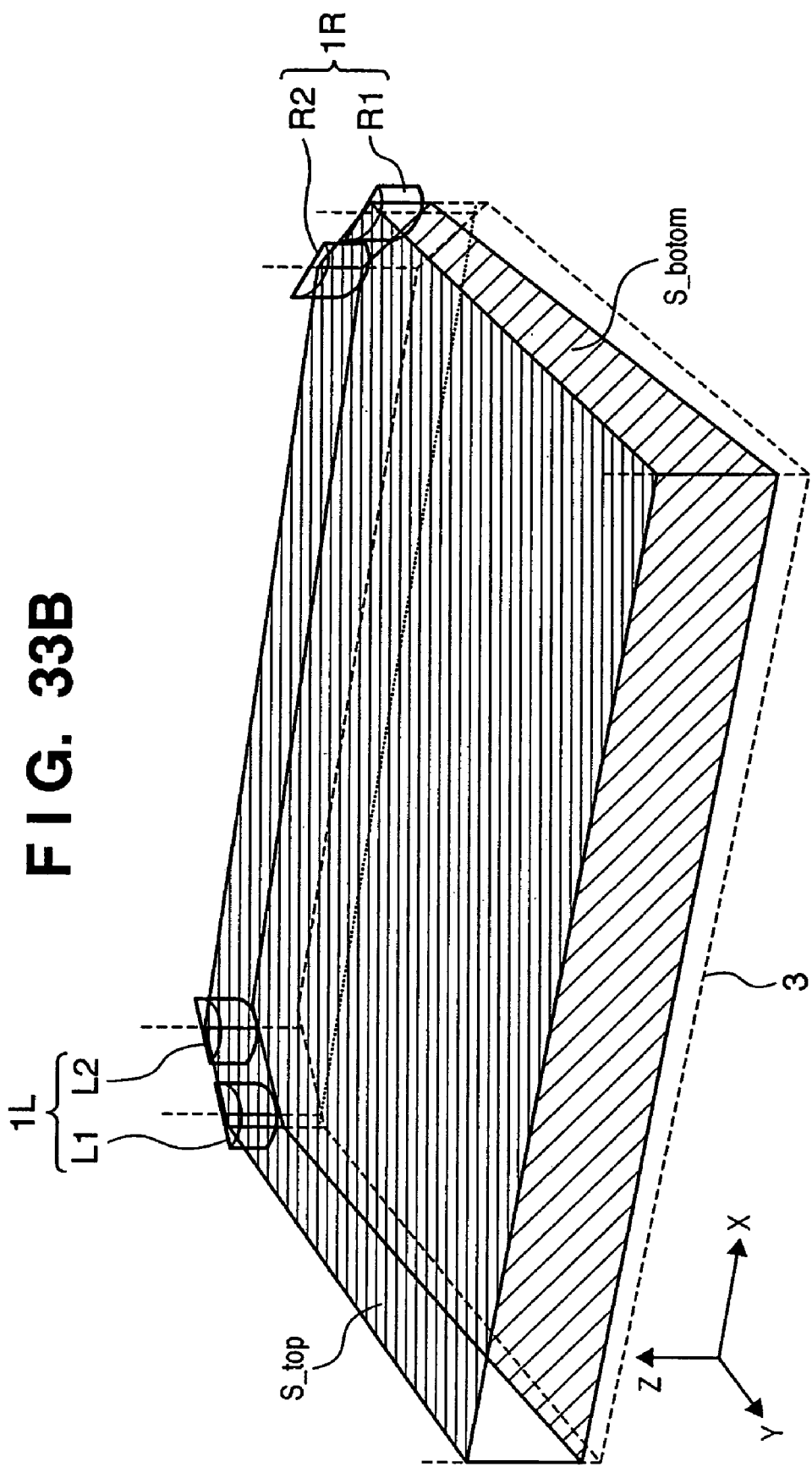

FIG. 47
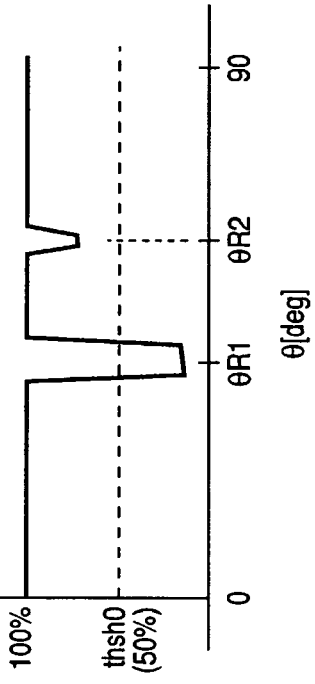
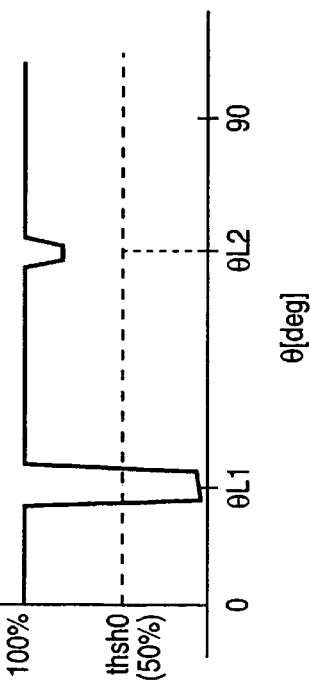

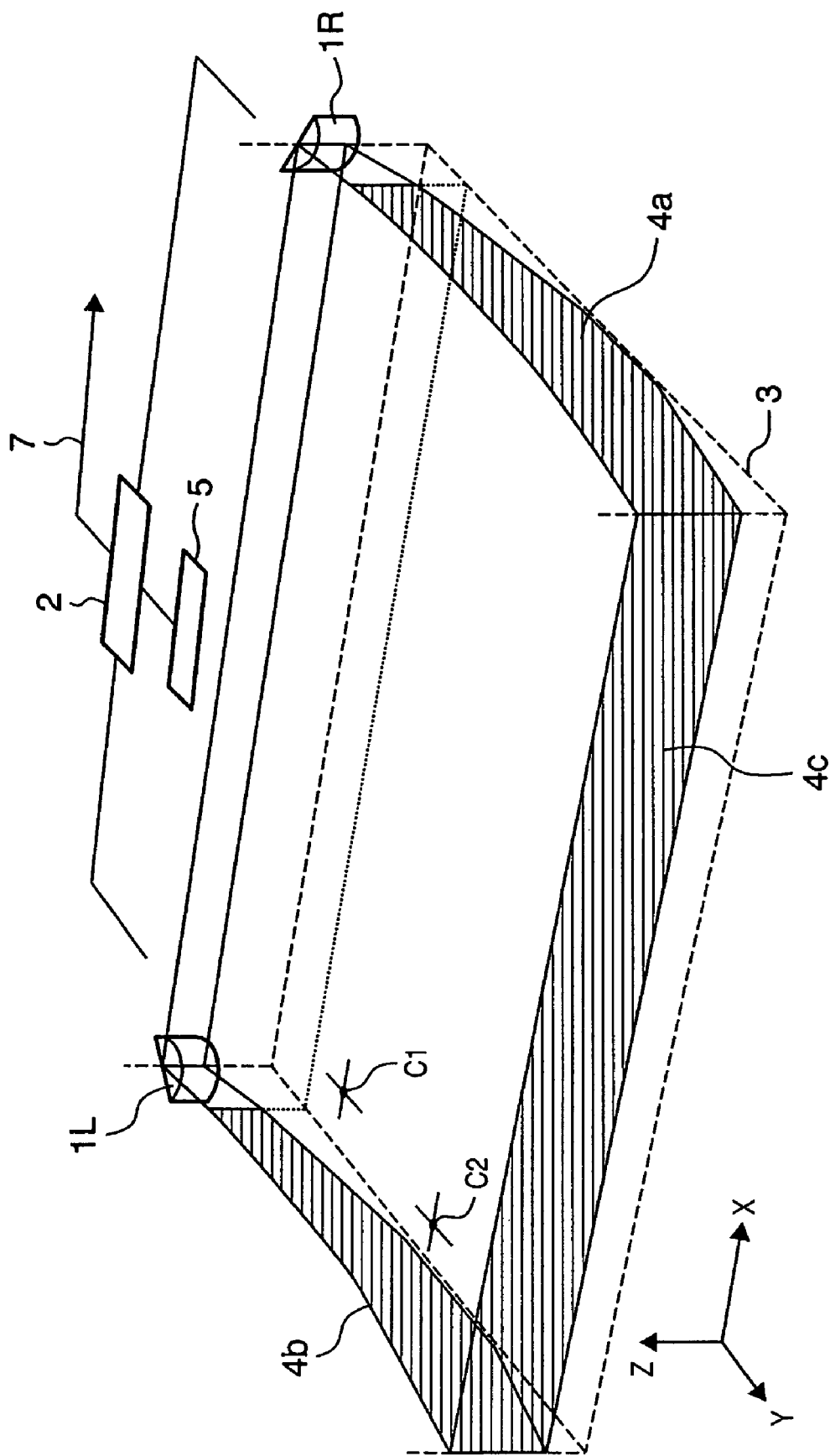

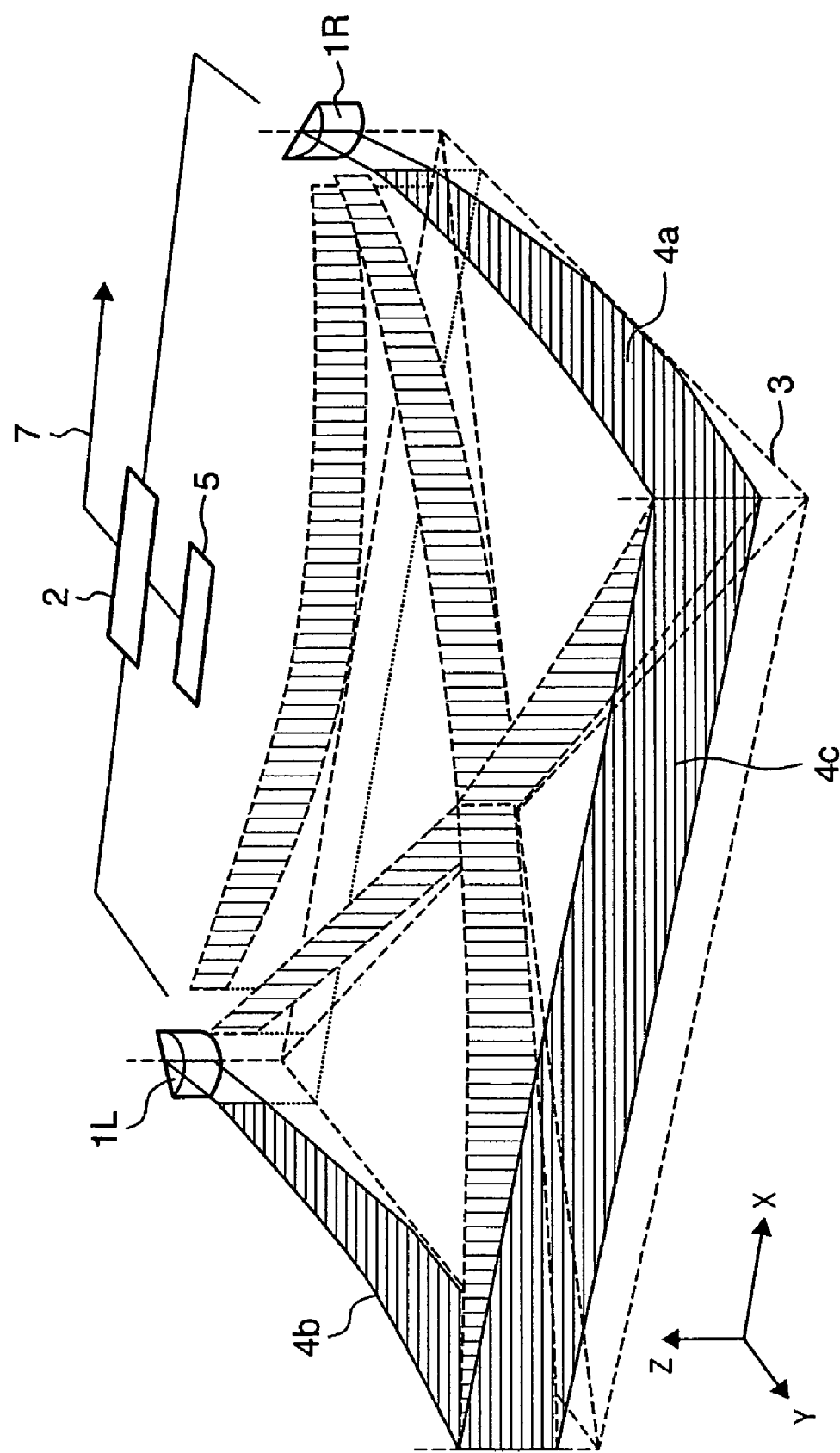

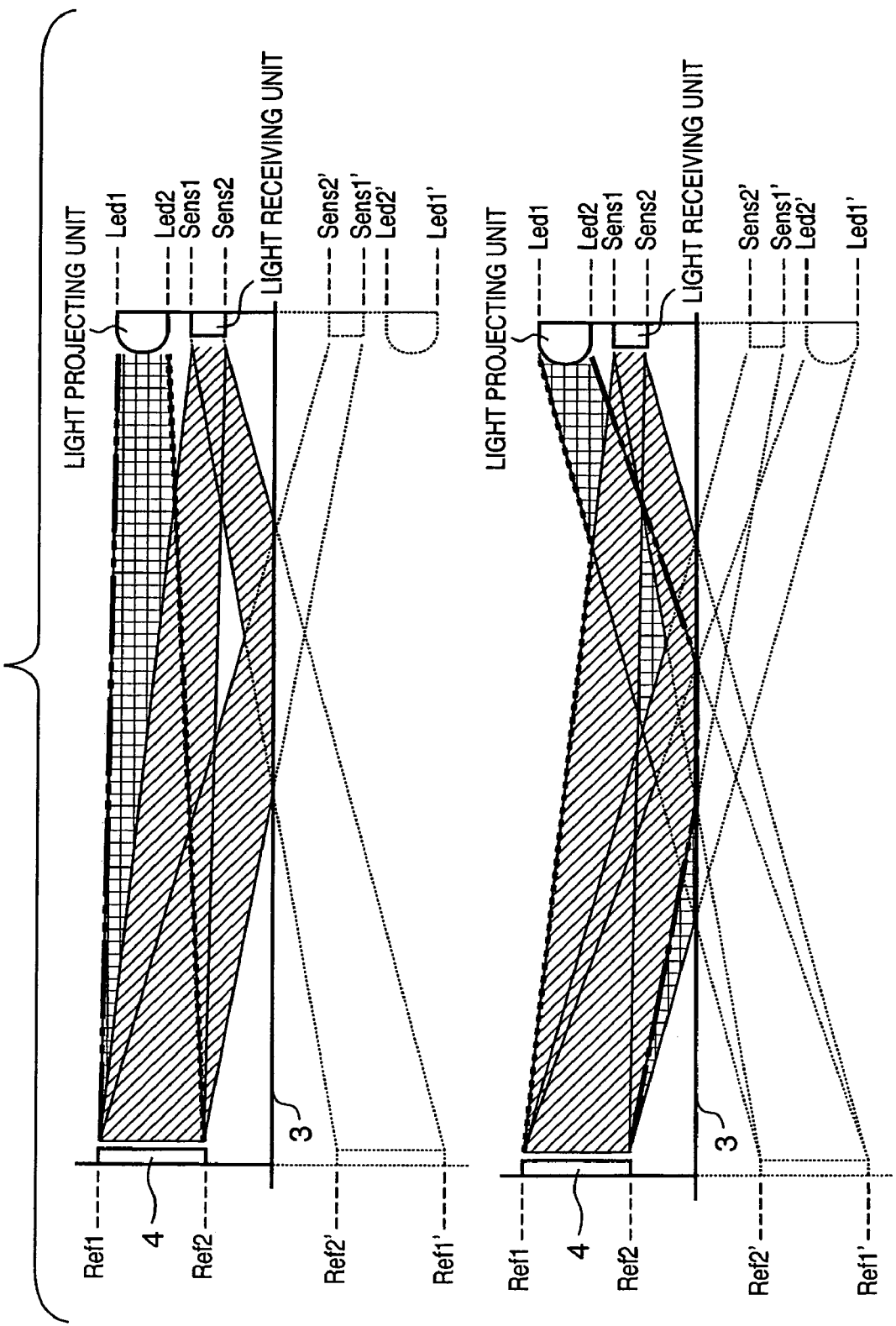

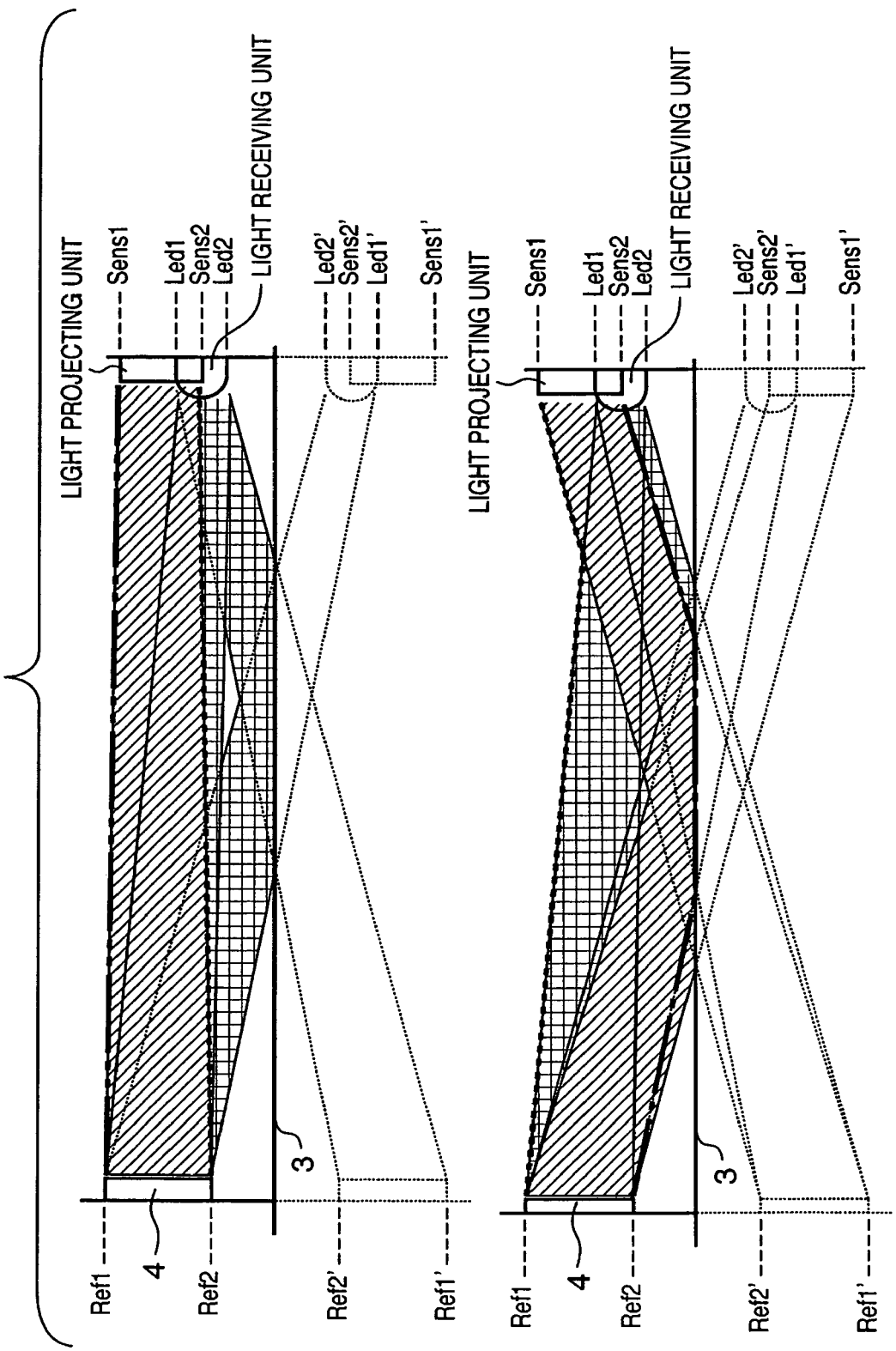

COORDINATE INPUT APPARATUS, CONTROL METHOD THEREOF, AND PROGRAM

FIELD OF THE INVENTION

The present invention relates to a coordinate input apparatus for detecting a point position on a coordinate input region, a control method thereof, and a program.

BACKGROUND OF THE INVENTION

There exist coordinate input apparatuses which are used to input coordinates to a coordinate input surface by using a pointer (e.g., a dedicated input pen or finger) to control a connected computer or write characters and graphics.

Conventionally, as coordinate input apparatuses of this type, touch panels of various schemes have been proposed or become commercially available. These apparatuses are widely used because a terminal such as a personal computer can easily be operated on the screen without using any special tool.

There are various coordinate input schemes using, e.g., a resistive film or an ultrasonic wave. A scheme using light is disclosed in, e.g., U.S. Pat. No. 4,507,557. In U.S. Pat. No. 4,507,557, a retroreflecting sheet is provided outside the coordinate input region. By illumination units which are arranged at the corners of the coordinate input region to emit light and light receiving units which receive light, the angles between the light receiving units and a shielding object such as a finger that shields light in the coordinate input region are detected. On the basis of the detection result, the point position of the shielding object is determined.

Japanese Patent Laid-Open No. 2000-105671 or Japanese Patent Laid-Open No. 2001-142642 discloses a coordinate input apparatus which includes a retroreflecting member arranged on the periphery of the coordinate input region and detects the coordinates of a point (light-shielded portion) where retroreflected light is shielded.

In the apparatus of, e.g., Japanese Patent Laid-Open No. 2000-105671, the peak of the light-shielded portion by the shielding object, which is received by the light receiving unit, is detected by waveform processing such as differentiation. The angle of the light-shielded portion with respect to the light receiving unit is detected, and the coordinates of the shielding object are calculated from the detection result. In Japanese Patent Laid-Open No. 2001-142642, comparison with a specific level pattern is done to detect one end and the other end of a light-shielded part, and the center of the coordinates is detected.

The scheme of calculating coordinates by detecting a light shielding position as in U.S. Pat. No. 4,507,557, Japanese Patent Laid-Open No. 2000-105671 and Japanese Patent Laid-Open No. 2001-142642 will be referred to as a light shielding scheme hereinafter.

Such a coordinate input apparatus of light shielding scheme is required to allow simultaneous operations of a plurality of operators to increase the convenience for efficient use in, e.g., a conference especially when the size of the coordinate input region is large. Hence, coordinate input apparatuses capable of coping with a plurality of simultaneous inputs have been devised.

To simultaneously input a plurality of coordinate points, in Japanese Patent Laid-Open No. 2002-055770, Japanese Patent Laid-Open No. 2003-303046 and Japanese Patent Registration No. 2896183, the angles of a plurality of light-shielded portions are detected by one light receiving sensor. Several input coordinate candidates are calculated on the basis of the combinations of the sensor angles. An actually input coordinate point is determined from the input coordinate candidates.

In, e.g., two-point input, a maximum of four coordinate points are calculated as input coordinate candidates. Of the four points, two actually input coordinate points are determined and output. That is, actual input coordinate points and false input coordinate points are discriminated from the plurality of input coordinate candidates, and final input coordinate points are determined. This determination will be referred to as "truth determination" here.

As a detailed method of truth determination, in Japanese Patent Laid-Open No. 2003-303046 or Japanese Patent Registration No. 2896183, first and second sensors are provided at the two ends of one side of a conventional coordinate input region while being spaced part by a distance enough to accurately calculate coordinates pointed in the coordinate input region. In addition, a third sensor is provided between the first and second sensors while being spaced part from them by a distance enough to accurately calculate coordinates pointed in the input region. On the basis of angle information in the third sensor which is different from those of the first and second sensors, truth is determined for a plurality of pieces of angle information detected by the first and second sensors.

Another method has also been proposed in which a plurality of sensor units are arranged at a predetermined interval around a coordinate input region to observe almost the same region in almost the same direction. Even when a plurality of light shielding shadows overlap, each shadow is never detected while being completely hidden by another shadow. Still another method has also been proposed in which when a plurality of shadows overlap, the direction of each shadow is detected by observing one end of the shadow.

In the above-described coordinate input apparatuses of light shielding scheme, all sensors must accurately detect the number of shadows formed by shielding light and their positions and intensities without inconsistency. However, the shadow intensity (the rate of light intensity decrease by light shielding) does not always take the same value for the sensors because of the positional relationship between the sensors and the retroreflecting member and the positional relationship between the light projecting units and the light receiving units in each sensor. "Light shielding depth", "light shielding ratio", and "light shielding rate" will also be used as synonyms to shadow intensity hereinafter (the rate of light intensity decrease by light shielding).

If the light shielding depth of a shadow changes, for example, the shadow which should be detected simultaneously by a plurality of predetermined sensors may be detected at a predetermined position by a specific sensor but may not be detected at the predetermined position by another specific sensor. That is, the shadow is missed.

When the shadow that must be detected cannot be detected by one of the sensors, the input coordinates cannot be detected accurately. The influence of this problem is especially serious when a plurality of inputs are done simultaneously by a plurality of pointers. For example, if a shadow which should be detectable by a given sensor cannot be detected, the sensor erroneously senses that the shadow overlaps another shadow. As a result, coordinates at an impossible position, i.e., a wrong position different from the actual input position of the pointer may be detected.

SUMMARY OF THE INVENTION

The present invention has been made to solve the above-described problem, and has as its object to provide a coordinate input apparatus capable of accurately detecting input coordinates, a control method thereof, and a program.

According to the present invention, the forgoing object is attained by providing a coordinate input apparatus for detecting a point position on a coordinate input region, comprising:

a plurality of sensor means each of which includes a light projecting unit to project light to the coordinate input region and a light receiving unit to receive arrival light and is provided around the coordinate input region;

reflection means, provided at a periphery of the coordinate input region, for retroreflecting incident light; and determination means for determining a point state of pointing means in the coordinate input region on the basis of the number and intensities of shadows which are present in light intensity distributions obtained from the plurality of sensor means in accordance with pointing by the pointing means.

In a preferred embodiment, the determination means determines, in an arbitrary set of the plurality of sensor means, the number of input points on the basis of the number and intensities of shadows obtained from one sensor means and determines presence/absence of overlap of shadows obtained from the other sensor means on the basis of the number and intensities of shadows obtained from each of the one sensor means and the other sensor means of the set of sensor means.

In a preferred embodiment, the determination means comprises:

setting means for setting a first threshold value to determine a level of a relatively low intensity and a second threshold value to determine a level of a relatively high intensity; and detection means for detecting, by using the first threshold value and the second threshold value set by the setting means, the number and intensities of shadows which are present in the light intensity distributions, and determines the point state of the pointing means in the coordinate input region on the basis of the number and intensities of shadows detected by the detection means.

In a preferred embodiment, the apparatus further comprises calculation means for calculating point position coordinates on the coordinate input region on the basis of the point state of the pointing means in the coordinate input region, which is determined by the determination means, and the light intensity distributions obtained from the plurality of sensor means.

In a preferred embodiment, when one sensor means in the arbitrary set of the plurality of sensor means which outputs a light intensity distribution containing a larger number of shadows exceeding the first threshold value is defined as first sensor means, and the other sensor means is defined as second sensor means, and the number of shadows exceeding the first threshold value is 2 in each of the light intensity distributions for the first sensor means and the second sensor means, the determination means determines that four coordinate candidate points are present.

In a preferred embodiment, when one sensor means in the arbitrary set of the plurality of sensor means which outputs a light intensity distribution containing a larger number of shadows exceeding the first threshold value is defined as first sensor means, and the other sensor means is defined as second sensor means, and the number of shadows exceeding the second threshold value is 2 in the light intensity distribution for the first sensor means, and the number of shadows exceeding the first threshold value is 1 in the light intensity distribution for the second sensor means, the determination means determines that two coordinate input points are arranged substantially linearly when viewed from the second sensor means.

In a preferred embodiment, when one sensor means in the arbitrary set of the plurality of sensor means which outputs a light intensity distribution containing a larger number of shadows exceeding the first threshold value is defined as first sensor means, and the other sensor means is defined as second sensor means, and the number of shadows exceeding the second threshold value is 1 in the light intensity distribution for the first sensor means, and the number of shadows exceeding the first threshold value is 1 in the light intensity distribution for the second sensor means, the determination means determines that one coordinate input point is present.

In a preferred embodiment, a ratio of the first threshold value to the second threshold value is larger than a ratio of a maximum value to a minimum value of shadows assumed in the light intensity distributions for the sensor means of the arbitrary set.

In a preferred embodiment, the sensor means comprises one optical unit including the light projecting unit and the light receiving unit.

In a preferred embodiment, the sensor means comprises two optical units each including the light projecting unit and the light receiving unit.

According to the present invention, the foregoing object is attained by providing a control method of a coordinate input apparatus for detecting a point position on a coordinate input region by using a plurality of sensor means each of which includes a light projecting unit to project light to the coordinate input region and a light receiving unit to receive arrival light and is provided around the coordinate input region, comprising:

an acquisition step of acquiring light intensity distributions obtained from the plurality of sensor means in accordance with pointing by pointing means; and a determination step of determining a point state of the pointing means in the coordinate input region on the basis of the number and intensities of shadows which are present in the light intensity distributions obtained from the plurality of sensor means and acquired in the acquisition step.

According to the present invention, the foregoing object is attained by providing a program which causes a computer to execute control of a coordinate input apparatus for detecting a point position on a coordinate input region by using a plurality of sensor means each of which includes a light projecting unit to project light to the coordinate input region and a light receiving unit to receive arrival light and is provided around the coordinate input region, characterized by causing the computer to execute:

an acquisition step of acquiring light intensity distributions obtained from the plurality of sensor means in accordance with pointing by pointing means; and a determination step of determining a point state of the pointing means in the coordinate input region on the basis of the number and intensities of shadows which are present in the light intensity distributions obtained from the plurality of sensor means and acquired in the acquisition step.

According to the present invention, the foregoing object is attained by providing a coordinate input apparatus for detecting a point position on a coordinate input region, comprising:

a plurality of sensor means; and determination means for determining a point state of pointing means in the coordinate input region on the basis of the number and intensities of shadows or images which are present in light intensity distributions obtained from the plurality of sensor means in accordance with pointing by the pointing means.

According to the present invention, the foregoing object is attained by providing a coordinate input apparatus for detecting a point position on a coordinate input region, comprising:

a plurality of sensor means each of which includes a light projecting unit to project light to the coordinate input region and a light receiving unit to receive arrival light and is provided around the coordinate input region;

a plurality of retroreflection means, provided at a periphery of the coordinate input region, for retroreflecting incident light; and calculation means for calculating coordinates of a point position of pointing means on the basis of light amount distributions obtained from the plurality of sensor means in accordance with pointing by the pointing means, wherein three-dimensional light shielding detection regions of the plurality of sensor means have a common three-dimensional solid shape corresponding to the coordinate input region.

In a preferred embodiment, the three-dimensional light shielding detection region is a three-dimensional solid defined by a shape of the retroreflection means facing the sensor means and a light shielding detection window serving as a light shielding detection range of the sensor means.

In a preferred embodiment, an upper side of a member included in the retroreflection means forms a common first plane, and a lower side of the member forms a common second plane, an upper end of the light shielding detection window is substantially located on the first plane, and a lower end of the light shielding detection window is substantially located on the second plane, and the three-dimensional solid shape is a space sandwiched between the first plane and the second plane.

In a preferred embodiment, the light shielding detection window is defined by setting a lower end to a higher one of a lower end of a light projecting window serving as a light projecting range of the light projecting unit included in the sensor means and a lower end of a light receiving window serving as a light receiving range of the light receiving unit included in the sensor means and an upper end to a higher one of an upper end of the light projecting window and an upper end of the light receiving window.

In a preferred embodiment, in the sensor means, a visual field range of the light projecting unit includes retroreflection means related to the sensor means, and a visual field range of the light receiving unit includes retroreflection means related to the sensor means in a direction perpendicular to the coordinate input region.

In a preferred embodiment, the sensor means comprises one optical unit including the light projecting unit and the light receiving unit.

In a preferred embodiment, the sensor means comprises two optical units each including the light projecting unit and the light receiving unit.

According to the present invention the foregoing object is attained by providing a control method of a coordinate input apparatus which comprises a plurality of sensor means each including a light projecting unit to project light to a coordinate input region and a light receiving unit to receive arrival light and being provided around the coordinate input region and detects a point position on the coordinate input region, comprising:

a calculation step of calculating coordinates of a point position of pointing means on the basis of light amount distributions obtained from the plurality of sensor means in accordance with pointing by the pointing means; and an output step of outputting the coordinates calculated in the calculation step, wherein three-dimensional light shielding detection regions of the plurality of sensor means have a common three-dimensional solid shape corresponding to the coordinate input region.

According to the present invention the foregoing object is attained by providing a program which causes a computer to execute control of a coordinate input apparatus which comprises a plurality of sensor means each including a light projecting unit to project light to a coordinate input region and a light receiving unit to receive arrival light and being provided around the coordinate input region and detects a point position on the coordinate input region, characterized by causing the computer to execute:

a calculation step of calculating coordinates of a point position of pointing means on the basis of light amount distributions obtained from the plurality of sensor means in accordance with pointing by the pointing means; and an output step of outputting the coordinates calculated in the calculation step, wherein three-dimensional light shielding detection regions of the plurality of sensor means have a common three-dimensional solid shape corresponding to the coordinate input region.

According to the present invention the foregoing object is attained by providing a coordinate input apparatus for detecting a point position on a coordinate input region, comprising:

a plurality of sensor means each of which includes a light projecting unit to project light to the coordinate input region and a light receiving unit to receive arrival light and is provided around the coordinate input region;

a plurality of retroreflection means, provided at a periphery of the coordinate input region, for retroreflecting incident light; and calculation means for calculating coordinates of a point position of pointing means on the basis of light amount distributions obtained from the plurality of sensor means in accordance with pointing by the pointing means, wherein three-dimensional light shielding detection regions of the plurality of sensor means have a common three-dimensional solid shape corresponding to the coordinate input region, and the three-dimensional light shielding detection region is defined as a three-dimensional region in which a height-direction change in the position of the pointing means can be detected on the basis of a change rate of an observed light intensity.

In a preferred embodiment, a shape of the retroreflection means which faces one sensor means of the plurality of sensor means but does not face the other sensor means is defined by the other sensor means, a mirror image of the other sensor means with respect to the coordinate input region, the retroreflection means facing the other sensor means, and a mirror image of the retroreflection means facing the other sensor means with respect to the coordinate input region, and the three-dimensional solid shape is defined as a three-dimensional solid in which the shape substantially equals a shape of a section along the retroreflection means facing the one sensor means.

In a preferred embodiment, letting Opt1 be an upper end of a first light shielding detection window as a real image, Opt2 be a lower end, Opt4' be an upper end of a second light shielding detection window as a mirror image, Opt3' be a lower end, Opt0 be a position of the first light shielding detection window on the coordinate input effective region, Ref1 be an upper end of a real image of the opposite retroreflection means, Ref2 be a lower end, Ref1' be an upper end of a mirror image of the retroreflection means, Ref2' be a lower end, Ref0 be a position of the retroreflection means on the coordinate input effective region, Q1 be an intersection between a line segment Ref2-Opt3' and a line segment Ref0-Opt0, Q2 be an intersection between a line segment Ref1'-Opt2 and the line segment Ref0-Opt0, Q3 be an intersection between a line segment Ref1-Opt3 and a line segment Ref2-Opt1', and Q4 be an intersection between a line segment Ref2-Opt0 and a line segment Ref0-Opt2, an upper side of the section is located at a position lower than a line segment Ref1-Opt1 and higher than a line segment Ref1-Q3-Opt1, and a lower side of the section is located at a position lower than a line segment Ref2-Q4-Opt2 and higher than a line segment Ref2-Q2-Opt2.

In a preferred embodiment, the Opt1 is a selected higher one of an upper end of a light projecting window serving as a light projecting range of the light projecting unit of the sensor means and an upper end of a light receiving window serving as a light receiving range of the light receiving unit, the Opt2 is a selected higher one of a lower end of the light projecting window serving as the light projecting range of the light projecting unit of the sensor means and a lower end of the light receiving window serving as the light receiving range of the light receiving unit, the Opt4' is a mirror image, with respect to the coordinate input region, of a selection result of a lower one of the lower end of the light projecting window serving as the light projecting range of the light projecting unit of the sensor means and the lower end of the light receiving window serving as the light receiving range of the light receiving unit, and the Opt3' is a mirror image, with respect to the coordinate input region, of a selection result of a lower one of the upper end of the light projecting window serving as the light projecting range of the light projecting unit of the sensor means and the upper end of the light receiving window serving as the light receiving range of the light receiving unit.

According to the present invention, the foregoing object is attained by providing a coordinate input apparatus for detecting a point position on a coordinate input region, comprising:

two sensor means provided substantially at two ends of one side of a periphery of the coordinate input region, each of the sensor means including a light projecting unit to project light to the coordinate input region and a light receiving unit to receive arrival light;

a plurality of retroreflection means, provided on remaining sides of the periphery of the coordinate input region except the one side, for retroreflecting incident light; and calculation means for calculating coordinates of a point position of pointing means on the basis of light amount distributions obtained from the two sensor means in accordance with pointing by the pointing means, wherein in a shape of retroreflection means which faces only one sensor means of the two sensor means but does not face the other sensor means, a substantial extension of one end of the retroreflection means substantially matches a light shielding detection window of the other sensor unit, a side of the other end substantially matches a side of an end of retroreflection means which commonly faces the two sensor means, and at least a lower side of the retroreflecting member curves downward and comes close to the coordinate input surface at a midpoint.

In a preferred embodiment, the light shielding detection window is a portion in a range defined by setting an upper end to a higher one of an upper end of a light projecting window serving as a portion effectively contributing to light projection in the sensor means and an upper end of a light receiving window serving as a portion effectively contributing to light reception and a lower end to a higher one of a lower end of the light projecting window and a lower end of the light receiving window.

In a preferred embodiment, the sensor means comprises one optical unit including the light projecting unit and the light receiving unit.

In a preferred embodiment, the sensor means comprises two optical units each including the light projecting unit and the light receiving unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1B shows graphs for explaining the characteristic feature of the first embodiment of the present invention;

FIGS. 2A and 2B show graphs for explaining problems in the present invention;

FIG. 14 is an exploded view showing the detailed arrangement of a sensor unit according to the second embodiment of the present invention;

FIG. 19 is a view for explaining the coordinate calculation method according to the second embodiment of the present invention;

FIG. 32 is a flowchart showing coordinate calculation processing executed by the coordinate input apparatus according to the third embodiment of the present invention;

FIG. 33A is a view showing the outer appearance of a coordinate input apparatus according to the fourth embodiment of the present invention;

FIG. 33B is a view for explaining the characteristic feature of a retroreflecting member in the coordinate input apparatus according to the fourth embodiment of the present invention;

FIG. 47 shows graphs of light intensity distributions obtained by the sensor units in the input operation in FIG. 45;

FIG. 67A is a view showing the outer appearance of the coordinate input apparatus according to the sixth embodiment of the present invention;

FIG. 67B is a view for explaining the shape of the light shielding detection region in the coordinate input apparatus according to the sixth embodiment of the present invention;

FIG. 73A is a view for explaining the concept of the light shielding detection region according to the sixth embodiment of the present invention;

FIG. 74B shows views for explaining the concept of the light shielding detection region according to the sixth embodiment of the present invention;

DETAILED DESCRIPTION OF THE PREFERRED EMBODIMENTS

Preferred embodiments of the present invention will now be described in detail in accordance with the accompanying drawings.

First Embodiment

Figure 1A:
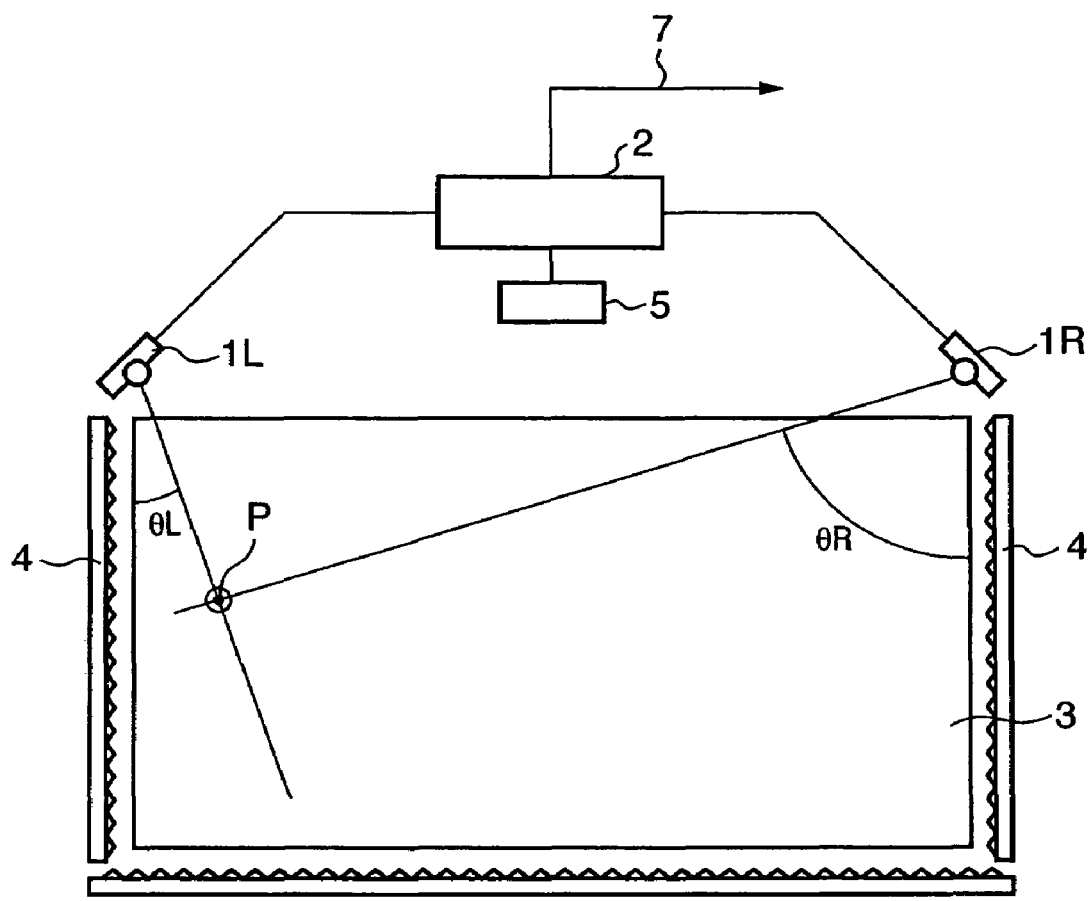
FIG. 1A is a view showing the arrangement of a coordinate input apparatus of light shielding scheme according to the first embodiment of the present invention.

FIG. 1A is a view showing the arrangement of a coordinate input apparatus of light shielding scheme according to the first embodiment of the present invention.

Referring to FIG. 1A, sensor units 1L and 1R have light projecting units and light receiving units. In the first embodiment, the sensor units 1L and 1R are arranged parallel to the X-axis of a coordinate input effective region 3 serving as a coordinate input surface and symmetrically about the Y-axis while being spaced apart by a predetermined distance, as shown in FIG. 1A. The sensor units 1L and 1R are connected to a control/arithmetic unit 2. Each of the sensor units 1L and 1R receives a control signal from the control/arithmetic unit 2 and transmits a detected signal to the control/arithmetic unit 2.

A retroreflecting member 4 has a retroreflecting surface to reflect incident light in the direction of arrival. The retroreflecting member 4 is arranged on three outer sides of the coordinate input effective region 3, as shown in FIG. 1A, to retroreflect, toward the left and right sensor units 1L and 1R, light projected within a range of almost 90° from the sensor units 1L and 1R.

The retroreflecting member 4 has a three-dimensional structure microscopically. A bead-type retroreflecting tape or a retroreflecting tape which causes retroreflection by periodically arraying corner cubes by, e.g., machining is currently known.

The light retroreflected by the retroreflecting member 4 is one-dimensionally detected by the sensor units 1L and 1R, and the light intensity distribution is transmitted to the control/arithmetic unit 2.

The coordinate input effective region 3 formed from the display screen of a display device such as a PDP, rear projector, or LCD panel can be used as an interactive input device.

In this arrangement, when input by a pointing means such as a finger or pointer is done in the coordinate input effective region 3, light projected from the light projecting units of the sensor units 1L and 1R is shielded (light-shielded portion). In the light receiving units of the sensor units 1L and 1R, the detection level of the light reflected by the retroreflecting member lowers in correspondence with the light-shielded portion. When the direction with the low light detection level is obtained, the direction of the light shielding position can be detected.

The control/arithmetic unit 2 detects a plurality of light-shielded ranges of the input portion by the pointer on the basis of a change in light intensity detected by the left and right sensor units 1L and 1R. On the basis of the end information of the light-shielded ranges, the direction (angle) of each end of the light-shielded ranges with respect to the sensor units 1L and 1R is calculated. If the pointer has a signal generation unit, a pen signal receiving unit 5 receives a pen signal from the pointer.

On the basis of the number of detected light-shielded ranges, data obtained from the light-shielded ranges and to be used for coordinate calculation is determined. The light shielding position of the pointer on the coordinate input effective region 3 is geometrically calculated on the basis of, e.g., the calculated direction (angle ($\theta L$ and $\theta R$ in FIG. 1A)) and the distance information between the sensor units 1L and 1R. The coordinate value is output, through an interface 7 (e.g., USB or IEEE 1394), to an external terminal such as a host computer connected to the display device.

In this way, the external terminal can be operated by the pointer by, e.g., drawing a line on the screen or manipulating an icon displayed on the display device.

In the present invention, a light intensity distribution including a light-shielded portion (shadow) detected by sensor units is compared with a reference light intensity distribution without the shadow (no light shielding state). In this comparison, a relative light intensity distribution is calculated from the light intensity distribution to be processed and the reference light intensity distribution. A threshold value is prepared to detect a part in the relative light intensity distribution, which is light-shielded at a predetermined ratio. In this embodiment, to solve problems, a first threshold value to determine the presence/absence of light shielding at a relatively low light shielding scheme level and a second threshold value to determine the presence/absence of light shielding at a higher light shielding level than the first threshold value are prepared (FIG. 1B).

When the first and second threshold values are compared with a shadow intensity (the rate of light intensity decrease by light shielding or the depth) obtained upon light shielding (input) from the relative light intensity distribution, even the coordinates of a plurality of inputs that are executed in parallel can accurately be detected without errors.

<Description of Problems>

Problems in the present invention will be described again in detail with reference to the accompanying drawings.

Figure 2B:
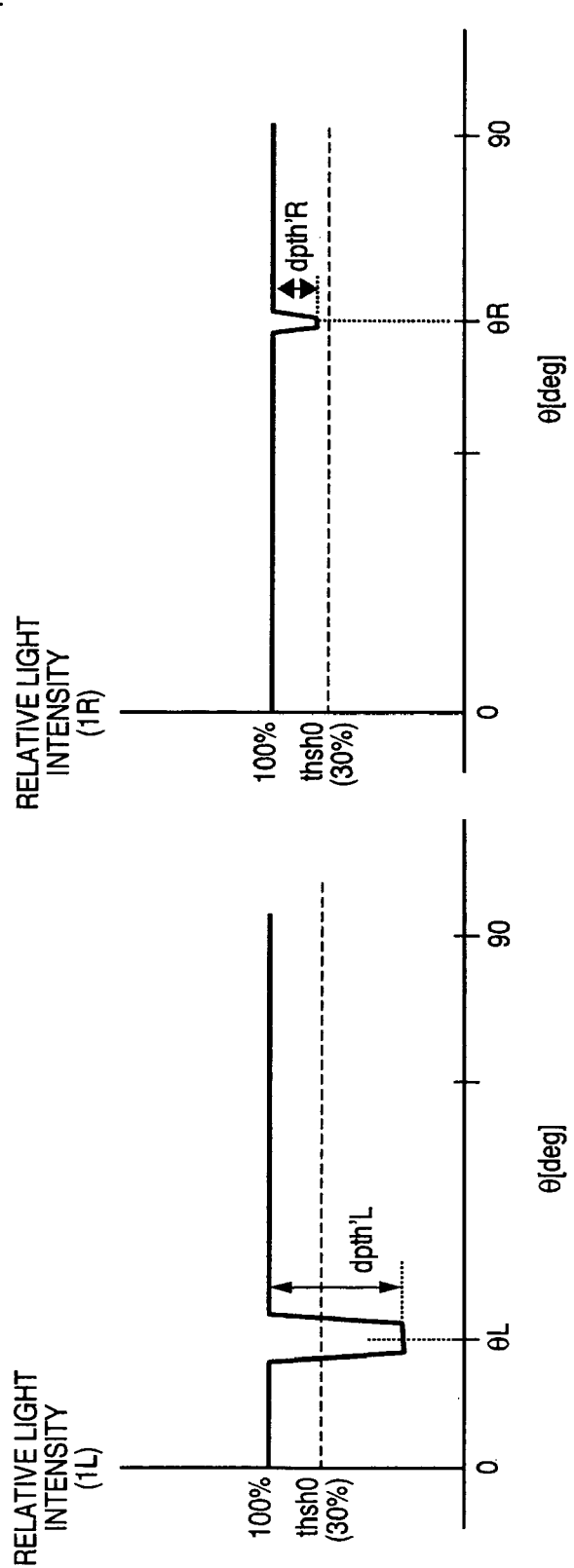

FIGS. 2A and 2B show graphs for explaining the problems in the present invention.

In the conventional arrangement, a single threshold value is used to determine the above-described shadow intensity.

For example, when a coordinate input operation is executed at a point P in FIG. 1A, relative light intensity distributions shown in FIG. 2A or 2B are obtained in correspondence with the input state. In this case, a shadow is formed at positions $\theta L$ and $\theta R$ in FIGS. 2A and 2B by input at the point P.

FIG. 2A shows relative light intensity distributions obtained by the sensor units 1L and 1R when coordinate input by a pointer is being executed. FIG. 2B shows relative light intensity distributions obtained by the sensor units 1L and 1R at the instant when the pointer enters or leaves the coordinate input effective region.

As is apparent from comparison of FIGS. 2A and 2B, even in the coordinate input operation of one cycle, the detection levels of the intensity (light shielding depth) of a shadow formed by light shielding have a large deviation between the relative light intensity distributions of the sensor units 1L and 1R depending on the detection timing. This deviation variously changes depending on the input position, and the manner of change is determined by factors such as the positional relationship between the retroreflecting member and the light projecting units and light receiving units in the sensor units and the distance between the input position and each sensor.

A case wherein, of the above-described factors, the factor of the distance between the input position and each sensor has a large effect will be examined for the sake of simplicity. When the point P is near the sensor unit 1L but far from the sensor unit 1R, the shadow in the relative light intensity distribution detected by the sensor unit 1L has a large width and depth. On the other hand, the shadow in the relative light intensity distribution detected by the sensor unit 1R has a small width and depth. That is, the light shielding depth of the shadow detected by the sensor unit 1L is relatively large, and the light shielding depth of the shadow detected by the sensor unit 1R is relatively small.

For example, assume that the threshold value to determine the presence/absence of a shadow is set to thsh0 (e.g., the level of relative light intensity decreases by 50%; a light shielding rate of 50%), as shown in FIG. 2A. When $$dpthL > thsh0$$

is satisfied, the sensor unit 1L detects the shadow corresponding to the point input at the point P.

On the other hand when $$dpthR < thsh0$$

is satisfied, the sensor unit 1R does not detect the shadow corresponding to the point input at the point P.

As a result, the position coordinates of the point P cannot be calculated.

Assume that thsh0 is set to a smaller value (e.g., the level of relative light intensity decreases by 30%; a light shielding rate of 30%) to avoid the above-described situation. Even in this case, the shadow detected by each sensor unit is small so that $$dpth'R < thsh0$$

is satisfied, as shown in FIG. 2B, always at a specific instant, e.g., when the pointer enters or leaves the coordinate input effective region 3. That is, the shadow is detected by only the sensor unit 1L but not by the sensor unit 1R. The position coordinates of the point P cannot be calculated even in this case.

As described above, in the single coordinate input operation (to also be abbreviated as single point input hereinafter), a moment at which the shadow to be detected by both sensor units cannot be detected by one of them because of, e.g., the difference in distance between the sensor units and the input position of the pointer is present when the pointer enters or leaves the coordinate input effective region. In this case, coordinate calculation cannot be executed.

This fact poses a serious problem particularly in a coordinate input apparatus allowing a plurality of simultaneous inputs. This problem will be described below with reference to FIG. 3. Some of the various constituent elements shown in FIG. 1A are omitted in FIG. 3 and subsequent drawings corresponding to FIG. 1A.

Figure 3:
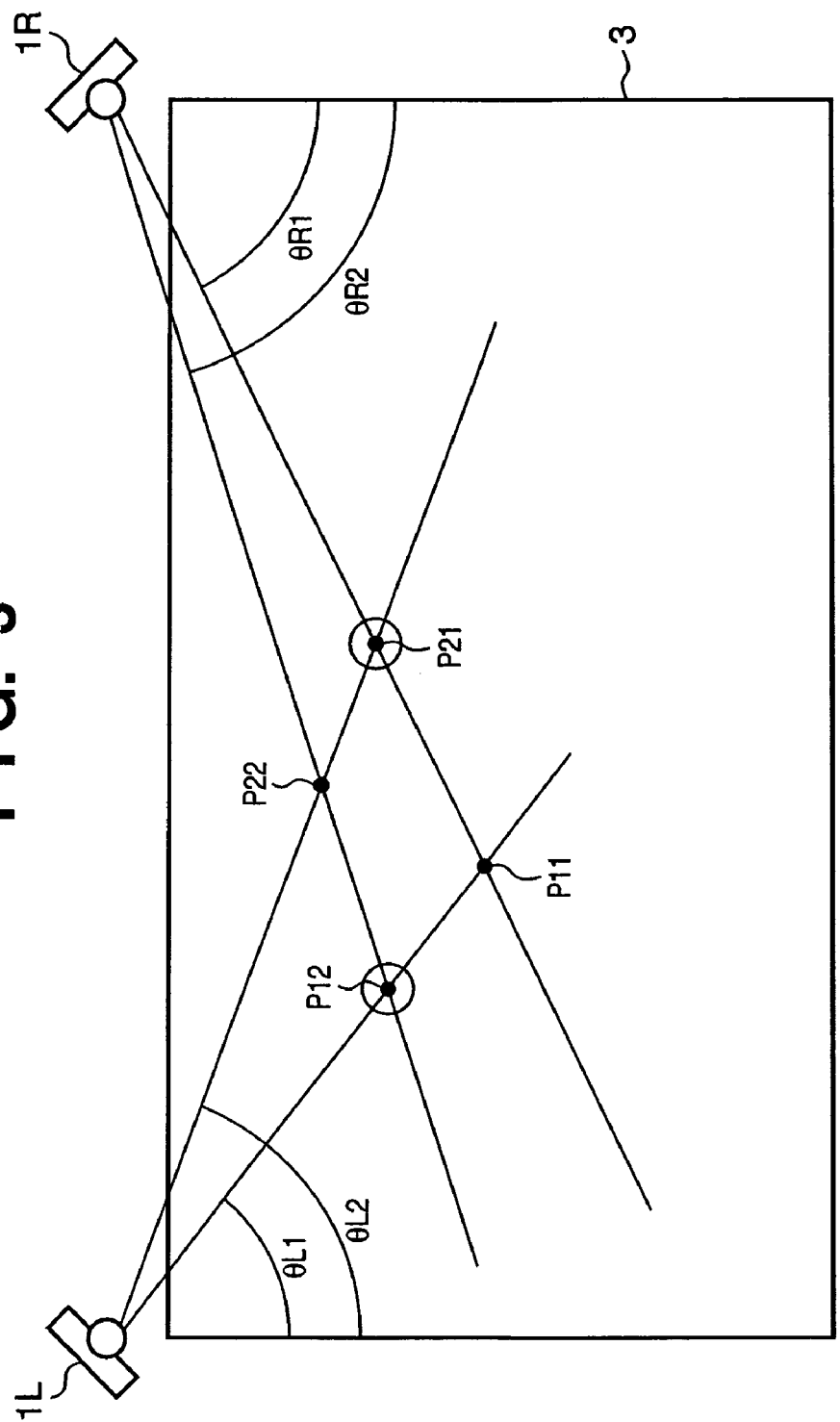
FIG. 3 is a view for explaining a multiple point input operation.

FIG. 3 shows a case wherein a plurality of inputs are done at a point Pa (e.g., P12 in FIG. 3) and a point Pb (e.g., P21 in FIG. 3).

Figure 4:
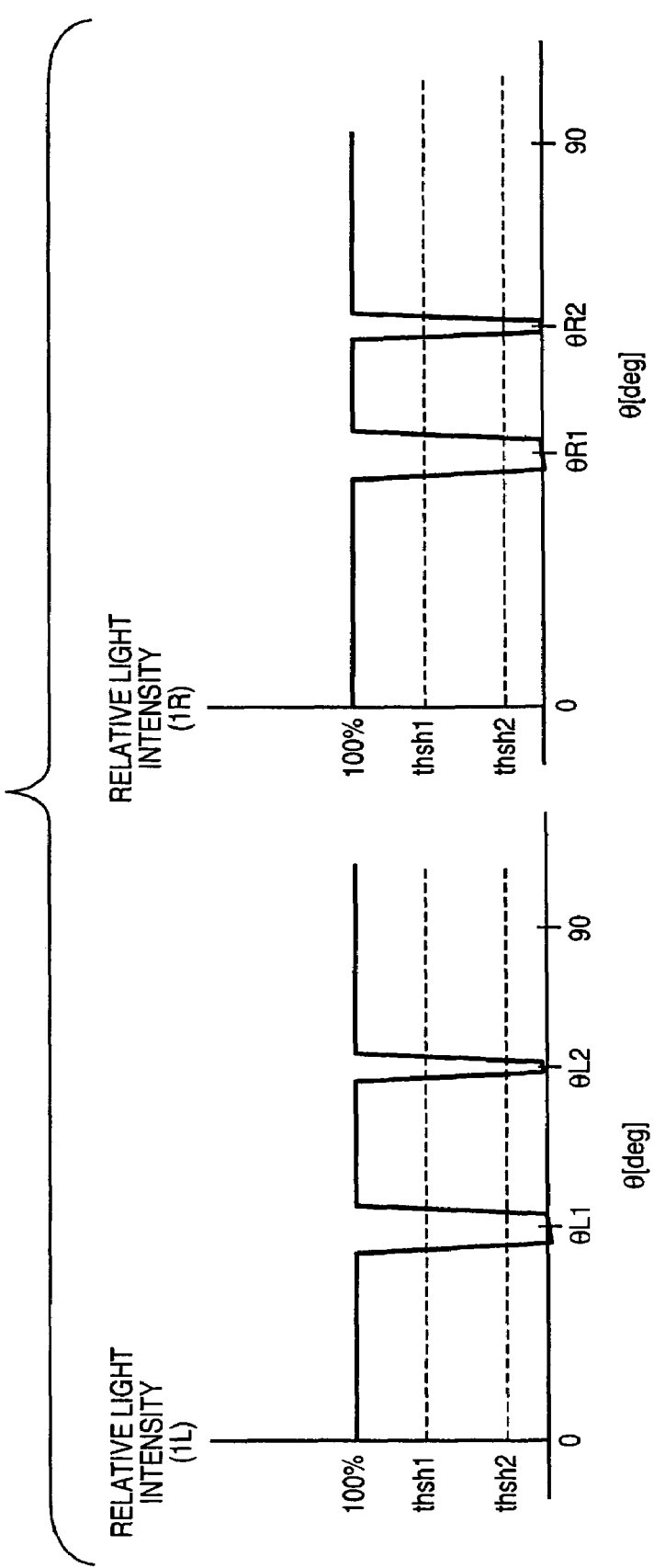
FIG. 4 shows graphs of light intensity distributions obtained by the sensor units in the input operation in FIG. 3.

In this case, the sensor unit 1L detects shadows at positions θL1 and θL2, and the sensor unit 1R detects shadows at positions θR1 and θR2, as shown in FIG. 4.

On the basis of the two sets of angle data (θL1 and θL2, and θR1 and θR2), four coordinate candidate points P11, P12, P21, and P22 are calculated. When truth determination is executed for these coordinate candidate points, for example, P11 and P22 are determined as virtual images, and P12 and P21 are determined as real images. Hence, the coordinate input points can be decided.

If a shadow detected by the sensor unit nearer to the coordinate input position has a large width and depth while the shadow detected by the sensor unit far from the coordinate input position has a small width and depth so the shadow cannot be detected, as described above, a wrong coordinate candidate point is detected.

An example of this will be described below.

Figure 5:
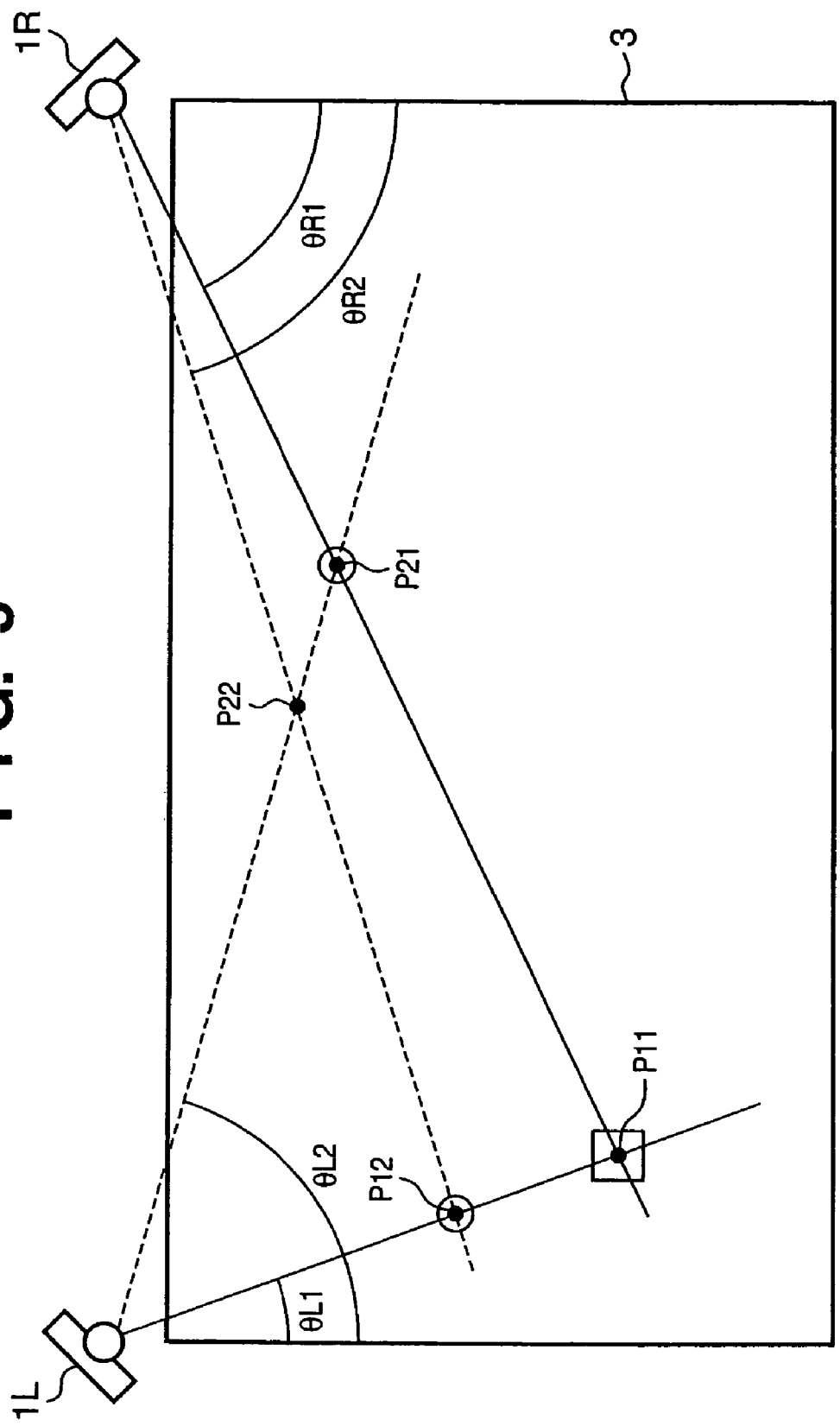
FIG. 5 is a view for explaining a multiple point input operation.
Figure 6:
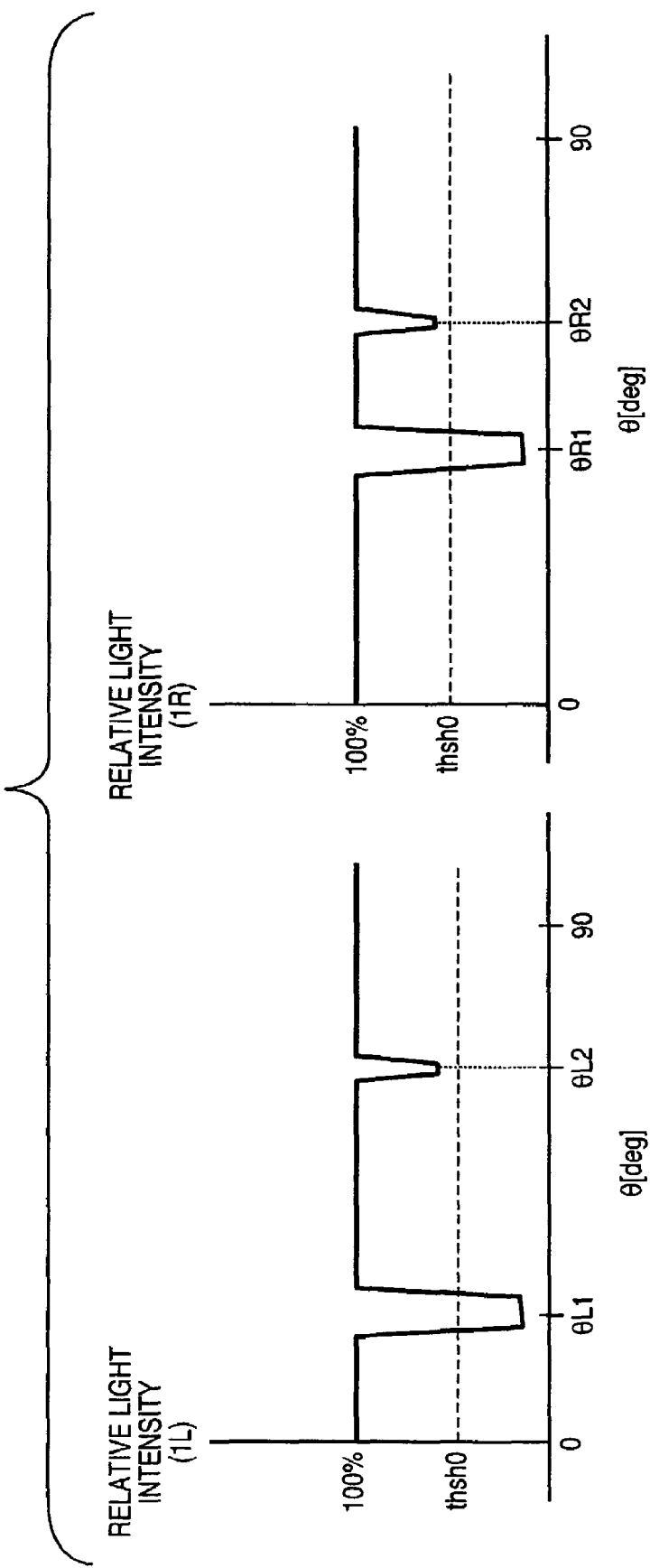
FIG. 6 shows graphs of light intensity distributions obtained by the sensor units in the input operation in FIG. 5.

FIGS. 5 and 6 show an example of multiple point input when coordinates cannot accurately be detected because shadows representing θL2 and θR2 do not exceed the threshold value thsh0.

In this case, the sensor units cannot detect shadows in directions of broken lines (i.e., P12, P21, and P22), as shown in FIGS. 5 and 6. For this reason, it is erroneously detected that only one input is done at the position P11, although a plurality of inputs are actually done at the position Pa (e.g., P12 in FIG. 5) and the position Pb (e.g., P21 in FIG. 5).

Another example will be described.

Figure 7:
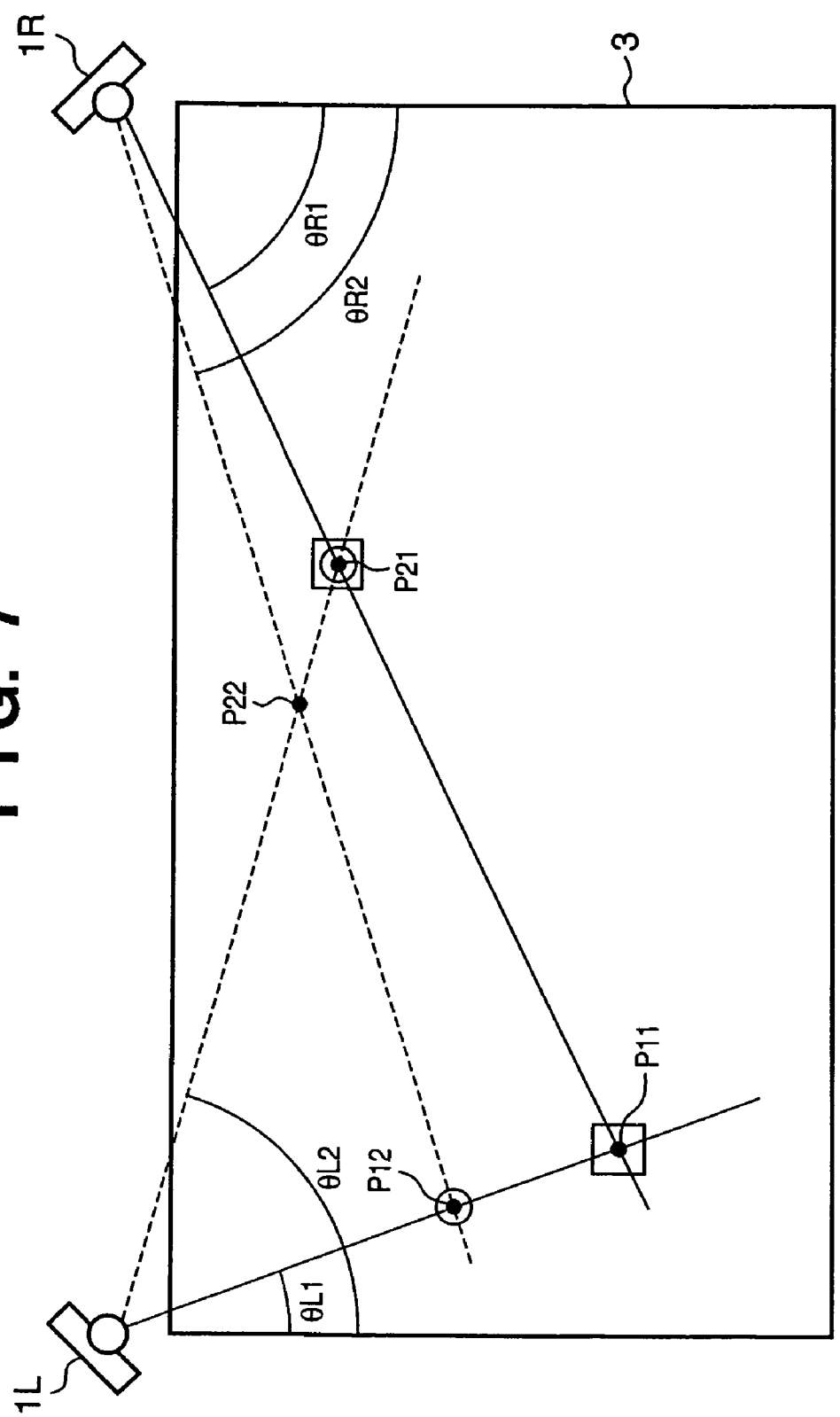
FIG. 7 is a view for explaining a multiple point input operation.
Figure 8:
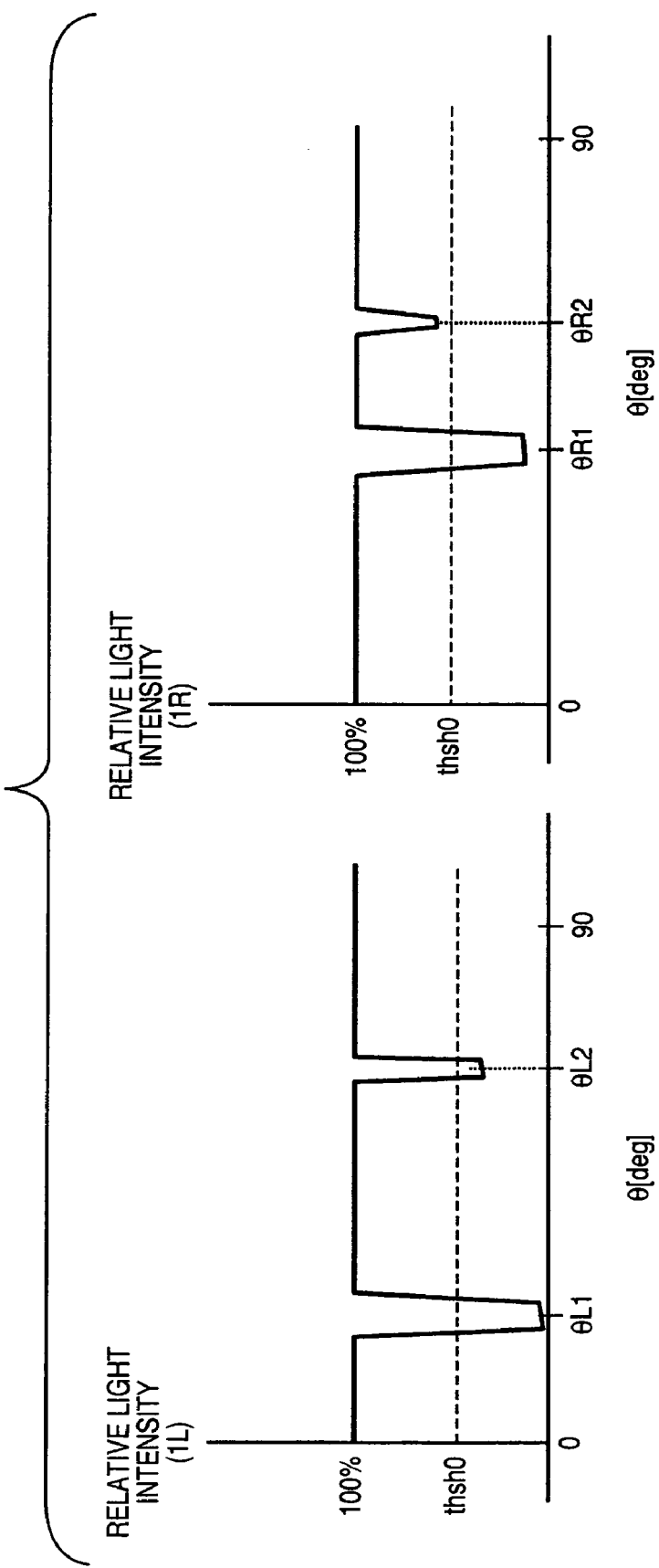
FIG. 8 shows graphs of light intensity distributions obtained by the sensor units in the input operation in FIG. 7.

FIGS. 7 and 8 show an example of multiple point input when coordinates cannot accurately be detected because only θR2 does not exceed the threshold value thsh0.

In this case, the sensor unit 1R cannot detect shadows in directions of broken lines (i.e., P12 and P22), as shown in FIGS. 7 and 8. For this reason, it is erroneously detected that two input points are present at P11 and P21 and overlap when viewed from the sensor unit 1R, although a plurality of inputs are actually done at the position Pa (e.g., P12 in FIG. 5) and the position Pb (e.g., P21 in FIG. 5).

As described above, even in the simultaneous multiple coordinate input operation (to also be abbreviated as multiple point input hereinafter), a moment at which the shadow to be detected by both sensor units cannot be detected by one of them because of, e.g., the difference in distance between the sensor units and the input position of the pointer is present when the pointer enters or leaves the coordinate input effective region, as in the single point input. In this case, coordinate calculation cannot be executed. In addition, if multiple point input is allowed, wrong coordinates or coordinate candidates are calculated, not to mention the fact that coordinate calculation is impossible The present invention proposes arrangements to solve these problems. In the present invention, especially, two threshold values are set to detect, from a relative light intensity distribution, the presence of a shadow formed by light shielding. The two threshold values are set on the basis of the maximum ratio of the shadow intensity (the depth of a valley in a relative light intensity distribution) assumed from the optical characteristics of the sensor units.

Let dpth_max be the maximum value and dpth_min be the minimum value of the assumed shadow intensity. A maximum ratio M of the shadow intensity is given by $$M = \text{dpth\_max}/\text{dpth\_min} \qquad \text{(Equation 1\_1)}$$

At this time, threshold values that satisfy $$\text{thsh1}/\text{thsh2} > M \qquad \text{(Equation 1\_2)}$$

are set. The two threshold values are applied to relative light intensity distributions. When a larger shadow exceeds the second threshold value (thsh2), a smaller shadow always exceeds the first threshold value (thsh1). That is, the presence of the larger shadow is determined on the basis of the second threshold value (thsh2), and the presence of the smaller shadow is determined on the basis of the first threshold value (thsh1). With this arrangement, the above-described coordinate calculation error which occurs because the smaller shadow cannot be detected although the larger shadow is detected can be avoided.

According to this arrangement, in the single point input, coordinate calculation can be prevented from being impossible when the pointer enters and leaves the coordinate input effective region. In the multiple point input, the problem of calculation of wrong coordinates as a result of recognition of wrong coordinate candidates and a recognition error of the presence/absence of shadow overlap can be avoided.

As described above, the effect obtained by the present invention is very large and indispensable in the coordinate input apparatus of this field.

The arrangement according to the first embodiment of the present invention will be described next.

FIGS. 9A to 11F schematically show all patterns of relationships between the set threshold values and the number of shadows in relative light intensity distributions obtained from the two sensor units 1L and 1R in the multiple point input mode shown in FIG. 3 (patterns in which only the order of shadows changes are omitted).

Referring to FIGS. 9A to 11F, shadows in relative light intensity distributions are represented by s1, s2, s3, and s4.

Views on the left side of FIGS. 9A to 11F show the composition of shadows detected by a sensor unit that detects a larger number of shadows exceeding the first threshold value thsh1. Views on the right side show the composition of shadows detected by a sensor unit that detects a smaller number of shadows exceeding the first threshold value thsh1.

For the descriptive convenience, assume that the sensor unit 1L detects a larger number of shadows. In FIGS. 9A to 11F, the position of each shadow has no meaning. Only the relationship between the number of shadows, the shadow intensity (depth), and the threshold values (thsh1 and thsh2) is significant.

In the multiple point input in the arrangement shown in FIG. 3, for example, the two sensor units 1L and 1R decide two sets of effective coordinate candidate points and decide final coordinate input points from the candidates. Alternatively, a third sensor unit may be provided to decide final coordinate input points on the basis of one set of coordinate candidate points and information acquired from the third sensor unit.

The first embodiment assumes multiple point input. Hence, single point input, multiple point input, and shadow overlap in the multiple point input are determined with positive proof on the basis of the state of detected shadows, i.e., whether each shadow exceeds the two threshold values. Hence, only sure coordinate candidate points without errors can be decided, and any coordinate calculation error can be prevented.

FIGS. 9A to 11F will be described below.

Figure 9A:
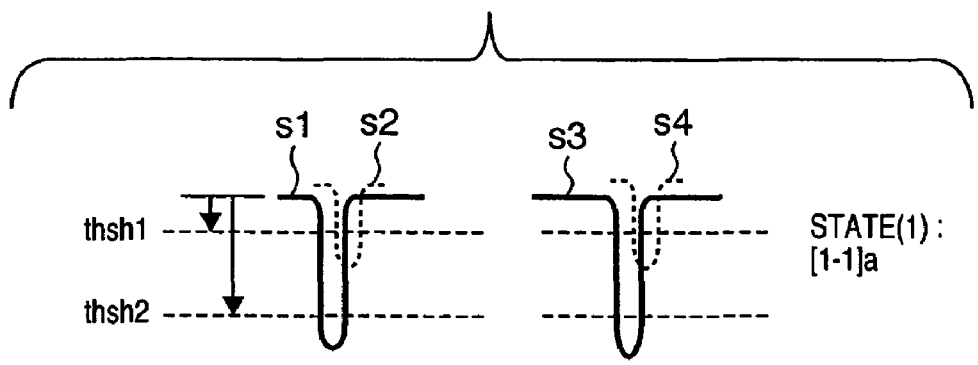
FIGS. 9A to 9C are views for explaining the arrangement of the first embodiment of the present invention.
Figure 9B:
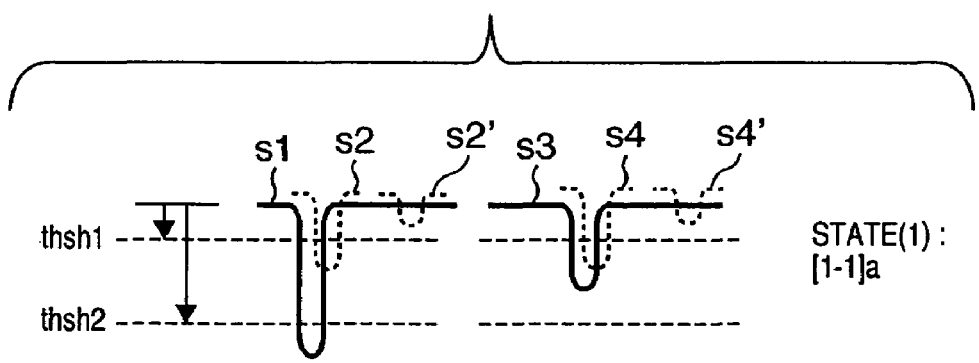
Figure 9C:
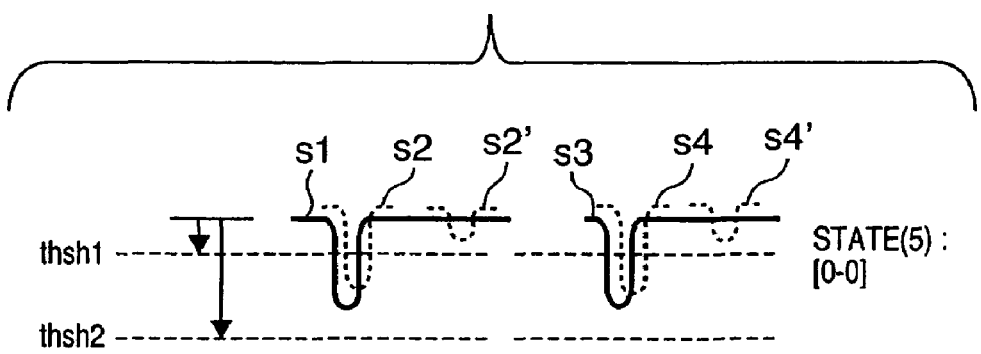

In a group A shown in FIGS. 9A to 9C, each of the sensor units 1L and 1R detects only one shadow exceeding at least the first threshold value thsh1.

[Case in FIG. 9A]

Both the shadows detected by the sensor units 1L and 1R exceed the second threshold value thsh2. For this reason, the shadows detected by the sensor unit 1R in the same input operation must exceed at least the first threshold value thsh1. Only the shadow s3 exceeds the first threshold value thsh1 on the side of the sensor unit 1R.

Of the shadows on the side of the sensor unit 1R, the shadow corresponding to the shadow s1 on the side of the sensor unit 1L is one of the shadow s3 and the shadow s4 (broken line) overlapping the shadow s3 at almost the same position.

The same examination applies to the shadow s3. Of the shadows on the side of the sensor unit 1L, the shadow corresponding to the shadow s3 is one of the shadow s1 and the shadow s2 (broken line) overlapping the shadow s1 at almost the same position.

Since the shadows overlap in both the sensor units 1L and 1R, it is determined that the same position is pointed by the input, i.e., single point input is executed, or a state that can be regarded as single point input is obtained.

Hence, it can be determined that the shadows s1 and s3 correspond to each other, i.e., one input defined by (s1,s3) is present.

[Case in FIG. 9B]

The shadow on the side of the sensor unit 1R corresponding to the shadow s1 on the side of the sensor unit 1L is one of the shadow s3 and the shadow s4 (broken line) overlapping the shadow s3. On the other hand, whether the shadow on the side of the sensor unit 1L corresponding to the shadow s3 on the side of the sensor unit 1R is the shadow s1, the shadow s2 (broken line) overlapping the shadow s1, or an undetected shadow s2' at another position (the shadow s2' does not exceed even the first threshold value thsh1) is unknown because the shadow s3 does not exceed the second threshold value thsh2.

In this case, the presence of at least one input defined by (s1,s3) is decided.

However, the presence of second input is not always deniable. That is, another input defined by (s2,s3) or (s2,s4) may exist.

[Case in FIG. 9C]

In this case, the shadow s1 does not correspond to the shadow s3. An input defined by (s1,s3) is present at a high probability. However, two inputs defined by (s1,s4) and (s2,s3) may also be detected incompletely (i.e., without exceeding the second threshold value thsh2). Hence, no inputs can be decided.

In a group B shown in FIGS. 10A to 10F, one sensor unit (sensor unit 1L here) detects two shadows exceeding the first threshold value thsh1, and the other sensor unit detects one shadow exceeding the first threshold value thsh1.

Figure 10A:
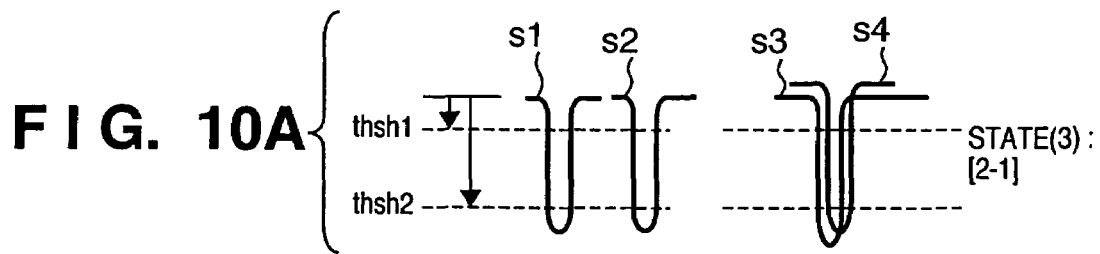
FIGS. 10A to 10F are views for explaining the arrangement of the first embodiment of the present invention.
Figure 10B:
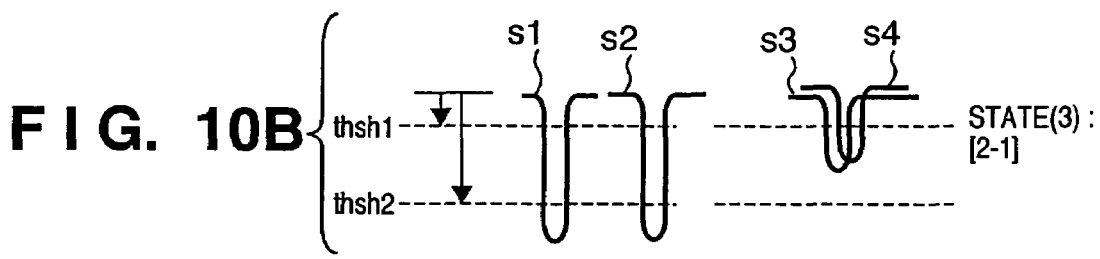

[Cases in FIGS. 10A and 10B]

Both the shadows s1 and s2 on the side of the sensor unit 1L exceed the second threshold value thsh2. For this reason, corresponding shadows on the side of the sensor unit 1R should also exceed the first threshold value thsh1. Only the shadow s3 exceeds the first threshold value thsh1 on the side of the sensor unit 1R. The shadow s4 overlaps the shadow s3 and is therefore regarded as identical to the shadow s3.

Hence, the shadows on the side of the sensor unit 1R corresponding to the shadows s1 and s2 are supposed to exist at least overlapping the position of the shadow s3. That is, the presence of two inputs defined by (s1,s3) and (s2,s3) can be decided.

Figure 10C:
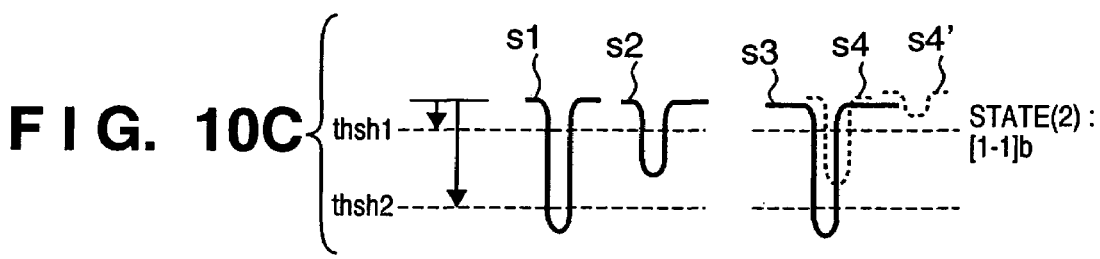
Figure 10D:
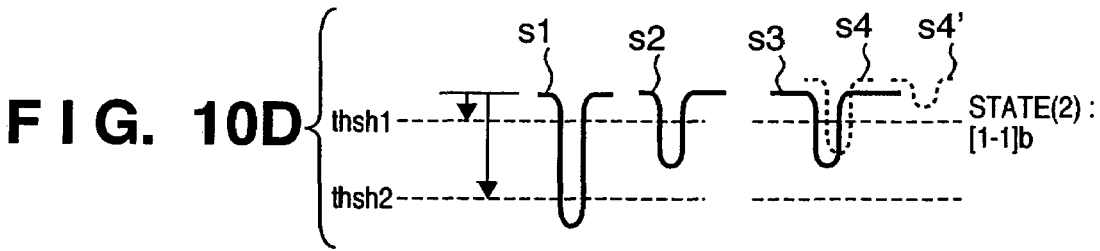

[Cases in FIGS. 10C and 10D]

The shadow s1 on the side of the sensor unit 1L exceeds the second threshold value thsh2. For this reason, the corresponding shadow on the side of the sensor unit 1R must exceed at least the first threshold value thsh1. Only the shadow s3 exceeds the first threshold value thsh1 on the side of the sensor unit 1R. Hence, the shadow corresponding to the shadow s1 is one of the shadow s3 and the shadow s4 overlapping the shadow s3.

On the other hand, the shadow s2 exceeds the first threshold value thsh1 but not the second threshold value thsh2. For this reason, the corresponding shadow on the side of the sensor unit 1R does not always exceed the first threshold value thsh1 and cannot positively be determined to be the shadow s3 or the shadow s4 overlapping the shadow s3.

In this case, the presence of an input defined by (s1,s3) can be decided. Although another input absolutely exists, it cannot be decided to be (s2,s3) or (s2,s4) (the presence of a shadow s4' is possible here).

Figure 10E:
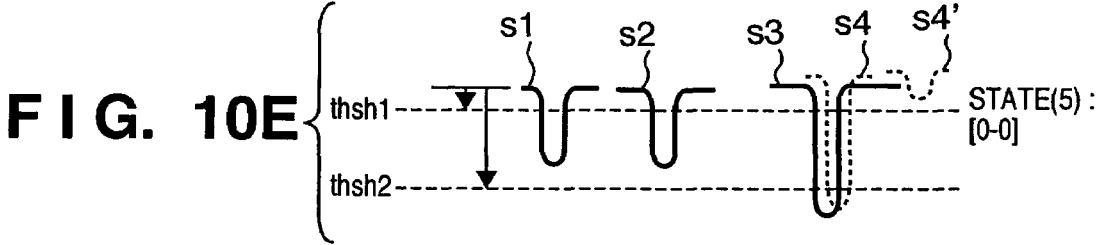
Figure 10F:
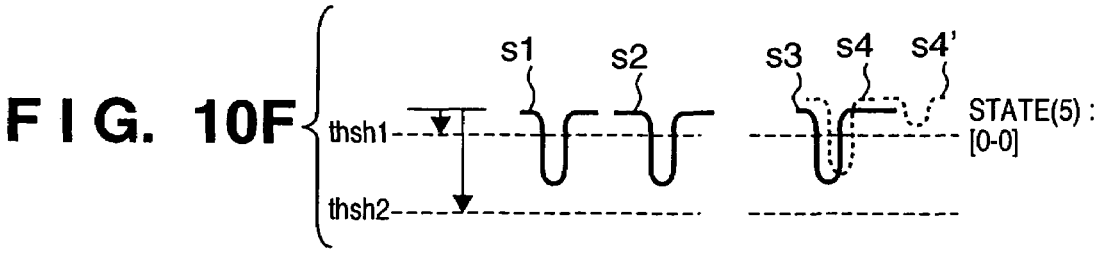
Figure 11A:
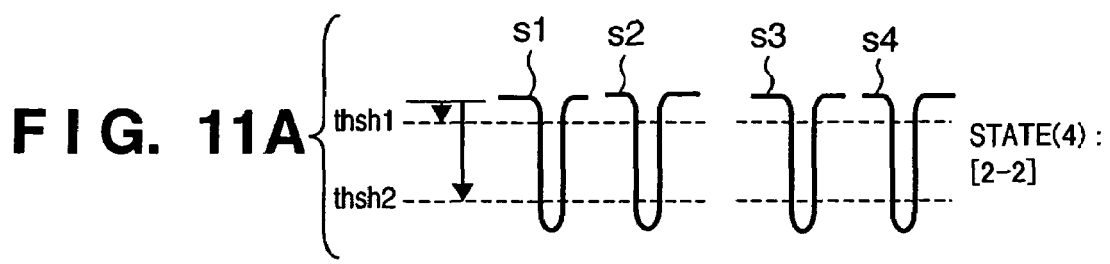
FIGS. 11A to 11F are views for explaining the arrangement of the first embodiment of the present invention.
Figure 11B:
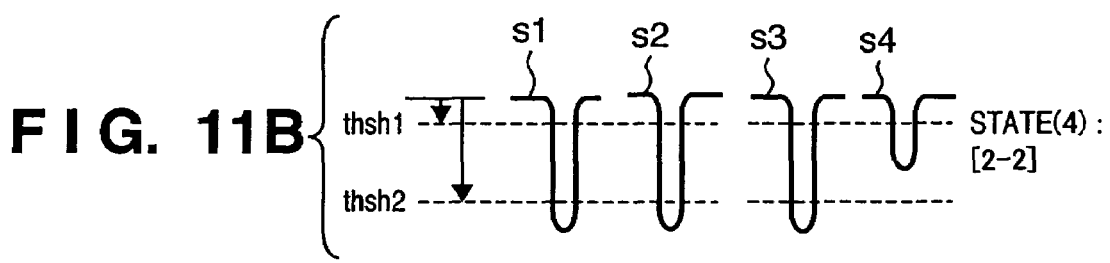
Figure 11C:
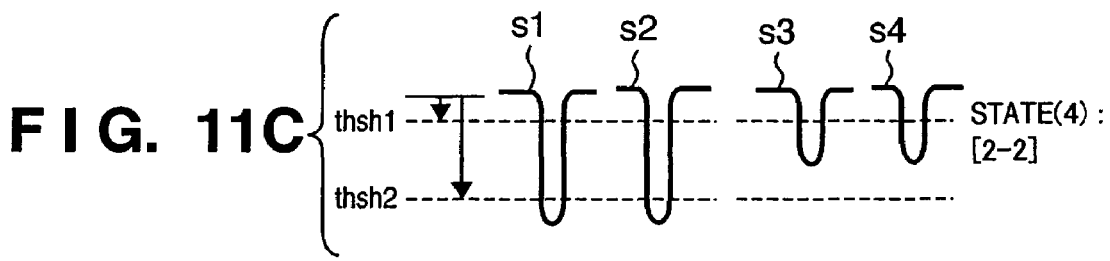
Figure 11D:
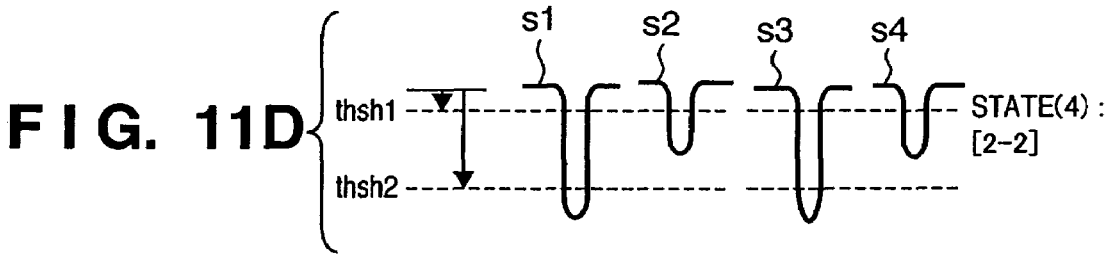
Figure 11E:
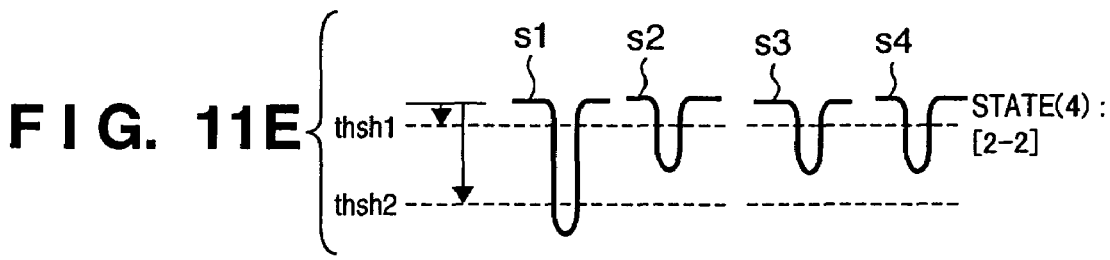
Figure 11F:
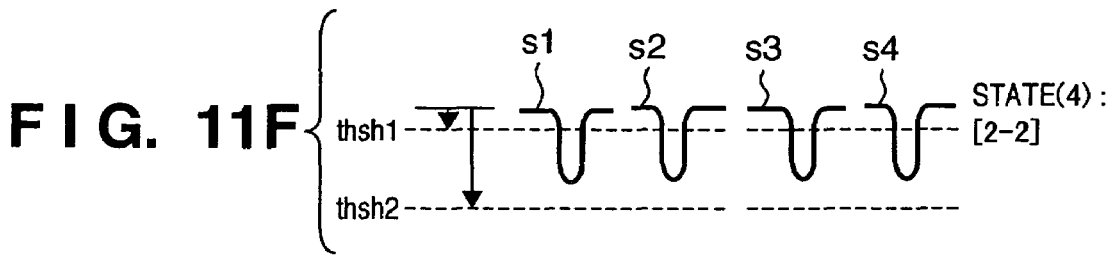

[Cases in FIGS. 10E and 10F]

The shadow s3 on the side of the sensor unit 1R exceeds the second threshold value thsh2. For this reason, a corresponding shadow on the side of the sensor unit 1L must exceed at least the first threshold value thsh1.

However, on the side of the sensor unit 1L, the two shadows s1 and s2 exceed the first threshold value thsh1, but do not exceed the second threshold value thsh2. For this reason, whether the shadows corresponding to them correspond to the shadow s3, the shadow s4 overlapping the shadow s3, or the undetected shadow s4' at another position on the side of the sensor unit 1R is unknown.

In this case, two inputs are present surely. However, inputs (i.e., combinations of shadows) that can be determined as a result are not present.

In a group C shown in FIGS. 11A to 11F, both the sensor units 1L and 1R can specify the positions of two shadows. Since the third input is inhibited, at least two inputs are present surely. Hence, the positions of all shadows can be specified. An undetected shadow at another position is supposed to not exist.

In all the cases shown in FIGS. 11A to 11F, four coordinate candidate points including at least two actual input points can be decided, though the coordinate positions of the two actual inputs cannot be specified.

As described above, in the first embodiment, input coordinates, four coordinate candidate points, or two overlap points can be decided on the basis of the groups shown in FIGS. 9A to 11F.

The decision states of coordinate candidate points based on the number of shadows detected by the sensor units 1L and 1R will be defined below. A combination of shadow counts will be expressed as [X-Y] (X=1, 2, Y=1, 2).

Decision state (1) ([1-1]a): decision of a single point input point

Decision state (2) ([1-1]b): decision of one of two input points

Decision state (3) ([2-1]): decision of overlap of two input points viewed from one sensor unit Decision state (4) ([2-2]): decision of four coordinate candidate points including two actual input points Decision state (5) ([0-0]): no decision of input points and coordinate candidate points The number of shadows in the decision states (1) to (5) is not the number of shadows simply detected by the sensor units 1L and 1R. The number of shadows represents a decision state wherein it is determined by coordinate candidate point decision processing (to be described below) based on the relationship between the shadows and the two threshold values that an input point or coordinate candidate point exists certainly. In some cases the number of shadows may be different from or smaller than the number of actually detected shadows.

The decision principle of input points or coordinate candidate points according to the first embodiment has been described above. When truth determination is combined with this decision principle, a coordinate input apparatus of light shielding scheme coping with multiple point input can be formed.

The coordinate candidate point decision processing according to the first embodiment will be described below with reference to FIG. 12.

Figure 12:
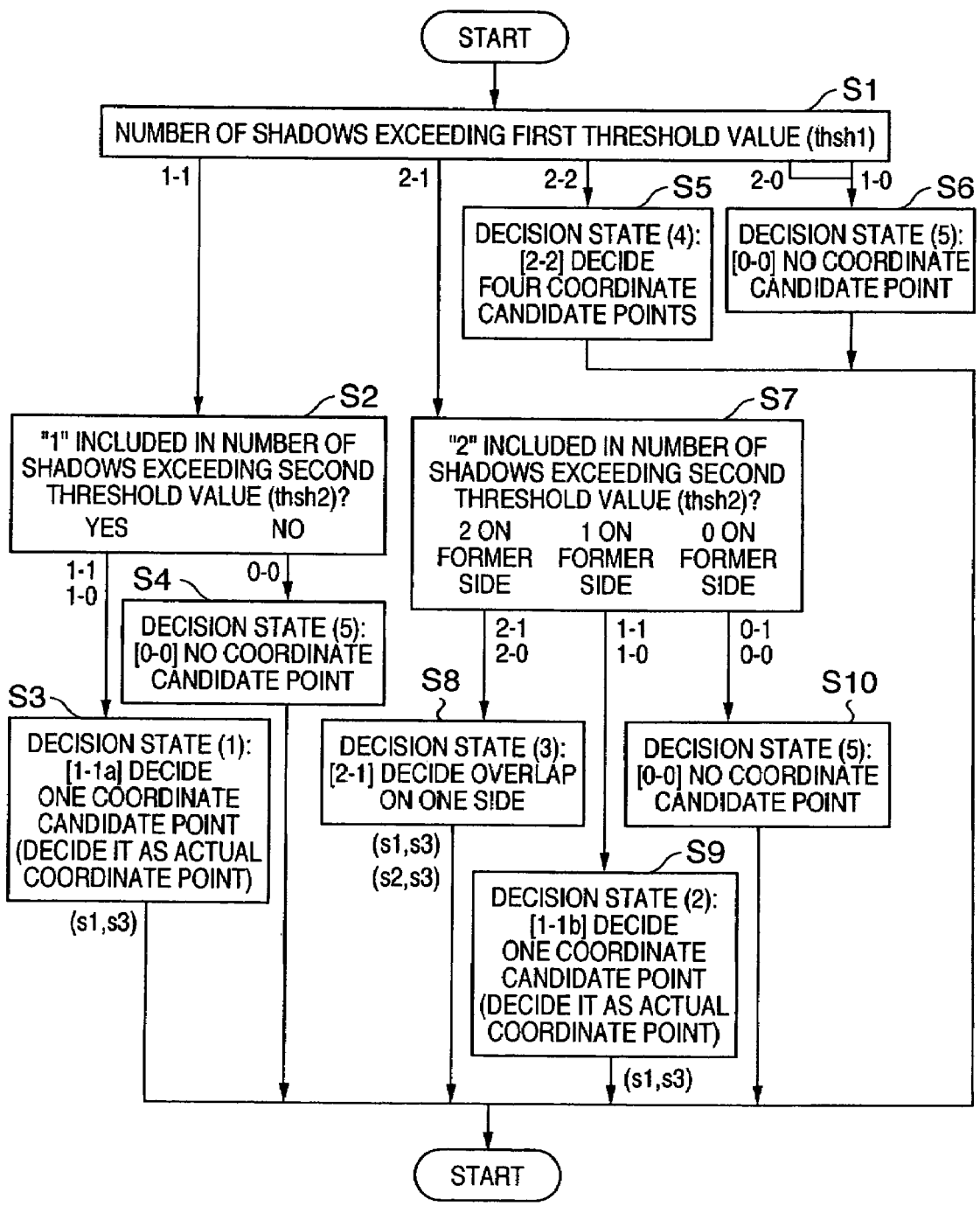
FIG. 12 is a flowchart showing coordinate candidate point decision processing according to the first embodiment of the present invention.

FIG. 12 is a flowchart showing the coordinate candidate point decision processing according to the first embodiment of the present invention.

In step S1, the number of shadows exceeding the first threshold value (thsh1) is detected from relative light intensity distributions detected by the sensor units 1L and 1R. The processing branches on the basis of this determination result.

If the combination of shadow counts is [1-1] in step S1, the flow advances to step S2 to determine whether the number of shadows that exceed the second threshold value (thsh2) in the process target shadows includes "1". If "1" is included (YES in step S2), the flow advances to step S3 to determine the decision state (1). If "1" is not included (NO in step S2), the flow advances to step S4 to determine the decision state (5).

If the combination of shadow counts is [2-1] in step S1, the flow advances to step S7 to determine whether the number of shadows that exceed the second threshold value (thsh2) in the process target shadows on the side of one sensor unit (sensor unit 1L or 1R) (in this case, the other sensor unit is the sensor unit 1R or 1L) includes "2". If "2" is included, the flow advances to step S8 to determine the decision state (3). If "1" is included, the flow advances to step S9 to determine the decision state (2). If "0" is included, the flow advances to step S10 to determine the decision state (5).

If the combination of shadow counts is [2-2] in step S1, the flow advances to step S5 to determine the decision state (4).

If the combination of shadow counts is [2-0] or [1-0] in step S1, the flow advances to step S6 to determine the decision state (5).

When coordinate calculation processing suitable for each decision state is executed on the basis of the decision state, coordinate calculation in multiple point input can accurately be executed. A detailed example of the coordinate calculation processing will be described in the second embodiment.

As described above, according to the coordinate input apparatus of light shielding scheme of the first embodiment, in an arbitrary set of a plurality of sensor units to observe input in the coordinate input effective region, the number of input points where the existence of input can be decided is determined from the shadow intensity and the number of shadows on the side of one sensor unit which detects a larger number of shadows upon input. In addition, the number of shadows detected by one sensor unit is compared with the number of shadows detected by the other sensor unit, thereby determining the presence/absence of shadow overlap.

For relative light intensity distributions obtained from the sensor units, a threshold value to be used by one sensor unit to determine the presence of a shadow is set as the first threshold value, and a threshold value to be used by the other sensor unit to determine the presence of a shadow is set as the second threshold value. The second threshold value is set to a higher intensity level (the degree of light shielding in the relative light intensity distribution) than the first threshold value.

In this arrangement, for example, when one sensor unit detects N shadows, the other sensor unit should also detect shadows unless they overlap. If the number of shadows detected by the latter sensor unit equals the number of shadows of the former sensor unit, it can be determined that the shadows do not overlap. If the number of shadows detected by the latter sensor unit is smaller than the number of shadows of the former sensor unit, it can be determined that the shadows overlap.

If each sensor unit detects N shadows, N×N coordinate candidate points can be decided. If the latter sensor unit detects one shadow, N coordinate candidate points can be decided.

When N=2, the present invention can implement the following determination.

When one sensor unit detects two shadows exceeding the second threshold value, and the other sensor unit detects two shadows exceeding the first threshold value, it is decided that four coordinate candidate points exist.

When one sensor unit detects two shadows exceeding the second threshold value, and the other sensor unit detects one shadow exceeding the first threshold value, it is decided that two coordinate input points are almost linearly arranged (overlap) when viewed from the latter sensor unit.

When one sensor unit detects one shadow exceeding the second threshold value, and the other sensor unit detects one shadow exceeding the first threshold value, it is decided that one coordinate input point exists.

With the above-described arrangement, in the first embodiment, even when shadows (light-shielded ranges) formed upon the same input are detected with a level difference between different sensor units, the point state (the above-described decision state and detection state) in the coordinate input effective region is determined so that input coordinate detection errors can be prevented in single point input, and detection of wrong coordinates different from input coordinates can be prevented in multiple point input.

The arrangement of the first embodiment can avoid the problem of, e.g., a detection error that occurs when the pointer enters or leaves the coordinate input effective region upon input. Hence, stable coordinate input can be implemented.

Second Embodiment

Figure 13:
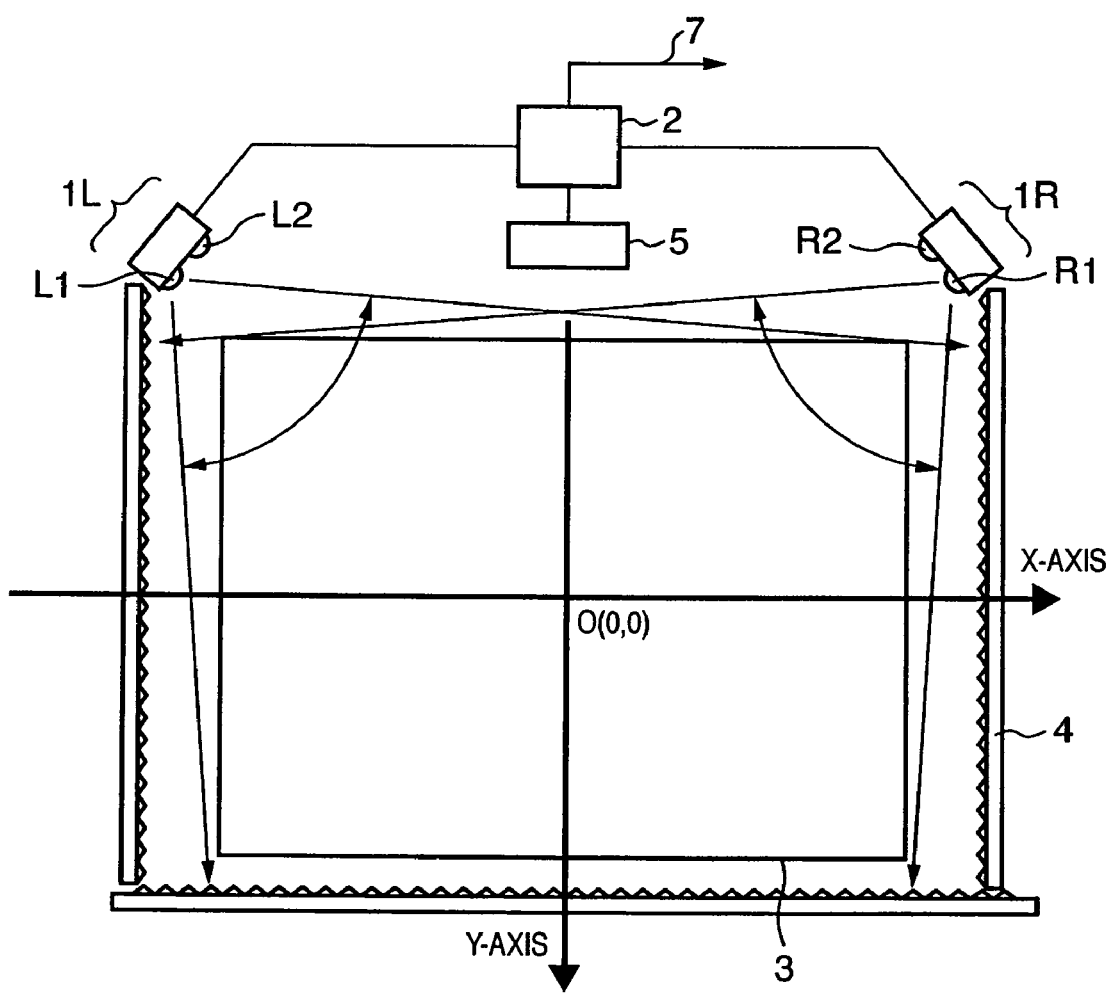
FIG. 13 is a view showing the arrangement of a coordinate input apparatus of light shielding scheme according to the second embodiment of the present invention.

FIG. 13 is a view showing the arrangement of a coordinate input apparatus of light shielding scheme according to the second embodiment of the present invention.

The basic arrangement of the coordinate input apparatus shown in FIG. 13 is the same as that of the coordinate input apparatus shown in FIG. 1A. In the first embodiment, the detailed arrangement of the sensor units 1L and 1R have not been described particularly. This will be described in the second embodiment.

Each of the sensor units 1L and 1R of the first embodiment incorporates one set of a light projecting unit and a light receiving unit. In the second embodiment shown in FIG. 13, each of sensor units 1L and 1R includes two sets of light projecting units and light receiving units. That is, the first embodiment employs a single-lens structure in which one optical unit is incorporated in one sensor unit. However, the second embodiment employs a multiple-lens (twin-lens) structure in which two optical units are incorporated in one sensor unit.

<Detailed Description of Sensor Unit 1>

The arrangement of the sensor units 1L and 1R will be described next with reference to FIG. 14. Each of the sensor units 1L and 1R is roughly divided into a light projecting unit and a light receiving unit.

FIG. 14 is an exploded view showing the detailed arrangement of the sensor unit according to the second embodiment of the present invention.

Referring to FIG. 14, infrared LEDs 101A and 101B to emit infrared light project light within a range of almost 90° toward the retroreflecting member 4 through projecting lenses 102A and 102B, respectively. The light projecting units in the sensor units 1L and 1R are implemented by the infrared LEDs 101A and 101B and the projecting lenses 102A and 102B. Hence, two light projecting units are included in each of the sensor units 1L and 1R.

Infrared light projected from the light projecting units is retroreflected by the retroreflecting member 4 in the direction of arrival and detected by the light receiving units in the sensor units 1L and 1R.

The light receiving unit comprises a 1D line CCD 104 with a shield member 105 which limits the visual field of a light beam and electrically shields the light, light receiving lenses (e.g., fθ lenses) 106A and 106B serving as a condenser optical system, irises 108A and 108B to roughly restrict the incident direction of incident light, and infrared filters 107A and 107B to prevent incidence of excess light (disturbance light) such as visible light.

The light reflected by the retroreflecting member 4 is focused on the surface of a detection element 110 of the line CCD 104 by the light receiving lenses 106A and 106B through the infrared filters 107A and 107B and the irises 108A and 108B. Hence, two light receiving units are included in each of the sensor units 1L and 1R.

Members 103 and 109 function as upper and lower hoods 103 and 109 which arrange the optical components included in the light projecting units and light receiving units and prevent the light projected by the light projecting units from directly entering the light receiving units or cut extraneous light.

In the second embodiment, the irises 108A and 108B are integrated with the lower hood 109. However, they may be separate components. In addition, a positioning unit of the irises 108A and 108B and light receiving lenses 106A and 106B may be provided on the side of the upper hood 103 to implement an arrangement that facilitates positioning of each light receiving unit with respect to the light emission center of a corresponding light projecting unit (i.e., an arrangement which allows only the upper hood 103 to arrange all the main optical components).

Figure 15A:
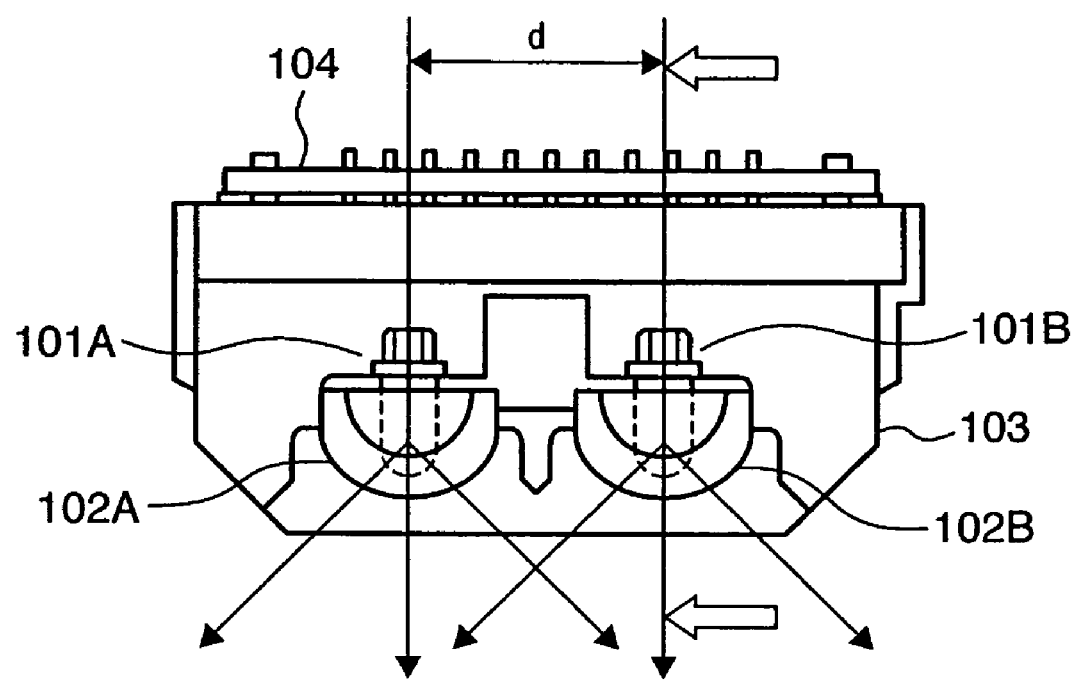
FIG. 15A is a view showing the optical arrangement of the sensor unit according to the second embodiment of the present invention.

FIG. 15A is a view showing the assembled state of the sensor unit 1L (1R) in FIG. 14, which is viewed from the front direction (a direction perpendicular to the coordinate input surface). As shown in FIG. 15A, the two light projecting units in the sensor unit 1L (1R) are spaced part by a predetermined distance d and arranged such that the directions of principal rays are almost parallel. The light projecting units are configured to project light within a range of almost 90° through the projecting lenses 102A and 102B.

Figure 15B:
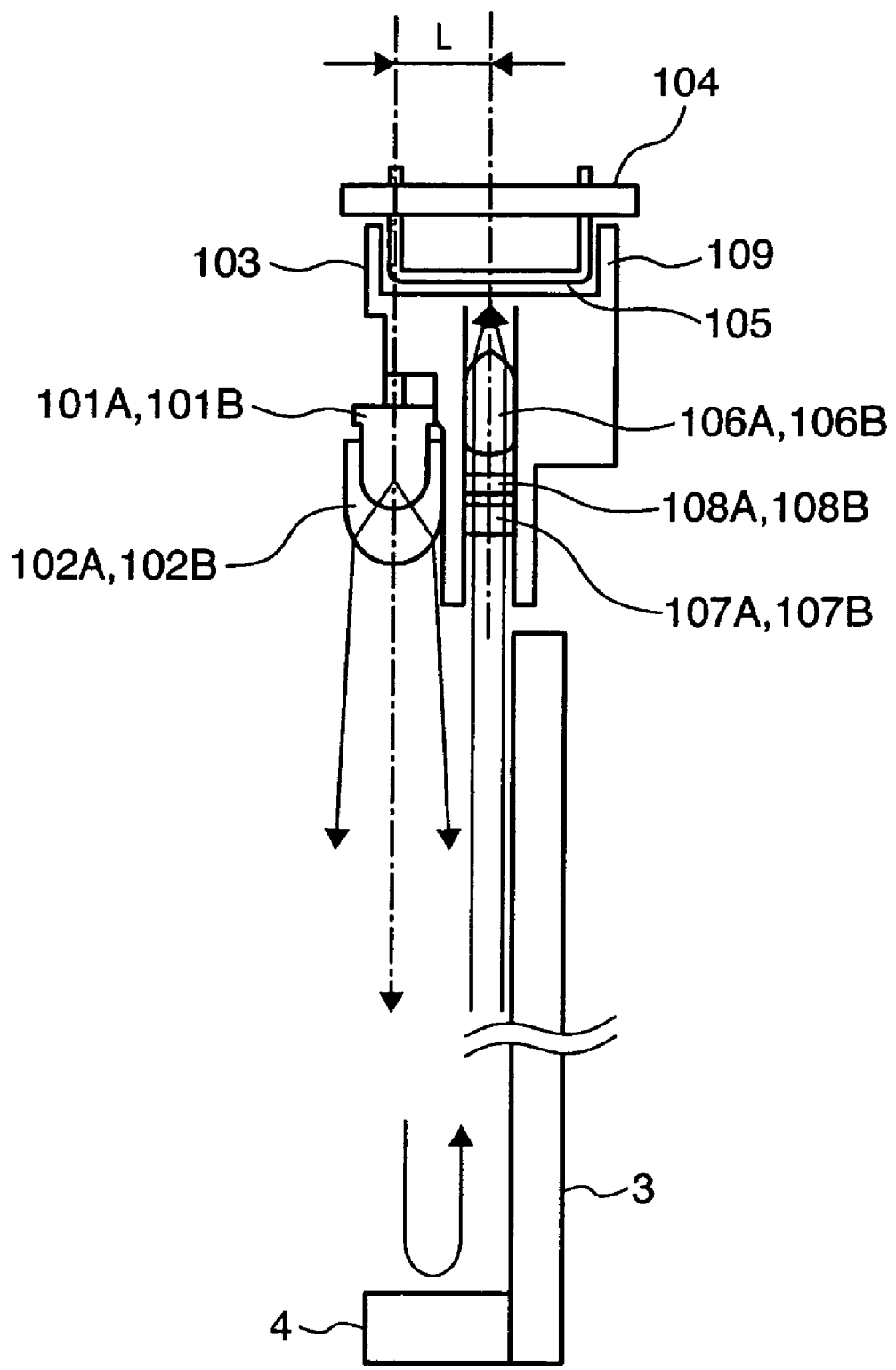
FIG. 15B is a sectional view showing the optical arrangement of the sensor unit according to the second embodiment of the present invention.

FIG. 15B is a sectional view of a portion indicated by open arrows in FIG. 15A. Light from the infrared LED 101A (101B) is projected mainly toward the retroreflecting member 4 as a light beam restricted by the projecting lens 102A (102B) to be almost parallel to the coordinate input surface.

Figure 15C:
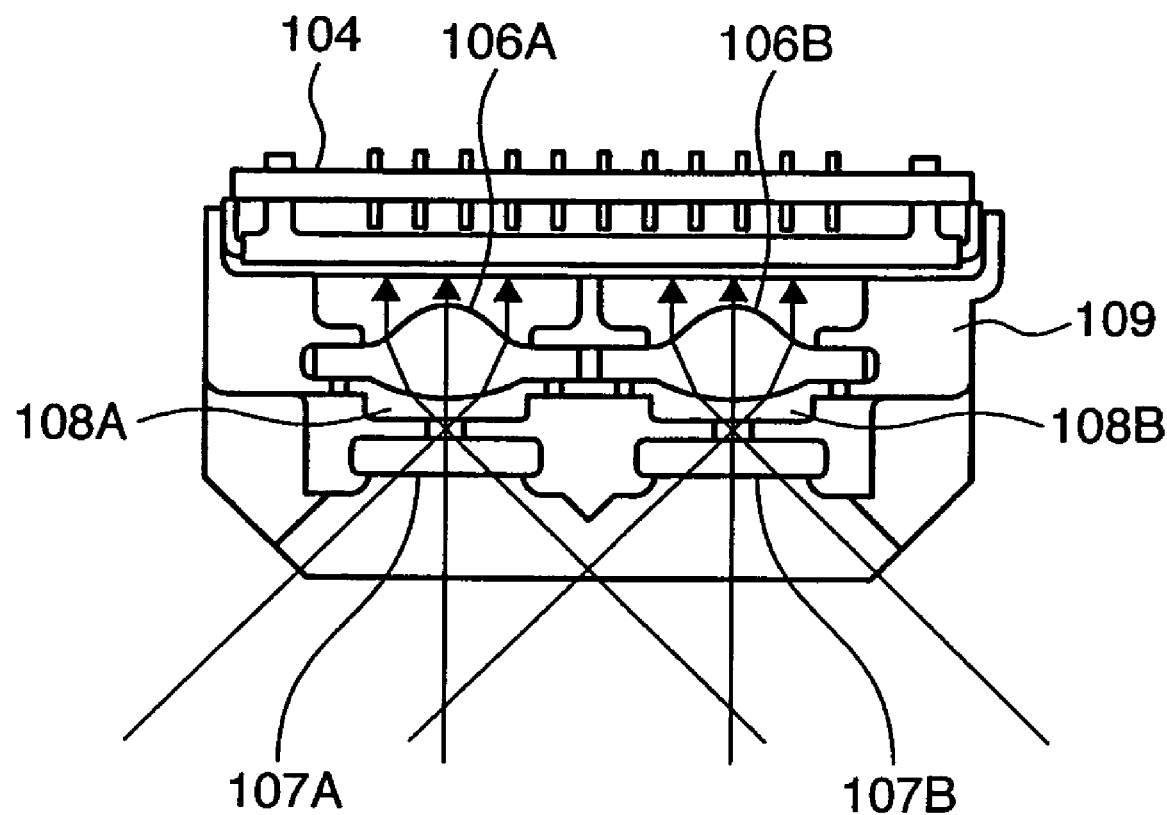
FIG. 15C is a view showing the optical arrangement of the sensor unit according to the second embodiment of the present invention.

FIG. 15C is a view showing the sensor unit without the infrared LEDs 101A and 101B, projecting lenses 102A and 102B, and upper hood 103 in FIG. 15A, which is viewed from the front direction (a direction perpendicular to the coordinate input surface).

In the second embodiment, the light projecting units and light receiving units are stacked in the direction perpendicular to a coordinate input effective region 3 serving as the coordinate input surface (FIG. 15B). When viewed from the front direction (the direction perpendicular to the coordinate input surface), the light emission center of each light projecting unit matches the reference position of a corresponding light receiving unit (the reference position corresponds to a reference point position to measure an angle, i.e., the position of the iris 108A (108B) in the second embodiment where light beams cross in FIG. 15C).

As described above, the two light projecting units are spaced part by the predetermined distance d and arranged such that the directions of principal rays are almost parallel. Hence, the two light receiving units are also spaced part by the predetermined distance d and arranged such that the optical axes (optical symmetry axes) are almost parallel.

The light beam almost parallel to the coordinate input surface, which is projected from a light projecting unit within a range of almost 90° in the in-plane direction, is retroreflected by the retroreflecting member 4 in the direction of arrival of light and is focused and forms an image on the surface of the detection element 110 of the line CCD 104 through the infrared filter 107A (107B), iris 108A (108B), and light receiving lens 106A (106B).

The output signal from the line CCD 104 represents the light intensity distribution corresponding to the incident angle of reflected light. Hence, the pixel number of each pixel included in the line CCD 104 indicates angle information.

A distance L between the light projecting unit and the light receiving unit shown in FIG. 15B is much shorter than the distance from the light projecting unit to the retroreflecting member 4. For this reason, even the light receiving unit having the distance L with respect to the light projecting unit can detect sufficient retroreflected light.

As described above, the sensor unit 1L (1R) includes at least two light projecting units and two light receiving units to detect light projected from the light projecting units (in the second embodiment, two sets of light projecting units and two sets of light receiving units are present).

In the second embodiment, the left portion of the detection element 110 that is linearly arranged on the line CCD 104 as part of the light receiving units is defined as the condenser region of the first light receiving unit, and the right portion is defined as the condenser region of the second light receiving unit, thereby sharing the component. However, the present invention is not limited to this. For example, line CCDs may individually be provided for the light receiving units.

<Description of Control/Arithmetic Unit>

A control/arithmetic unit 2 and the sensor units 1L and 1R mainly exchange CCD control signals for the line CCDs 104 in the light receiving units, CCD clock signal and output signal, and driving signals of the infrared LEDs 101A and 101B in the light projecting units.

The detailed arrangement of the control/arithmetic unit 2 will be described with reference to FIG. 16.

Figure 16:
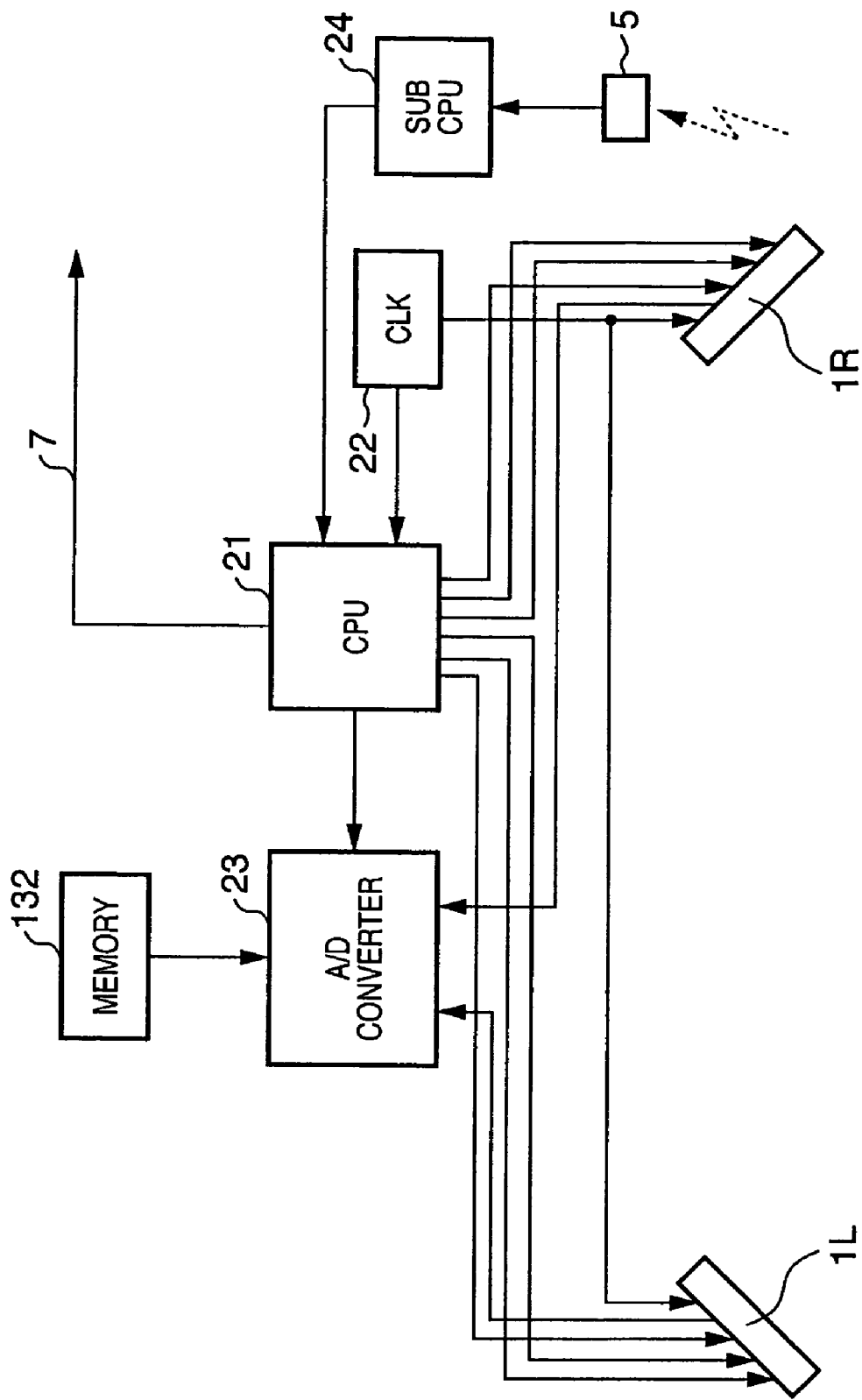
FIG. 16 is a block diagram showing the detailed arrangement of a control/arithmetic unit according to the second embodiment of the present invention.

FIG. 16 is a block diagram showing the detailed arrangement of the control/arithmetic unit according to the second embodiment of the present invention.

A CCD control signal is output from an arithmetic control circuit (CPU) 21 including, e.g., a one-chip microcomputer to control the shutter timing and data output of the line CCD 104.

The arithmetic control circuit 21 operates in accordance with a clock signal from a clock generation circuit (CLK) 22. Clock signals for CCDs are transmitted from the clock generation circuit (CLK) 22 to the sensor units 1L and 1R and also input to the arithmetic control circuit 21 to execute various kinds of control in synchronism with the line CCD 104 in each sensor unit.

LED driving signals to drive the infrared LEDs 101A and 101B of the light projecting units are supplied from the arithmetic control circuit 21 to the infrared LEDs 101A and 101B in the light projecting units in the sensor units 1L and 1R through LED driving circuits (not shown).

A detection signal from the line CCD 104 in each light receiving unit of the sensor units 1L and 1R is input to an A/D converter 23 and converted into a digital value under the control of the arithmetic control circuit 21. The converted digital value is stored in a memory 132 and used to calculate the angle of a pointer. A coordinate value is calculated from the calculated angle and output to an external terminal via a serial interface 7 (e.g., USB, IEEE 1394, or RS232C).

When a pen is used as a pointer, a pen signal receiving unit 5 which receives a pen signal from the pen outputs a digital signal obtained by demodulating the pen signal. This signal is input to a sub CPU 24 serving as a pen signal detection circuit and analyzed. The analysis result is output to the arithmetic control circuit 21.

<Detailed Description of Optical Layout of Sensor Unit 1>

Figure 17:
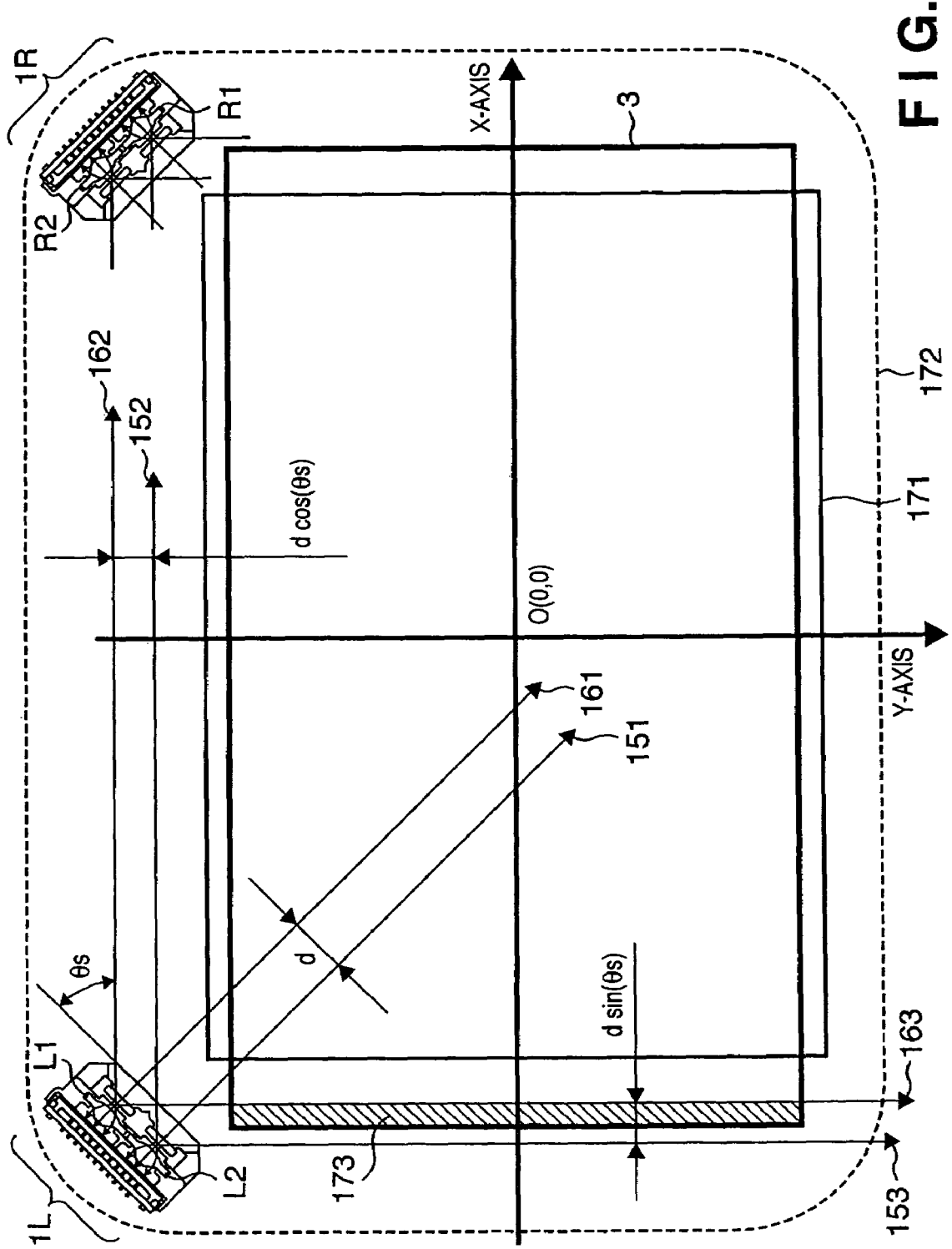
FIG. 17 is a view for explaining the optical layout of the coordinate input apparatus according to the second embodiment of the present invention.

FIG. 17 is a view for explaining the optical layout of the coordinate input apparatus according to the second embodiment of the present invention.

The optical layout of the left sensor unit 1L will particularly be described with reference to FIG. 17. The characteristic features of the right sensor unit 1R are the same as those of the left sensor unit 1L except that the sensor unit 1R is symmetrical with respect to the sensor unit 1L about the Y-axis in FIG. 17, and a description thereof will be omitted.

As described above, the sensor unit 1L includes two sets of light projecting units and light receiving units (optical units L1 and L2). The optical axes (optical symmetry axes corresponding to light beams 151 and 161) of the optical units are arranged almost parallel while being spaced apart by the predetermined distance d. The sensor surface of the sensor unit 1L tilts by θs with respect to one side of the coordinate input effective region 3.

The light projecting range of one light projecting unit (or the detection angle range of eon light receiving unit) in the sensor unit 1L is defined by light beams 152 and 153. The light projecting range of the other light projecting unit is defined by light beams 162 and 163.

The sensor unit 1R includes two sets of light projecting units and light receiving units (optical units R1 and R2).

The effective visual field range of each of the two sets of optical units (light projecting units and light receiving units), which is defined by the light beams 152 and 153 or light beams 162 and 163, is about 90°. The range may be, e.g., 100°. However, when the effective visual field range is set and designed to be wider, for example, the optical distortion of the optical components (e.g., lenses) included in the optical units increases, resulting in a disadvantage in forming an inexpensive optical system.

In a preferable form to obtain the point position information of a pointer that shields projected light, the coordinate input effective region is set in a region defined by the light beams 152 and 163. When the coordinate input effective region is set in a region 171, as shown in FIG. 17, the light shielding position of the pointer (light shielding object) in the region 171 can be detected by the two sets of light receiving units in the sensor unit 1L.

However, when the coordinate input effective region is set in this way, for example, the cabinet frame determined by the relationship between the coordinate inputtable region 171 and a cabinet 172 of the coordinate input apparatus incorporating the components becomes large. Hence, the entire coordinate input apparatus becomes bulky relative to the operable region. To solve this problem, the shape of the sensor unit 1L (1R) shall is preferably made small. In addition, the predetermined distance d between the two sets of optical units (light projecting units and light receiving units), which is defined by the light beams 151 and 161, is preferably decreased.

In the coordinate input apparatus according to the second embodiment, to make the cabinet frame determined by the coordinate input effective region 3 and cabinet 172 as small as possible, one light receiving unit in the sensor unit 1L (1R) includes the whole coordinate input effective region 3 in the effective visual field, although the other light receiving unit has a region 173 shown in FIG. 17 outside the effective visual field.

The distance d is set such that the projected component viewed from the direction of the pointer, i.e., d*cos(θL−θs) almost equals the radius of the pointer when the pointer is located at the left, right, or upper end of the coordinate input effective region 3.

With this arrangement, the pointer on the rear side is prevented from completely entering the region between the light beams 151 and 161 in FIG. 17.

In the second embodiment, light intensity distributions are acquired from, e.g., the optical units L1, L2, R1, and R2 shown in FIG. 17. The number of shadows and their positions (angles) obtained by each optical unit are calculated from the light intensity distribution. Four combinations, i.e., (L1,R1), (L1,R2), (L2,R1), and (L2,R2) obtained from the optical units L1 and L2 of the sensor unit 1L and the optical units R1 and R2 of the sensor unit 1R are sequentially selected.

In each combination, coordinate candidate points and their overlap state are decided. An appropriate combination of optical units is selected from them. With this processing, actual input points are determined (so-called truth determination) from the coordinate candidate points, and two input coordinate points are finally decided.

The four combinations (L1,R1), (L1,R2), (L2,R1), and (L2,R2) will be expressed as "LR optical unit combinations" or "LR combinations" hereinafter.

The coordinate calculation processing according to the second embodiment will be described next with reference to FIGS. 18A and 18B.

Figure 18A:
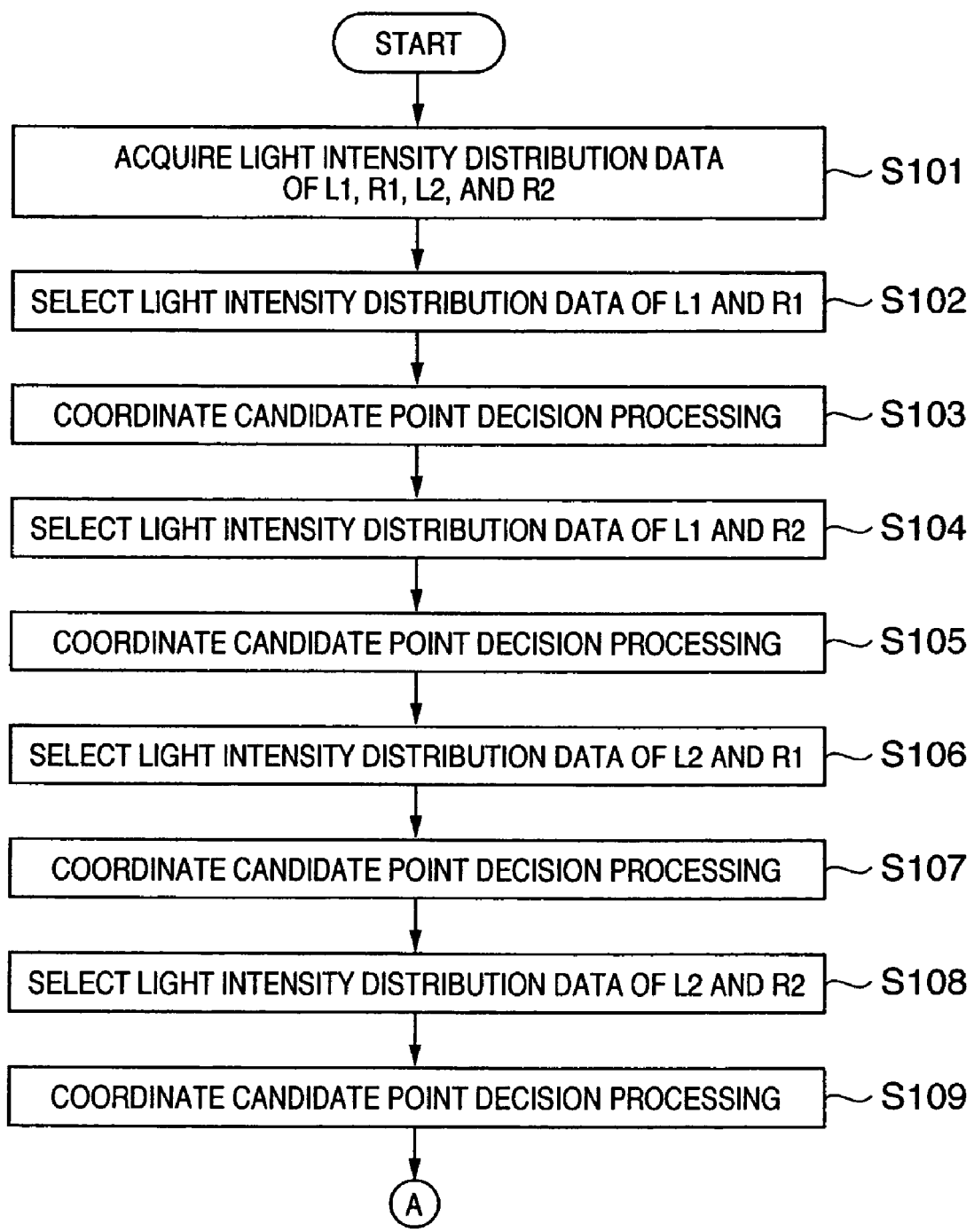
FIGS. 18A and 18B are flowcharts showing coordinate calculation processing executed by the coordinate input apparatus according to the second embodiment of the present invention.
Figure 18B:
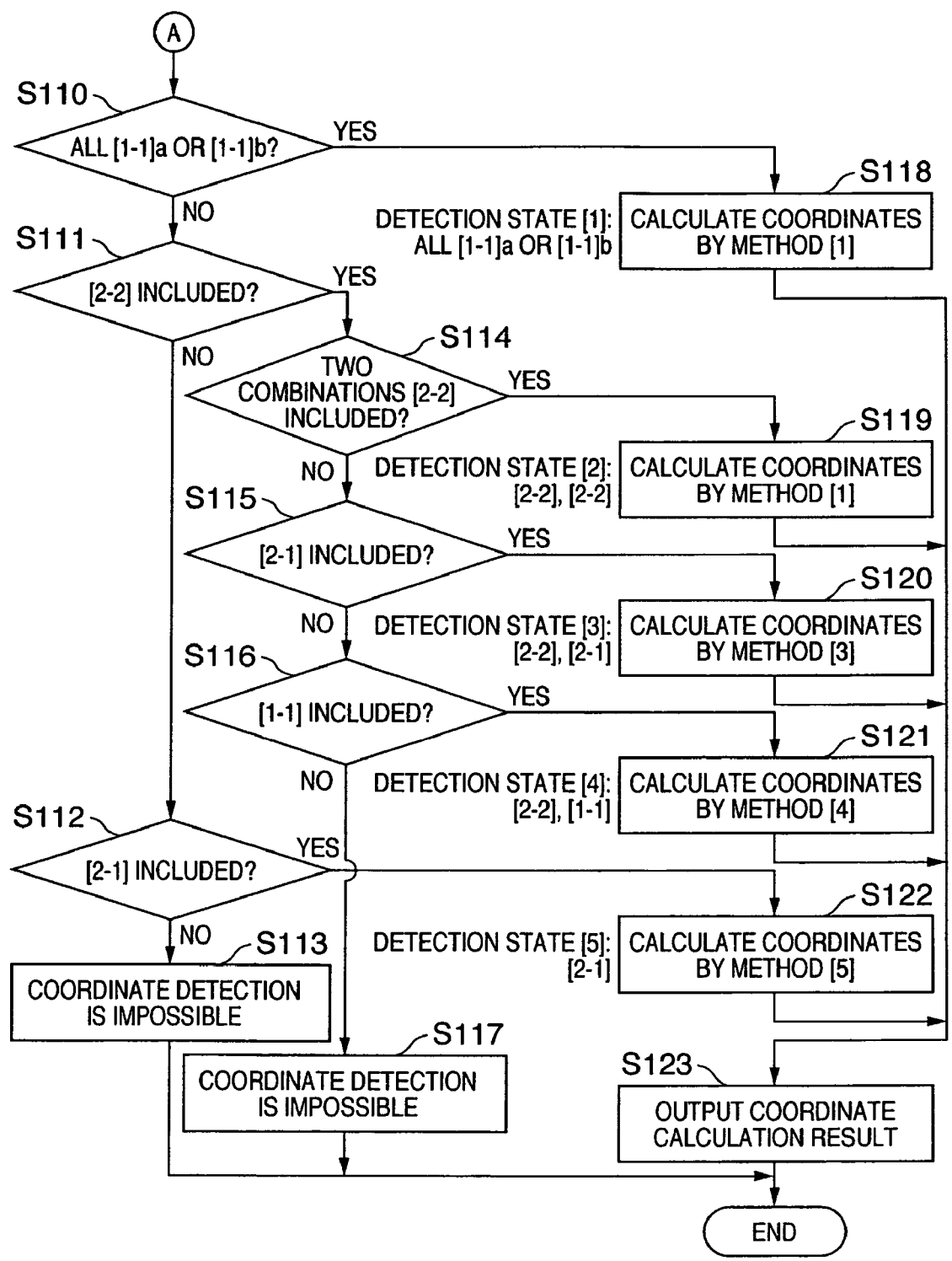

FIGS. 18A and 18B are flowcharts showing the coordinate calculation processing executed by the coordinate input apparatus according to the second embodiment of the present invention.

In step S101, light intensity distribution data of the optical units L1, L2, R1, and R2 are acquired. In step S102, light intensity distribution data corresponding to each LR combination is sequentially selected from the acquired light intensity distribution data. For the selected light intensity distribution data, the coordinate candidate point decision processing shown in FIG. 12 of the first embodiment is executed (steps S102 to S109).

On the basis of the result of coordinate candidate point decision processing, the coordinate calculation processing (steps S110 to S123) is executed.

By the coordinate candidate point decision processing for each LR combination, one of the following decision states is obtained, as described in the first embodiment.

Decision state (1) ([1-1]a): decision of a single point input point

Decision state (2) ([1-1]b): decision of one of two input points

Decision state (3) ([2-1]): decision of overlap of two input points viewed from one sensor unit Decision state (4) ([2-2]): decision of four coordinate candidate points including two actual input points Decision state (5) ([0-0]): no decision of input points and coordinate candidate points As described in the first embodiment, the number of shadows in the decision states (1) to (5) is not the number of shadows simply detected by the sensor units 1L and 1R. The number of shadows represents a decision state wherein it is determined on the basis of the relationship between the shadows and the two threshold values that an input point or coordinate candidate point exists certainly. In some cases, the number of shadows may be different from or smaller than the number of actually detected shadows.

In the second embodiment, the state of each LR combination is determined from the decision states (1) to (5). On the basis of the determination result, the detection state of shadow count in each optical unit in the sensor units 1L and 1R is decided.

Detection state [1]: all LR combinations are [1-1]a or [1-1]b

Detection state [2]: at least two LR combinations are [2-2]

Detection state [3]: an LR combination [2-2] and an LR combination [2-1] are present Detection state [4]: an LR combination [2-2] and an LR combination [1-1] are present Detection state [5]: at least one LR combination [2-1] is present In the second embodiment, the detection state of shadow count in each optical unit is determined (steps S111 to S112 and steps S114 to S116). Coordinate calculation is executed by one of coordinate calculation methods [1] to [5] defined in advance for the determined detection state (steps S118 to S122). The coordinate calculation result is output (step S123). If none of the above detection states is determined, it is determined that coordinate detection is impossible, and the processing is ended (step S113 or S117).

In FIGS. 18A and 18B, the detection states [1] to [5] are determined preferentially in this order. For example, if the detection states [3] and [4] are satisfied, the state is preferentially determined as the detection state [3].

The coordinate calculation methods [1] to [5] will be described below in detail.

Coordinate Calculation Method [1] (Step S118: Detection State [1])

In the detection state [1], when all LR combinations are [1-1]a, single point input is executed. When all LR combinations are [1-1]b, two-point input is executed, though one point is not correctly detected.

The latter case occurs mainly when the pointer enters or leaves the coordinate input effective region. In this case, input that is not correctly detected is neglected, thereby preventing calculation of wrong coordinates. Hence, in the detection state [1], coordinate calculation is executed assuming single point input in both [1-1]a and [1-1]b.

In this case, coordinate calculation can be executed in any LR combination. For example, in the optical unit combination (L1,R1), coordinate calculation is executed by <Coordinate Calculation Processing (1)> (to be described later).

Coordinate Calculation Method [2] (Step S119: Detection State [2])

In the detection state [2], at least two of the LR combinations (L1,R1), (L1,R2), (L2,R1), and (L2,R2) are [2-2].

Two combinations are selected, and sets of four coordinate candidate points obtained from the combinations are compared.

A detailed example will be described with reference to FIGS. 19 and 20, in which (L1,R1) and (L2,R1) are [2-2].

In FIG. 19, P11, P12, P21, and P22 are decided from the combination (L1,R1) on the basis of <Coordinate Calculation Processing (1)> to be described later. In FIG. 20, P'11, P'12, P'21, and P'22 are decided from the combination (L2,R1) on the basis of <Coordinate Calculation Processing (2)> to be described later.

The values of the sets of four coordinate candidate points obtained from the LR combinations are compared.

Coordinate candidate points based on actually input coordinates have the same coordinate value in both the LR combinations. On the other hand, coordinate points that are not based on actually input coordinates (coordinate candidate points as so-called virtual images) have different coordinate values in the LR combinations because of the influence of offset of the optical unit positions.

The values of the sets of four coordinate candidate points obtained from the LR combinations are compared. Coordinate candidate points which almost match each other as a result of comparison can be decided as the true coordinate values of the two input points.

Figure 20:
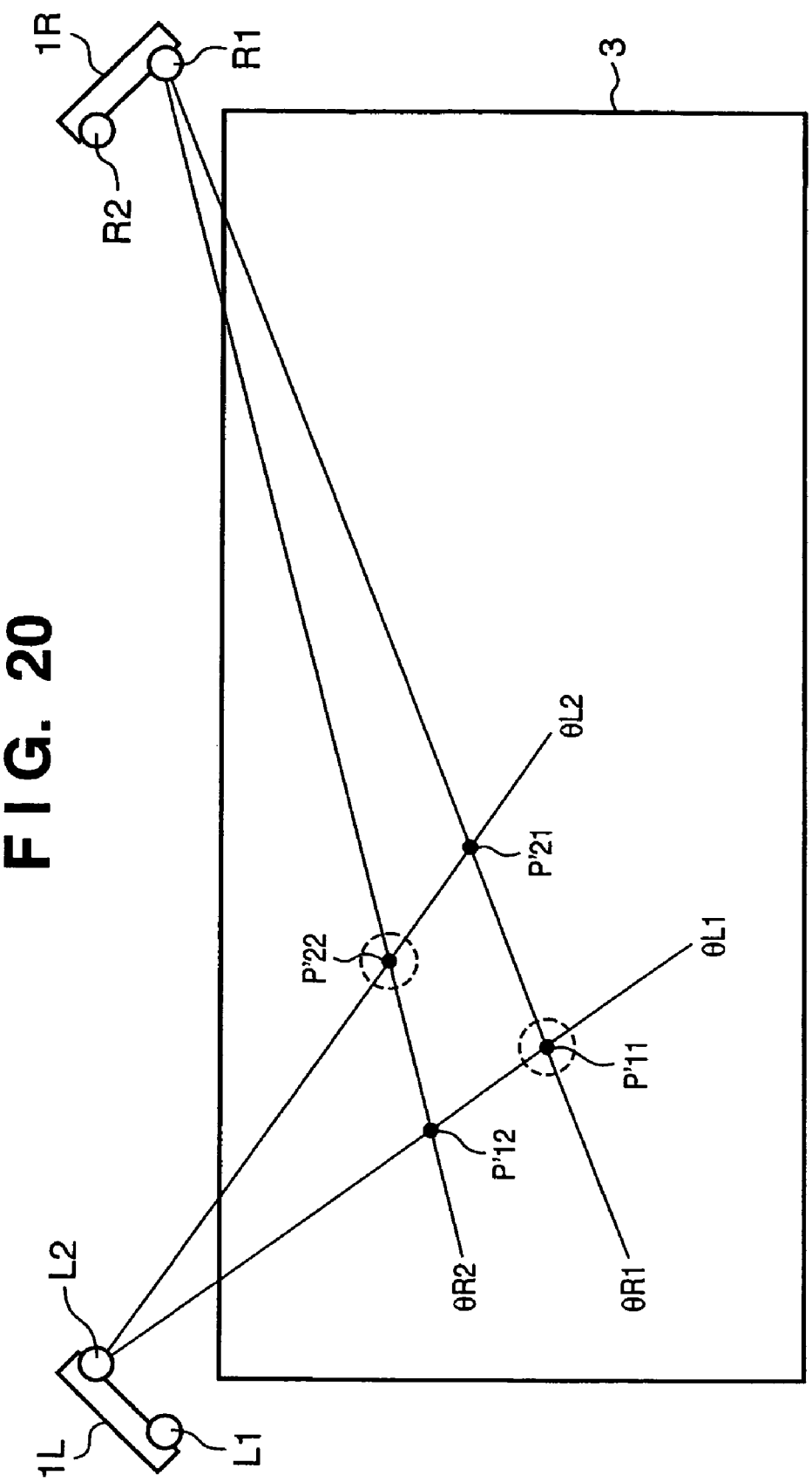
FIG. 20 is a view for explaining the coordinate calculation method according to the second embodiment of the present invention.

In the example shown in FIGS. 19 and 20, P11 and P22 are decided as two input points based on actual input.

Coordinate Calculation Method [3] (Step S120: Detection State [3])

In the detection state [3], an LR combination [2-2] and an LR combination [2-1] are present.

A detailed example will be described with reference to FIGS. 21 and 22, in which (L1,R2) is [2-2], and (L1,R1) are [2-1].

Figure 21:
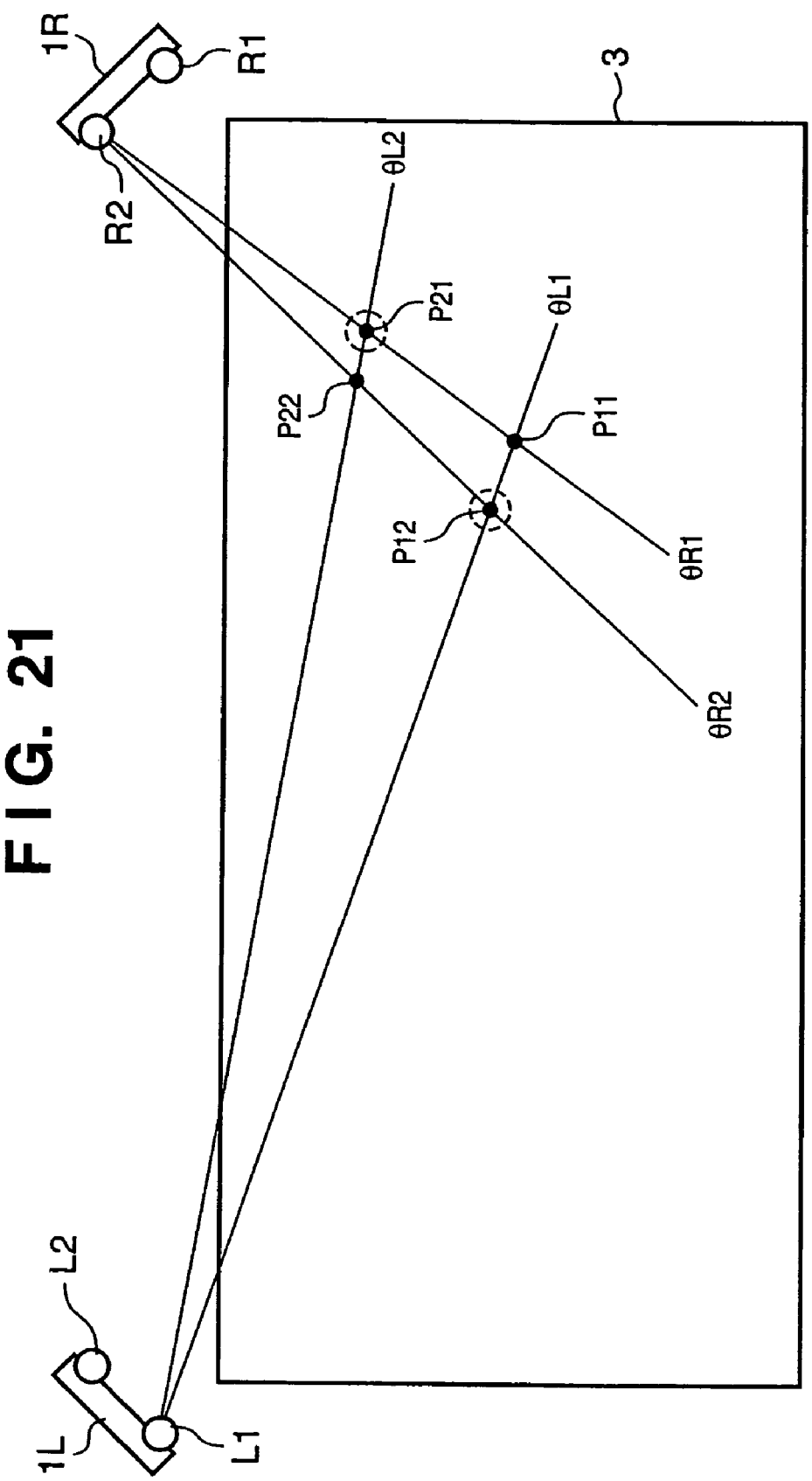
FIG. 21 is a view for explaining the coordinate calculation method according to the second embodiment of the present invention.

In FIG. 21, P11, P12, P21, and P22 are decided from the combination (L1,R2) on the basis of <Coordinate Calculation Processing (2)> to be described later. In FIG. 22, PP1 and PP2 are decided from the combination (L1,R1) on the basis of <Coordinate Calculation Processing (1)> to be described later.

Figure 22:
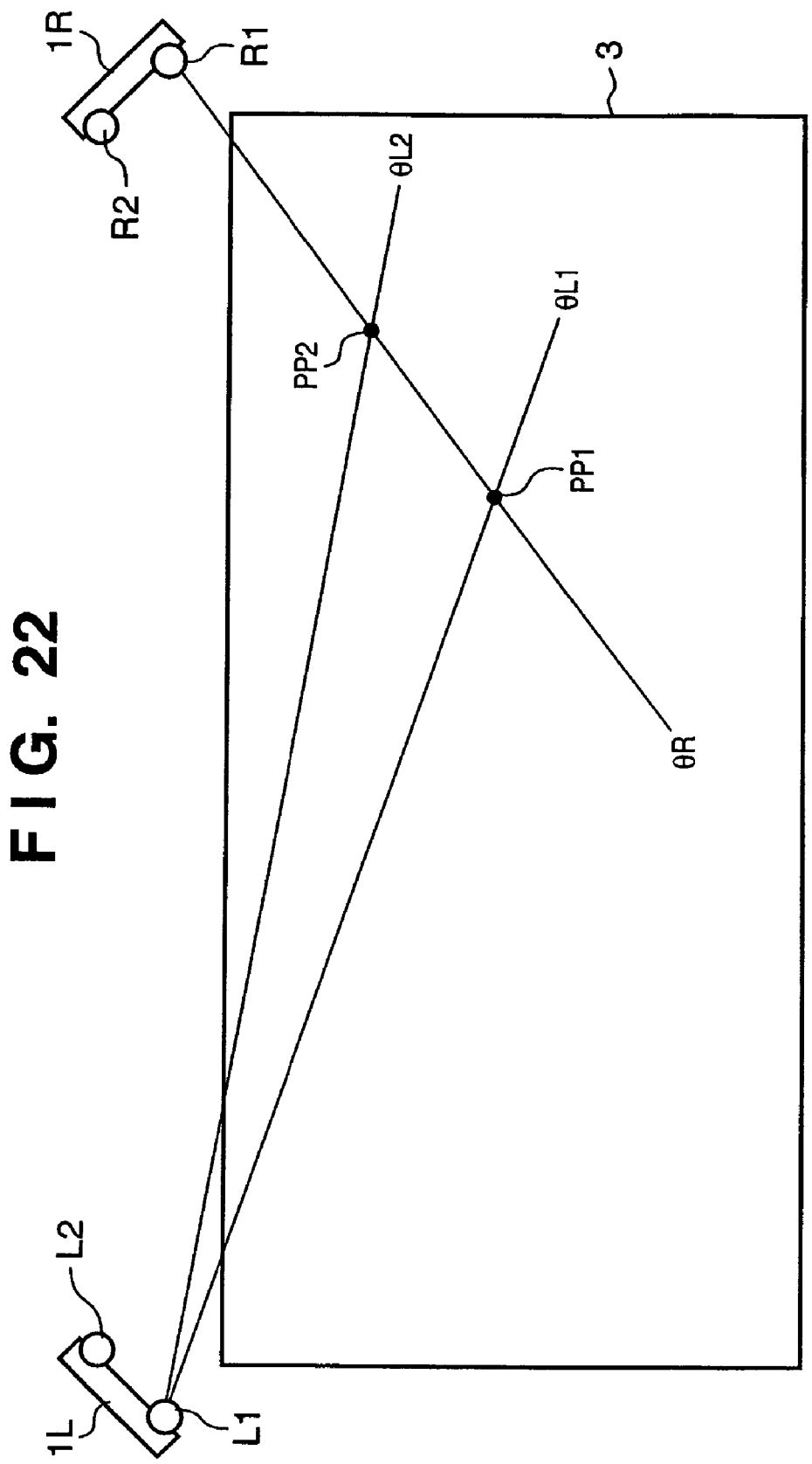
FIG. 22 is a view for explaining the coordinate calculation method according to the second embodiment of the present invention.

Coordinate candidate points relatively close to (PP1,PP2) in FIG. 22 are selected from (P11,P22) and (P12,P21) of P11, P12, P21, and P22 in FIG. 21 and decided as a set of coordinate values of two input points.

In the example shown in FIGS. 21 and 22, P12 and P21 are decided as two input points based on actual input.

Coordinate Calculation Method [4] (Step S121: Detection State [4])

In the detection state [4], an LR combination [2-2] and an LR combination [1-1] are present.

A detailed example will be described with reference to FIGS. 23 and 24, in which (L1,R2) is [2-2], and (L1,R1) are [1-1].

Simultaneous existence of the LR combinations [2-2] and [1-1] is apparently strange. In the normal sense, if one LR combination is [2-2], the other should be [2-1]. Alternatively, if one LR combination is [1-1], the other should be [2-1].

Actually, the shadow detection timing slightly shifts between the optical units. This influence cannot be neglected especially, at the timing when the shadow intensity largely changes, i.e., when the pointer enters or leaves the coordinate input effective region. That is, the shadow which should be detected by both optical units may be detected by only one of them due to the shift of detection timing.

In the present invention, to avoid, e.g., an instability generated by this phenomenon (more specifically, instantaneous detection of wrong coordinates), all combinations defined by the detection state [4] are taken into consideration.

More specifically, in FIG. 23, P11, P12, P21, and P22 are decided from the combination (L1,R2) on the basis of <Coordinate Calculation Processing (2)> to be described later. In FIG. 24, PP1 is decided from the combination (L1,R1) on the basis of <Coordinate Calculation Processing (1)> to be described later.

Figure 23:
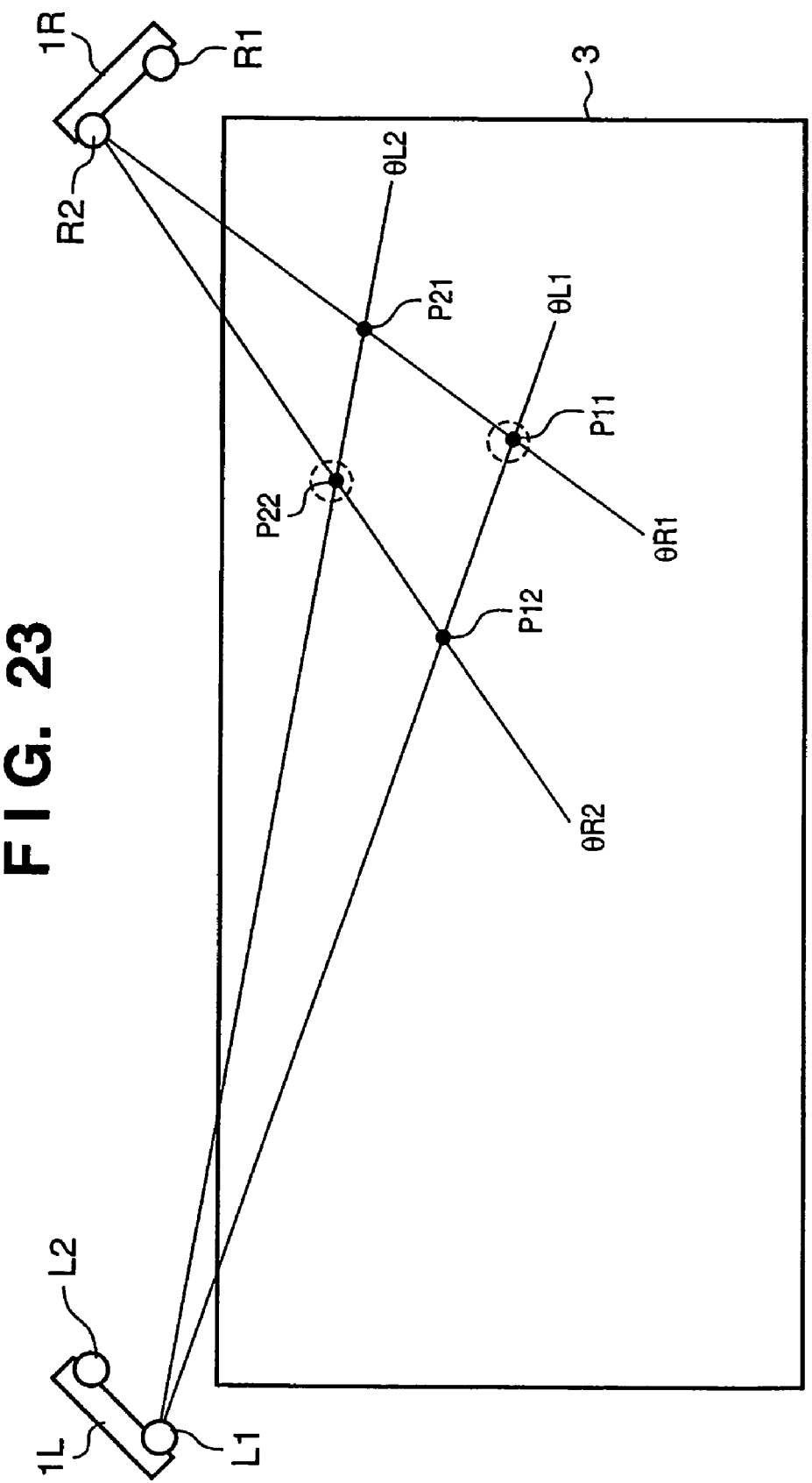
FIG. 23 is a view for explaining the coordinate calculation method according to the second embodiment of the present invention.
Figure 24:
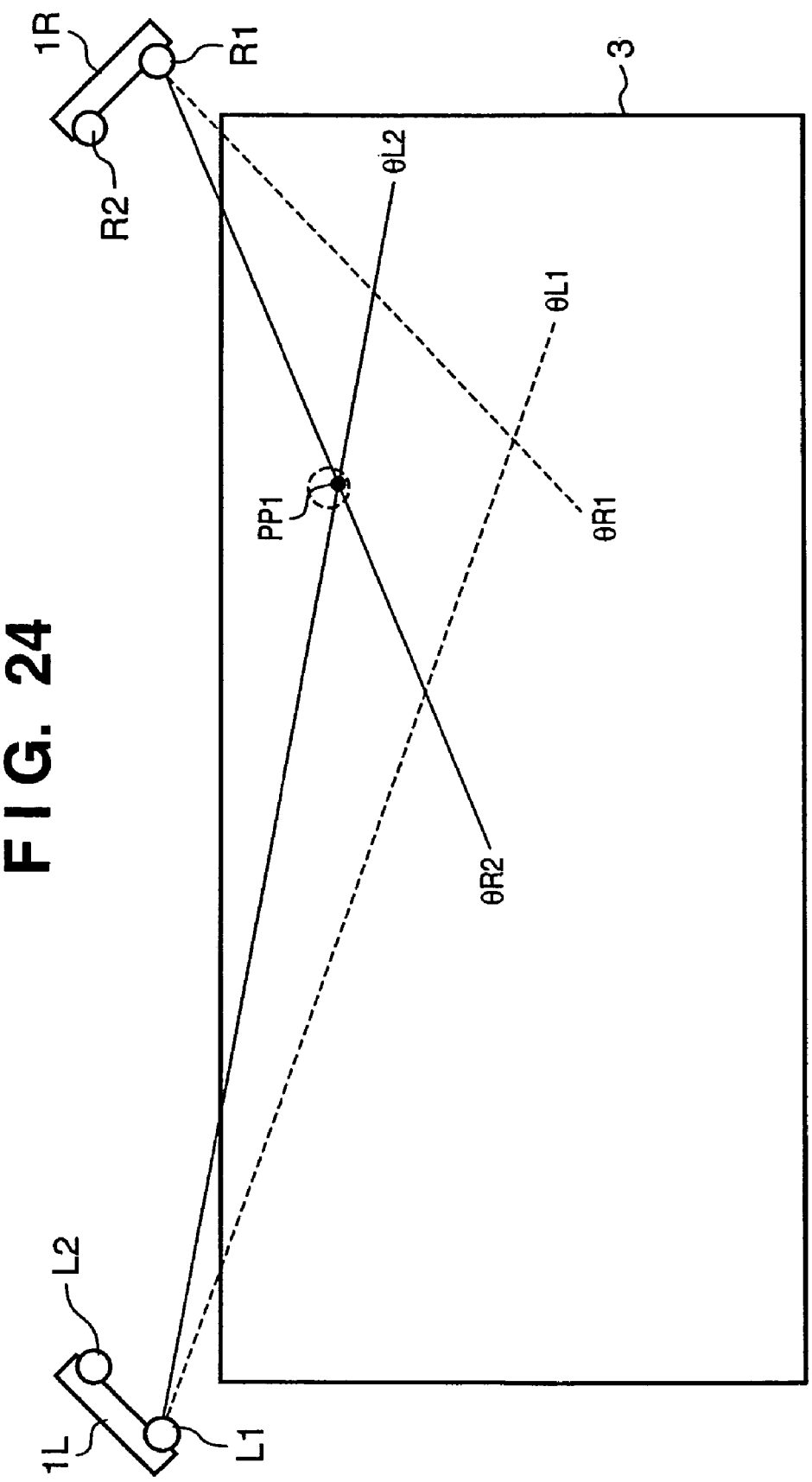
FIG. 24 is a view for explaining the coordinate calculation method according to the second embodiment of the present invention.

It is determined here whether any one of P11, P12, P21, and P22 in FIG. 23 almost matches PP1 in FIG. 24. In the example shown in FIGS. 23 and 24, P22 almost matches PP1.

Hence, P22 is a coordinate point based on actual input. When P22 is an actually input point, P11 is also an actually input point. In the example shown in FIGS. 23 and 24, P11 and P22 are decided as two input points based on actual input.

Coordinate Calculation Method [5] (Step S122: Detection State [5])

In the detection state [5], at least one LR combination [2-1] is present.

A detailed example will be described with reference to FIGS. 25 and 26, in which (L1,R1) is [2-1], and (L2,R2) are [1-1].

Figure 25:
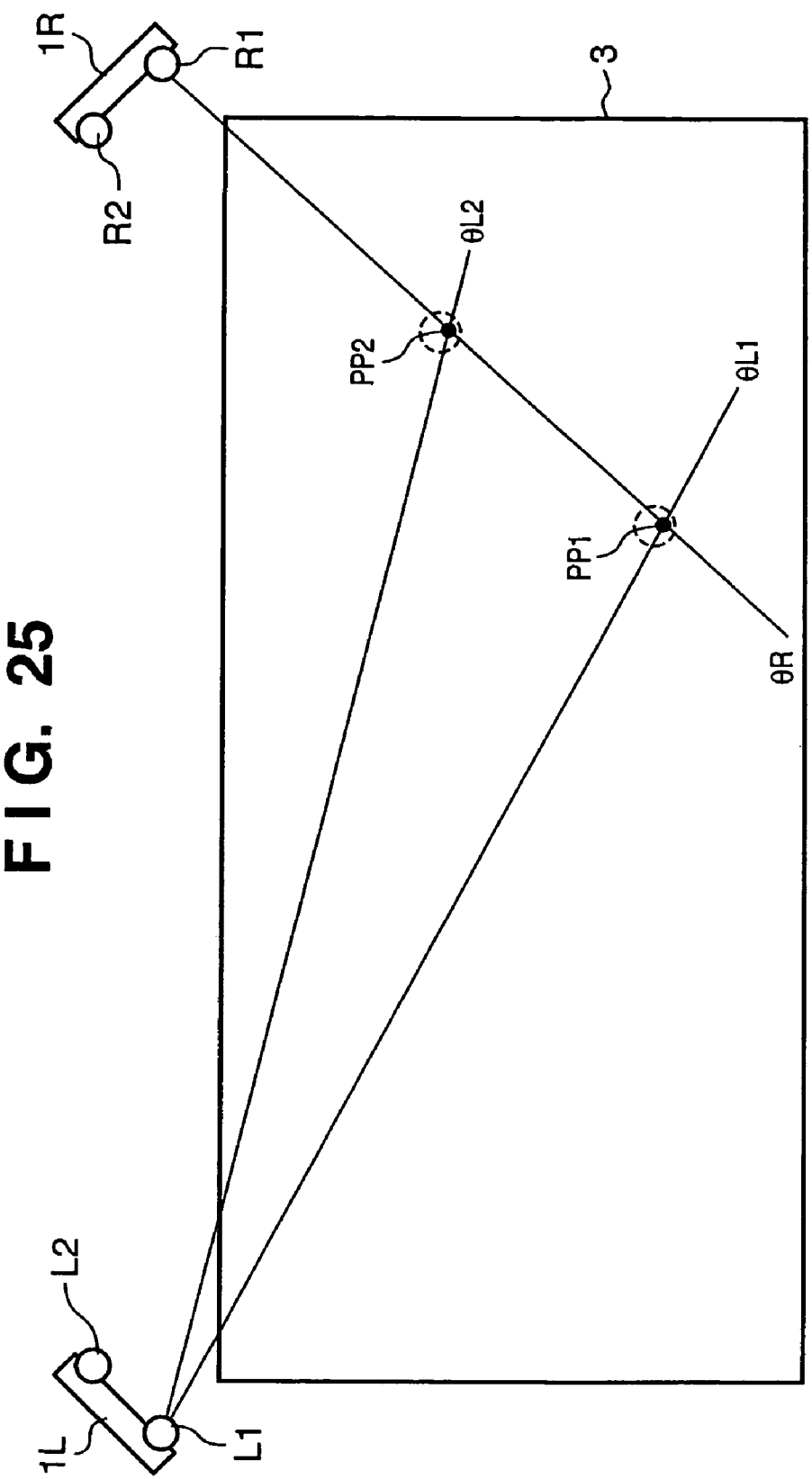
FIG. 25 is a view for explaining the coordinate calculation method according to the second embodiment of the present invention.

In FIG. 25, PP1 and PP2 are decided from the combination (L1,R1) on the basis of <Coordinate Calculation Processing (1)> to be described later. For the combination of (L2,L11 in FIG. 26, coordinate calculation is unnecessary because coordinates overlapping on one side are decided on the basis of (L1,R1).

That is, in the detection state [5], the coordinates of two input points are decided on the basis of only one LR combination [2-1] independently of the remaining LR combinations.

Figure 26:
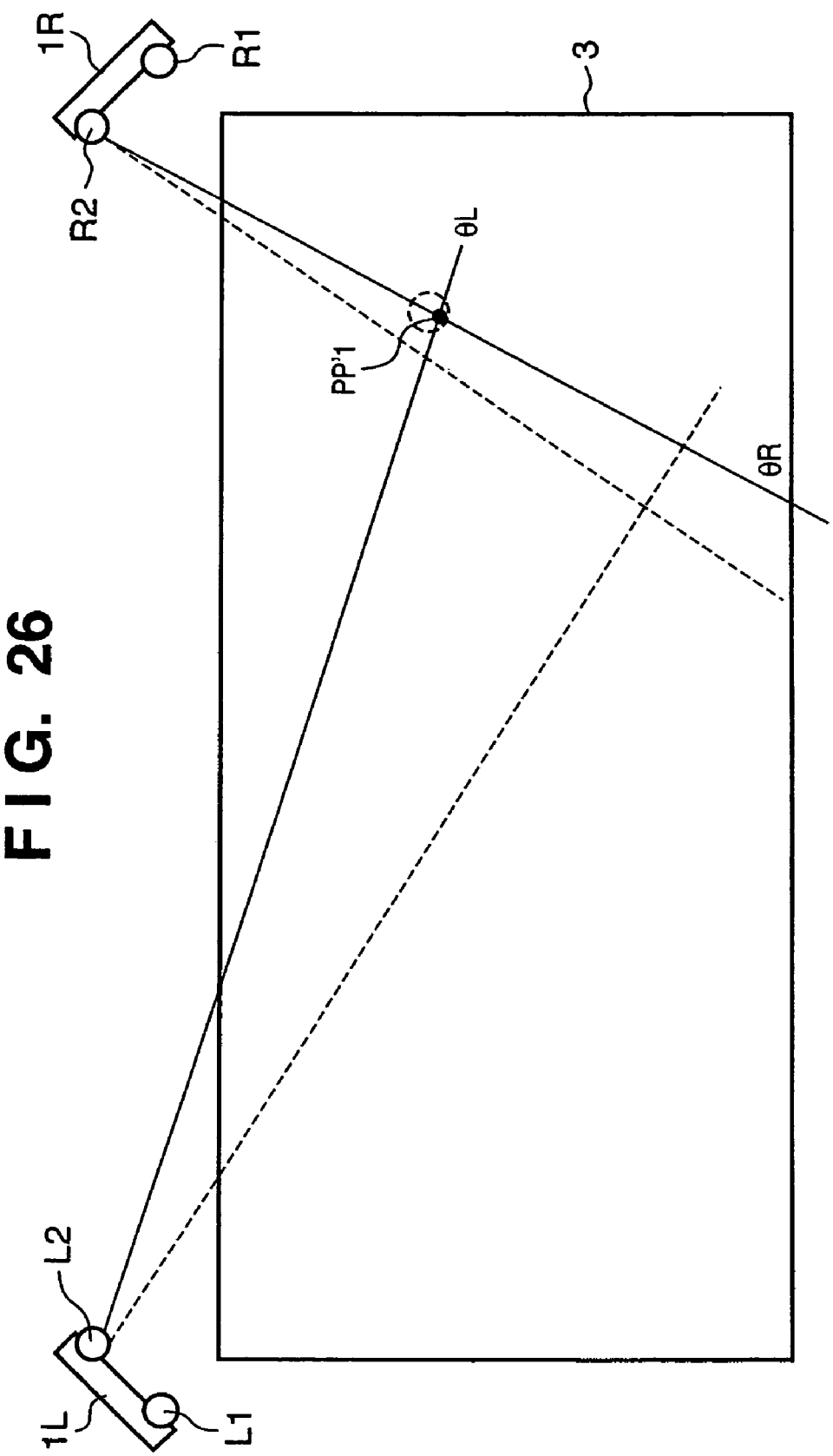
FIG. 26 is a view for explaining the coordinate calculation method according to the second embodiment of the present invention.

In FIG. 26, almost the central portion of the two ends of one overlapping shadow detected by the optical unit R2 may approximately be handled as one angle θR, and PP1 may be decided on the basis of <Coordinate Calculation Processing (3)>.

The coordinate calculation result of one or two input points calculated by one of the above-described coordinate calculation methods [1] to [5] is output to an external terminal through the serial interface 7 and displayed on an output device such as an image display device as the movement or locus of a cursor.

Details of the contents of the coordinate calculation processing (1) to (3) will be described next.

<Coordinate Calculation Processing (1)>

Coordinate calculation processing (1) of calculating coordinates on the basis of the combination of the optical units L1 and R1 will be described with reference to FIG. 27.

Figure 27:
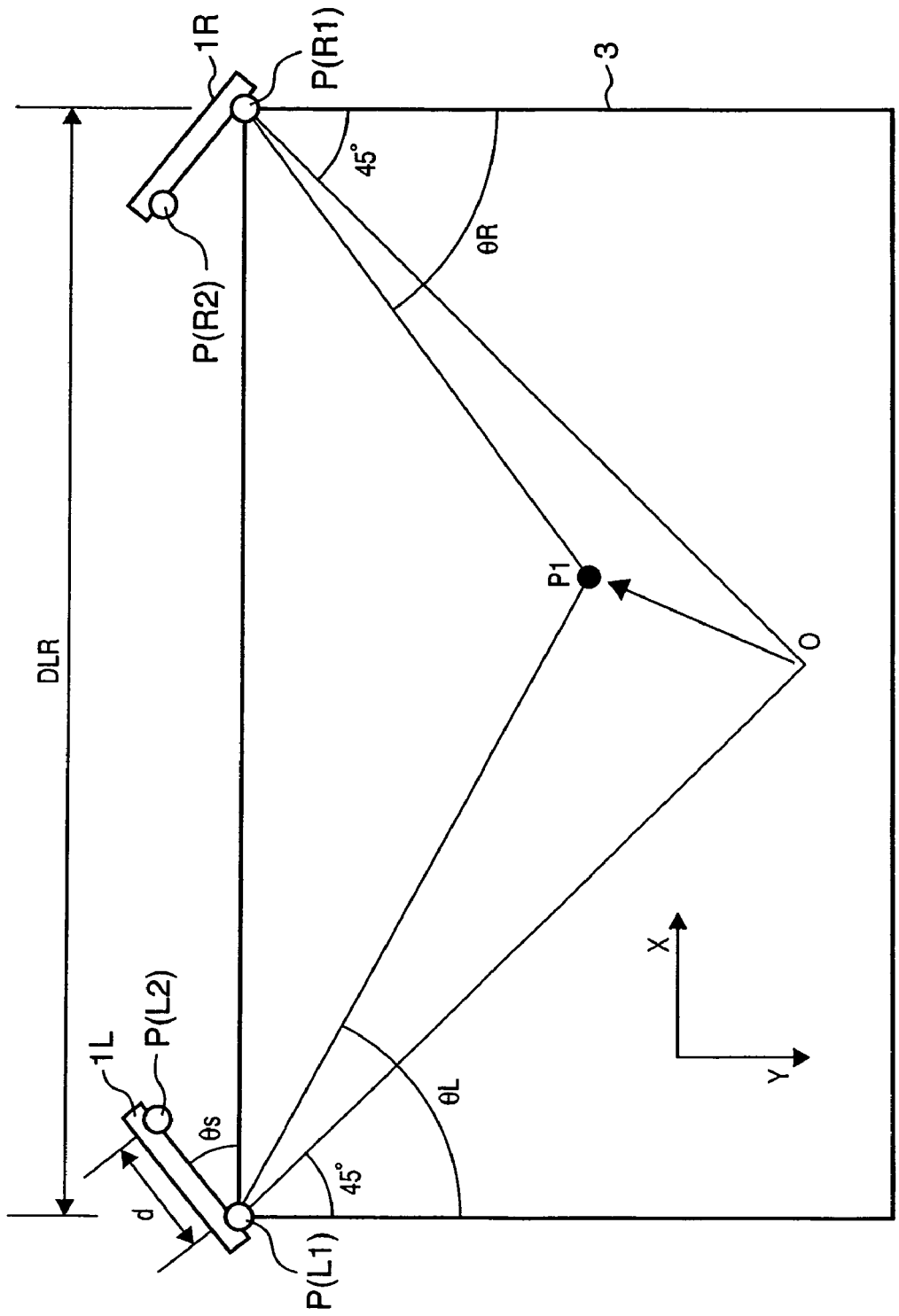
FIG. 27 is a view for explaining the coordinate calculation method according to the second embodiment of the present invention.

In the sensor units 1L and 1R shown in FIG. 27, the outer optical units on the left and right sides with respect to the coordinate input effective region 3 are the optical units (L1, R1). The inner optical units on the left and right sides are the optical units (L2, R2).

Angle data obtained from the optical units are defined to increase inward and bilaterally symmetrically when viewed from corresponding sensor units from 0° set along the Y-axis on the lower side. The coordinate positions where the optical units are present are defined as P(L1), P(L2), P(R1), and P(R2).

For example, when coordinates are to be calculated on the basis of angle data obtained from the optical units (L1,R1), the following functions are defined to set the X and Y directions with a point O being set as the origin, as shown in FIG. 27.

$$Xt(\theta L-45, \theta R-45) = (\tan(\theta L-45) - \tan(\theta R-45)) / [2*(1-\tan(\theta L-45)*\tan(\theta R-45))] \quad (120)$$

$$Yt(\theta L-45, B-45) = (-1)*[(1-\tan(\theta L-45))*(1-\tan(\theta R-45)) / (2*(1-\tan(\theta L-45)*\tan(\theta R-45)))-0.5] \quad (121)$$

With this definition, the coordinates of a point (X,Y) in FIG. 27 with the point O being set as the origin are given by $$X = DRL * Xt(\theta L-45, \theta R-45) \quad (122)$$

$$Y = DRL * Yt(\theta L-45, \theta R-45) \quad (123)$$

<Coordinate Calculation Processing (2)>

Coordinate calculation processing (2) of calculating coordinates on the basis of the combination of the optical units L2 and R1 will be described with reference to FIG. 28.

Figure 28:
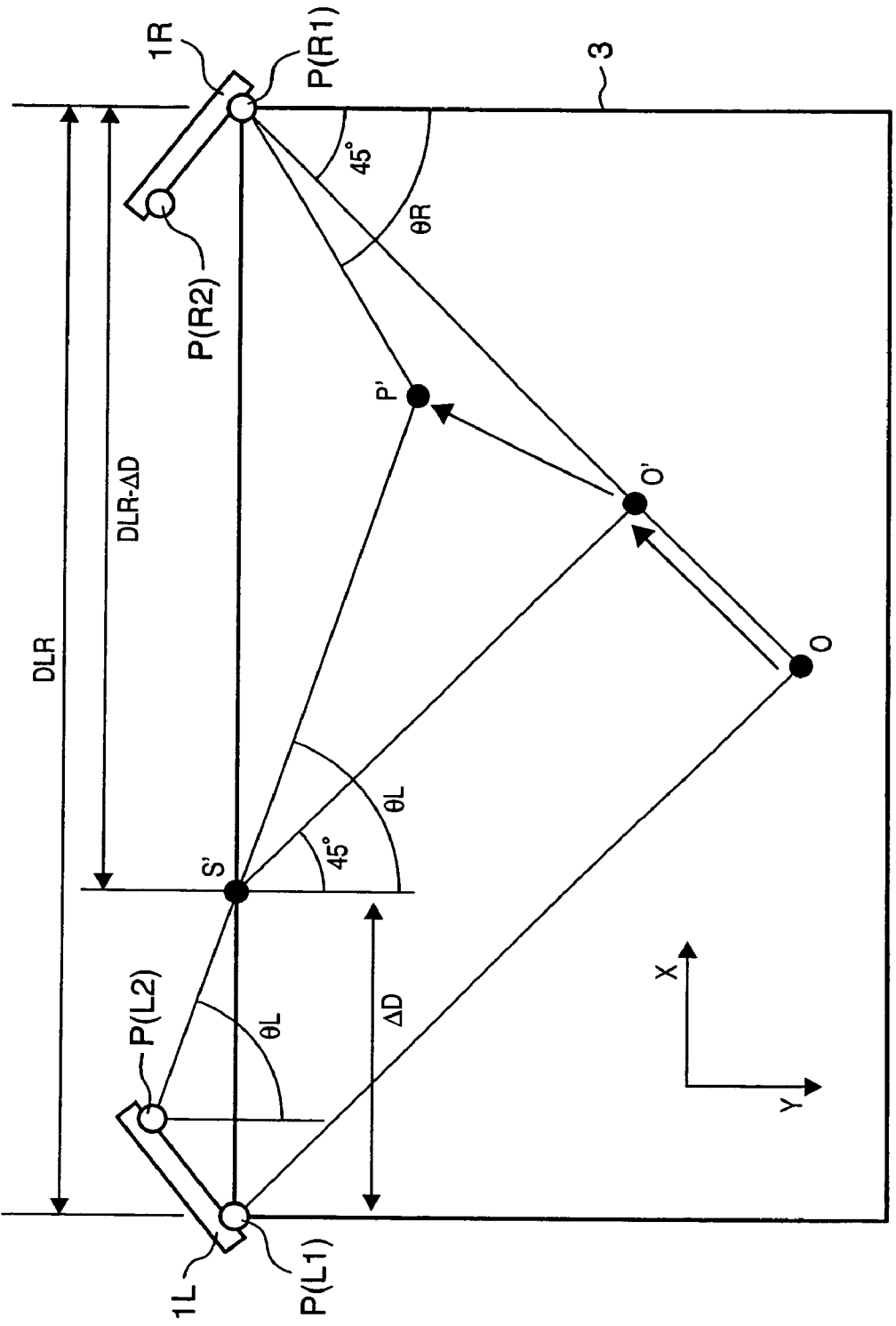
FIG. 28 is a view for explaining the coordinate calculation method according to the second embodiment of the present invention.

Referring to FIG. 28, Let P' be the point position of the pointer. Let S' be the intersection between a line P(L1)-P(R1) and a line P(L2)-P'.

Calculating the coordinates of P' from the positional relationship between the three points S', P(R1), and O' in FIG. 28 is equivalent to calculating the coordinates of P from the three points P(L1), P(R1), and O in FIG. 27. A vector O'P' is expressed as O'→P', its X component is expressed as (O'P')x, and the Y component is expressed as (O'P')y. From equations (120) and (121), we obtain $$(O' \to P')x = (DLR - \Delta D) * Xt(\theta L-45, \theta R-45) \quad (130)$$

$$(O' \to P')y = (DLR - \Delta D) * Yt(\theta L-45, \theta R-45) \quad (131)$$

From FIG. 28, $$\Delta D = Sx + Sy * \tan(\theta L) \quad (132)$$

$$\text{where } Sx = d*\cos(\theta s), Sy = d*\sin(\theta s) \quad (133)$$

As is apparent from FIG. 28, $$(O \to O \to)x = \Delta D/2 \quad (134)$$

$$(O \to O')y = (-1) * \Delta D/2 \quad (135)$$

Hence, the coordinates of P' with the point O being set as the origin can be calculated as the X and Y components of $(O \to P') = (O \to O') + (O \to P')$.

The coordinates can also be calculated on the basis of the combination of the optical units L1 and R2 by changing the sign of only the above-described X component.

<Coordinate Calculation Processing (3)>

Coordinate calculation processing (3) of calculating coordinates on the basis of the combination of the optical units L2 and R2 will be described with reference to FIG. 29.

Figure 29:
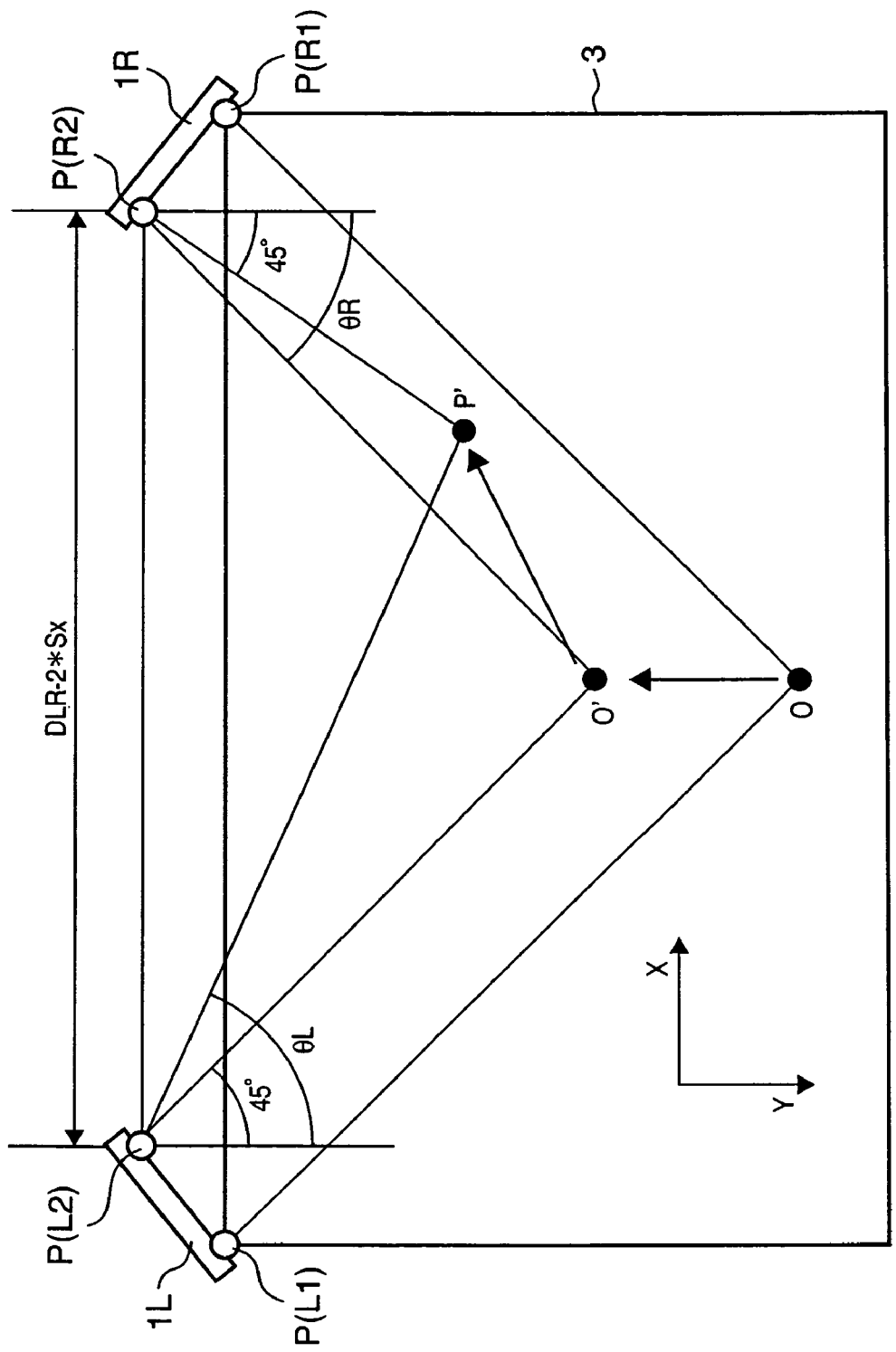
FIG. 29 is a view for explaining the coordinate calculation method according to the second embodiment of the present invention.

Calculating the coordinates of P" from the positional relationship between the three points P(L2), P(R2), and O" in FIG. 29 is equivalent to calculating the coordinates of P from the three points P(L1), P(R1), and O in FIG. 27. A vector O"P" is expressed as O"→P", its X component is expressed as (O"→P")x, and the Y component is expressed as (O"→P")y. From equations (120) and (121), we obtain $$(O'' \to P'')x = (DLR - 2*Sx)*Xt(\theta L - 45, \theta R - 45) \quad (141)$$

$$(O'' \to P'')y = (DLR - 2*Sx)*Yt(\theta L - 45, \theta R - 45) \quad (142)$$

As is apparent from FIG. 29, $$(O \to O'')x = 0 \quad (143)$$

$$(O \to O'')y = (-1)*(Sx + Sy) \quad (144)$$

Hence, the coordinates of P" with the point O being set as the origin can be calculated as the X and Y components of $(O \to P'') = (O \to O'') + (O \to P'')$.

As described above, in the second embodiment, coordinates can be calculated in all LR combinations.

As described above, according to the second embodiment, input coordinate detection errors can be prevented in single point input, and detection of wrong coordinates different from input coordinates can be prevented to correctly calculate the number of input coordinates in multiple point input, as in the first embodiment.

Third Embodiment

Figure 30:
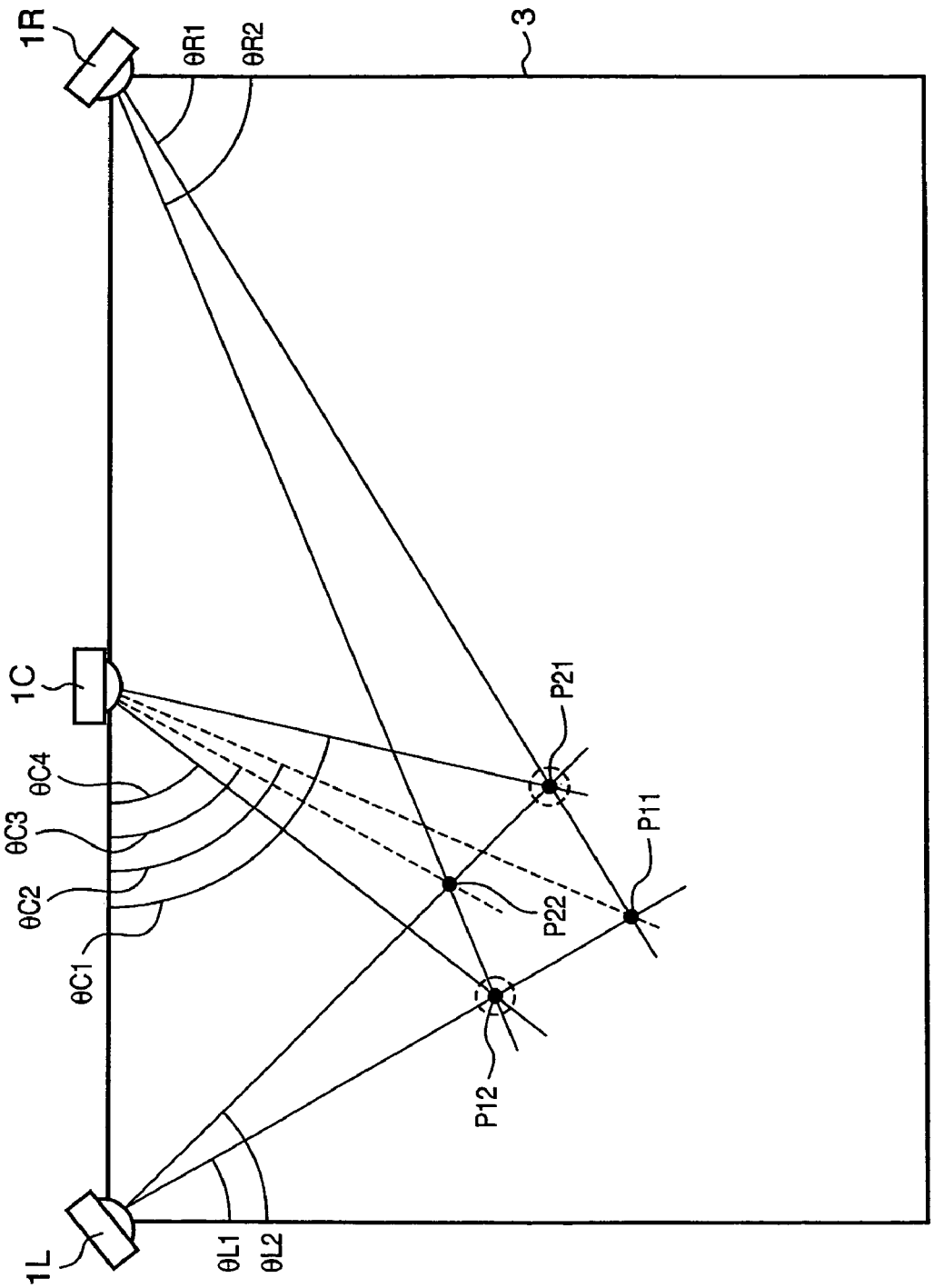
FIG. 30 is a view showing the arrangement of a coordinate input apparatus according to the third embodiment of the present invention.

In the third embodiment, an arrangement will be described in which a sensor unit 1C is newly added to the arrangement of the first embodiment shown in FIG. 1A, as shown in FIG. 30.

FIG. 30 shows multiple point input in points P12 and P21.

Figure 31A:
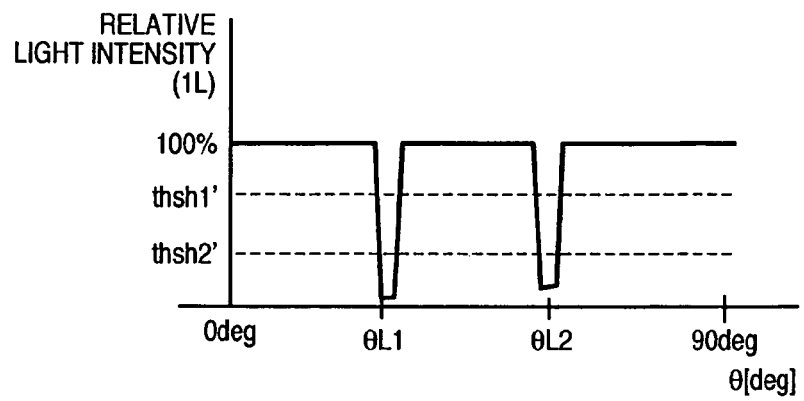
FIGS. 31A to 31C are graphs showing light intensity distributions obtained by the sensor units in the input operation in FIG. 30.
Figure 31B:
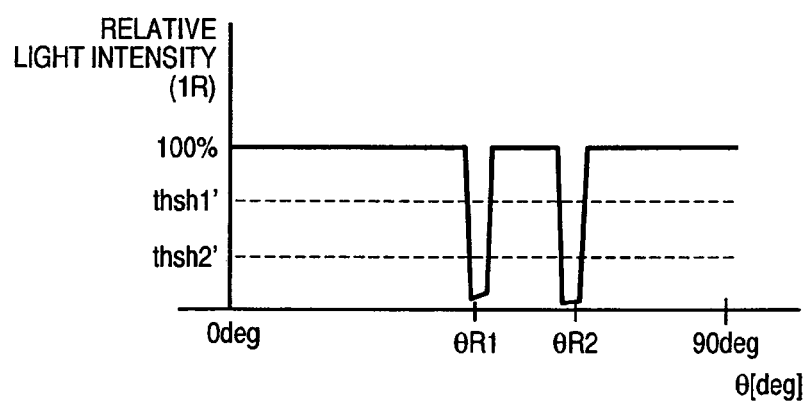
Figure 31C:
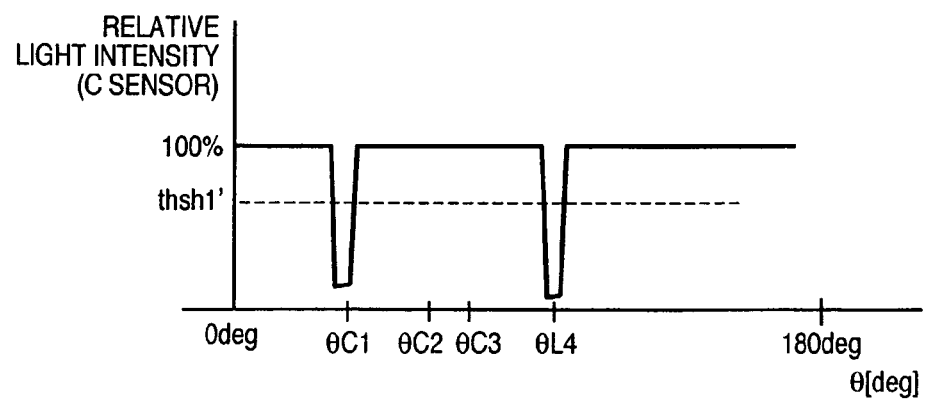

In this case, as shown in FIG. 31A, a sensor unit 1L detects shadows at positions θL1 and θL2. As shown in FIG. 31B, a sensor unit 1R detects shadows at positions θR1 and θR2. As shown in FIG. 31C, the sensor unit 1C detects shadows at positions θC1 and θC4. On the basis of the three sets of angle data, four coordinate candidate points P11, P12, P21, and P22 are calculated. When truth determination is executed for these coordinate candidate points by a certain means, for example, P11 and P22 are determined as real images, and P12 and P21 are determined as virtual images. Hence, the coordinate input points can be decided.

The sensor unit 1C shown in FIG. 30 has almost the same arrangement as the sensor unit 1L or 1R except the structure of the internal optical units (light receiving units and light projecting units). The visual field range of the sensor units 1L and 1R is about 90°. However, the visual field range of the sensor unit 1C is about 180°.

In the third embodiment, coordinate candidate points are detected by the sensor units 1L and 1R. On the basis of the positional relationship between the coordinate candidate points and shadows detected by the sensor unit 1C, real input points are determined from the coordinate candidate points (so-called truth determination is performed), and two input coordinates are finally-decided.

For example, in FIG. 30, the sensor units 1L and 1R observe the four coordinate candidate points P11, P12, P21, and P22. Of these coordinate candidate points, coordinate candidate points observed by the sensor unit 1C in a predetermined direction are the coordinate candidate points of real input points. These points are finally output as two input coordinate points. Especially in the case shown in FIG. 30, since the sensor unit 1C observes only the shadows at the positions θC1 and θC4, P11 and P22 are the coordinates of the real input points.

Even in the third embodiment, the same coordinate candidate point decision processing as in the first embodiment is executed for the detection result obtained from the sensor units 1L and 1R.

In the third embodiment, let dpth_max be the maximum value and dpth_min be the minimum value of the assumed shadow intensity including the intensities of the shadows detected by the sensor unit 1C. A maximum ratio M of the shadow intensity is given by $$M = \text{dpth\_max}/\text{dpth\_min} \quad (\text{Equation 3\_1})$$

At this time, threshold values that satisfy $$\text{thsh}1'/\text{thsh}2' > M \quad (\text{Equation 3\_2})$$

are set. The two threshold values are applied to relative light intensity distributions. When a larger shadow exceeds the second threshold value (thsh_2'), a smaller shadow always exceeds the first threshold value (thsh_1').

That is, the presence of the larger shadow is determined on the basis of the second threshold value (thsh_2'), and the presence of the smaller shadow is determined on the basis of the first threshold value (thsh_1'). With this arrangement, the above-described coordinate calculation error which occurs because the smaller shadow cannot be detected although the larger shadow is detected can be avoided.

Coordinate calculation processing according to the third embodiment will be described below with reference to FIG. 32.

FIG. 32 is a flowchart showing coordinate calculation processing executed by a coordinate input apparatus according to the third embodiment of the present invention.

In step S201, light intensity distribution data of the sensor units 1L, 1R, and 1C are acquired. In step S202, light intensity distribution data corresponding to each LR combination is sequentially selected from the acquired light intensity distribution data. For the selected light intensity distribution data, the coordinate candidate point decision processing shown in FIG. 12 of the first embodiment is executed.

On the basis of the result of coordinate candidate point decision processing, the coordinate calculation processing (steps S203 to S209) is executed.

Especially in the third embodiment, three of the detection states described in the second embodiment, i.e., detection states [1] to [3] will be taken into consideration as the detection state of the shadow count in each sensor unit.

In the third embodiment, the detection state of shadow count in each of the sensor units 1L and 1R is determined (steps S203 to S205). Coordinate calculation is executed by one of coordinate calculation methods [6a] to [6c] defined in advance for the determined detection state (steps S206 to S208). The coordinate calculation result is output (step S209). If none of the above detection states is determined, it is determined that coordinate detection is impossible, and the processing is ended (step S210).

The coordinate calculation methods [6a] to [6c] will be described below in detail.

Coordinate Calculation Method [6a] (Step S206: Detection State [1])

In the detection state [1] or [2], single point input is executed. In this case, coordinate calculation is executed by <Coordinate Calculation Processing (1)> described in the second embodiment.

Coordinate Calculation Method [6b] (Step S207: Detection State [2])

In the detection state [2], at least two of the LR combinations (L1,R1), (L1,R2), (L2,R1), and (L2,R2) are [2-2].

In this case, the coordinate values of four obtained coordinate candidate points are calculated by <Coordinate Calculation Processing (1)> described in the second embodiment. In addition, angles obtained by observing the coordinate candidate points from the sensor unit 1C are calculated in advance.

Of these angles, angles that almost match the angles of shadows actually observed by the sensor unit 1C are employed as two input coordinates. At this time, the presence/absence of shadows observed by the sensor unit 1C is determined on the basis of the first threshold value (thsh1'). That is, this processing is based on an assumption that a shadow exceeding the first threshold value thsh1' is always detected by the sensor unit 1C in correspondence with an actually existing coordinate candidate point.

Coordinate Calculation Method [6c] (Step S208: Detection State [3])

In the detection state [3], a combination [2-1] is detected by the sensor units 1L and 1R.

In this case, the state is approximated to a state wherein two input coordinate points are present on the angle at almost the central position of the two ends of one overlapping shadow. The shadow is combined with the two remaining shadows, and the coordinates are decided on the basis of <Coordinate Calculation Processing (1)> described in the first embodiment. Light intensity distribution data detected by the sensor unit 1C is not used for truth determination but for proof for increasing the accuracy of the detected coordinate value.

As described above, according to the third embodiment, in addition to the effects described in the first embodiment, truth determination for coordinate calculation can be done more efficiently and accurately by providing the sensor unit 1C.

Fourth Embodiment

If a shadow which should be detected by a plurality of sensors cannot be detected, wrong coordinates are detected, and additionally, the number of shadows, i.e., the number of inputs may erroneously be recognized.

In this fourth embodiment, a coordinate input apparatus capable of accurately detecting input coordinates, a control method thereof, and a program will be described.

FIG. 33A is a view showing the outer appearance of the coordinate input apparatus according to the fourth embodiment of the present invention.

Referring to FIG. 33A, optical units L1 and L2 have light projecting units and light receiving units. A sensor unit 1L is formed by the two optical units L1 and L2. Similarly, optical units R1 and R2 have light projecting units and light receiving units. A sensor unit 1R is formed by the two optical units R1 and R2.

The optical units L1 and L2 in the sensor unit 1L are arranged to project and receive light in almost the same direction in almost the same visual field and observe arriving light with a predetermined parallax. Similarly, the optical units R1 and R2 in the sensor unit 1R are arranged to project and receive light in almost the same direction in almost the same visual field and observe arriving light with a predetermined parallax.

The sensor units 1L and 1R are arranged parallel to the X-axis of a coordinate input effective region 3 serving as a coordinate input surface and symmetrically about the Y-axis while being spaced apart by a predetermined distance, as shown in FIG. 33A. The sensor units 1L and 1R are connected to a control/arithmetic unit 2. Each of the sensor units 1L and 1R receives a control signal from the control/arithmetic unit 2 and transmits a detected signal to the control/arithmetic unit 2.

Each of retroreflecting members 4a to 4c has a retroreflecting surface to reflect incident light in the direction of arrival. The retroreflecting members 4a to 4c are arranged on three outer sides of the coordinate input effective region 3, as shown in FIG. 33A, to retroreflect, toward the sensor units 1L and 1R, light projected within a range of almost 90° from the sensor units 1L and 1R.

Each of the retroreflecting members 4a to 4c has a three-dimensional structure microscopically. A bead-type retroreflecting tape or a retroreflecting tape which causes retroreflection by periodically arraying corner cubes by, e.g., machining is currently known.

The light retroreflected by the retroreflecting members 4a to 4c is one-dimensionally detected by the sensor unit 1L (optical units L1 and L2) and the sensor unit 1R (optical units R1 and R2), and the light amount distribution is transmitted to the control/arithmetic unit 2.

The coordinate input effective region 3 formed from the display screen of a display device such as a PDP, rear projector, or LCD panel can be used as an interactive input device.

In this arrangement, when input by a pointing means such as a finger or pointer is done in the coordinate input effective region 3, light projected from the light projecting units of the optical units L1 and L2 in the sensor unit 1L and the optical units R1 and R2 in the sensor unit 1R is shielded (light-shielded portion). The light receiving units of the optical units L1 and L2 in the sensor unit 1L and the optical units R1 and R2 in the sensor unit 1R cannot detect the light of the light-shielded portion (light reflected by the retroreflecting members). As a result, the direction of light that cannot be detected can be detected.

The control/arithmetic unit 2 detects a plurality of light-shielded ranges of the input portion by the pointer on the basis of a change in light amount detected by the sensor unit 1L (optical units L1 and L2) and the sensor unit 1R (optical units R1 and R2). On the basis of the information of the light-shielded ranges, the direction (angle) of each end of the light-shielded ranges with respect to the sensor unit 1L (optical units L1 and L2) and the sensor unit 1R (optical units R1 and R2) is calculated. If the pointer has a signal generation unit, a pen signal receiving unit 5 receives a pen signal from the pointer.

On the basis of the number of detected light-shielded ranges, data obtained from the light-shielded ranges and to be used for coordinate calculation is determined. The light shielding position of the pointer on the coordinate input effective region 3 is geometrically calculated on the basis of, e.g., the calculated direction (angle) and the distance information between the sensor unit 1L (optical units L1 and L2) and the sensor unit 1R (optical units R1 and R2). The coordinate value is output, through an interface 7 (e.g., USB or IEEE 1394), to an external terminal such as a host computer connected to the display device.

In this way, the external terminal can be operated by the pointer by, e.g., drawing a line on the screen or manipulating an icon displayed on the display device.

In the following description, the direction perpendicular to the coordinate input effective region 3 is defined as a height direction (Z direction). A near side to the coordinate input effective region 3 is expressed as a "lower" side, and a far side is expressed as an "upper" side. In FIG. 1A, the sensor unit 1L (optical units L1 and L2) and sensor unit 1R (optical units R1 and R2) are expressed as the actual existences of ranges (light-shielded ranges) where light shielding is effectively detected, i.e., light shielding detection windows. Especially, the width in the height direction indicates the width between the upper and lower ends of the light shielding detection window.

That is, the thickness (Z direction) of the semicylindrical shape of each of the sensor unit 1L (optical units L1 and L2) and sensor unit 1R (optical units R1 and R2) corresponds to the size of the effective light shielding detection window defined in the height direction.

Particularly, in the fourth embodiment, a plane S_top is formed, where the upper sides of the retroreflecting members 4a to 4c and the effective upper ends of the sensor units 1L and 1R are located at almost the same level. In addition, a plane S_botom is formed, where the lower sides of the retroreflecting members 4a to 4c and the effective lower ends of the sensor units 1L and 1R are located at almost the same level.

With this arrangement, when light shielding by a pointer occurs, the sensor units 1L and 1R can always detect a shadow at almost the same light shielding ratio.

In FIGS. 33A and 33B, a multiple-lens (twin-lens) structure in which two optical units are incorporated in one sensor unit is employed. However, as shown in FIGS. 34A and 34B, a single-lens structure in which one optical unit is incorporated in one sensor unit may be employed.

Figure 34A:
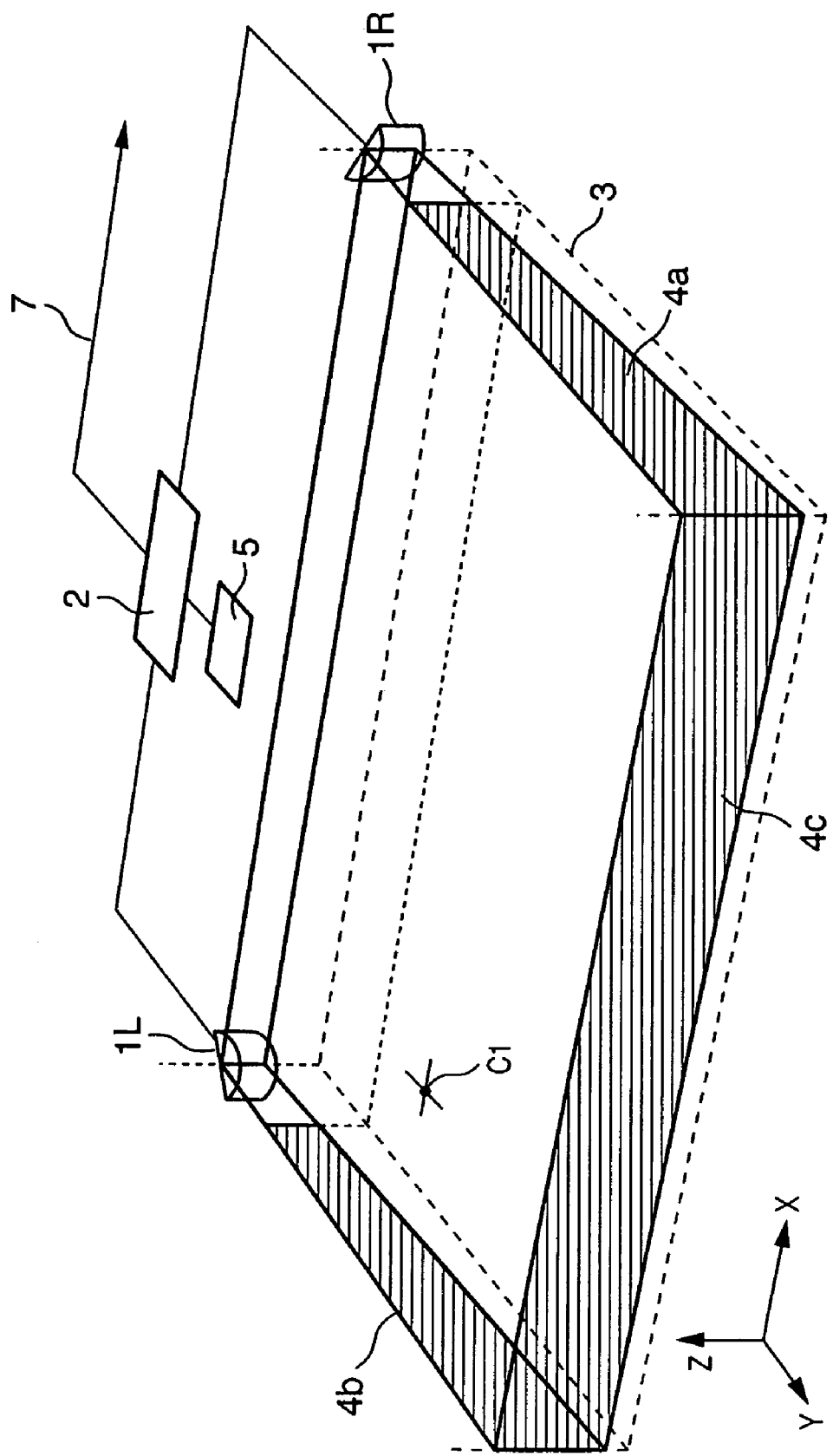
FIG. 34A is a view showing the outer appearance of the coordinate input apparatus according to the fourth embodiment of the present invention.
Figure 34B:
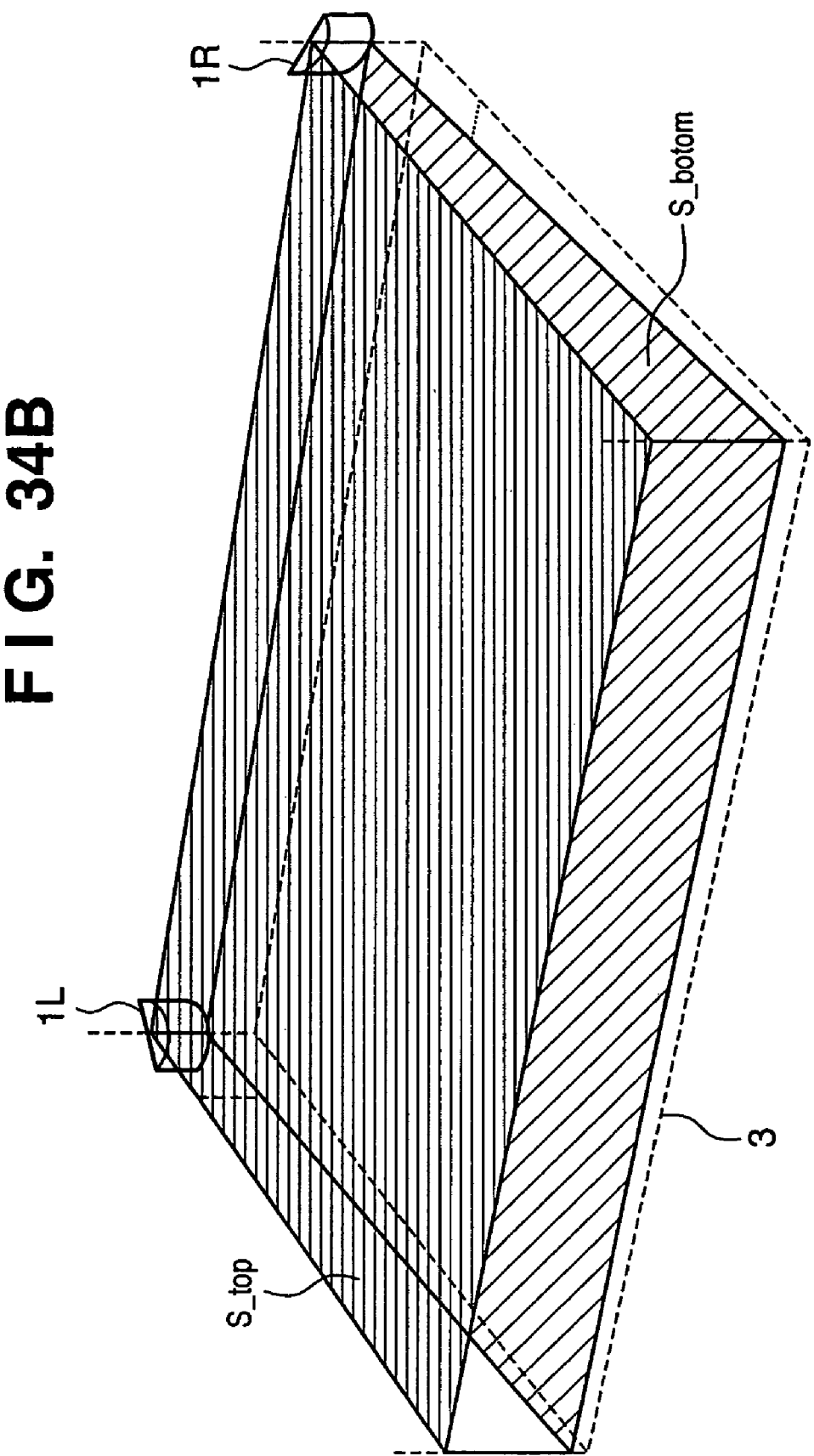
FIG. 34B is a view for explaining the characteristic feature of the retroreflecting member in the coordinate input apparatus according to the fourth embodiment of the present invention.

For the descriptive convenience, the single-lens structure shown in FIGS. 34A and 34B will be exemplified in FIGS. 35 to 55. However, the present invention can also be applied to the multiple-lens (twin-lens) structure shown in FIGS. 33A and 33B or a multiple-lens structure with three or more optical units being incorporated in one sensor unit.

In the multiple-lens structure, the following explanation is applied to each optical unit included in the sensor units. That is, in the single-lens structure, a sensor unit and an optical unit incorporated in it can be described while regarding them to be identical. Note that, in the multiple-lens structure, the explanation in FIGS. 35 to 55 is applied to each of the plurality of optical units included in a sensor unit.

<Description of Problems>

Problems in the present invention will be described again in detail with reference to the accompanying drawings.

Figure 35:
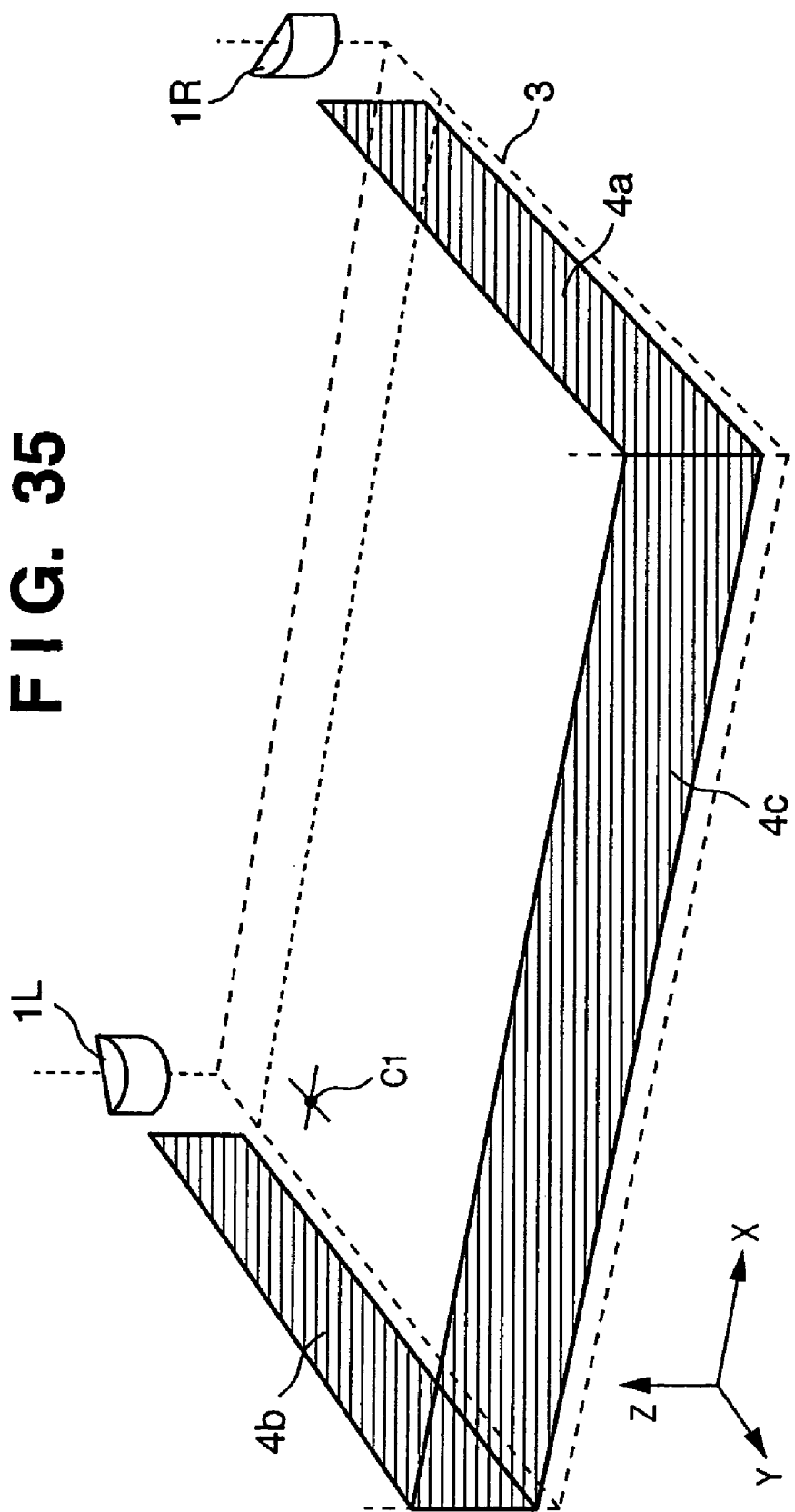
FIG. 35 is a view for explaining problems in the present invention.

FIG. 35 is a view for explaining problems in the present invention.

Conventionally, the sensor units 1L and 1R and the retroreflecting members 4 (4a to 4c) are designed to be close to the coordinate input surface as much as possible. Japanese Patent Laid-Open No. 2000-105671 or the like has mentioned a coordinate input apparatus which assumes that the light projecting position and light receiving position in a sensor unit are set at the same position and height as much as possible and made close to the coordinate input surface as much as possible by using an optical member such as a reflecting mirror, and projected light/received light is made parallel (collimated) as much as possible.

If projected light/received light is completely parallel to the thickness direction (the thickness direction indicates the direction (Z direction) perpendicular to the coordinate input surface (coordinate input effective region 3)), and the retroreflecting members are set to a shape and size to include, in the thickness direction, the light projection directional range (visual field range) and light reception directional range (visual field range), the three-dimensional light shielding detection region is determined by not the shape of the retroreflecting members but only the optical path of light projecting or light reception.

Actually, however, there is a limitation on mounting or a limitation on the cost and accuracy because of, e.g., the relationship to the display screen to display echo back or the overall structure of the apparatus. In many cases, projected light/received light cannot sufficiently be collimated in the thickness direction.

For this reason, practically, the apparatus is often designed such that the light projection directional range and light reception directional range of the optical unit become wider in the thickness direction than the width (width in the thickness direction) of the retroreflecting members, i.e., the light projection/light reception directional range in the thickness direction includes the retroreflecting members. Hence, the three-dimensional light shielding detection region is determined by the shape of the retroreflecting members.

The three-dimensional light shielding detection region viewed from each sensor unit has a concessive shape. The three-dimensional light shielding detection regions of the sensor units 1L and 1R are not always common regions.

The present invention proposes methods to solve problems in such an arrangement.

The problems will be described below with reference to FIG. 35.

Referring to FIG. 35, the sensor units 1L and 1R are located at higher positions than the retroreflecting members 4a to 4c with respect to the coordinate input effective region 3 serving as a coordinate input surface.

In fact, such an arrangement is often used when a coordinate input apparatus of light shielding scheme of this type is incorporated in or overlaid on a display device.

The sensor units 1L and 1R have a predetermined size and cannot be therefore installed in the black frame (the outer portion that is flush with the display surface and is not actually displayed) of the display screen. For this reason, the sensor units 1L and 1R are placed on the outer frame (the portion projected by one step from the display surface, i.e., a so-called frame) of the display device.

For the coordinate input apparatus, there is a demand to make the light shielding detection region close to the coordinate input surface as much as possible to implement comfortable writing without sense of discomfort. For this purpose, the long retroreflecting members are incorporated in the black frame of the display screen, i.e., arranged in the vicinity of the display surface.

The three-dimensional light shielding detection region of each of the sensor units 1L and 1R will be examined.

Light projected from the sensor unit 1L is retroreflected by only the retroreflecting members 4a and 4c and returns to the sensor unit 1L again. Unless the light projection/light reception optical system of the sensor unit 1L is reasonably collimated along the coordinate input surface, a three-dimensional light shielding detection region shown in FIG. 36 is formed actually.

Figure 37:
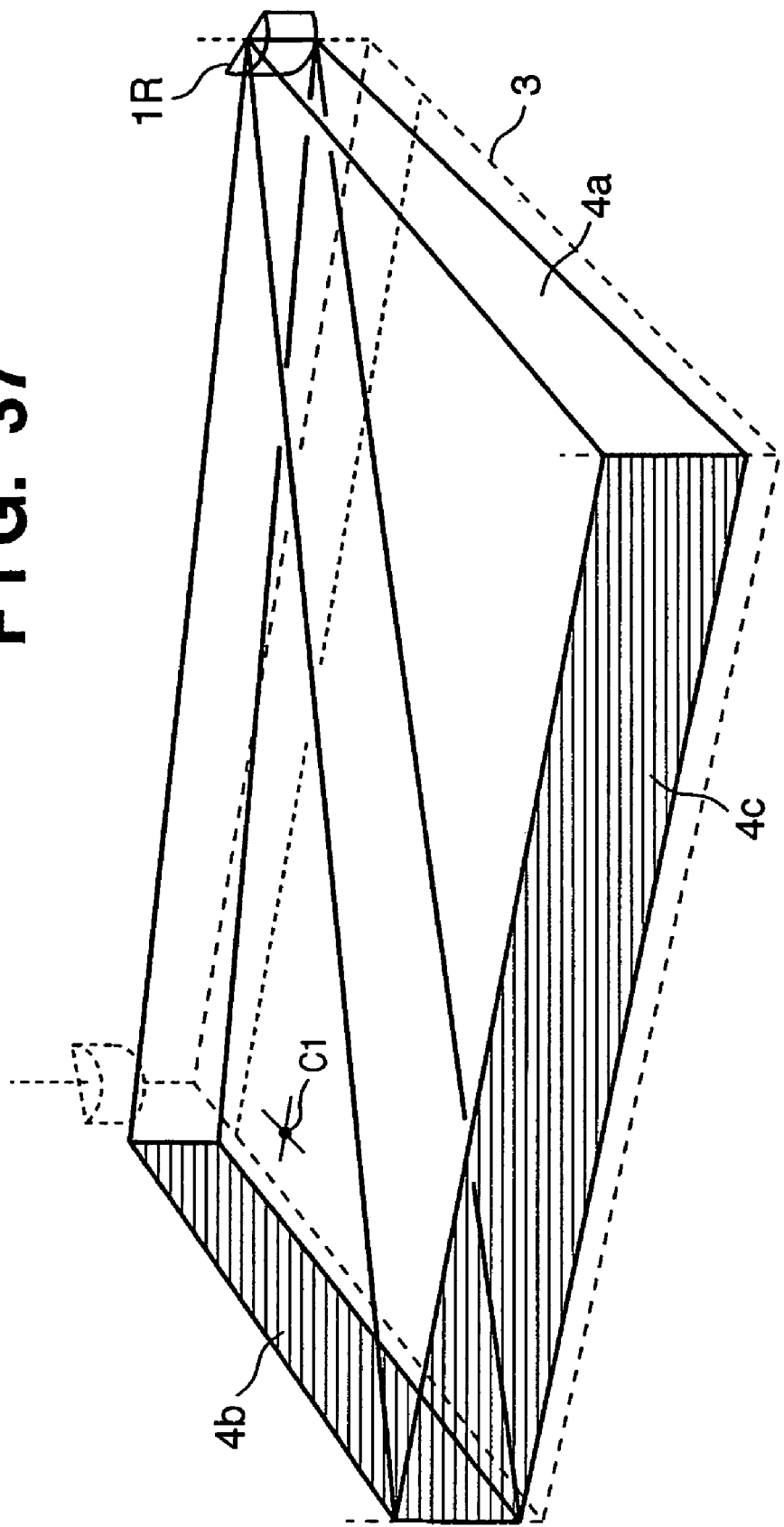
FIG. 37 is a view for explaining the three-dimensional light shielding detection region of each sensor unit according to the present invention.

For the sensor unit 1R as well, a three-dimensional light shielding detection region shown in FIG. 37 is formed.

Figure 36:
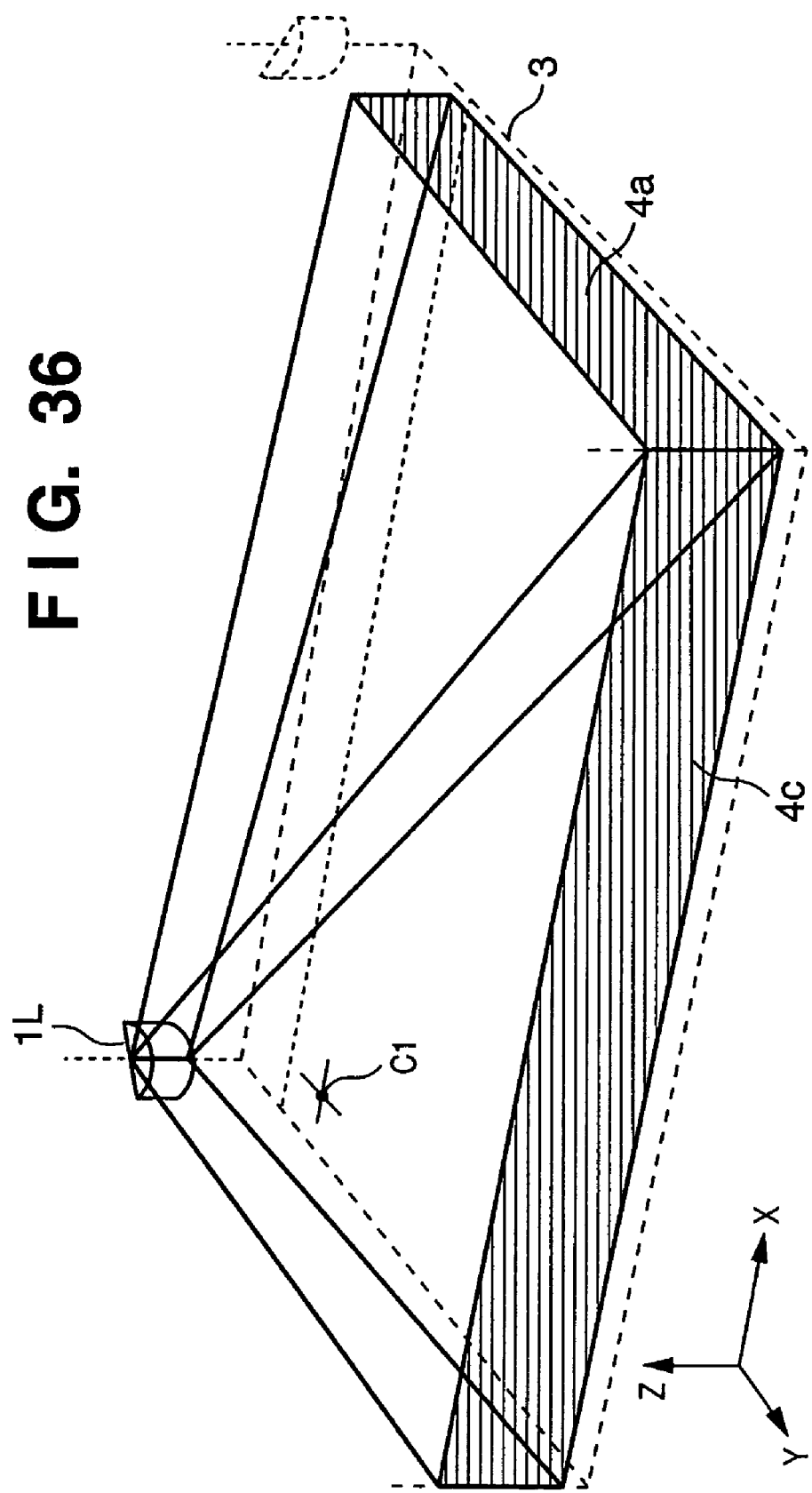
FIG. 36 is a view for explaining the three-dimensional light shielding detection region of each sensor unit according to the present invention.

As is apparent from FIGS. 36 and 37, the three-dimensional light shielding detection region of the sensor unit 1L and that of the sensor unit 1R are different three-dimensionally. That is, the sensor units 1L and 1R do not form almost the same three-dimensional light shielding detection region.

Consider a pointer inserted in a point C1 in FIG. 35.

As shown in FIG. 36, at the point C1, the three-dimensional light shielding detection region of the sensor unit 1L is close to the sensor unit 1L and is therefore located at a relatively high position (a position far from the coordinate input surface).

On the other hand, as shown in FIG. 37, at the point C1, the three-dimensional light shielding detection region of the sensor unit 1R is located at a level close to the height of the retroreflecting member 4c in the vicinity, i.e., at a relatively low position (a position close to the coordinate input surface).

Figure 38:
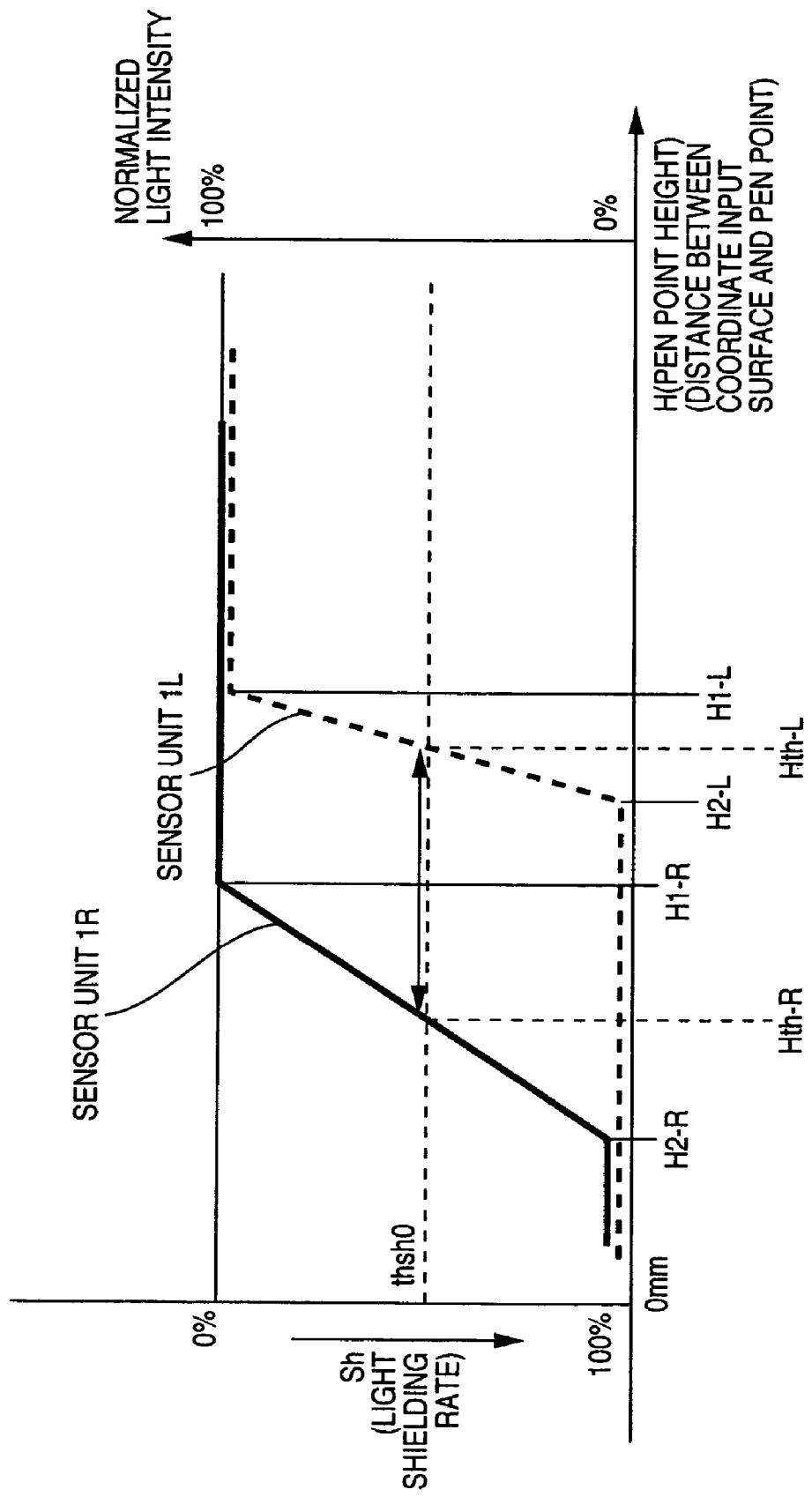
FIG. 38 is a graph for explaining a "pen-point-height vs. light shielding rate" characteristic according to the present invention.

A "pen-point-height vs. light shielding rate" characteristic as shown in FIG. 38 will be considered. Referring to FIG. 38, the abscissa represents a pen point height H (i.e., the distance between the effective point of the pointer and the coordinate input surface). The ordinate represents the light shielding rate in the sensor unit. For example, making the pointer close to the coordinate input surface corresponds to the movement from the right to the left in FIG. 38.

When the pointer is not inserted yet, the light shielding rate is 0% (normalized light intensity: 100%). When the pointer approaches a predetermined height position with respect to the coordinate input surface, the light shielding rate starts rising (the normalized light intensity starts decreasing), reaches 100% at a given point, and then takes a constant value.

When the pointer is inserted at the position of the point C1, the broken line indicates a locus representing the change in the light shielding rate for the sensor unit 1L, and the solid line represents the change in the light shielding rate for the sensor unit 1R.

Near the point C1, the three-dimensional light shielding detection region of the sensor unit 1L is located at a high position. Hence, the portion where the locus indicated by the broken line in FIG. 38 largely changes exists on the right side.

On the other hand, the three-dimensional light shielding detection region of the sensor unit 1R is located at a low position. Hence, the portion where the locus indicated by the solid line in FIG. 38 largely changes exists on the left side.

The large change portions can be regarded as portions where the pointer passes through the three-dimensional light shielding detection regions of the sensor units 1L and 1R.

In the arrangement shown in FIGS. 35 to 37, near the point C1, the three-dimensional light shielding detection region of the sensor unit 1L is thinner in the height direction than the three-dimensional light shielding detection region of the sensor unit 1R. Hence, the portion where the locus (curve) of the light shielding rate changes in FIG. 38 is narrower and steeper for the sensor unit 1L than for the sensor unit 1R.

As described above, in the conventional arrangement, the "pen-point-height vs. light shielding rate" characteristics detected differ between the left and right sensor units 1L and 1R.

In light shielding detection with this characteristic, the following problem arises.

For example, when the pointer is inserted to the coordinate input surface from the upper side, the height H reaches a range represented by $Hth\_R \leq H \leq Hth\_L$ shown in FIG. 38, and the intensities of shadows detected by the sensor units 1L and 1R, i.e., the light shielding rates exceed a predetermined threshold value thsh0, it is determined that a shadow is present.

In this arrangement, the sensor unit 1L detects a shadow for the first time when $H=Hth\_L$. The sensor unit 1R detects a shadow for the first time when $H=Hth\_R$.

Hence, in the range represented by $Hth\_R \leq H \leq Hth\_L$, the shadow of the pointer is observed by the sensor unit 1L but not by the sensor unit 1R.

This poses a particularly serious problem in multiple point input.

The problem in the multiple point input mode will be described below. Before the explanation of this problem, coordinate detection in single point input will be described.

Figure 39:
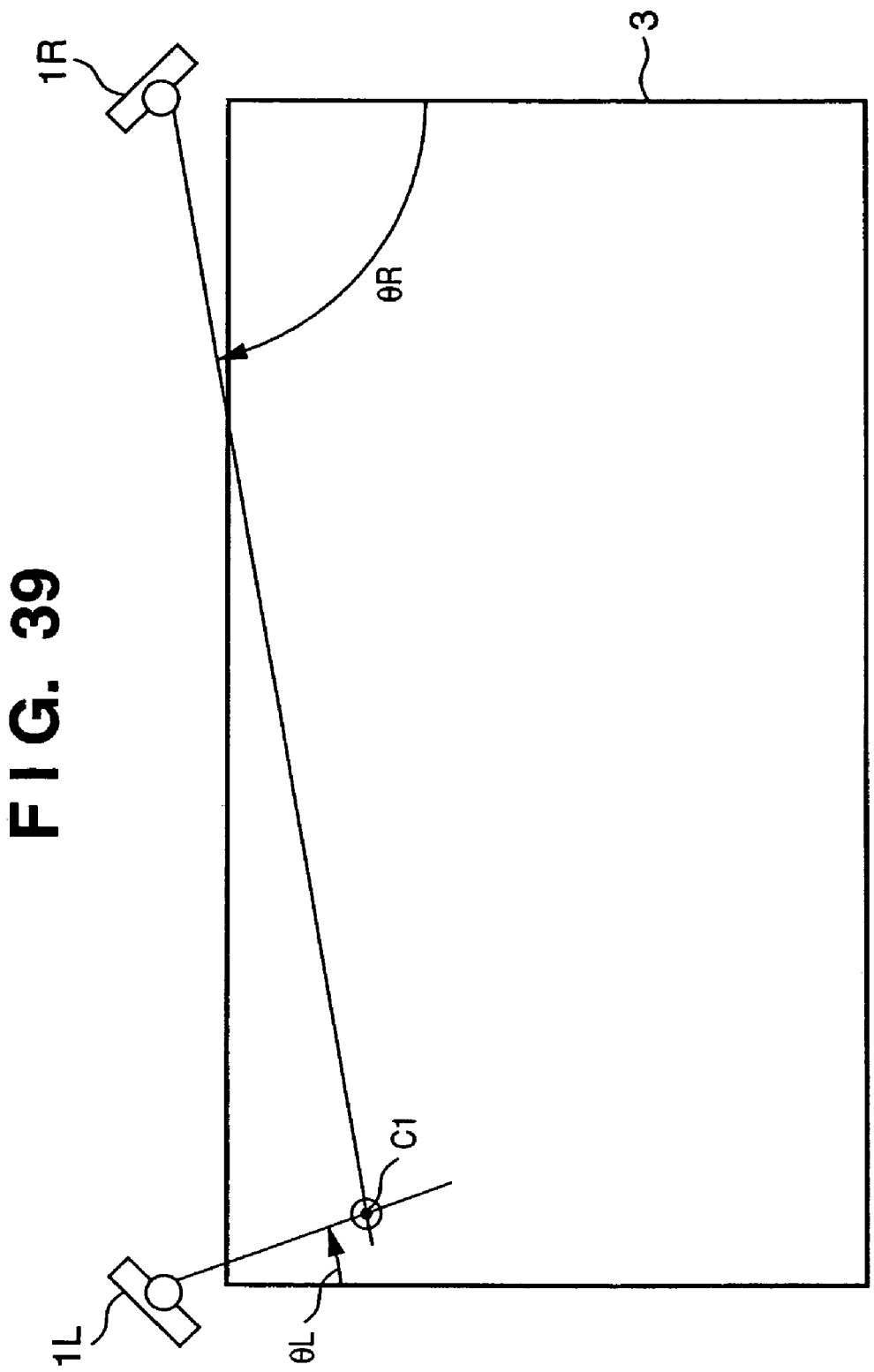
FIG. 39 is a view for explaining a single point input operation according to the present invention.

FIG. 39 is a view showing the single point input operation in FIG. 35 viewed from the upper side.

Figure 40:
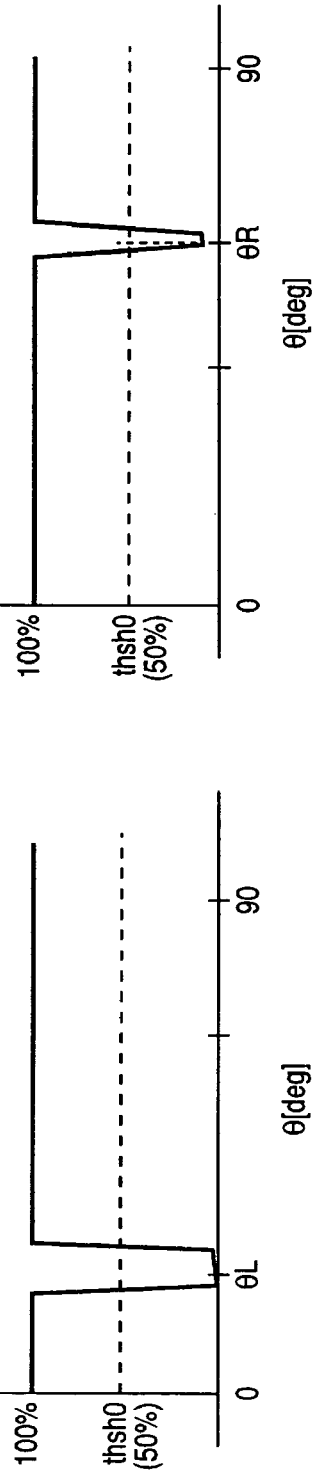
FIG. 40 shows graphs of light intensity distributions obtained by the sensor units in the input operation in FIG. 39.
Figure 41:
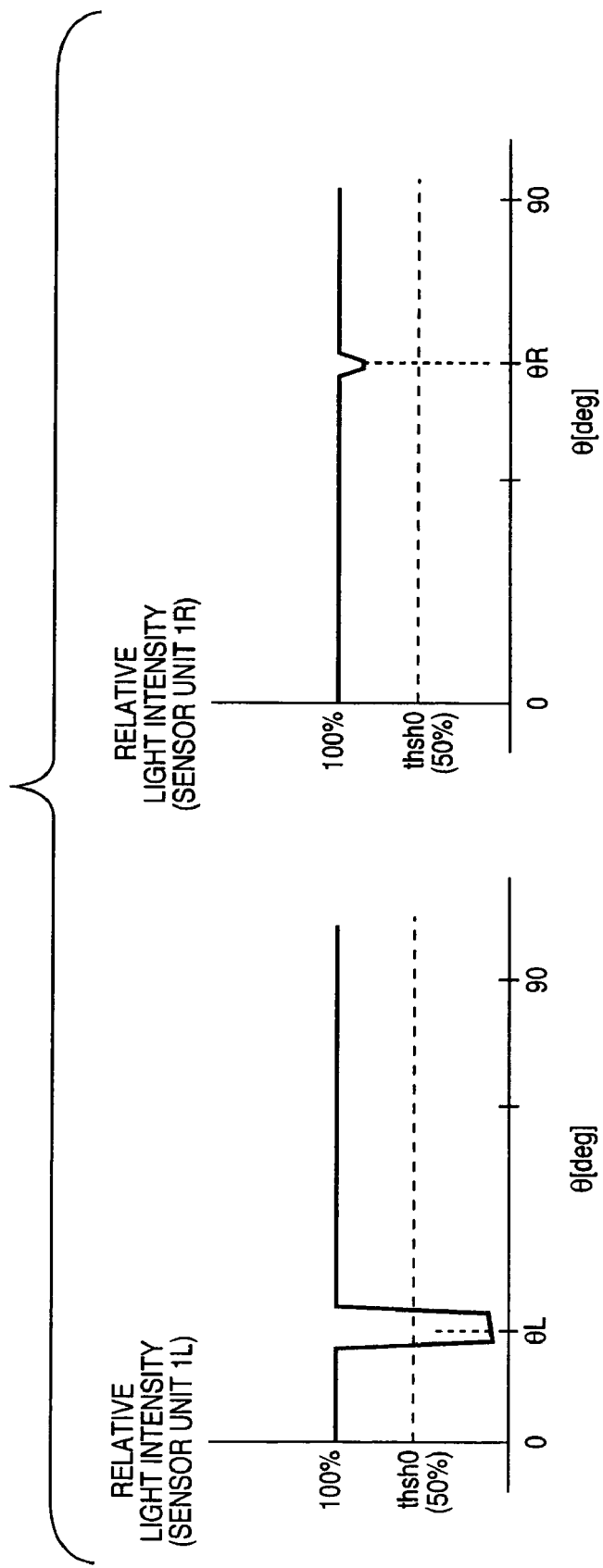
FIG. 41 shows graphs of light intensity distributions obtained by the sensor units in the input operation in FIG. 39.

When the position of the point C1 in FIG. 39 is input, normally, shadows are formed at positions θL and θR in FIGS. 40 and 41. FIG. 40 shows the shapes of shadows detected by the sensor units 1L and 1R when the pointer height H satisfies $H \leq H2\_R$ (i.e., when the pointer sufficiently approaches the coordinate input surface). FIG. 41 shows the shapes of shadows detected by the sensor units 1L and 1R when $Hth\_R \leq H \leq Hth\_L$ (i.e., when the pointer enters or leaves the coordinate input surface).

At this time, the shadow of the pointer is observed by the sensor unit 1L but not by the sensor unit 1R, as described above.

In single point input, any problem can be avoided by determining that an input is present only when both the two sensor units detect a shadow (no input is present when only one sensor unit detects a shadow).

However, a serious problem is posed in multiple point input. This will be described below.

Figure 42:
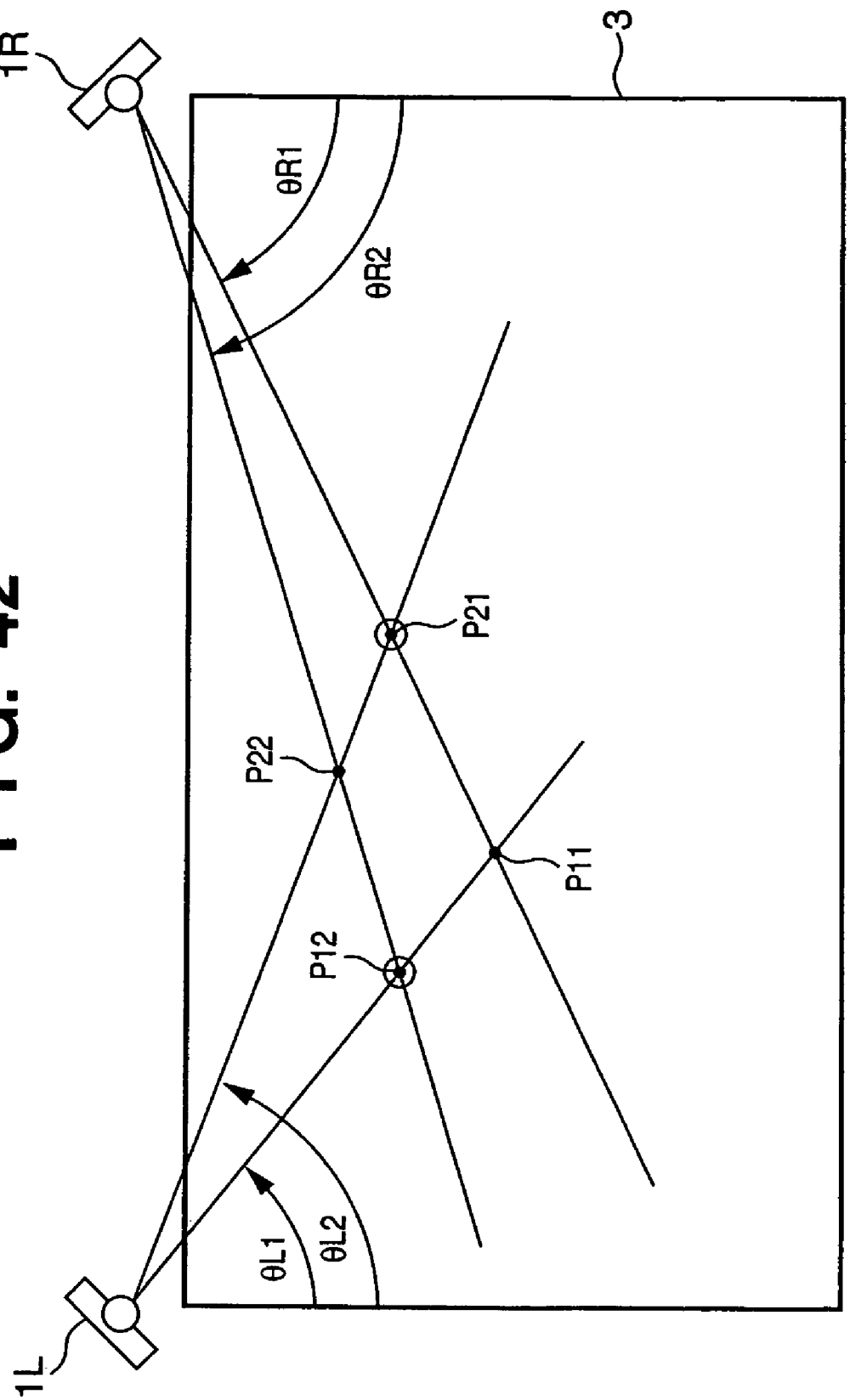
FIG. 42 is a view for explaining a multiple point input operation according to the present invention.

FIG. 42 is a view showing a multiple point input operation viewed from the upper side.

FIG. 42 shows a case wherein multiple point input is executed at points P12 and P21.

Figure 43:
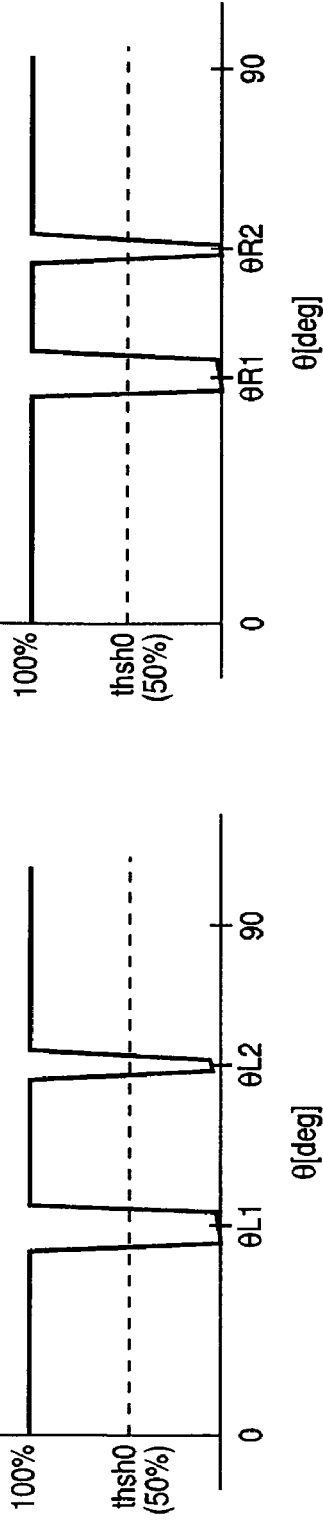
FIG. 43 shows graphs of light intensity distributions obtained by the sensor units in the input operation in FIG. 42.

In this case, as shown in FIG. 43, shadows are detected at positions θL1 and θL2 by the sensor unit 1L. In addition, shadows are detected at positions θR1 and θR2 by the sensor unit 1R. On the basis of the two sets of angle data, four coordinate candidate points P11, P12, P21, and P22 are calculated. When truth determination is executed for these coordinate candidate points by a certain means, for example, P11 and P22 are determined as virtual images, and P12 and P21 are determined as real images. Hence, the coordinate input points are decided.

Figure 44:
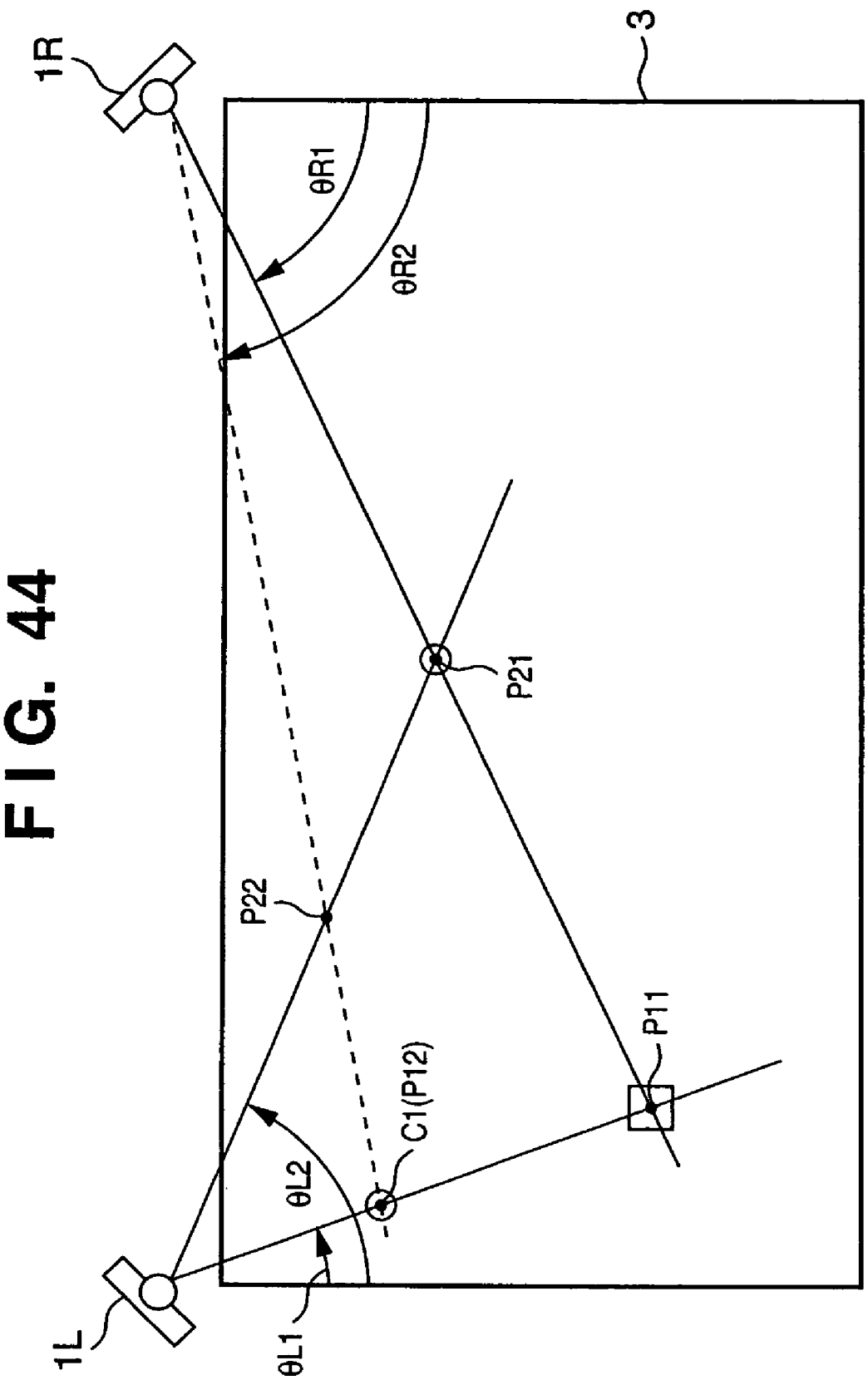
FIG. 44 is a view for explaining an example of a detection error in the present invention.

An example of multiple point input when a coordinate input point detection error occurs will be described next. An erroneous detection pattern (1) is as follows. Consider a case wherein multiple point input is executed at the point P12 (corresponding to the point C1 in FIG. 39) and the point P21, as shown in FIG. 44. The pointer height H at each point satisfies $Hth\_R \leq H \leq Hth\_L$ shown in FIG. 38.

Figure 45:
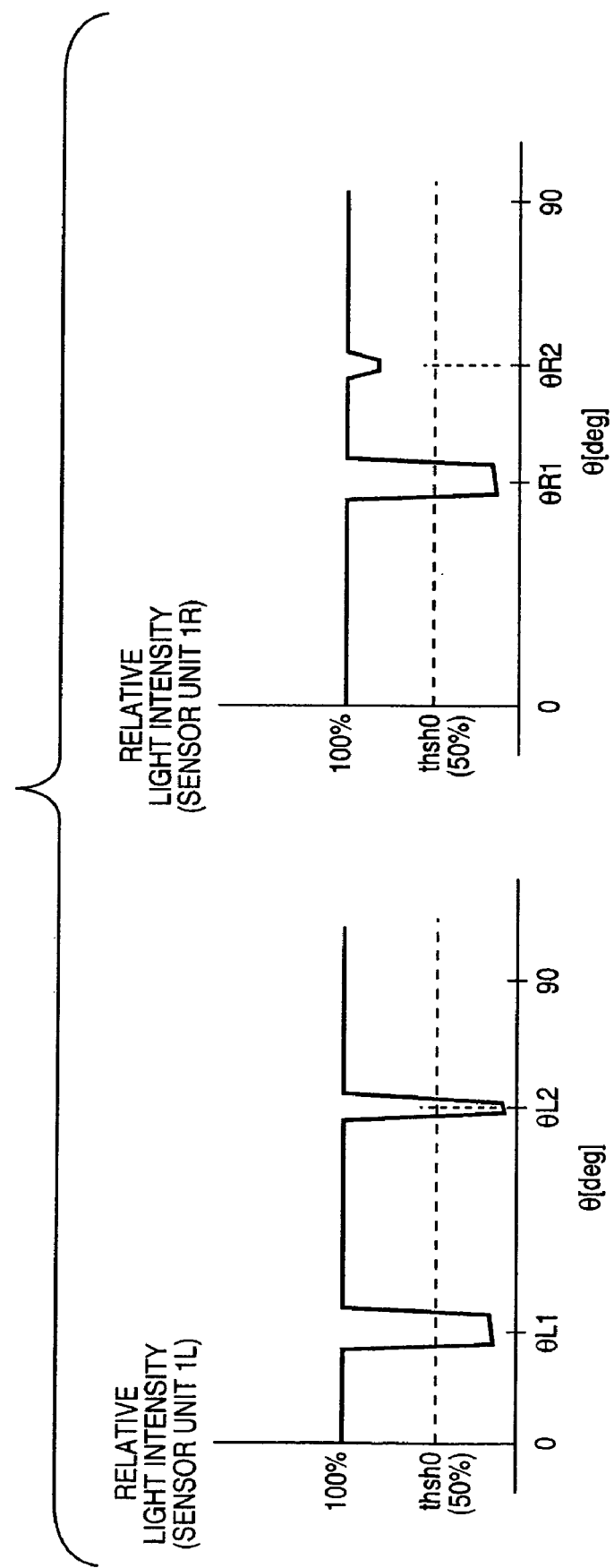
FIG. 45 shows graphs of light intensity distributions obtained by the sensor units in the input operation in FIG. 44.

At this time, θR2 is not detected by the sensor unit 1R, as shown in FIG. 45.

Figure 46:
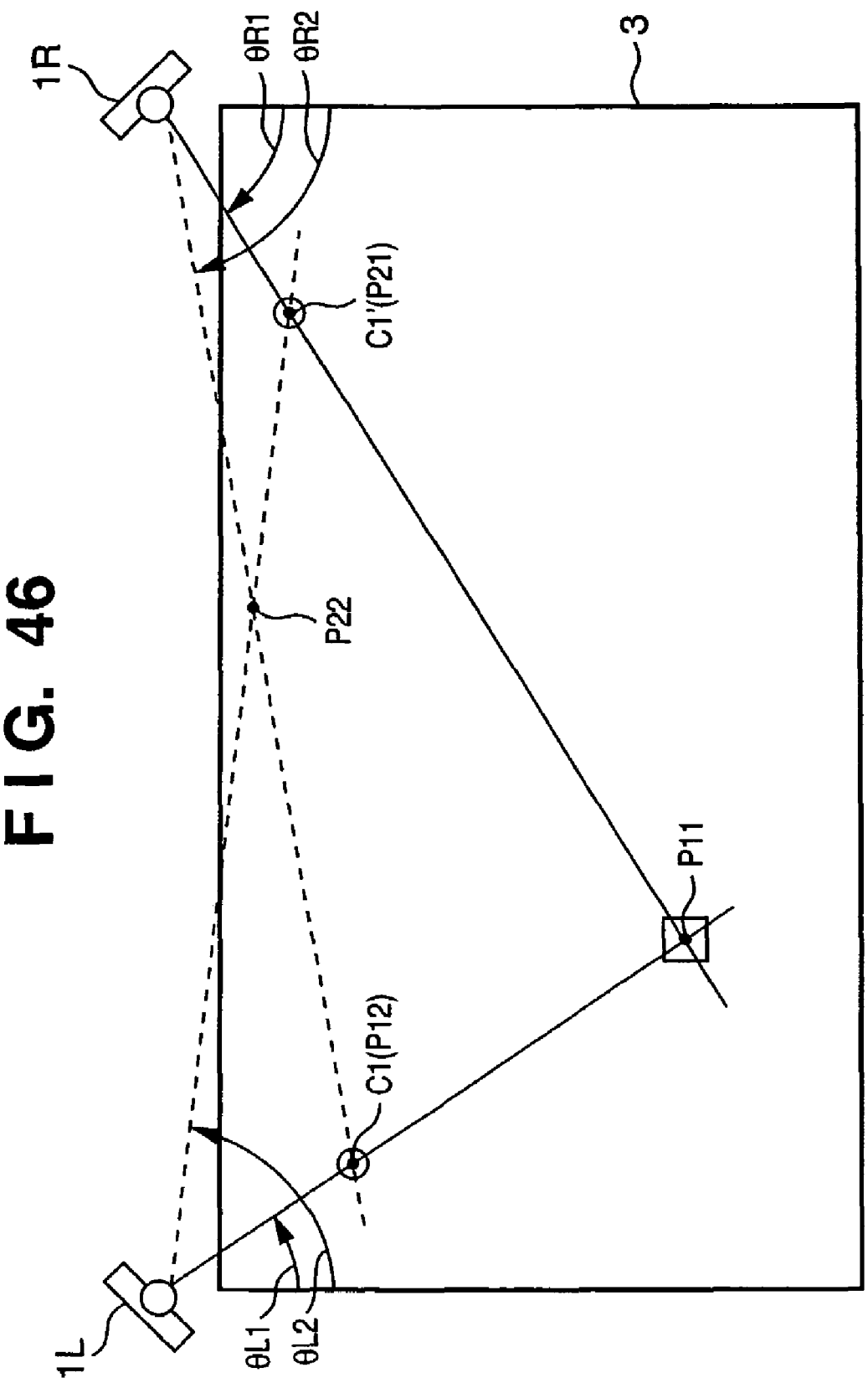
FIG. 46 is a view for explaining an example of a detection error in the present invention.

In this case, although the two points C1 (P12) and P21 are actually input, the sensor unit 1R detects only θR1 but not θR2 (i.e., the shadow of the input P12 is not detected). For this reason, the point P12 is erroneously recognized as an overlapping point observed from the sensor unit 1R, and P11 in FIG. 46 is recognized as a coordinate input point. That is, the actual coordinate input point P12 is erroneously detected as the coordinate input point P11.

An erroneous detection pattern (2) is as follows. Consider a case wherein multiple point input is executed at the point P12 (corresponding to the point C1 in FIG. 39) and the point P21 (a point C1' that is almost bilaterally symmetric with respect to the point C1), as shown in FIG. 46. The pointer height H at the point C1 satisfies $Hth\_R \leq H \leq Hth\_L$ shown in FIG. 38. The pointer height H at the point C1' satisfies $Hth\_L$ (C1)≦H(C1')≦Hth_R(C1'), i.e., the reversed relationship of the sensor units 1L and 1R in FIG. 38.

At this time, θL2 is not observed from the sensor unit 1L, and θR2 is not observed from the sensor unit 1R, as shown in FIG. 47. In this case, although the two points C1 (P12) and C1' (P21) are actually input, the intersection between the angles θL1 and θR1 detected actually, i.e., P11 in FIG. 46 is erroneously sensed as the coordinate input point. That is, it is erroneously detected that single point input is executed.

As described above, when the pointer height H falls within a predetermined range (e.g., at the point C1, Hth_R≦H≦Hth_L), the shadow which should be detected by both the sensor units 1L and 1R changes between their three-dimensional light shielding detection regions. For this reason, the coordinate input point cannot be detected on the basis of a correct combination of coordinate candidate points detected upon multiple point input.

The predetermined range (e.g., at the point C1, Hth_R≦H≦Hth_L) always exists when the pointer enters or leaves the coordinate input effective region. For this reason, a coordinate detection error or coordinate candidate point calculation error occurs.

The present invention proposes arrangements to solve these problems. In the present invention, especially, a single (common) three-dimensional light shielding detection region is prepared for the left and right sensor units 1L and 1R, thereby solving the problems.

<Definition of Common Three-Dimensional Light Shielding Detection Region>

An arrangement proposed by the present invention considers how to form an identical space as the three-dimensional light shielding detection regions of the sensor units 1L and 1R shown in, e.g., FIGS. 36 and 37.

As a first possible way, for example, the section of the optical path near the left side of the sensor unit 1L and the retroreflecting member 4b related to the sensor unit 1R are formed into almost the same shape. Similarly, the section of the optical path near the right side of the sensor unit 1R and the retroreflecting member 4a related to the sensor unit 1L are formed into almost the same shape.

In this way, a three-dimensional light shielding detection region as shown in FIG. 34A can be formed, which is common to the sensor units 1L and 1R. That is, a common three-dimensional shape corresponding to the coordinate input effective region can be obtained.

Referring to FIG. 34A, the retroreflecting member 4c is rectangular, the retroreflecting members 4a and 4b have identical trapezoidal shapes, and the sensor units 1L and 1R have symmetrical shapes. The upper end of the sensor unit 1L is located on the extension of the upper side of the retroreflecting member 4b, and the lower end is located on the extension of the lower side. The upper end of the sensor unit 1R is located on the extension of the upper side of the retroreflecting member 4a, and the lower end is located on the extension of the lower side.

<Effective Light Shielding Detection Window of Sensor Unit>

As described above, the sensor units 1L and 1R in FIGS. 34A and 34B are expressed to be significant especially in the height direction as the actual existence of a light shielding detection window which effectively detects light shielding including light projection and light reception. That is, the thickness of the semicylindrical shape of each of the sensor units 1L and 1R indicates the size of the effective light shielding detection window defined in the height direction.

The section of the light shielding detection region (light shielding detection window) will be described below with reference to FIGS. 48 to 51.

Referring to FIGS. 48 to 51, an effective light projecting unit 102 included in a sensor unit is expressed as a mesh pattern, and an effective light receiving unit 106 is expressed as a hatched pattern. The width of light projection (the width of the effective window) and the width of light reception (the width of the effective window) are represented by the widths in the drawings. A description will be made below with an emphasis on the sensor unit 1L.

The sensor unit includes a light projecting unit and a light receiving unit. Ideally, the light projecting unit and light receiving unit are arranged at the same position. In fact, such an arrangement is impossible because of the limitation on, e.g., the cost and accuracy. For this reason, the following arrangement is employed actually.

Figure 48:
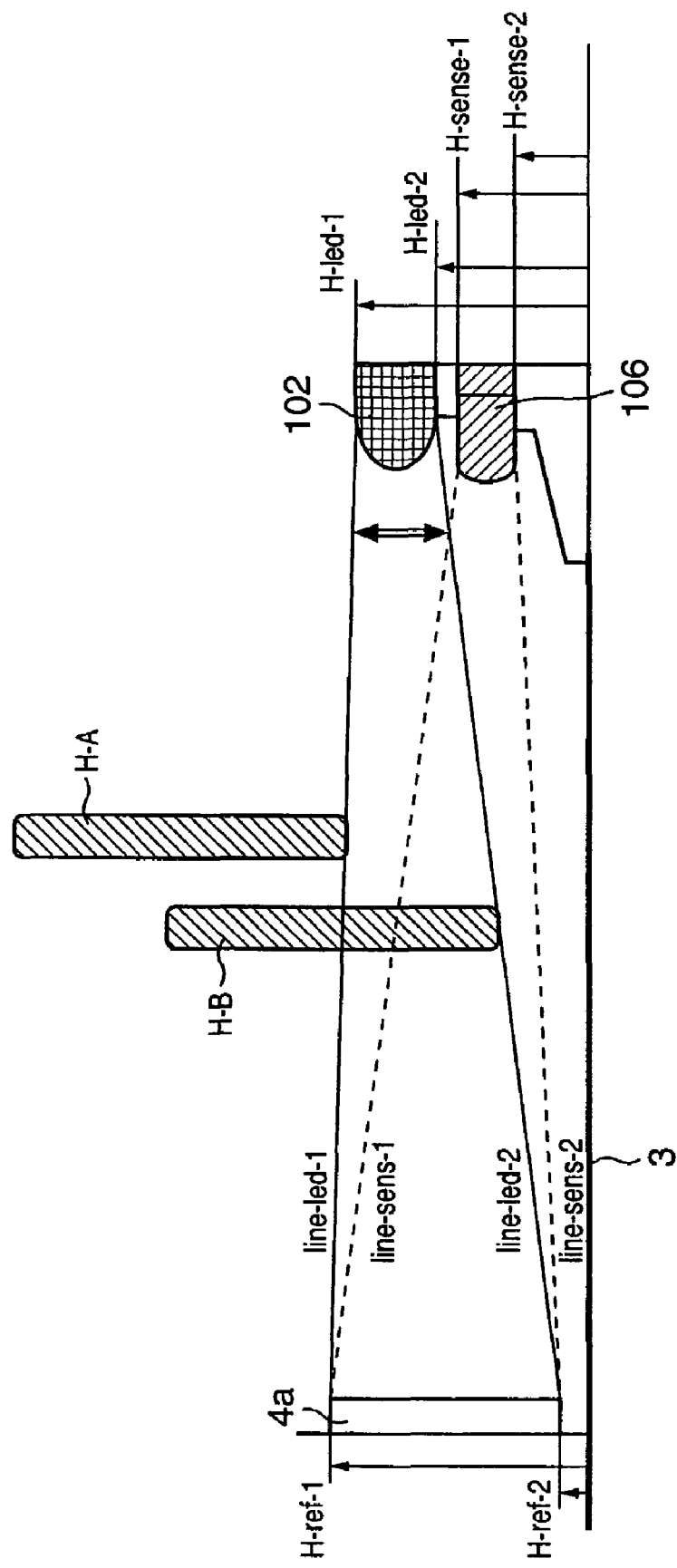
FIG. 48 is a view for explaining the concept of the light shielding detection region according to the fourth embodiment of the present invention.

(1) The light projecting unit 102 is arranged on the light receiving unit 106 (FIG. 48).

Figure 49:
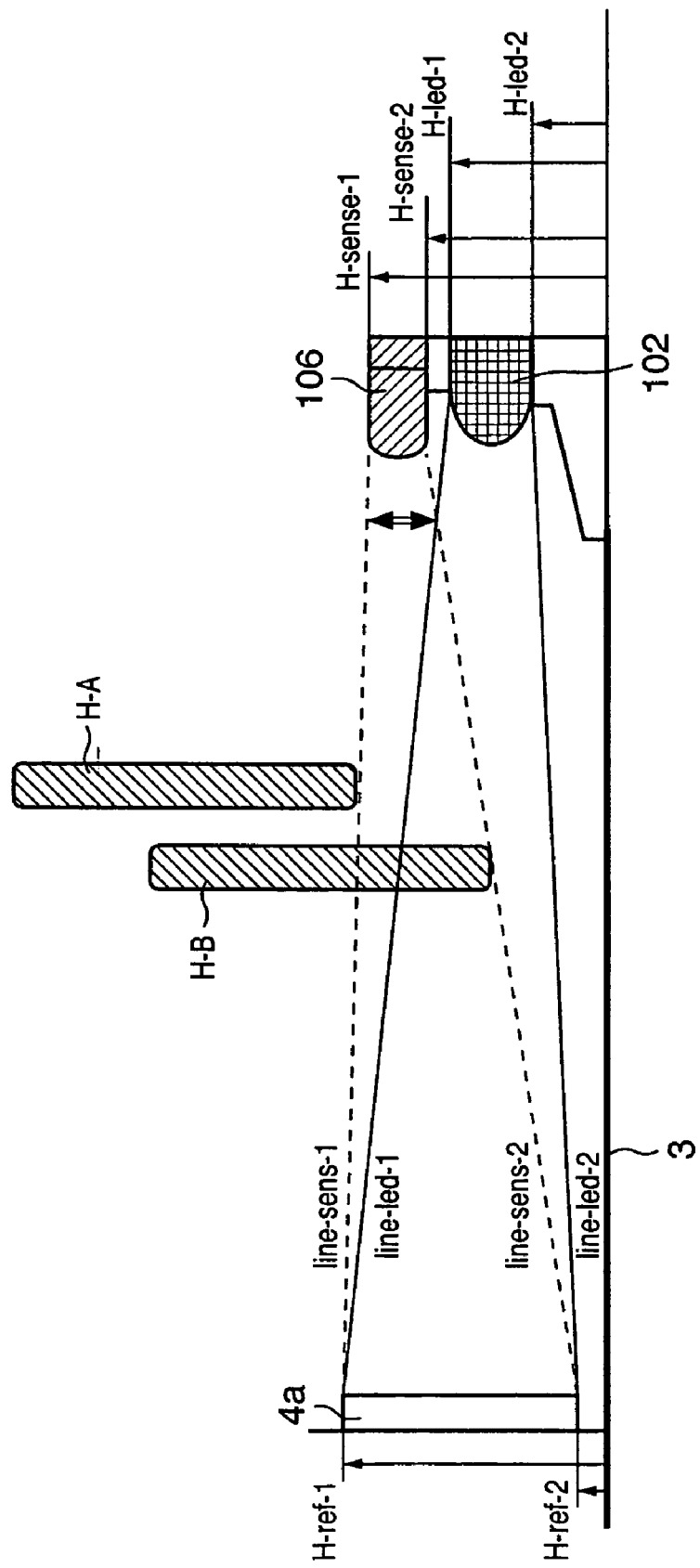
FIG. 49 is a view for explaining the concept of the light shielding detection region according to the fourth embodiment of the present invention.

(2) The light receiving unit 106 is arranged on the light projecting unit 102 (FIG. 49).

Figure 50:
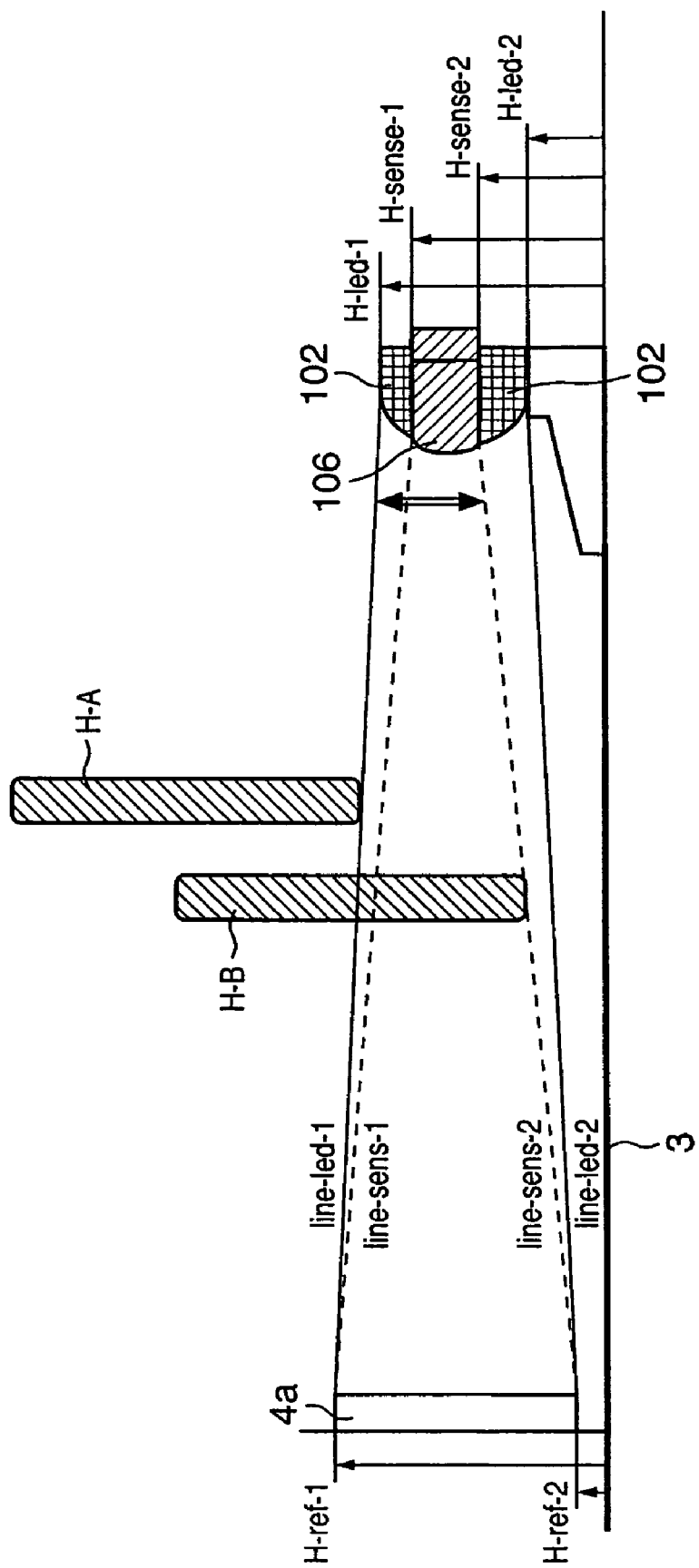
FIG. 50 is a view for explaining the concept of the light shielding detection region according to the fourth embodiment of the present invention.

(3-a) The light projecting unit 102 and light receiving unit 106 are arranged side by side, and the light projecting unit 102 is larger (FIG. 50).

Figure 51:
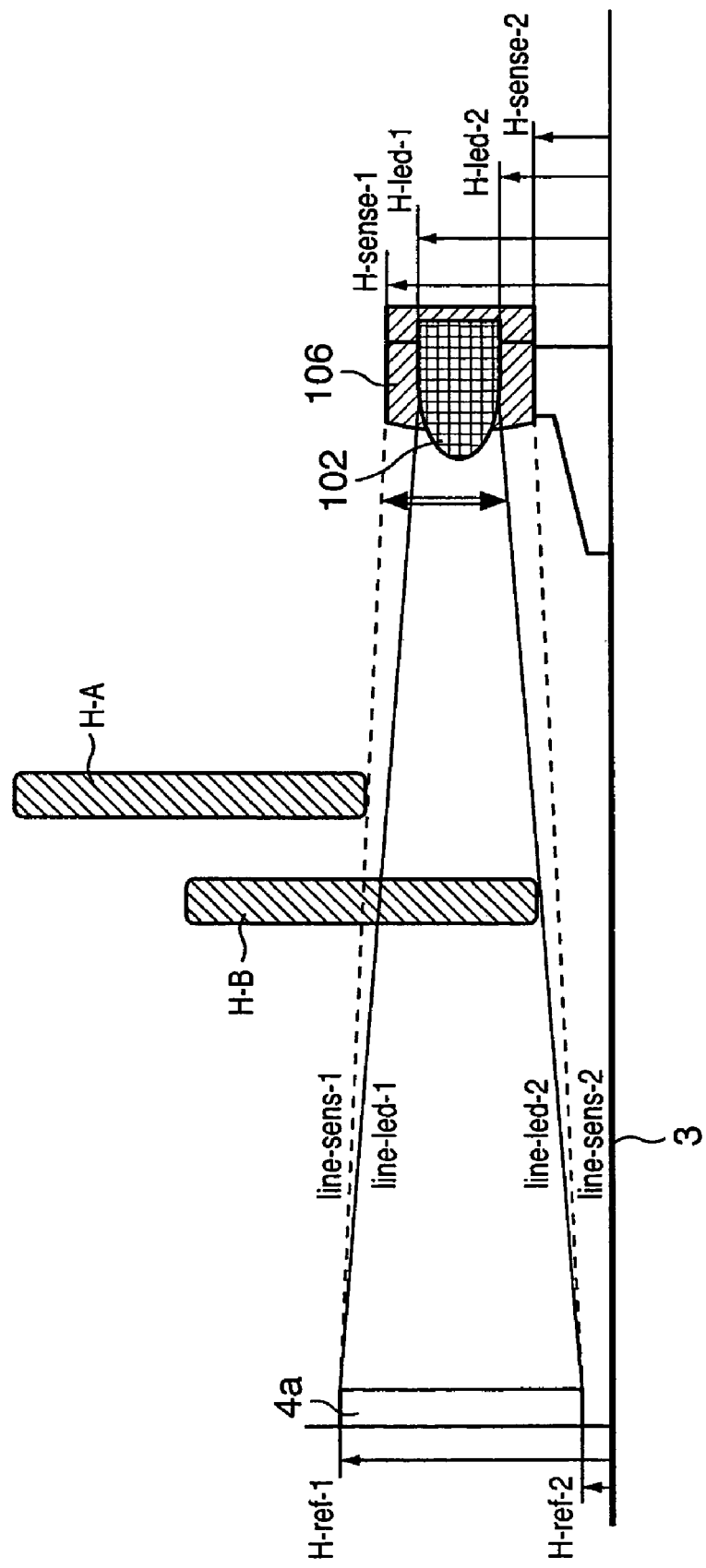
FIG. 51 is a view for explaining the concept of the light shielding detection region according to the fourth embodiment of the present invention.

(3-b) The light projecting unit 102 and light receiving unit 106 are arranged side by side, and the light receiving unit 106 is larger (FIG. 51).

(4) The light projecting unit and light receiving unit are equivalently arranged at the same position by using a half mirror.

In the present invention, only the height direction from the coordinate input surface matters. Hence, the arrangements (3) and (4) are regarded as the same.

How to define the light shielding detection window of the sensor unit will be described next.

Referring to FIGS. 48 to 51, H_led_1 indicates not the actual size of the light projecting unit but the height of the upper end of the eye of the effective light projecting unit, and H_led_2 indicates the height of the lower end. H_sens_1 indicates not the actual size of the light receiving unit but the height of the upper end of the range where an image is effectively formed on the photoelectric conversion unit of the sensor in the light receiving unit, and H_sens_2 indicates the height of the lower end.

H_ref_1 indicates the height of the effective upper end of the retroreflecting member 4a facing the sensor unit. H_ref_2 indicates the height of the effective lower end of the retroreflecting member 4a facing the sensor unit.

H_A indicates the position (the distance between a pointer and the coordinate input surface) where a shadow appears for the first time upon insertion of a pointer. H_B indicates the position (the distance between the pointer and the coordinate input surface) where the shadow depth (light shielding rate) reaches about 100%.

As an important point, the visual field range of the light projecting unit regarding the thickness direction (the direction perpendicular to the coordinate input surface) is wider than the retroreflecting region H_ref_1 to H_ref_2 and includes it. The visual field range of the light receiving unit is also wider than the retroreflecting region H_ref_1 to H_ref_2 and includes it.

Referring to FIGS. 48 to 51, the effective optical path of the light projecting unit is a region sandwiched between line_led_1 and line_led_2. That is, the light projecting window is defined by H_led_1 and H_led_2. The effective optical path of the light receiving unit is a region sandwiched between line_sens_1 and line_sens_2. That is, the light receiving window is defined by H_sens_1 and H_sens_2.

In the sensor unit arrangement shown in FIG. 48, when the pointer approaches the position line_led_1, the effective optical path of the light projecting unit is cut off. A shadow of light shielding is observed here for the first time. When the pointer reaches the position line_led_2, the effective optical path of the light projecting unit is cut off about 100%. For this reason, even when the portion under line_led_2 remains, i.e., the light receiving unit is not completely shielded yet, the light shielding rate of the shadow reaches about 100%.

Hence, the light shielding detection region is formed between line_led_1 and line_led_2. That is, the upper end of the light shielding detection window of the sensor unit is H_led_1, and the lower end is H_led_2. H_led_2 and H_sens_1 can be reversed.

In the sensor unit arrangement shown in FIG. 49, when the pointer approaches the position line_sens_1, the effective optical path of the light receiving unit is cut off. A shadow of light shielding is observed here for the first time. When the pointer reaches the position line_sens_2, the effective optical path of the light receiving unit is cut off about 100%. For this reason, even when the portion under line_sens_2 remains, i.e., the light projecting unit is not completely shielded yet, the light shielding rate of the shadow reaches about 100%.

Hence, the light shielding detection region is formed between line_sens_1 and line_sens_2. That is, the upper end of the light shielding detection window of the sensor unit is H_sens_1, and the lower end is H_sens_2. H_sens_2 and H_led_1 can be reversed.

In the sensor unit arrangement shown in FIG. 50, when the pointer approaches the position line_led_1, the effective optical path of the light projecting unit is cut off. A shadow of light shielding is observed here for the first time. When the pointer reaches the position line_sens_2, the effective optical path of the light receiving unit is cut off about 100%. For this reason, even when the portion under line_sens_2 remains, i.e., the light projecting unit is not completely shielded yet, the light shielding rate of the shadow reaches about 100%.

Hence, the light shielding detection region is formed between line_led_1 and line_sens_2. That is, the upper end of the light shielding detection window of the sensor unit is H_led_1, and the lower end is H_sens_2.

In the sensor unit arrangement shown in FIG. 51, when the pointer approaches the position line_sens_1, the effective optical path of the light receiving unit is cut off. A shadow of light shielding is observed here for the first time. When the pointer reaches the position line_led_2, the effective optical path of the light projecting unit is cut off about 100%. For this reason, even when the portion under line_led_2 remains, i.e., the light receiving unit is not completely shielded yet, the light shielding rate of the shadow reaches about 100%.

Hence, the light shielding detection region is formed between line_sens_1 and line_led_2. That is, the upper end of the light shielding detection window of the sensor unit is H_sens_1, and the lower end is H_led_2.

As described above, a sensor unit arrangement in which the optical paths of the light projecting unit and light receiving unit are superimposed by using a half mirror so that they are arranged virtually at the same position, as in, e.g., Japanese Patent Laid-Open No. 2000-105671, is included in the arrangements shown in FIGS. 50 and 51.

The positional relationship between the light projecting window serving as the light projecting range of the light projecting unit and the light receiving window serving as the light receiving range of the light receiving unit can be defined generally that "the upper end of the effective light shielding detection window of the sensor unit equals a higher one of the upper end of the effective light projecting window and the upper end of the effective light receiving window", and "the lower end of the effective light shielding detection window of the sensor unit equals a higher one of the lower end of the effective light projecting window and the lower end of the effective light receiving window".

This relationship can be represented by $$H\_opt\_1 = \text{Higher}(H\_led\_1, H\_sens\_1) \quad (1)$$

$$H\_opt\_2 = \text{Higher}(H\_led\_2, H\_sens\_2) \quad (2)$$

where

H_opt_1: upper end of effective light shielding detection window of the sensor unit H_opt_2: lower end of effective light shielding detection window of the sensor unit H_led_1: upper end of effective light projecting window of the sensor unit H_led_2: lower end of effective light projecting window of the sensor unit H_sens_1: upper end of effective light receiving window of the sensor unit H_sens_2: lower end of effective light receiving window of the sensor unit Higher(*1,*2): operation of selecting a higher one of *1 and *2

<Extension of Definition of Common Three-Dimensional Light Shielding Detection Region>

As described above, in, e.g., the arrangement shown in FIG. 34A, the two planes S_top and S_botom as shown in FIG. 34B are defined. If the upper ends of the effective light shielding detection windows of the two sensor units 1L and 1R almost match the plane S_top, and the lower ends almost match the plane S_botom, a three-dimensional light shielding detection region common to the sensor units 1L and 1R can be formed. Hence, the depths (light shielding rates) of light shielding shadows observed by the sensor units are observed as almost the same value.

The number of sensor units is not limited to two. In a coordinate input apparatus including a plurality of, i.e., three or more sensor units, generally, if the upper ends of the effective light shielding detection window of all sensor units almost match the plane S_top, and the lower ends almost match the plane S_botom, a three-dimensional light shielding detection region common to all sensor units can be formed.

In the twin-lens structure shown in FIG. 33A, the two planes S_top and S_botom as shown in FIG. 33B are defined. In this case, if the upper ends of the effective light shielding detection windows of the optical units L1, L2, R1, and R2 incorporated in the sensor units 1L and 1R almost match the plane S_top, and the lower ends almost match the plane S_botom, a three-dimensional light shielding detection region common to all the optical units can be formed. The depths (light shielding rates) of light shielding shadows observed by the optical units are observed as almost the same value.

Several application examples of the arrangement shown in FIG. 34B will be described below.

Figure 52:
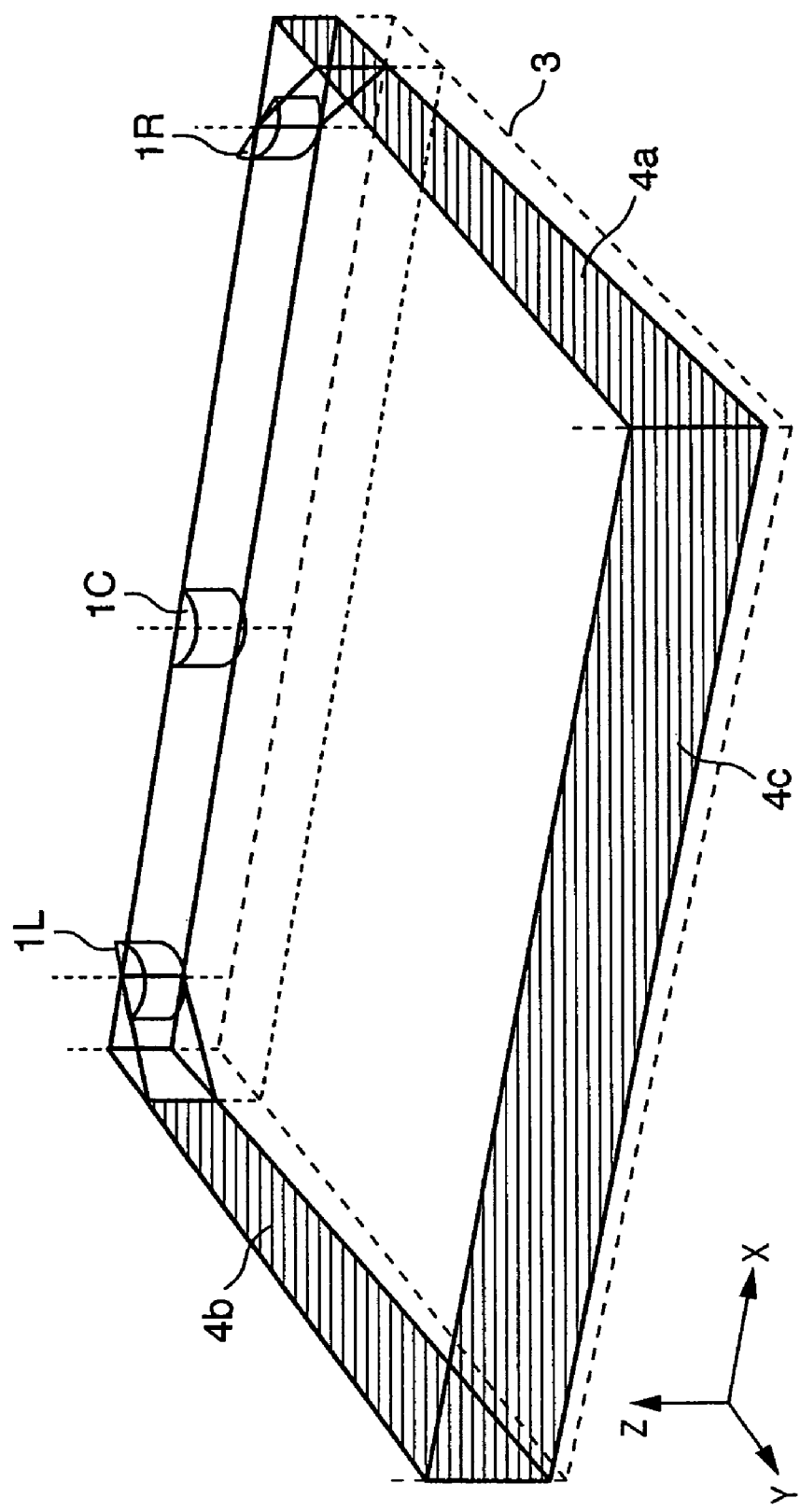
FIG. 52 is a view showing a layout example of the sensor units of the coordinate input apparatus according to the fourth embodiment of the present invention.

For example, in the arrangement shown in FIG. 52, a new sensor unit 1C is arranged on the same line as the sensor units 1L and 1R to input two coordinate points. Even in this case, if the upper ends of the effective light shielding detection windows of the sensor units almost match the plane S_top, and the lower ends almost match the plane S_botom, a three-dimensional light shielding detection region common to all the sensor units can be formed. Hence, the depths (light shielding rates) of light shielding shadows observed by the optical units are observed as almost the same value.

Figure 53:
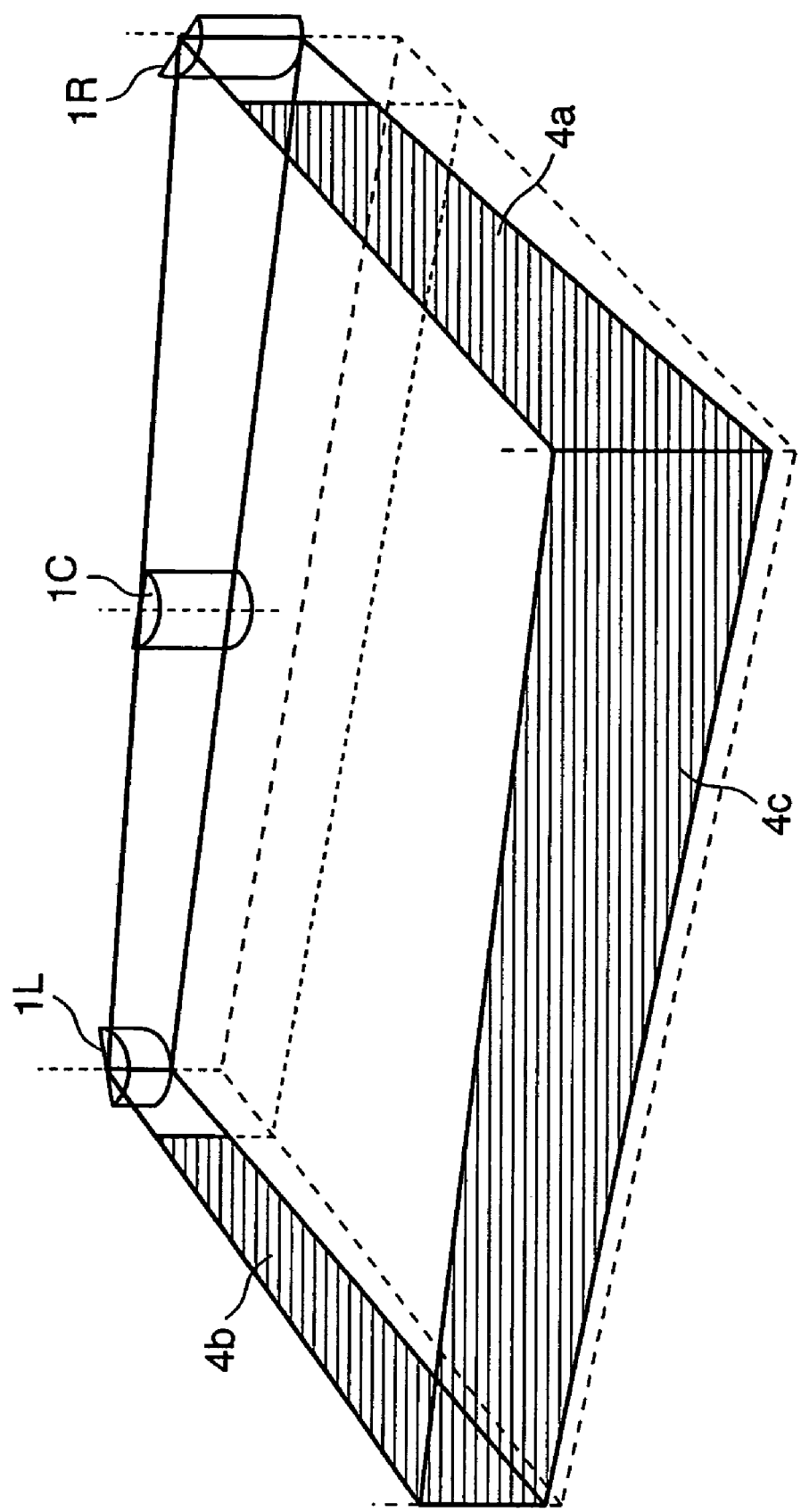
FIG. 53 is a view showing a layout example of the sensor units of the coordinate input apparatus according to the fourth embodiment of the present invention.

As shown in FIG. 53, the retroreflecting member 4c has a trapezoidal shape, and the planes S_top and S_botom tilt in the X direction. Even in this case, if the upper ends of the effective light shielding detection windows of the sensor units almost match the plane S_top, and the lower ends almost match the plane S_botom, a three-dimensional light shielding detection region common to all the sensor units can be formed. Hence, the depths (light shielding rates) of light shielding shadows observed by the optical units are observed as almost the same value.

Figure 54:
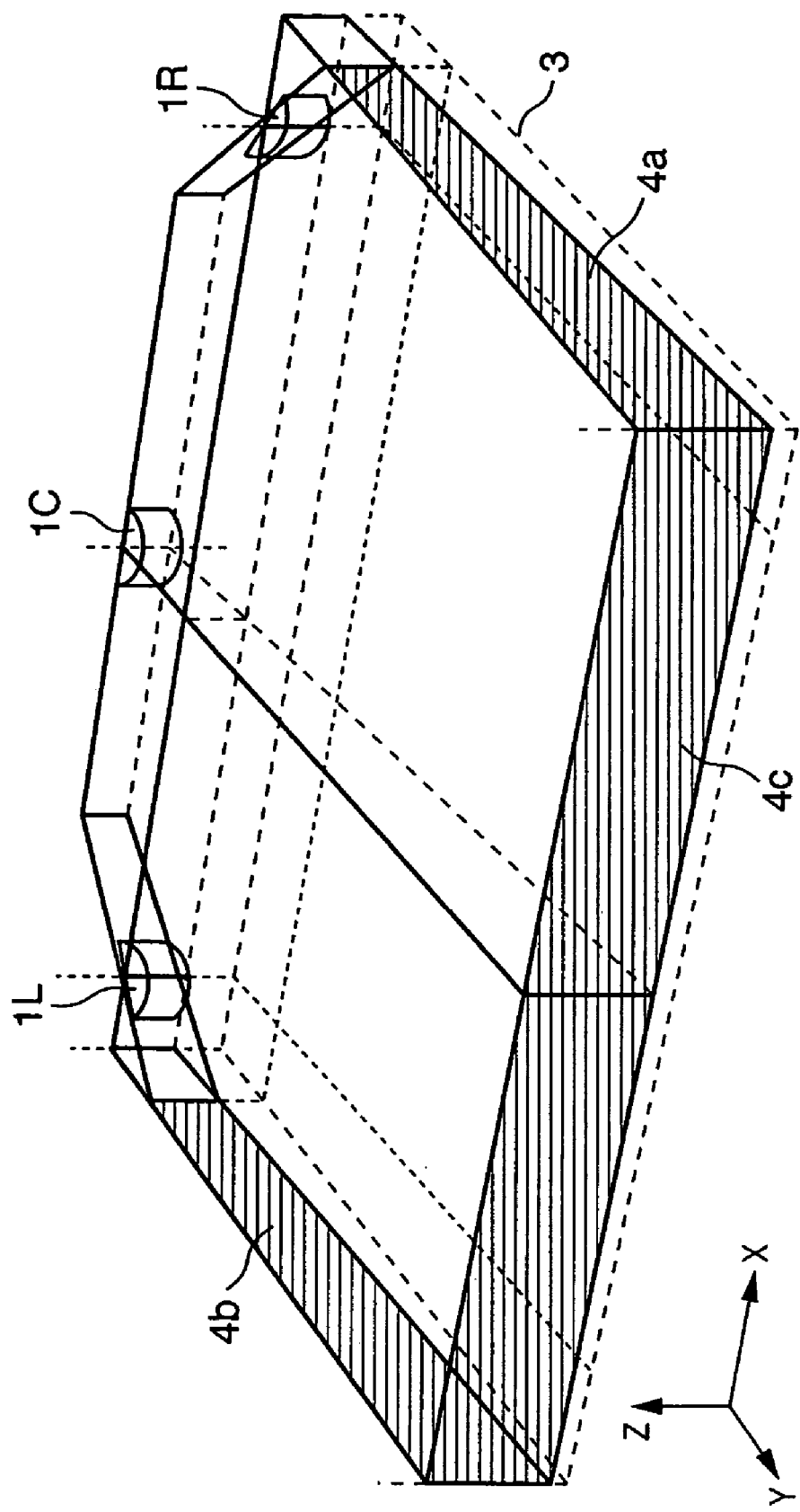
FIG. 54 is a view showing a layout example of the sensor units of the coordinate input apparatus according to the fourth embodiment of the present invention.

Instead of arranging all sensor units on the same line as shown in FIGS. 52 and 53, the sensor unit 1C is arranged slightly farther from the coordinate input effective region 3 than the sensor units 1L and 1R, as shown in FIG. 54. Even in this case, if the upper ends of the effective light shielding detection windows of the sensor units almost match the plane S_top, and the lower ends almost match the plane S_botom, a three-dimensional light shielding detection region common to all the sensor units can be formed. Hence, the depths (light shielding rates) of light shielding shadows observed by the optical units are observed as almost the same value.

Figure 55:
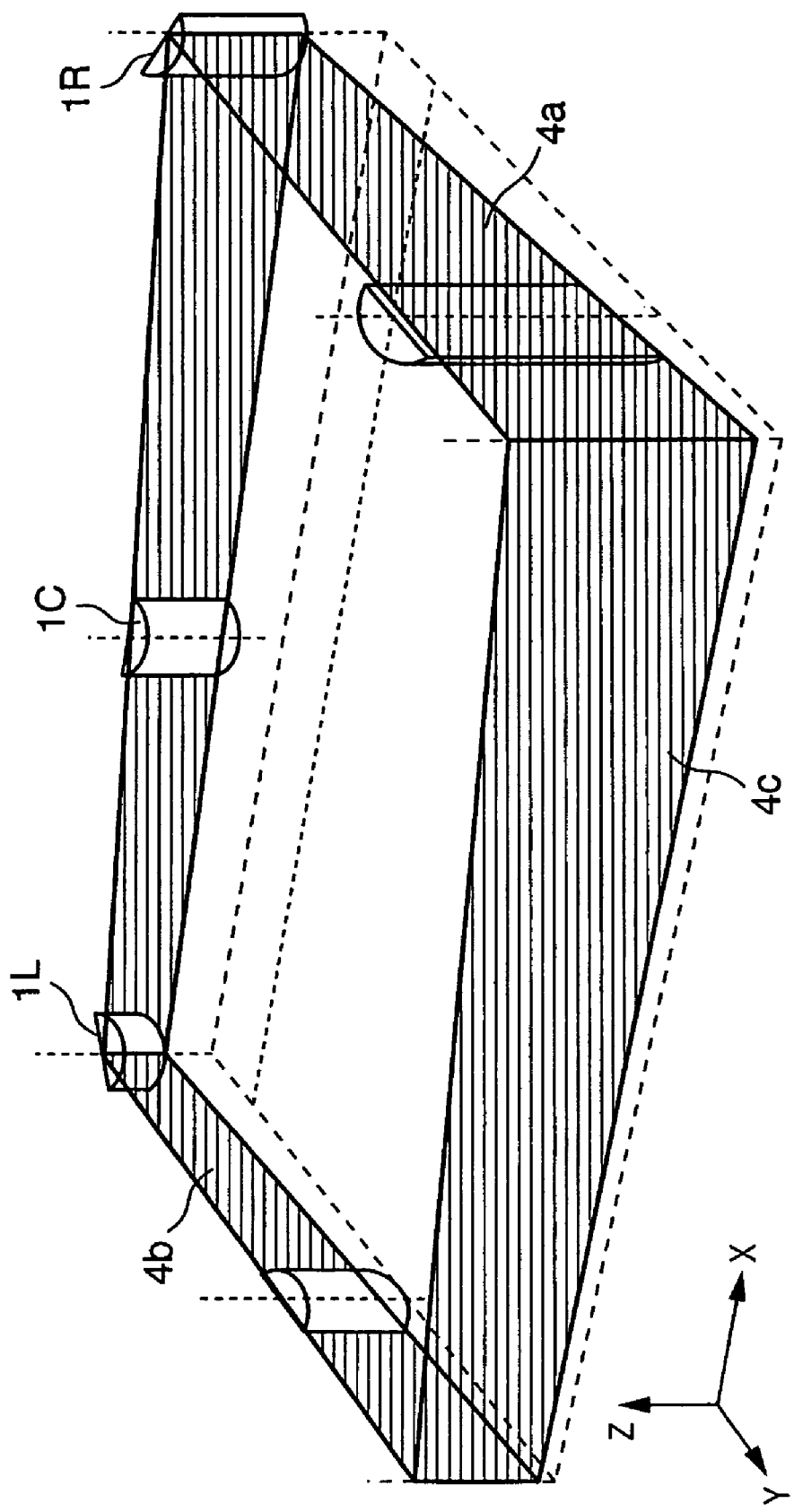
FIG. 55 is a view showing a layout example of the sensor units of the coordinate input apparatus according to the fourth embodiment of the present invention.

Even when new sensor units C2 and C3 are added, a shown in FIG. 55, if the upper ends of the effective light shielding detection windows of the sensor units almost match the plane S_top, and the lower ends almost match the plane S_botom, a three-dimensional light shielding detection region common to all the sensor units can be formed. Hence, the depths (light shielding rates) of light shielding shadows observed by the optical units are observed as almost the same value.

That is, it is necessary that the upper and lower sides of the effective retroreflecting members form the first and second planes, and the effective light shielding detection window of each sensor unit fills the gap between the first and second planes.

Each of the first and second planes must not be a curved or folded plane. The planes must be flat. The first and second planes need not always be parallel. The retroreflecting members and sensor units need not always be arranged along the periphery of the coordinate input effective region and may be arranged at slightly farther (retreated) positions if they satisfy predetermined conditions.

The above-described conditions are not conditions to calculate correct coordinates but conditions that only allow all sensor units to observe almost the same value as the depths (light shielding rates) of shadows observed by the sensor units upon input by a pointer.

To calculate correct coordinates, the retroreflecting members and sensor units must be arranged in a plane with an appropriate relationship in the coordinate input surface direction almost parallel to the first and second planes.

The fourth and fifth embodiments of the present invention satisfy the above-described conditions, as a matter of course.

Feature conditions that characterize the arrangement of the coordinate input apparatus of the present invention can be expressed generally as follows. That is, "the upper sides of the effective retroreflecting members which surround the coordinate input region form the first plane, the lower sides of the effective retroreflecting members form the second plane, and if the upper ends of the effective light shielding detection windows of the sensor units almost match the first plane, and the lower ends of the effective light shielding detection windows almost match the second plane, the depths (light shielding rates) of light shielding shadows observed by the sensor units are observed as almost the same value".

<Coordinate Detection Principle>

The coordinate detection principle according to the fourth embodiment will be described with reference to FIG. 13.

For the arrangement of the fourth embodiment, FIG. 13 is a schematic view showing the coordinate input apparatus in FIG. 33A (or FIG. 34A) viewed from the upper side. In the following description with reference to FIG. 33A (or FIG. 34A) or 13, the retroreflecting members 4a to 4c will generally be referred to as a retroreflecting member 4 as needed.

In the fourth embodiment, the components such as the sensor units 1L and 1R common to the first to third embodiment will be omitted appropriately.

In the fourth embodiment, light intensity distributions are acquired from, e.g., the optical units L1, L2, R1, and R2 shown in FIG. 17. The number of shadows and their positions (angles) obtained by each optical unit are calculated from the light intensity distribution. Four combinations, i.e., (L1,R1), (L1,R2), (L2,R1), and (L2,R2) obtained from the optical units L1 and L2 of the sensor unit 1L and the optical units R1 and R2 of the sensor unit 1R are sequentially selected.

In each combination, coordinate candidate points and their overlap state are decided. An appropriate combination of optical units is selected from them. With this processing, actual input points are determined (so-called truth determination) from the coordinate candidate points, and two input coordinate points are finally decided.

The four combinations (L1,R1), (L1,R2), (L2,R1), and (L2,R2) will be expressed as "LR optical unit combinations" or "LR combinations" hereinafter.

The coordinate calculation processing according to the fourth embodiment will be described next with reference to FIG. 56.

Figure 56:
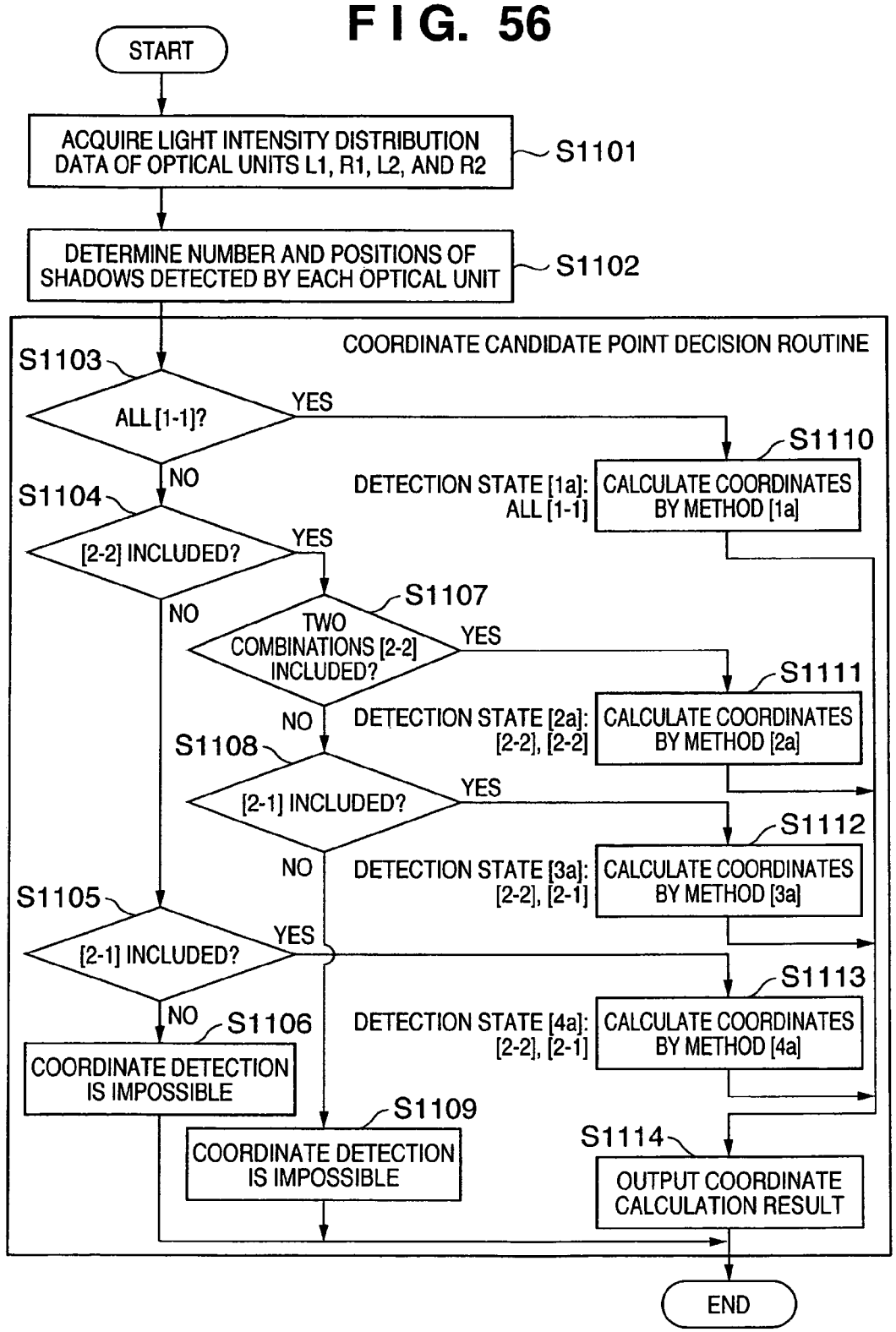
FIG. 56 is a flowchart showing coordinate calculation processing executed by the coordinate input apparatus according to the fourth embodiment of the present invention.

FIG. 56 is a flowchart showing the coordinate calculation processing executed by the coordinate input apparatus according to of the fourth embodiment of the present invention.

In step S1101, light intensity distribution data of the optical units L1, L2, R1, and R2 are acquired. In step S1102, the number of shadows (light shielding shadows) and their positions (angles) detected by each optical unit are calculated from the acquired light intensity distribution data.

The detection state of shadow count in each optical unit is determined on the basis of the "LR combinations" and the number of shadows detected by the optical unit. On the basis of the determination result, a coordinate candidate point decision routine (steps S1103 to S1114) of deciding coordinate candidate points to be used for coordinate calculation is executed.

Especially in the fourth embodiment, the following four types are considered as the shadow count detection state in each optical unit. A shadow count combination for (Ln,Rm) (n=1, 2, m=1, 2) is expressed as [X-Y] (X=1, 2, Y=1, 2).

Detection state [1a]: the number of shadows is [1-1] in all LR combinations

Detection state [2a]: at least two LR combinations [2-2] are present

Detection state [3a]: an LR combination [2-2] and an LR combination [2-1] are present Detection state [4a]: two LR combinations [2-1] are present In the fourth embodiment, the detection state of shadow count in each optical unit is determined (steps S1103 to S1105 and steps S1108 and S1109). Coordinate calculation is executed by one of coordinate calculation methods [1a] to

[4a] defined in advance for the determined detection state (steps S1110 to S1113). The coordinate calculation result is output (step S1114). If none of the above detection states is determined, it is determined that coordinate detection is impossible, and the processing is ended (step S1106 or S1109).

The coordinate calculation methods [1a] to [4a] will be described below in detail.

Coordinate Calculation Method [1a] (Step S110: Detection State [1a])

In the detection state [1a], single point input is executed. In this case, coordinate calculation can be executed in any LR combination. For example, in the optical unit combination (L1,R1), coordinate calculation is executed by <Coordinate Calculation Processing (1)> (to be described later).

Coordinate Calculation Method [2a] (Step S1111: Detection State [2a])

In the detection state [2a], at least two of the LR combinations (L1,R1), (L1,R2), (L2,R1), and (L2,R2) are [2-2].

Two combinations are selected, and sets of four coordinate candidate points obtained from the combinations are compared.

A detailed example will be described with reference to FIGS. 57 and 58, in which (L1,R1) and (L2,R1) are [2-2].

Figure 57:
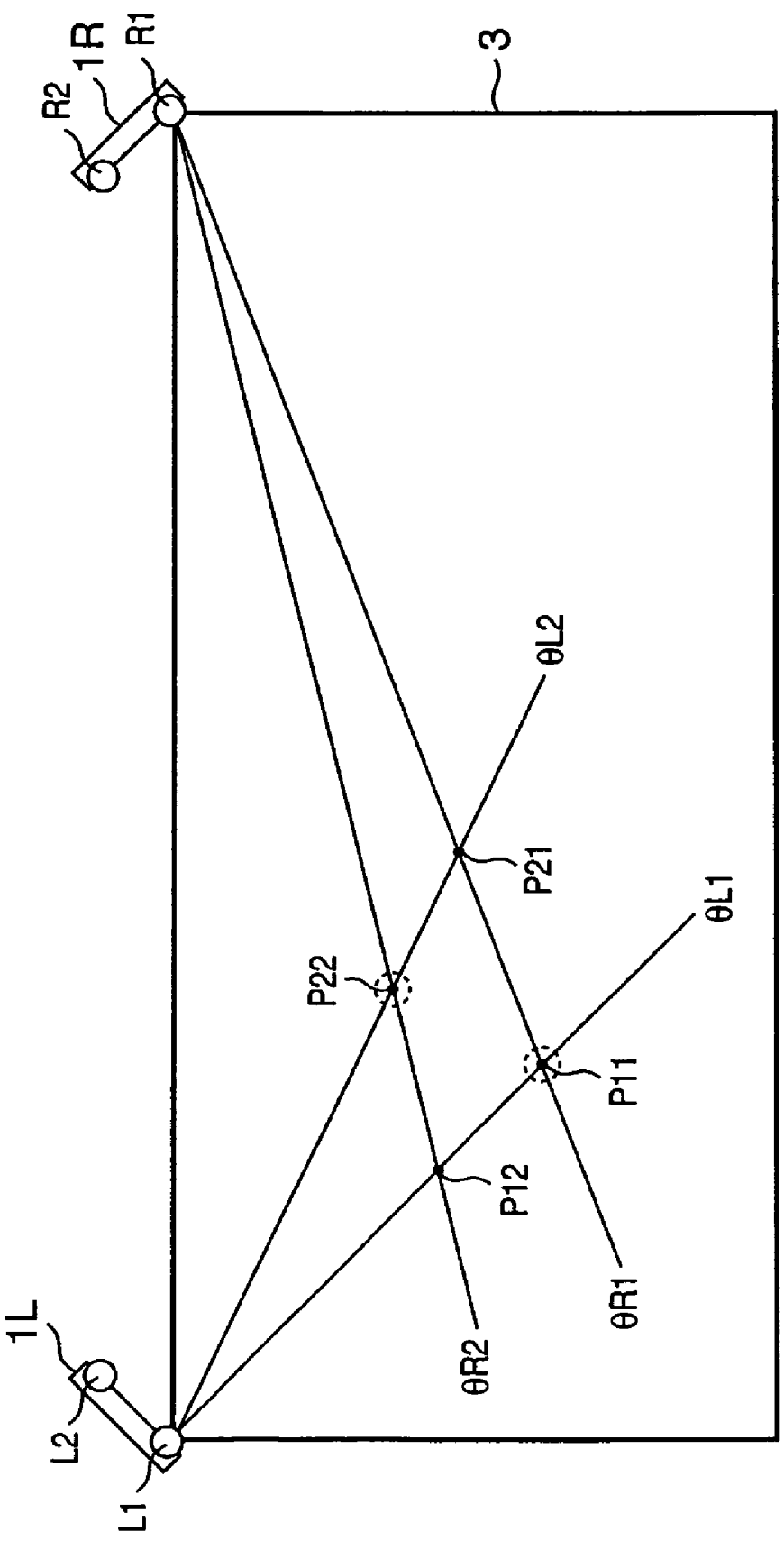
FIG. 57 is a view for explaining the coordinate calculation method according to the fourth embodiment of the present invention.

In FIG. 57, P11, P12, P21, and P22 are decided from the combination (L1,R1) on the basis of <Coordinate Calculation Processing (1)> to be described later. In FIG. 58, P'11, P'12, P'21, and P'22 are decided from the combination (L2,R1) on the basis of <Coordinate Calculation Processing (2)> to be described later.

The values of the sets of four coordinate candidate points obtained from the LR combinations are compared.

Coordinate candidate points based on actually input coordinates have the same coordinate value in both the LR combinations. On the other hand, coordinate points that are not based on actually input coordinates (coordinate candidate points as so-called virtual images) have different coordinate values in the LR combinations because of the influence of offset of the optical unit positions.

The values of the sets of four coordinate candidate points obtained from the LR combinations are compared. Coordinate candidate points which almost match each other as a result of comparison can be decided as the true coordinate values of the two input points.

Figure 58:
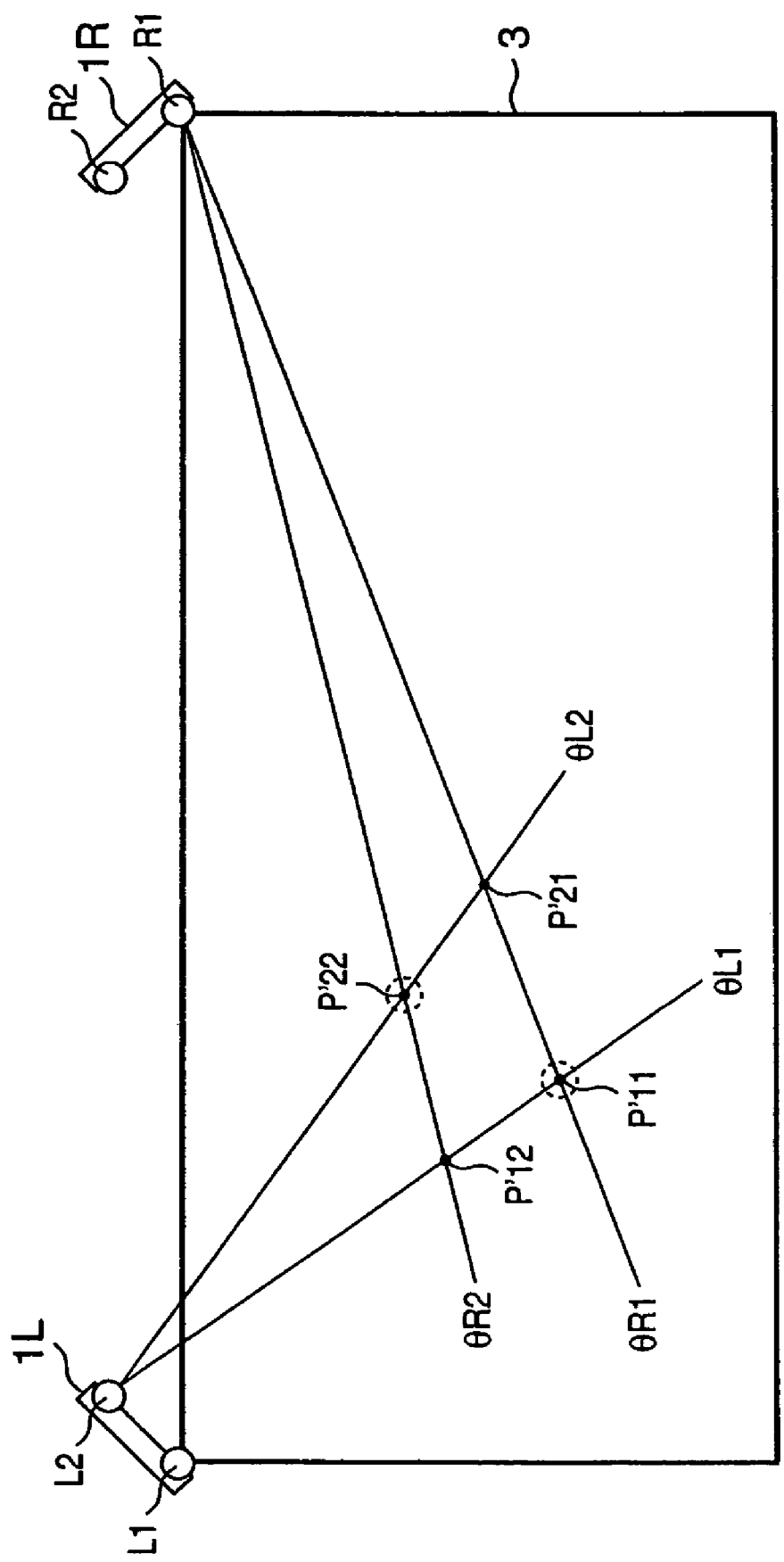
FIG. 58 is a view for explaining the coordinate calculation method according to the fourth embodiment of the present invention.

In the example shown in FIGS. 57 and 58, P11 and P22 are decided as two input points based on actual input.

Coordinate Calculation Method [3a] (Step S1112: Detection State [3a])

In the detection state [3a], an LR combination [2-2] and an LR combination [2-1] are present.

A detailed example will be described with reference to FIGS. 59 and 60, in which (L1,R2) is [2-2], and (L1,R1) are [2-1].

Figure 59:
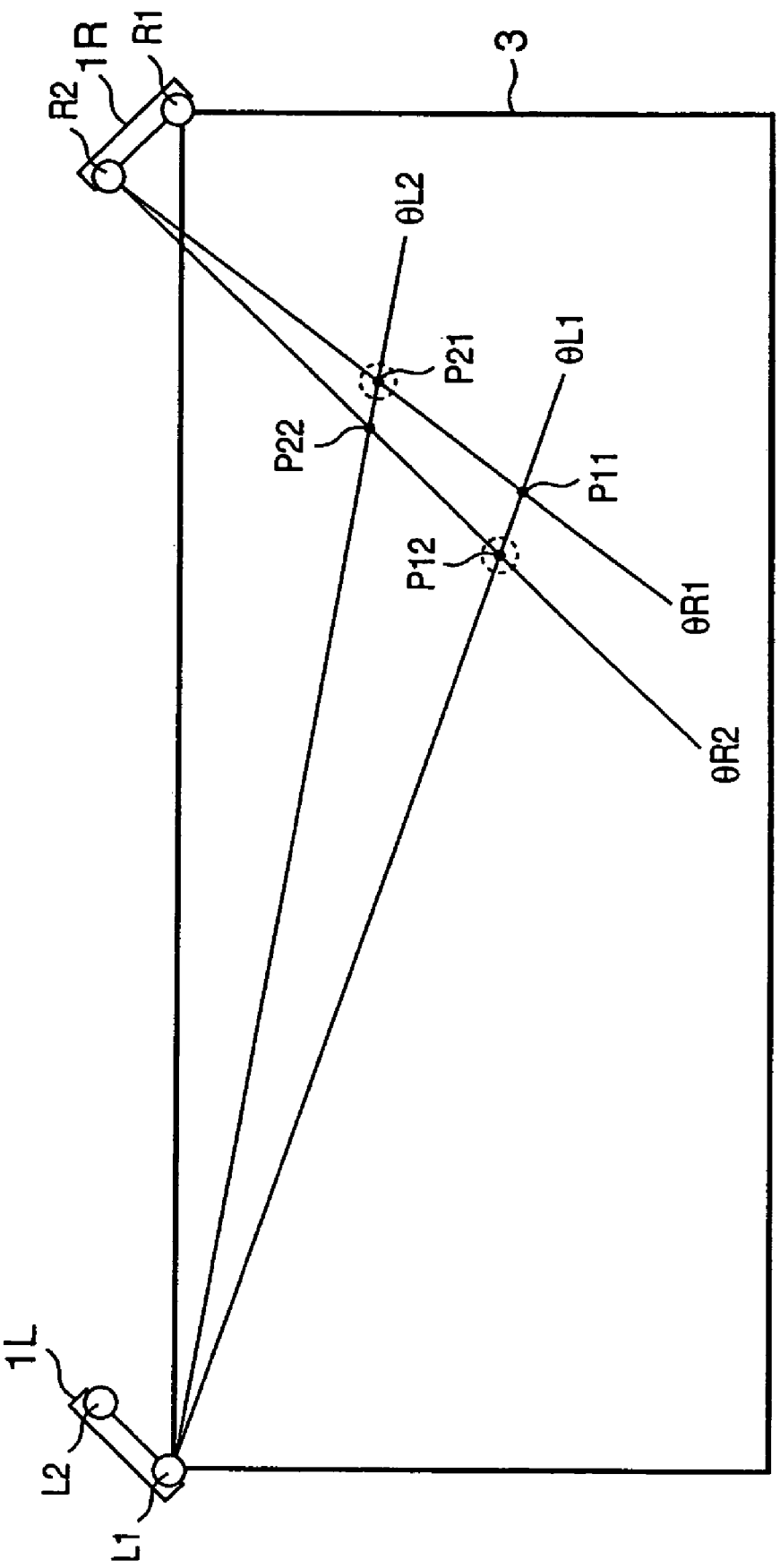
FIG. 59 is a view for explaining the coordinate calculation method according to the fourth embodiment of the present invention.

In FIG. 59, P11, P12, P21, and P22 are decided from the combination (L1,R2) on the basis of <Coordinate Calculation Processing (2)> to be described later. In FIG. 60, PP1 and PP2 are decided from the combination (L1,R1) on the basis of <Coordinate Calculation Processing (1)> to be described later.

Figure 60:
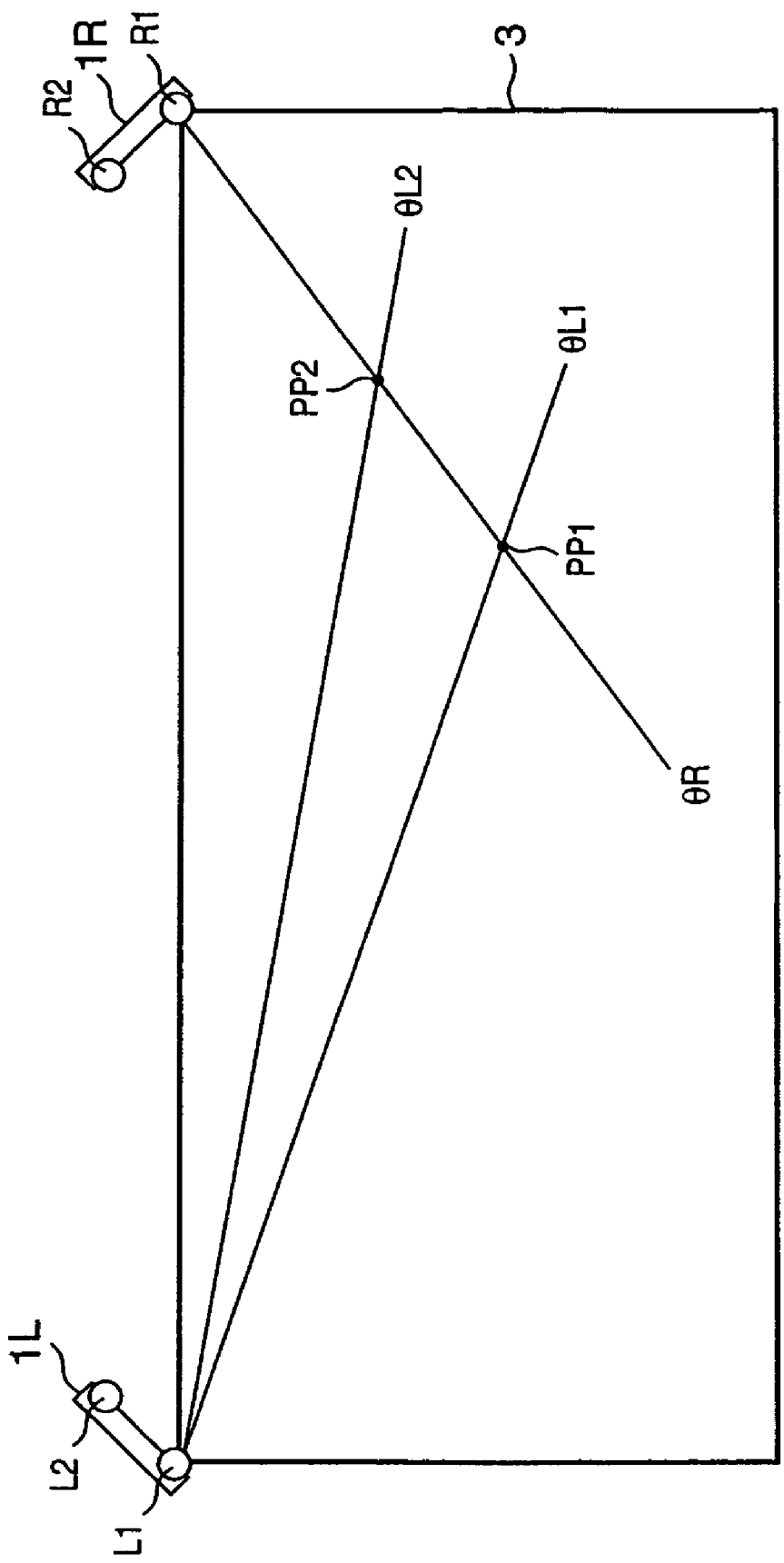
FIG. 60 is a view for explaining the coordinate calculation method according to the fourth embodiment of the present invention.

Coordinate candidate points relatively close to (PP1,PP2) in FIG. 60 are selected from (P11,P22) and (P12,P21) of P11, P12, P21, and P22 in FIG. 59 and decided as a set of coordinate values of two input points.

In the example shown in FIGS. 59 and 60, P12 and P21 are decided as two input points based on actual input.

Coordinate Calculation Method [4a] (Step S1113: Detection State [4a])

In the detection state [4a], two LR combinations [2-1] are present.

Figure 61:
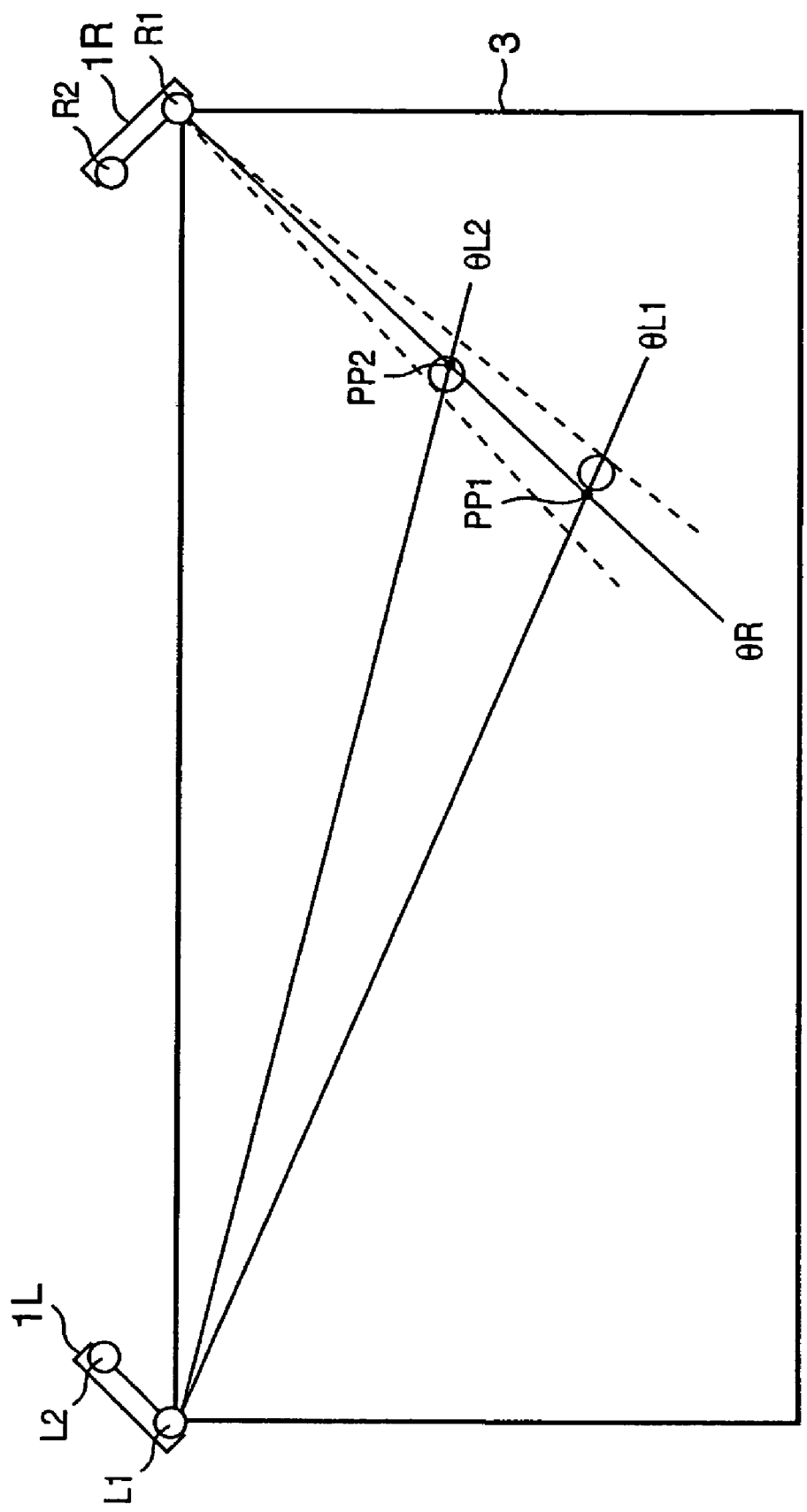
FIG. 61 is a view for explaining the coordinate calculation method according to the fourth embodiment of the present invention.

A detailed example will be described with reference to FIGS. 61 and 62, in which (L1,R1) and (L1,R2) are [2-1].

Figure 62:
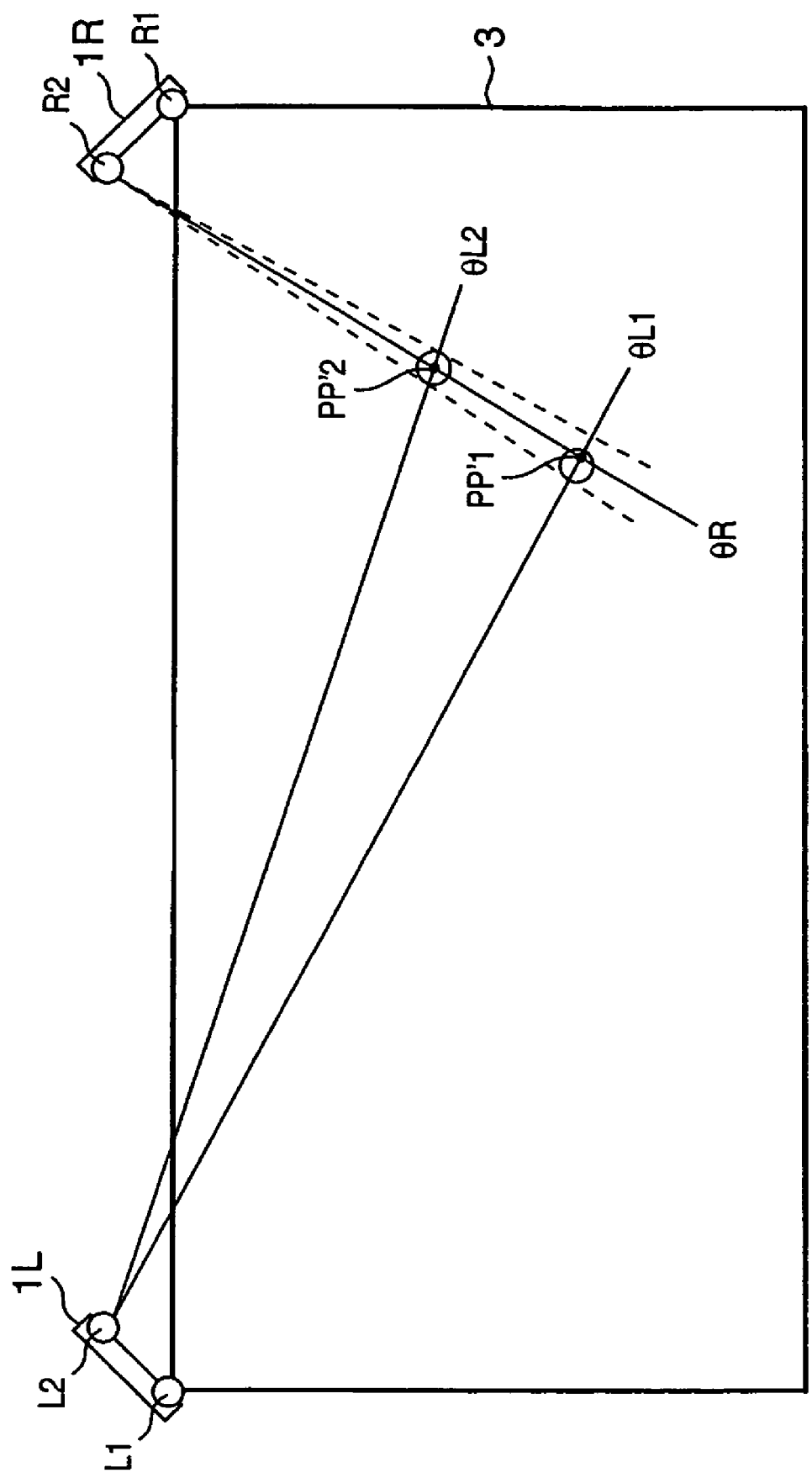
FIG. 62 is a view for explaining the coordinate calculation method according to the fourth embodiment of the present invention.
Figure 63:
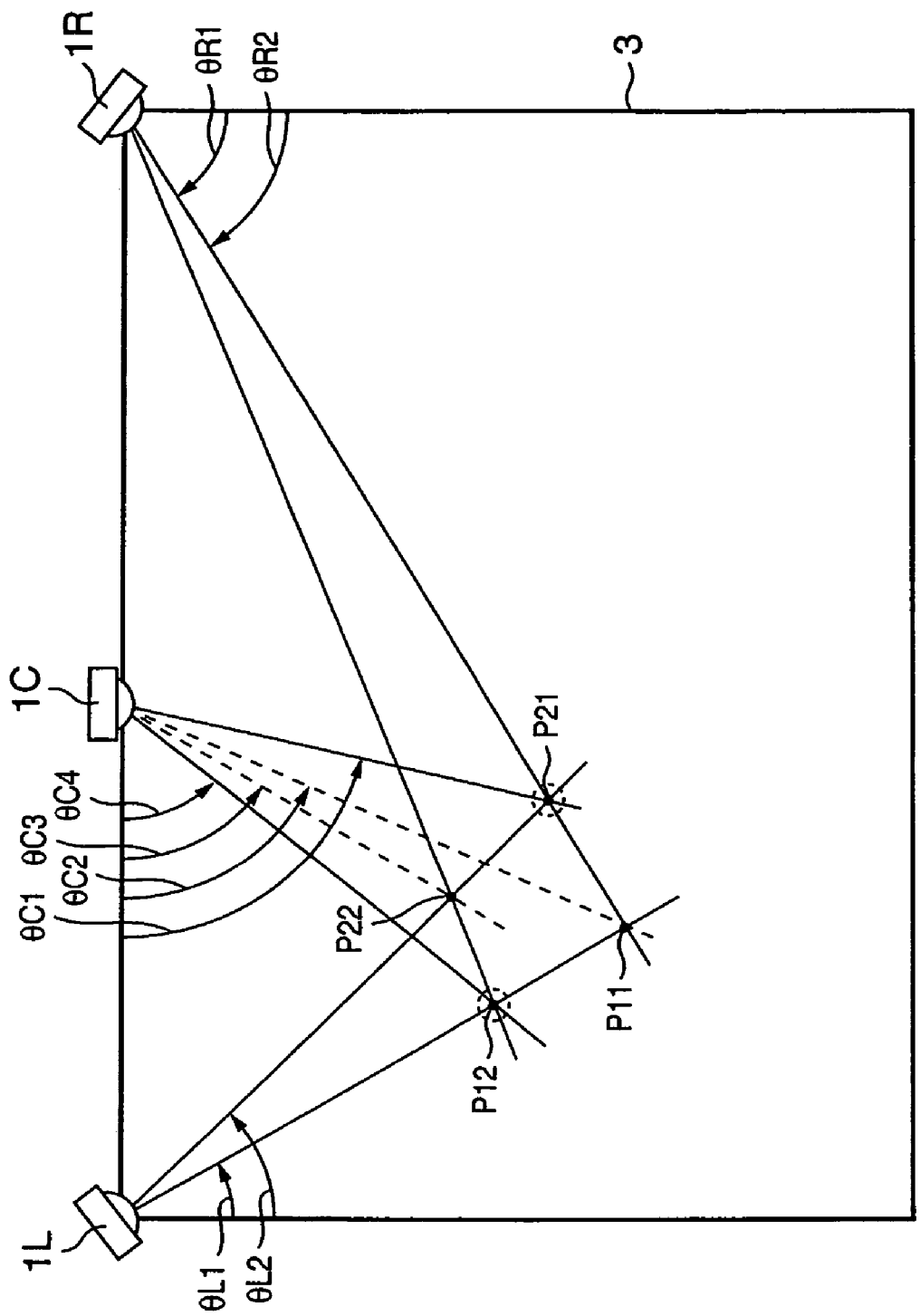
FIG. 63 is a view showing the arrangement of a coordinate input apparatus according to the fifth embodiment of the present invention.

Referring to FIG. 63, almost the central portion of the two ends of one overlapping shadow detected by the optical unit R1 is approximately handled as one angle $\theta R$, and PP1 and PP2 are decided on the basis of <Coordinate Calculation Processing (2)>. Alternatively, referring to FIG. 62, almost the central portion of the two ends of one overlapping shadow detected by the optical unit R2 is approximately handled as one angle $\theta R$, and PP'1 and PP'2 are decided on the basis of <Coordinate Calculation Processing (3)>.

Normally, when a combination with a high shadow overlapping ratio is employed, as shown in FIG. 62, a satisfactory calculation result can be obtained in such approximate calculation.

The coordinate calculation result of one or two input points calculated by one of the above-described coordinate calculation methods [1a] to [4a] is output to an external terminal through the serial interface 7 and displayed on an output device such as an image display device as the movement or locus of a cursor.

Details of the contents of the coordinate calculation processing (1) to (3) have already been described in the second embodiment and will be omitted here.

As described above, according to the fourth embodiment, when the retroreflecting members arranged around the coordinate input effective region are designed to satisfy the above-described feature conditions and equations (1) and (2), shadows detected by the sensor units in accordance with the same input are prevented from being detected with a level (light shielding rate) difference between the sensor units. The shadows can always be detected at almost the same level (light shielding rate).

Hence, input coordinate detection errors can be prevented in single point input, and detection of wrong coordinates different from input coordinates can be prevented to correctly calculate the number of input coordinates in multiple point input. Since the above-described problems which frequently arise when the pointer enters or leaves the coordinate input effective region upon input are avoided, stable coordinate input can be implemented.

Fifth Embodiment

In the fifth embodiment, an arrangement will be described in which a sensor unit 1C is newly added to the arrangement of the fourth embodiment shown in FIG. 42, as shown in FIG. 63.

FIG. 63 shows multiple point input in points P12 and P21.

Figure 64A:
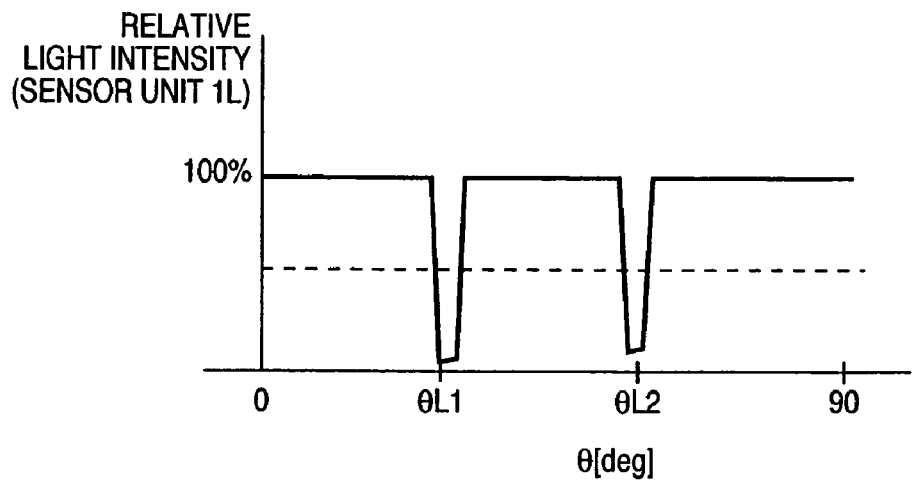
FIGS. 64A to 64C are graphs showing light intensity distributions obtained by the sensor units in the input operation in FIG. 63.
Figure 64B:
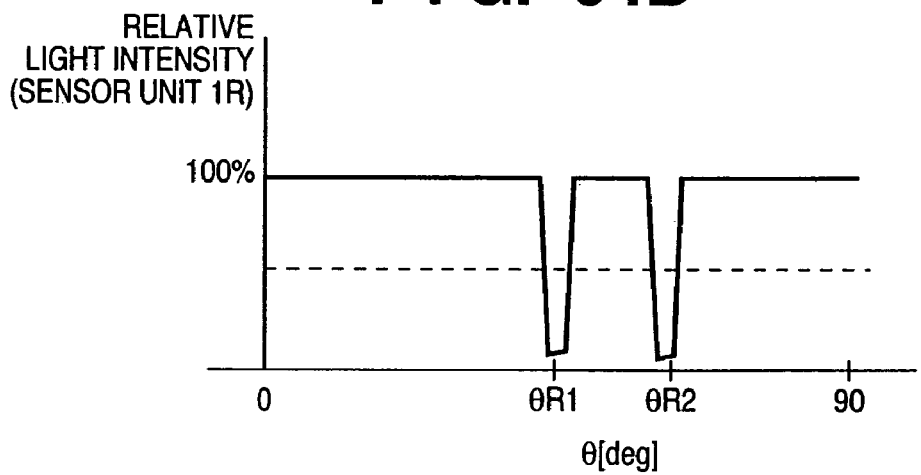
Figure 64C:
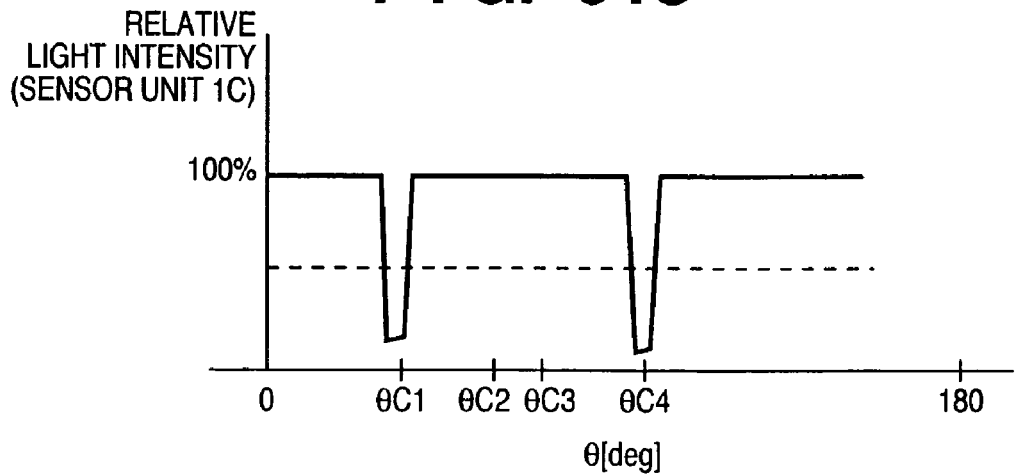

In this case, as shown in FIG. 64A, a sensor unit 1L detects shadows at positions $\theta L1$ and $\theta L2$. As shown in FIG. 64B, a sensor unit 1R detects shadows at positions $\theta R1$ and $\theta R2$. As shown in FIG. 64C, the sensor unit 1C detects shadows at positions $\theta C1$ and $\theta C4$. On the basis of the three sets of angle data, four coordinate candidate points P11, P12, P21, and P22 are calculated. When truth determination is executed for these coordinate candidate points by a certain means, for example, P11 and P22 are determined as real images, and P12 and P21 are determined as virtual images. Hence, the coordinate input points can be decided.

The sensor unit 1C shown in FIG. 63 has almost the same arrangement as the sensor unit 1L or 1R except the structure of the internal optical units (light receiving units and light projecting units). The visual field range of the sensor units 1L and 1R is about 90°. However, the visual field range of the sensor unit 1C is about 180°.

It is most important that the arrangement of the sensor units 1L, 1R, and 1C and the retroreflecting members arranged around a coordinate input effective region 3 satisfy the feature conditions and equations (1) and (2) in the fourth embodiment.

More specifically, even in the fifth embodiment, the upper sides of all effective retroreflecting members located around the coordinate input effective region form one plane (first plane), and the lower sides of the effective retroreflecting members form another plane (second plane). In addition, the upper ends of the effective light shielding detection windows of the sensor units almost match the first plane, and the lower ends almost match the second plane.

In this arrangement, when input is done by a pointer, the depths (light shielding rates) of light shielding shadows observed by the sensor units 1L, 1R, and 1C are observed as almost the same value.

Hence, correct coordinates can always be detected on the basis of the positional relationship between the sensor units, 1L, 1R, and 1C. Especially, even when the pointer enters or leaves the coordinate input effective region or ends input, stable coordinate calculation can be executed without a light shielding shadow recognition error.

In the fifth embodiment, coordinate candidate points are detected by the sensor units 1L and 1R. On the basis of the positional relationship between the coordinate candidate points and shadows detected by the sensor unit 1C, real input points are determined) from the coordinate candidate points (so-called truth determination is performed), and two input coordinates are finally decided.

For example, in FIG. 63, the sensor units 1L and 1R observe the four coordinate candidate points P11, P12, P21, and P22. Of these coordinate candidate points, coordinate candidate points observed by the sensor unit 1C in a predetermined direction are the coordinate candidate points of real input points. These points are finally output as two input coordinate points. Especially in the case shown in FIG. 63, since the sensor unit 1C observes only the shadows at the positions θC1 and θC4, P11 and P22 are the coordinates of the real input points.

Coordinate calculation processing according to the fifth embodiment will be described below with reference to FIG. 65.

Figure 65:
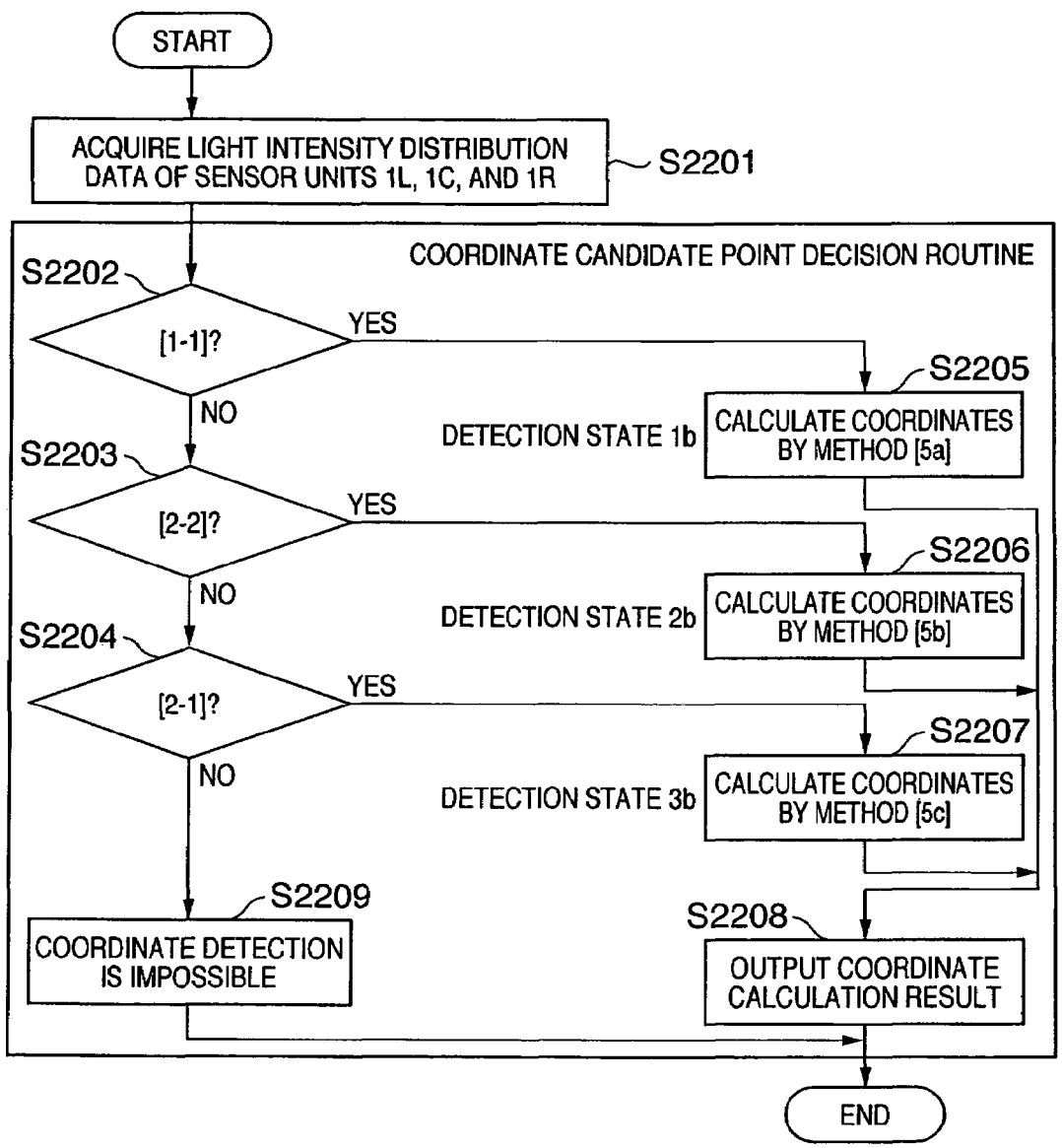
FIG. 65 is a flowchart showing coordinate calculation processing executed by the coordinate input apparatus according to the fifth embodiment of the present invention.

FIG. 65 is a flowchart showing coordinate calculation processing executed by a coordinate input apparatus according to the fifth embodiment of the present invention.

In step S2201, light intensity distribution data of the sensor units 1L, 1R, and 1C are acquired. Next, the number of shadows (light shielding shadows) and their positions (angles) detected by each sensor unit are calculated from the acquired light intensity distribution data.

The detection state of shadow count in each sensor unit is determined on the basis of the number of shadows detected by the sensor unit. On the basis of the determination result, a coordinate candidate point decision routine (steps S2202 to S2208) of deciding coordinate candidate points to be used for coordinate calculation is executed.

Especially in the fifth embodiment, the following three types are considered as the shadow count detection state in each sensor unit. In the fifth embodiment, a shadow count combination of the sensor units 1L and 1R is expressed as [X-Y] (X=1, 2, Y=1, 2).

Detection state [1b]: the number of shadows decided by the sensor units 1L and 1R is [1-1]

Detection state [2b]: the number of shadows decided by the sensor units 1L and 1R is [2-2]

Detection state [3b]: the number of shadows decided by the sensor units 1L and 1R is [2-1]

In the fifth embodiment, the detection state of shadow count in each of the sensor units 1L and 1R is determined (steps S2202 to S2204). Coordinate calculation is executed by one of coordinate calculation methods [5a] to [5c] defined in advance for the determined detection state (steps S2205 to S2207). The coordinate calculation result is output (step S2208). If none of the above detection states is determined, it is determined that coordinate detection is impossible, and the processing is ended (step S2209).

The coordinate calculation methods [5a] to [5c] will be described below in detail.

Coordinate Calculation Method [5a] (Step S2205: Detection State [1b])

In the detection state [1b], single point input is executed. In this case, coordinate calculation is executed by <Coordinate Calculation Processing (1)> described in the fourth embodiment.

Coordinate Calculation Method [5b] (Step S2206: Detection State [2b])

In the detection state [2b], the number of shadows in the sensor units 1L and 1R is [2-2].

In this case, the coordinate values of four obtained coordinate candidate points are calculated by <Coordinate Calculation Processing (1)> described in the fourth embodiment. In addition, angles obtained by observing the coordinate candidate points from the sensor unit 1C are calculated in advance.

Of these angles, angles that almost match the angles of shadows actually observed by the sensor unit 1C are employed as two input coordinates.

Coordinate Calculation Method [5c] (Step S2206: Detection State [3b])

In the detection state [3b], the number of shadows in the sensor units 1L and 1R is [2-1].

In this case, the state is approximated to a state wherein two input coordinate points are present on the angle at almost the central position of the two ends of one overlapping shadow. The shadow is combined with the two remaining shadows, and the coordinates are decided on the basis of <Coordinate Calculation Processing (1)> described in the fourth embodiment. Light intensity distribution data detected by the sensor unit 1C is not used for truth determination but for proof for increasing the accuracy of the detected coordinate value.

As described above, according to the fifth embodiment, in addition to the effects described in the fourth embodiment, truth determination for coordinate calculation can be done more efficiently and accurately by providing the sensor unit 1C.

Sixth Embodiment

Figure 66A:
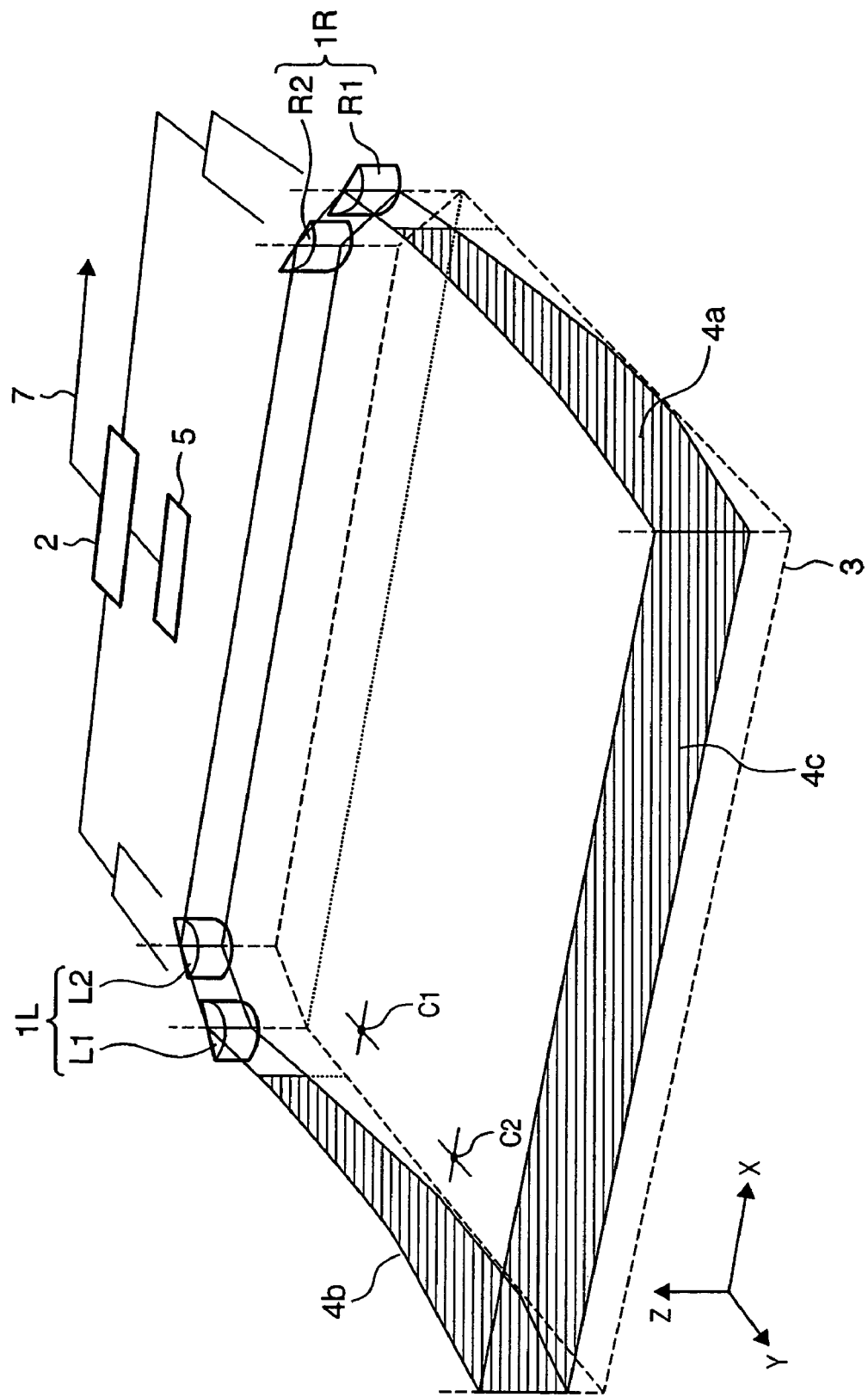
FIG. 66A is a view showing the outer appearance of a coordinate input apparatus according to the sixth embodiment of the present invention.

FIG. 66A is a view showing the outer appearance of a coordinate input apparatus according to the sixth embodiment of the present invention.

Referring to FIG. 66A, optical units L1 and L2 have light projecting units and light receiving units. A sensor unit 1L is formed by the two optical units L1 and L2. Similarly, optical units R1 and R2 have light projecting units and light receiving units. A sensor unit 1R is formed by the two optical units R1 and R2.

The optical units L1 and L2 in the sensor unit 1L are arranged to project and receive light in almost the same direction in almost the same visual field and observe arriving light with a predetermined parallax. Similarly, the optical units R1 and R2 in the sensor unit 1R are arranged to project and receive light in almost the same direction in almost the same visual field and observe arriving light with a predetermined parallax.

The sensor units 1L and 1R are arranged parallel to the X-axis of a coordinate input effective region 3 serving as a coordinate input surface and symmetrically about the Y-axis while being spaced apart by a predetermined distance, as shown in FIG. 66A. The sensor units 1L and 1R are connected to a control/arithmetic unit 2. Each of the sensor units 1L and 1R receives a control signal from the control/arithmetic unit 2 and transmits a detected signal to the control/arithmetic unit 2.

Each of retroreflecting members 4a to 4c has a retroreflecting surface to reflect incident light in the direction of arrival. The retroreflecting members 4a to 4c are arranged on three outer sides of the coordinate input effective region 3, as shown in FIG. 66A. The retroreflecting members 4a to 4c retroreflect, toward the sensor units 1L and 1R, light projected within a range of almost 90° from the sensor units 1L and 1R.

Each of the retroreflecting members 4a to 4c has a three-dimensional structure microscopically. A bead-type retroreflecting tape or a retroreflecting tape which causes retroreflection by periodically arraying corner cubes by, e.g., machining is currently known.

The light retroreflected by the retroreflecting members 4a to 4c is one-dimensionally detected by the sensor unit 1L (optical units L1 and L2) and the sensor unit 1R (optical units R1 and R2), and the light amount distribution is transmitted to the control/arithmetic unit 2.

The coordinate input effective region 3 formed from the display screen of a display device such as a PDP, rear projector, or LCD panel can be used as an interactive input device.

In this arrangement, when input by a pointing means such as a finger or pointer is done in the coordinate input effective region 3, light projected from the light projecting units of the optical units L1 and L2 in the sensor unit 1L and the optical units R1 and R2 in the sensor unit 1R is shielded (light-shielded portion). In this case, the light receiving units of the optical units L1 and L2 in the sensor unit 1L and the optical units R1 and R2 in the sensor unit 1R cannot detect the light of the light-shielded portion (light reflected by the retroreflecting members). On the basis of this detection situation, the direction of light that cannot be detected by each of the optical units L1 and L2 can be detected.

The control/arithmetic unit 2 detects a plurality of light-shielded ranges of the input portion by the pointer on the basis of a change in light amount detected by the sensor unit 1L (optical units L1 and L2) and the sensor unit 1R (optical units R1 and R2). On the basis of the information of the light-shielded ranges, the direction (angle) of each end of the light-shielded ranges with respect to the sensor unit 1L (optical units L1 and L2) and the sensor unit 1R (optical units R1 and R2) is calculated. If the pointer has a signal generation unit, a pen signal receiving unit 5 receives a pen signal from the pointer.

On the basis of the number of detected light-shielded ranges, data obtained from the light-shielded ranges and to be used for coordinate calculation is determined. The light shielding position of the pointer on the coordinate input effective region 3 is geometrically calculated on the basis of, e.g., the calculated direction (angle) and the distance information between the sensor unit 1L (optical units L1 and L2) and the sensor unit 1R (optical units R1 and R2). The coordinate value is output, through an interface 7 (e.g., USB or IEEE 1394), to an external terminal such as a host computer connected to the display device.

In this way, the external terminal can be operated by the pointer by, e.g., drawing a line on the screen or manipulating an icon displayed on the display device.

In the following description, the direction perpendicular to the coordinate input effective region 3 is defined as a height direction (Z direction). A near side to the coordinate input effective region 3 is expressed as a "lower" side, and a far side is expressed as an "upper" side. In FIG. 66A, the sensor unit 1L (optical units L1 and L2) and sensor unit 1R (optical units R1 and R2) are expressed as ranges where light shielding is effectively detected, i.e., the actual existences of first light shielding detection windows.

That is, the thickness (Z direction) of the semicylindrical shape of each of the sensor unit 1L (optical units L1 and L2) and sensor unit 1R (optical units R1 and R2) corresponds to the size of the effective light shielding detection window defined in the height direction.

Especially, the first light shielding detection window in the height direction is not defined as the light projecting window or light receiving window of the sensor unit. Light shielding is actually executed by inserting a pointer from the upper side very near the sensor unit. At this time, the height at which detection of light shielding actually starts is defined as the upper end of the first light shielding detection window. The height at which the light shielding rate is almost 100% is defined as the lower end of the first light shielding detection window. A window defined by the upper and lower ends is defined as the first light shielding detection window.

The light shielding detection region is defined as a part of the region of the optical path of light which is projected from the sensor unit, retroreflected, and received by the sensor unit. In the light shielding detection region, when the optical path is even partially cut off by a pointer from the upper side, the intensity of received light decreases, and the decrease in light intensity can be detected. Hence, the light shielding detection region is defined as a height range at a given coordinate position or as a three-dimensional region with respect to the coordinate input effective region having a predetermined range. In a certain direction viewed from the sensor unit, the light shielding detection region is defined as a two-dimensional region that forms the section of the three-dimensional region.

With this arrangement, when light shielding by a pointer occurs, the sensor units 1L and 1R can always detect a shadow at almost the same light shielding ratio. The vertically striped portions in FIG. 66B indicate sections which are added to facilitate understanding of the three-dimensional shape of the three-dimensional light shielding detection region. These sections are not specially significant in the present invention.

Figure 66B:
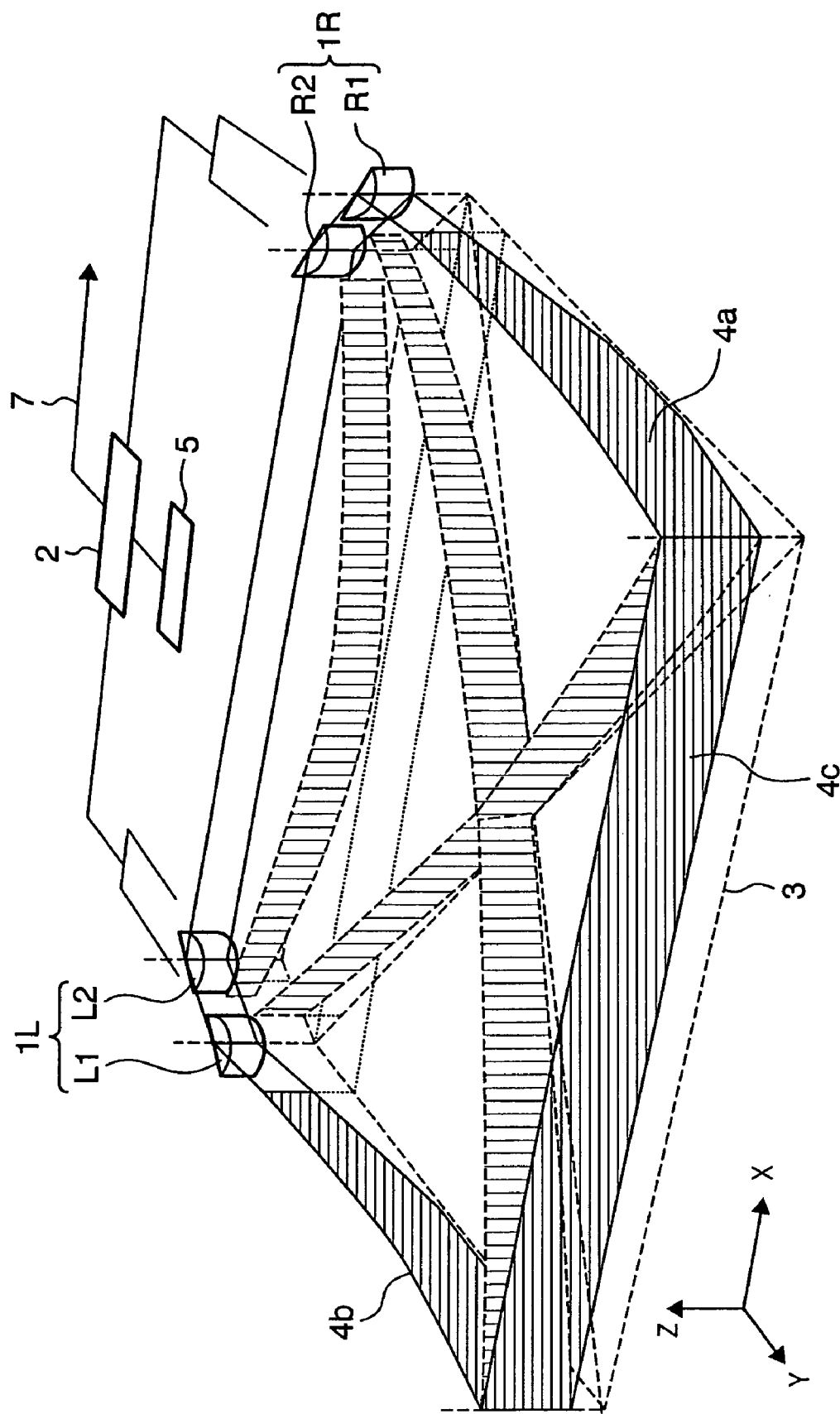
FIG. 66B is a view for explaining the shape of a light shielding detection region in the coordinate input apparatus according to the sixth embodiment of the present invention.

In FIGS. 66A and 66B, a multiple-lens (twin-lens) structure in which two optical units are incorporated in one sensor unit is employed. However, as shown in FIGS. 67A and 67B, a single-lens structure in which one optical unit is incorporated in one sensor unit may be employed.

For the descriptive convenience, the single-lens structure shown in FIGS. 67A and 67B will be exemplified in FIGS. 68 to 79. However, the present invention is not limited to this. For example, the present invention can also be applied to the multiple-lens (twin-lens) structure shown in FIGS. 66A and 66B or a multiple-lens structure with three or more optical units being incorporated in one sensor unit.

In the multiple-lens structure, the following explanation is applied to each optical unit included in the sensor units. That is, in the single-lens structure, a sensor unit and an optical unit incorporated in it can be described while regarding them to be identical. Note that, in the multiple-lens structure, the explanation in FIGS. 68 to 79 is applied to each of the plurality of optical units included in a sensor unit.

<Description of Problems>

Problems in the present invention will be described again in detail with reference to the accompanying drawings.

Figure 68:
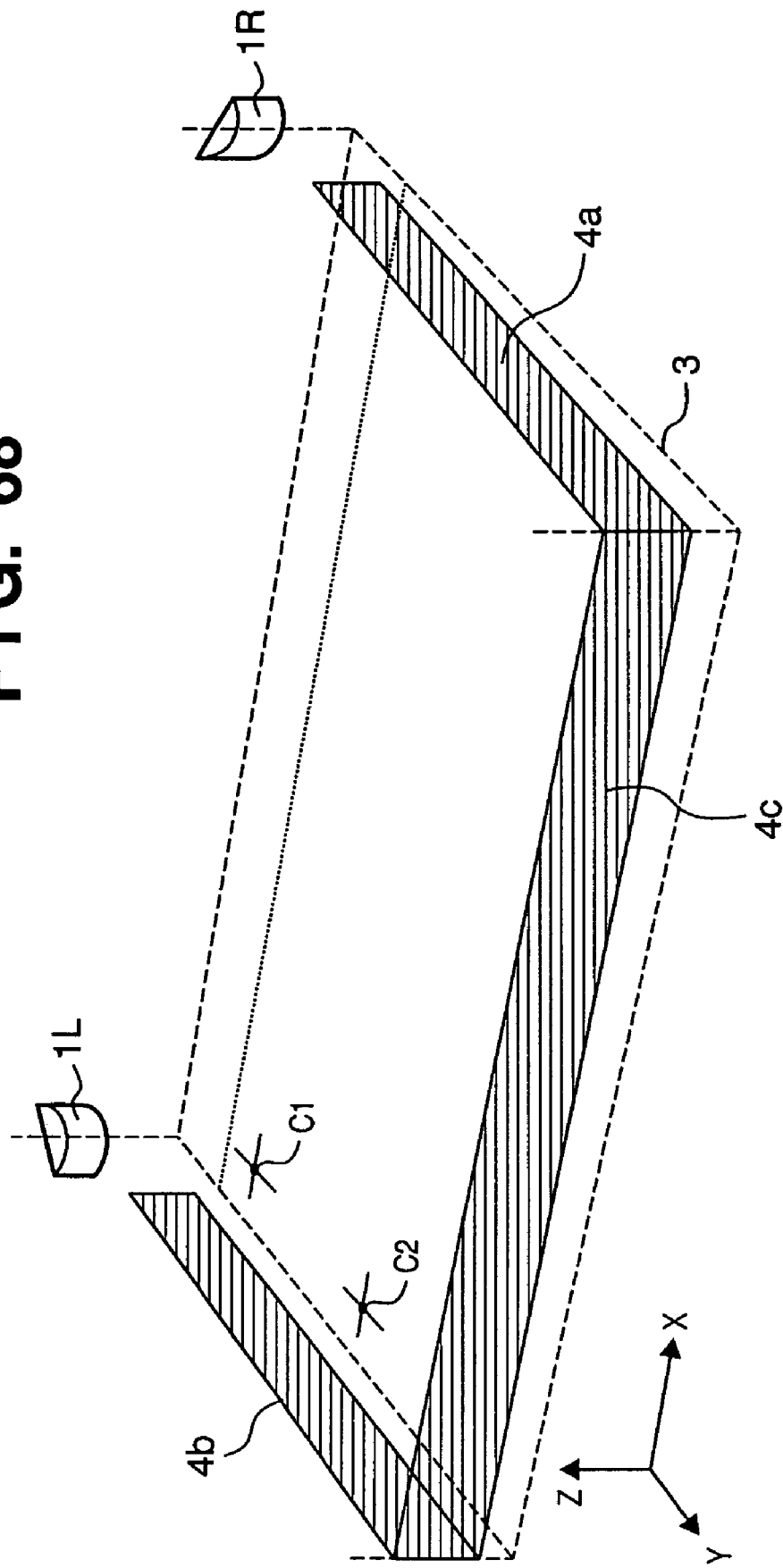
FIG. 68 is a view for explaining problems in the present invention.

FIG. 68 is a view for explaining problems in the present invention.

Conventionally, the sensor units 1L and 1R and the retroreflecting members 4 (4a to 4c) are designed to be close to the coordinate input surface as much as possible. Japanese Patent Laid-Open No. 2000-105671 or the like has mentioned that the light projecting position and light receiving position in a sensor unit are set at the same position and height as much as possible and made close to the coordinate input surface as much as possible by using an optical member such as a reflecting mirror. A coordinate input apparatus which assumes that projected light/received light be made parallel (collimated) as much as possible has also been mentioned.

Assume that projected light/received light is completely parallel to the thickness direction, and the retroreflecting members are set to a shape and size to include, in the thickness direction, the light projection directional range (visual field range) and light reception directional range (visual field range). In this case, the three-dimensional light shielding detection region is determined by not the shape of the retroreflecting members but only the optical path of light projecting or light reception.

The thickness direction indicates the direction (Z direction) perpendicular to the coordinate input surface (coordinate input effective region 3).

Actually, however, there is a limitation on mounting or a limitation on the cost and accuracy because of, e.g., the relationship to the display screen to display echo back or the overall structure of the apparatus. In many cases, projected light/received light cannot sufficiently be collimated in the thickness direction.

For this reason, practically, the apparatus is often designed such that the light projection directional range and light reception directional range of the optical unit become wider in the thickness direction than the width (width in the thickness direction) of the retroreflecting members. That is, the light projection/light reception directional range in the thickness direction includes the retroreflecting members. Hence, the three-dimensional light shielding detection region is determined by the shape of the retroreflecting members.

Especially, in the present invention, the apparatus is designed such that the light projection/light reception directional range in the thickness direction includes not only the retroreflecting members but also the large part of the coordinate input surface and, more particularly, the most part except the vicinity of the sensor units.

In some arrangements, the light projection directional range and light reception directional range include the retroreflecting members but not the coordinate input surface, or the coordinate input surface does not reflect light.

To the contrary, in the present invention, the light projection directional range and light reception directional range include not only the retroreflecting members but also the most part of the coordinate input surface except the vicinity of the sensor units.

Either case can be implemented as a practical arrangement. However, the arrangement without limitation on the directional range in the thickness direction can be handled more easily in many perspectives such as the accuracy of the sensor unit itself, attachment accuracy, rigidity of the entire structure, manufacturing cost, and the degree of freedom in design.

In this case, however, the three-dimensional light shielding detections region viewed from the sensor units 1L and 1R have a complex shape. The three-dimensional light shielding detection regions of the sensor units 1L and 1R are not always a common region under present circumstances.

The present invention proposes methods to solve problems in such an arrangement.

The problems will be described below with reference to FIG. 68.

Referring to FIG. 68, the sensor units 1L and 1R are located at higher positions than the retroreflecting members 4a to 4c with respect to the coordinate input effective region 3 serving as a coordinate input surface.

In fact, such an arrangement must often be used when a coordinate input apparatus of light shielding scheme of this type is incorporated in or overlaid on a display device.

The sensor units 1L and 1R have a predetermined size and cannot be therefore installed in the black frame (the outer portion that is flush with the display surface and is not actually displayed) of the display screen. For this reason, the sensor units 1L and 1R are placed on the outer frame (the portion projected from the display surface, i.e., a so-called frame) of the display device.

For the coordinate input apparatus, there is a demand to make the light shielding detection region close to the coordinate input surface as much as possible to implement comfortable writing without sense of discomfort. In addition, from the viewpoint of easy mounting, the long retroreflecting members are incorporated in the black frame of the display screen, i.e., arranged in the vicinity of the display surface, as shown in FIG. 68.

The three-dimensional light shielding detection region of each of the sensor units 1L and 1R will be examined.

Figure 69:
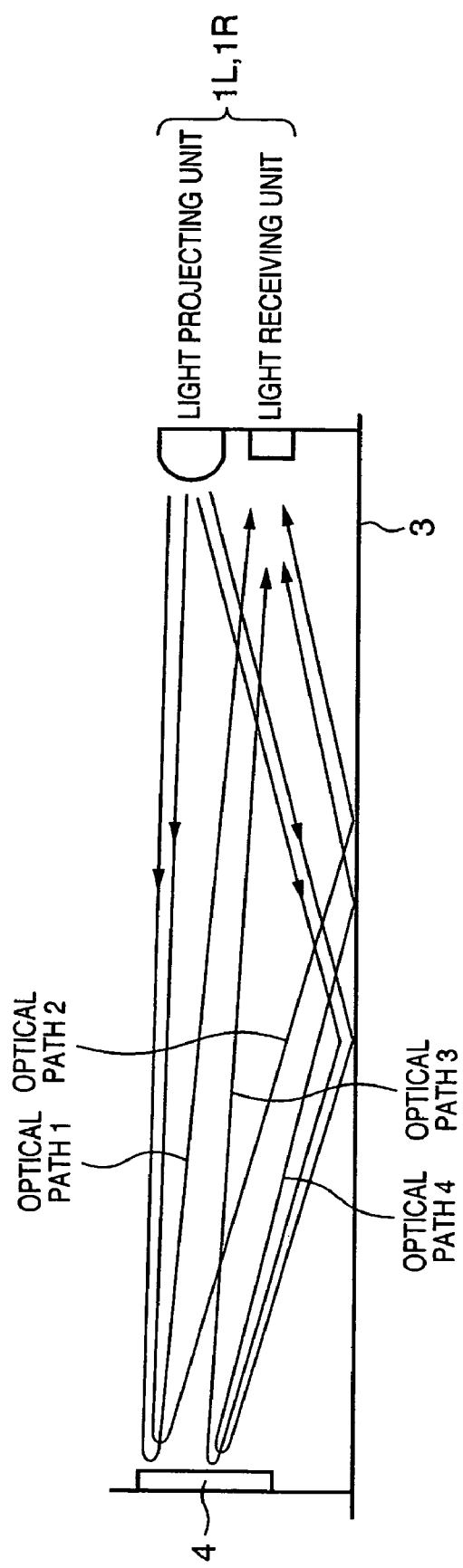
FIG. 69 is a view for explaining the concept of the light shielding detection region according to the present invention.

As shown in FIG. 69, some components of light projected from the light projecting unit of the sensor unit 1L (1R) directly reach the retroreflecting member 4. Some components of the light retroreflected by the retroreflecting member 4 directly reach the light receiving unit while the remaining components are reflected by the coordinate input surface of the coordinate input effective region 3 and then reach the light receiving unit.

On the other hand, the remaining components of the light projected from the light projecting unit are reflected by the coordinate input surface of the coordinate input effective region 3 and then reach the retroreflecting member 4. Some components of the light retroreflected by the retroreflecting member 4 directly reach the light receiving unit while the remaining components are reflected by the coordinate input surface of the coordinate input effective region 3 and then reach the light receiving unit.

That is, in this arrangement, light to be shielded by a pointer can be considered divisionally in four optical paths (optical paths 1 to 4).

Retroreflection originally indicates reflecting projected light directly in the projection direction. Actually, the reflection direction has a slight spread in the projection direction. For example, even a member with considerably high performance has a spread of about 1° to 2° in half width.

Hence, the optical paths 1 to 4 are formed in many cases although it depends on the size of the sensor unit and the size of the coordinate input effective region 3. In addition, the observation angle in the optical paths 2 and 3 (the relative angle between projected light and reflected light) cannot be neglected with respect to the above-described half width. If an attenuation coefficient is applied to the light intensity correspondingly, the optical paths 1 to 4 are formed.

Figure 70A:
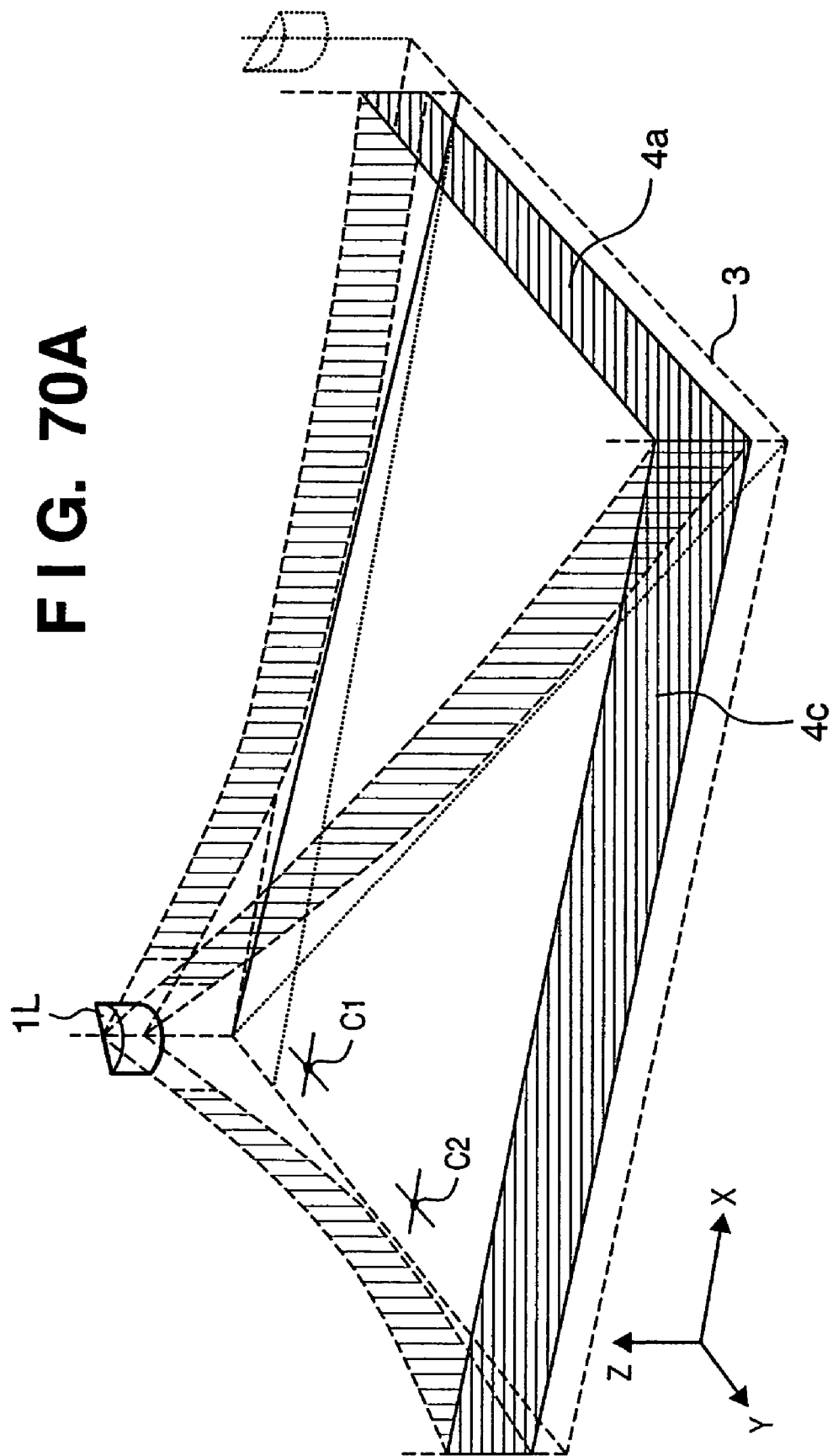
FIG. 70A is a view for explaining the three-dimensional light shielding detection region of each sensor unit according to the present invention.

In the actual light shielding detection region of the sensor unit 1L, light projected from the sensor unit 1L returns from the opposite retroreflecting members 4 to the light receiving unit via the optical paths 1 to 4. For this reason, as shown in FIG. 70A, the space between the detection window of the sensor unit and the opposing retroreflecting members has a shape sandwiched between two planes projecting downward. At the projecting portion, the three-dimensional light shielding detection region almost contacts the coordinate input surface.

Figure 70B:
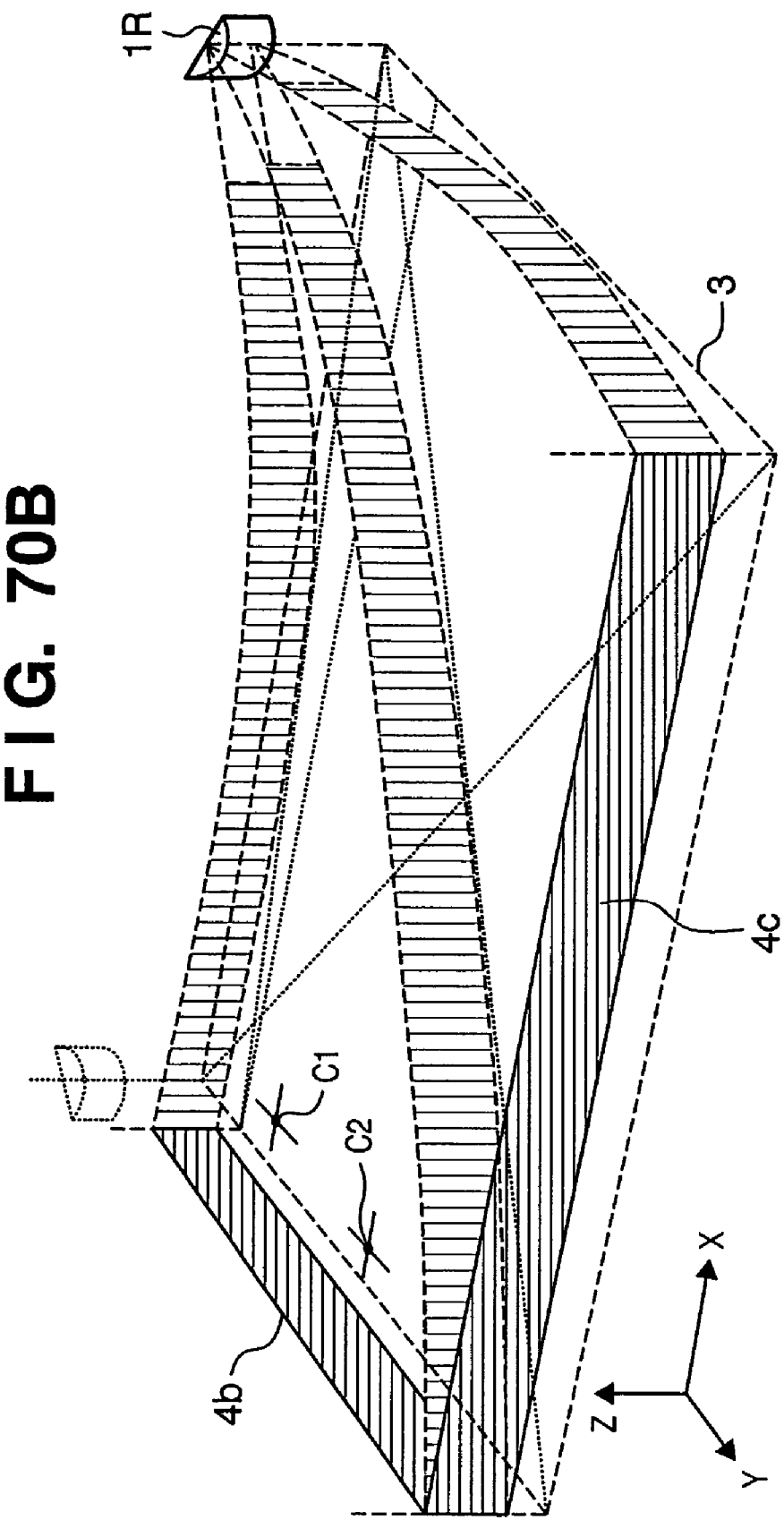
FIG. 70B is a view for explaining the three-dimensional light shielding detection region of each sensor unit according to the present invention.

For the sensor unit 1R as well, a three-dimensional light shielding detection region shown in FIG. 70B is formed.

As is apparent from FIGS. 70A and 70B, the three-dimensional light shielding detection region of the sensor unit 1L and that of the sensor unit 1R are different three-dimensionally. That is, the sensor units 1L and 1R do not form almost the same three-dimensional light shielding detection region.

Consider a pointer inserted in a point C1 or C2 in FIG. 68.

As shown in FIG. 70A, at the point C1, the three-dimensional light shielding detection region of the sensor unit 1L is close to the sensor unit 1L and is therefore located at a relatively high position (a position far from the coordinate input surface).

On the other hand, as shown in FIG. 70B, at the point C1, the three-dimensional light shielding detection region of the sensor unit 1R is located at a level close to the height of the retroreflecting member 4b in the vicinity, i.e., at a relatively low position (a position close to the coordinate input surface).

Figure 71A:
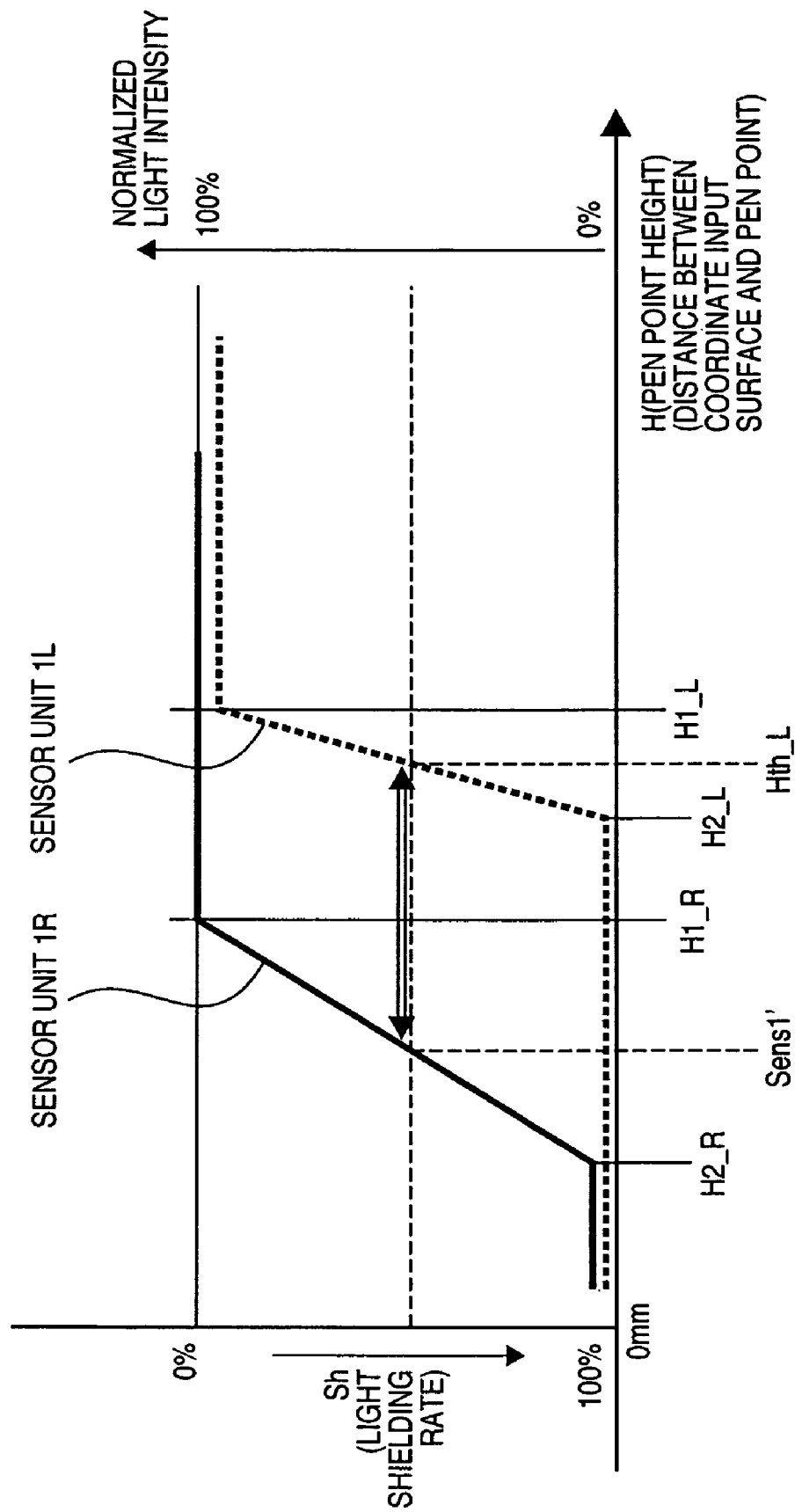
FIG. 71A is a graph for explaining a "pen-point-height vs. light shielding rate" characteristic according to the present invention.
Figure 71B:
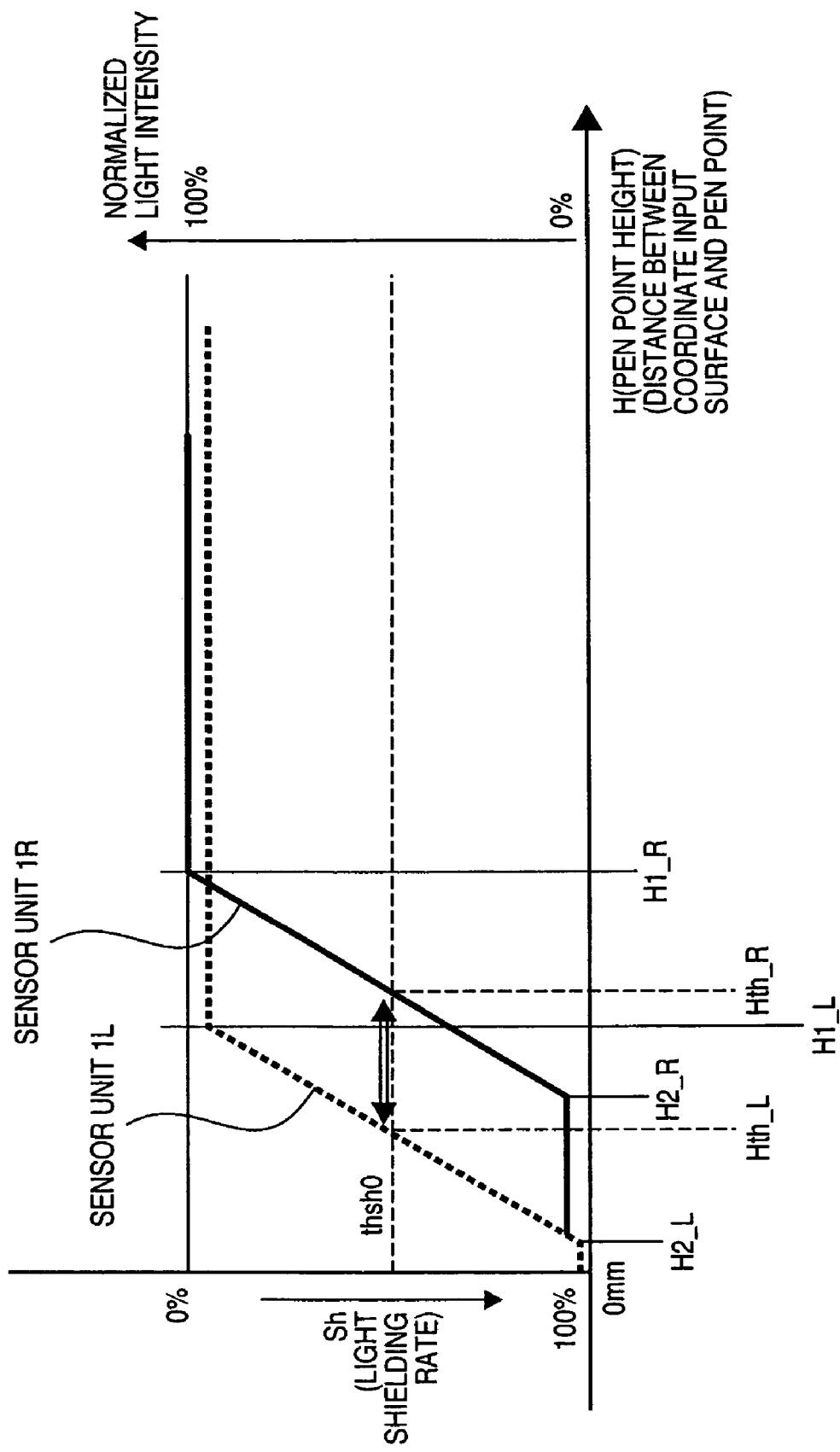
FIG. 71B is a graph for explaining a "pen-point-height vs. light shielding rate" characteristic according to the present invention.

A "pen-point-height vs. light shielding rate" characteristic or "pointer-height vs. light shielding rate" characteristic as shown in FIGS. 71A and 71B will be considered. Referring to FIGS. 71A and 71B, the abscissa represents a pen point height H (i.e., the distance between the effective point of the pointer and the coordinate input surface). The ordinate represents the light shielding rate in the sensor unit. For example, making the pointer close to the coordinate input surface corresponds to the movement from the right to the left in FIGS. 71A and 71B.

When the pointer is not inserted yet, the light shielding rate is 0% (normalized light intensity: 100%). When the pointer approaches a predetermined height position with respect to the coordinate input surface, the light shielding rate starts rising (the normalized light intensity starts decreasing). After that, the light shielding rate reaches 100% at a given point and then takes a constant value.

When the pointer is inserted at the position of the point C1, the broken line in FIG. 71A indicates a locus representing the change in the light shielding rate for the sensor unit 1L, and the solid line represents the change In the light shielding rate for the sensor unit 1R.

Near the point C1, the three-dimensional light shielding detection region of the sensor unit 1L is located at a high position. Hence, the portion where the locus indicated by the broken line in FIG. 71A largely changes exists on the right side.

On the other hand, the three-dimensional light shielding detection region of the sensor unit 1R almost matches the height of the retroreflecting member 4b. Hence, the locus indicated by the solid line in FIG. 71A exists at almost the corresponding position.

The large change portions can be regarded as portions where the pointer passes through the three-dimensional light shielding detection regions of the sensor units 1L and 1R.

In the arrangement shown in FIGS. 68, 70A, and 70B, near the point C1, the three-dimensional light shielding detection region of the sensor unit 1L is thinner in the height direction than the three-dimensional light shielding detection region of the sensor unit 1R. Hence, the portion where the locus (curve) of the light shielding rate changes in FIG. 71A is narrower and steeper for the sensor unit 1L than for the sensor unit 1R.

As described above, in the conventional arrangement, the "pen-point-height vs. light shielding rate" characteristic detected changes between the left and right sensor units 1L and 1R.

In light shielding detection with this characteristic, the following problem arises.

For example, the presence of a shadow is determined when the pointer is inserted to the coordinate input surface from the upper side, the height H reaches a range represented by Hth_R≦H≦Hth_L shown in FIG. 71A, and the intensities of shadows detected by the sensor units 1L and 1R, i.e., the light shielding rates exceed a predetermined threshold value thsh0.

In this arrangement, the sensor unit 1L detects a shadow for the first time when H=Hth_L. The sensor unit 1R detects a shadow for the first time when H=Hth_R.

Hence, in the range represented by Hth_R≦H≦Hth_L, the shadow of the pointer is observed by the sensor unit 1L but not by the sensor unit 1R.

FIG. 71B shows the case of the point C2. Near the point C2, the three-dimensional light shielding detection region of the sensor unit 1L approaches the coordinate input surface because of the influence of reflection of the coordinate input surface. On the other hand, the three-dimensional light shielding detection region of the sensor unit 1R almost matches the height of the retroreflecting member 4b.

Hence, as shown in FIG. 71B, when the pointer is inserted at the position of the point C2, the broken line in FIG. 71A indicates a locus representing the change in the light shielding rate for the sensor unit 1L, and the solid line represents the change in the light shielding rate for the sensor unit 1R.

Near the point C2, the three-dimensional light shielding detection region of the sensor unit 1L approaches the coordinate input surface because of the influence of reflection of the coordinate input surface. That is, since the three-dimensional light shielding detection region is located at a low position, the portion where the locus indicated by the broken line in FIG. 71B largely changes exists on the left side.

On the other hand, the three-dimensional light shielding detection region of the sensor unit 1R almost matches the height of the retroreflecting member 4b. Hence, the locus indicated by the solid line in FIG. 71B exists at almost the corresponding position.

The large change portions can be regarded as portions where the pointer passes through the three-dimensional light shielding detection regions of the sensor units 1L and 1R.

In light shielding detection with this characteristic, the following problem arises.

In this arrangement, the sensor unit 1L detects a shadow for the first time when H=Hth_L. The sensor unit 1R detects a shadow for the first time when H=Hth_R. Hence, in the range represented by Hth_L≦H≦Hth_R, the shadow of the pointer is observed by the sensor unit 1L but not by the sensor unit 1R.

The above-described problems are particularly serious in simultaneous input (multiple point input operation) by a plurality of pointers.

The problem in the multiple point input mode will be described below. Before the explanation of this problem, coordinate detection in single point input will be described.

FIG. 39 is a view showing the single point input operation in FIG. 35 viewed from the upper side.

When the position of the point C1 in FIG. 39 is input, normally, shadows are formed at positions θL and θR in FIGS. 40 and 41. FIG. 40 shows the shapes of shadows detected by the sensor units 1L and 1R when the pointer height H satisfies H≦H2_R (i.e., when the pointer sufficiently approaches the coordinate input surface). FIG. 41 shows the shapes of shadows detected by the sensor units 1L and 1R when Hth_R≦H≦Hth_L (i.e., when the pointer enters or leaves the coordinate input surface).

At this time, the shadow of the pointer is observed by the sensor unit 1L but not by the sensor unit 1R, as described above.

In single point input, any problem can be avoided by determining that an input is present only when both the two sensor units detect a shadow (no input is present when only one sensor unit detects a shadow).

However, a serious problem is posed in multiple point input. This will be described below.

FIG. 42 is a view showing a multiple point input operation viewed from the upper side.

FIG. 42 shows a case wherein multiple point input is executed at points P12 and P21.

In this case, as shown in FIG. 43, shadows are detected at positions θL1 and θL2 by the sensor unit 1L. In addition, shadows are detected at positions θR1 and θR2 by the sensor unit 1R. On the basis of the two sets of angle data, four coordinate candidate points P11, P12, P21, and P22 are calculated. When truth determination is executed for these coordinate candidate points by a certain means, for example, P11 and P22 are determined as virtual images, and P12 and P21 are determined as real images. Hence, the coordinate input points are decided.

An example of multiple point input when a coordinate input point detection error occurs will be described next. An erroneous detection pattern (1) is as follows. Consider a case wherein multiple point input is executed at the point P12 (corresponding to the point C1 in FIG. 39) and the point P21, as shown in FIG. 44. The pointer height H at each point satisfies Hth_R≦H≦Hth_L shown in FIG. 71B.

At this time, θR2 is not detected by the sensor unit 1R, as shown in FIG. 45.

In this case, although the two points C1 (P12) and P21 are actually input, the sensor unit 1R detects only θR1 but not θR2 (i.e., the shadow of the input P12 is not detected). For this reason, the point P12 is erroneously recognized as an overlapping point observed from the sensor unit 1R, and P11 in FIG. 46 is recognized as a coordinate input point. That is, the actual coordinate input point P12 is erroneously detected as the coordinate input point P11.

An erroneous detection pattern (2) is as follows. Multiple point input is executed at the point P12 (corresponding to the point C1 in FIG. 39) and the point P21 (a point C1' that is almost bilaterally symmetric with respect to the point C1), as shown in FIG. 46. In this case, the pointer height H at the point C1 satisfies Hth_R≦H≦Hth_L shown in FIG. 71B. The pointer height H at the point C1' satisfies Hth_L(C1')≦H(C1')≦Hth_R(C1'), i.e., the reversed relationship of the sensor units 1L and 1R in FIG. 71B.

At this time, θL2 is not observed from the sensor unit 1L, and θR2 is not observed from the sensor unit 1R, as shown in FIG. 47. In this case, although the two points C1 (P12) and C1' (P21) are actually input, the intersection between the angles θL1 and θR1 detected actually, i.e., P11 in FIG. 46 is erroneously recognized as the coordinate input point. That is, it is erroneously detected that single point input is executed.

As described above, when the pointer height H falls within a predetermined range (e.g., at the point C1, Hth_R≦H≦Hth_L), the shadow which should be detected by both the sensor units 1L and 1R changes between their three-dimensional light shielding detection regions. For this reason, the coordinate input point cannot be detected on the basis of a correct combination of coordinate candidate points detected upon multiple point input.

The predetermined range (e.g., at the point C1, Hth_R≦H≦Hth_L) always exists when the pointer enters or leaves the coordinate input effective region. For this reason, a coordinate detection error or coordinate candidate point calculation error occurs.

The above-described problems arise even at the point C2. At the point C2, the relationship between the intensity of the shadow observed from the sensor unit 1L and the intensity of the shadow observed from the sensor unit 1R is reversed.

Figure 72A:
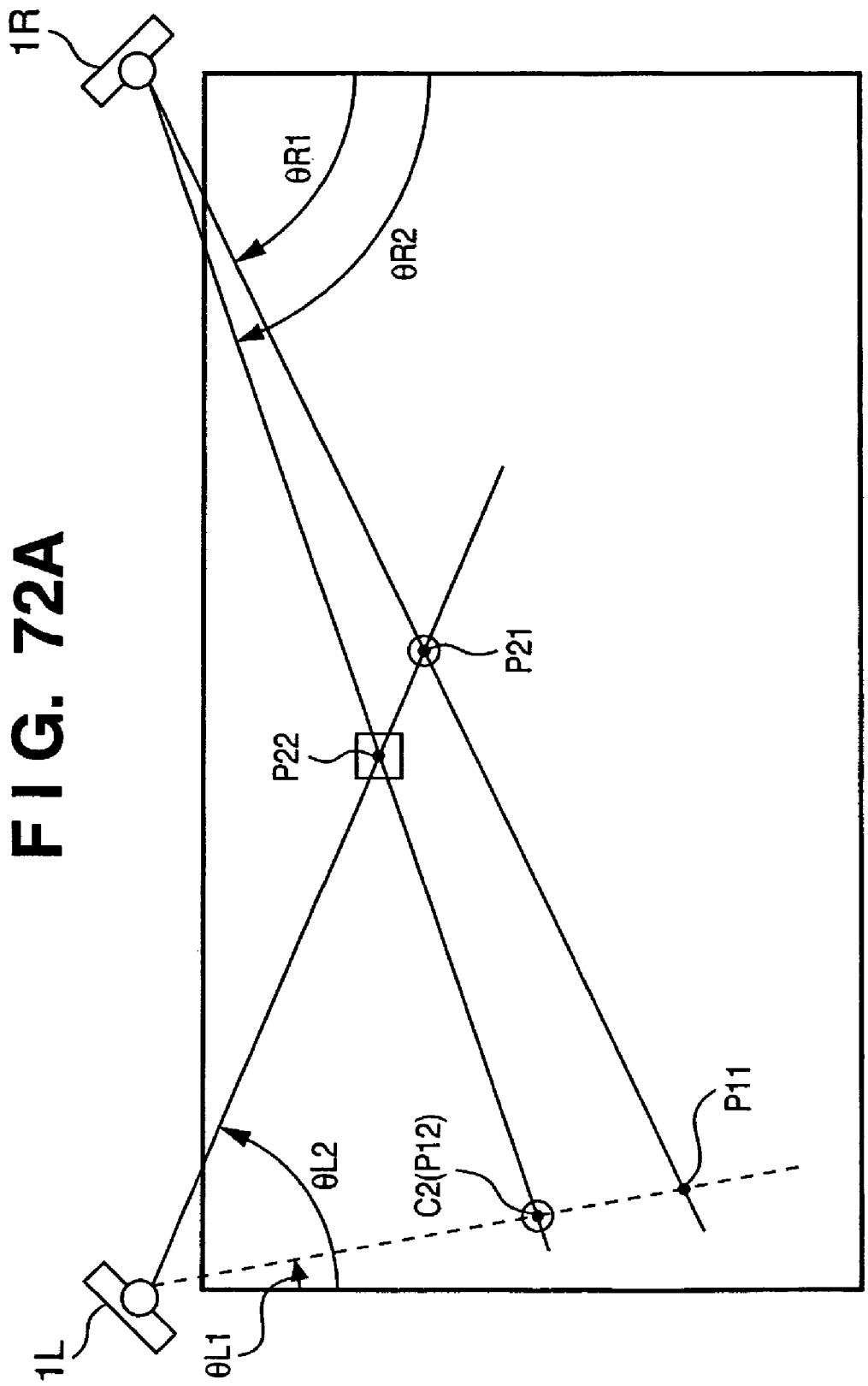
FIG. 72A is a view for explaining an example of a detection error in the present invention.

Hence, the pattern shown in FIG. 72A corresponds to the pattern shown in FIG. 44 at the point C1. In this case, the coordinates of C2 (P12) are erroneously detected as the coordinates of P22 at a moment when the sensor unit 1L cannot detect the shadow in the direction of θL1.

Figure 72B:
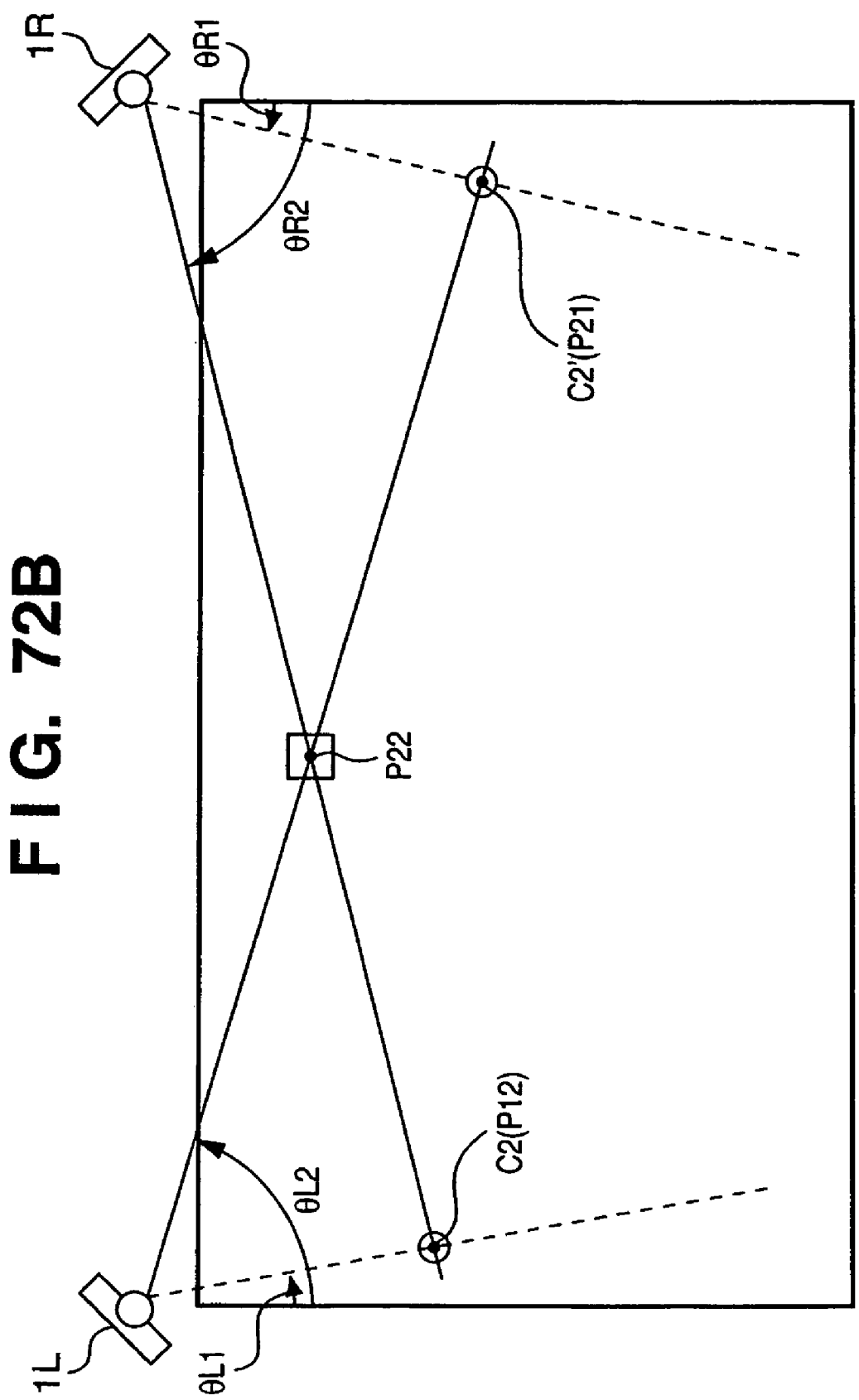
FIG. 72B is a view for explaining an example of a detection error in the present invention.

The pattern shown in FIG. 72B corresponds to the pattern shown in FIG. 46 at the point C1. In this case, the coordinates of P22 are erroneously detected at a moment when the sensor unit 1L cannot detect θL1, and the sensor unit 1R cannot detect θR1, although C2 (P12) and C2' (P21) are actually input.

<Commonality of Three-Dimensional Light Shielding Detection Regions>

The present invention proposes arrangements to solve these problems. In the present invention, especially, a single (common) three-dimensional light shielding detection region is prepared for the left and right sensor units 1L and 1R, thereby solving the problems.

<Definition of Common Three-Dimensional Light Shielding Detection Region>

An arrangement proposed by the present invention considers how to form an identical space as the three-dimensional light shielding detection regions of the sensor units 1L and 1R shown in, e.g., FIGS. 70A and 70B.

In the present invention, the following arrangements (feature conditions) are employed.

In a light shielding coordinate input apparatus including two sensor units, the retroreflecting member facing only one of the sensor units is formed into almost the same shape as the sectional shape of the three-dimensional light shielding detection region corresponding to the other sensor unit along the retroreflecting member facing only one of the sensor units.

More specifically, the section of the three-dimensional light shielding detection region of the sensor unit 1L near the left side and the shape of the retroreflecting member 4b which faces the sensor unit 1R but not the sensor unit 1L are formed into almost the same shape.

Similarly, the section of the three-dimensional light shielding detection region of the sensor unit 1R near the right side and the shape of the retroreflecting member 4a which faces the sensor unit 1L but not the sensor unit 1R are formed into almost the same shape.

To actually do this, as shown in FIG. 67A, for example, the extension of the side of one end of the retroreflecting member 4a almost matches the first light shielding detection window of the sensor unit 1R which does not face the retroreflecting member 4a. The side of the other end almost matches the side of an end of the retroreflecting member 4c which commonly faces the sensor units 1L and 1R. The lower side of the retroreflecting member 4a curves and comes close to (almost contacts or approaches) the coordinate input surface at almost the midpoint. The upper side is straight or curves downward at almost the midpoint.

Similarly, the extension of the side of one end of the retroreflecting member 4b almost matches the first light shielding detection window of the sensor unit 1L which does not face the retroreflecting member 4b. The side of the other end almost matches the side of the other end of the retroreflecting member 4c which commonly faces the sensor units 1L and 1R. The lower side of the retroreflecting member 4b curves and almost contacts or approaches the input surface at almost the midpoint. The upper side is straight or curves downward at almost the midpoint.

When this shape is employed, the peripheral surfaces of the common three-dimensional light shielding detection region match the respective retroreflecting members. The upper and lower planes are recessed downward at almost the center of the coordinate input surface. In addition, the lower plane almost contacts or approaches the coordinate input surface at almost the center of the coordinate input surface.

More specifically, when the retroreflecting members 4a and 4b in FIG. 67A are formed into the illustrated shapes, the three-dimensional light shielding detection region shown in FIG. 67B, i.e., a three-dimensional light shielding detection region common to the sensor units 1L and 1R can be formed.

The vertically striped portions in FIG. 67B indicate sections which are added to facilitate understanding of the three-dimensional shape of the three-dimensional light shielding detection region. These sections are not specially significant in the present invention.

As shown in FIG. 67A, the retroreflecting member 4c is rectangular. The retroreflecting members 4a and 4b have the same shape. The side of one end is connected to the detection position of a sensor unit by a curved shape. The retroreflecting members almost contact the coordinate input surface almost near the central portion.

The upper end of the sensor unit 1L is located on the extension of the upper side of the retroreflectlng member 4b, and the lower end is located on the extension of the lower side. The upper end of the sensor unit 1R is located on the extension of the upper side of the retroreflecting member 4a, and the lower end is located on the extension of the lower side.

<Sectional Shape of Three-Dimensional Light Shielding Detection Region>

A method of deciding the shape of the retroreflecting members 4a and 4b, i.e., the sectional shape of the three-dimensional light shielding detection region will be described next.

As already described, light projected from the light projecting unit of the sensor unit returns to the light receiving unit through four assumed optical paths, i.e., optical paths 1 to 4, as shown in FIG. 69.

The transmission orders of the optical paths are as follows.

Optical path 1: light projection→retroreflection→light reception

Optical path 2: light projection→retroreflection→ reflection by coordinate input surface→light reception Optical path 3: light projection→reflection by coordinate input surface retroreflection→light reception Optical path 4: light projection→reflection by coordinate input surface→retroreflection reflection by coordinate input surface→light reception The relationship between the optical paths and the light shielding detection region will be described next with reference to FIGS. 73A to 73C and 74A to 74C.

Figure 73B:
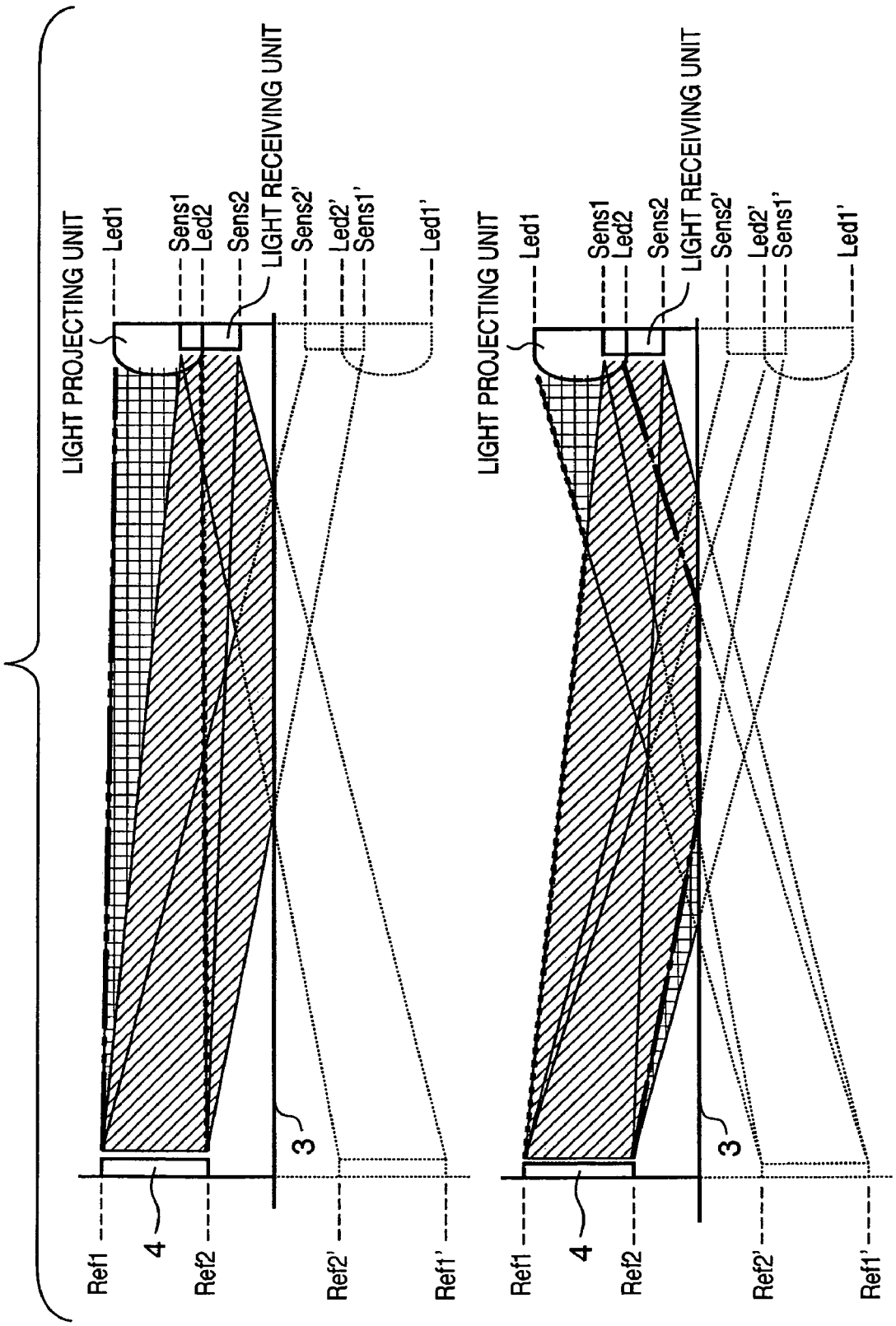
FIG. 73B shows views for explaining the concept of the light shielding detection region according to the sixth embodiment of the present invention.
Figure 73C:
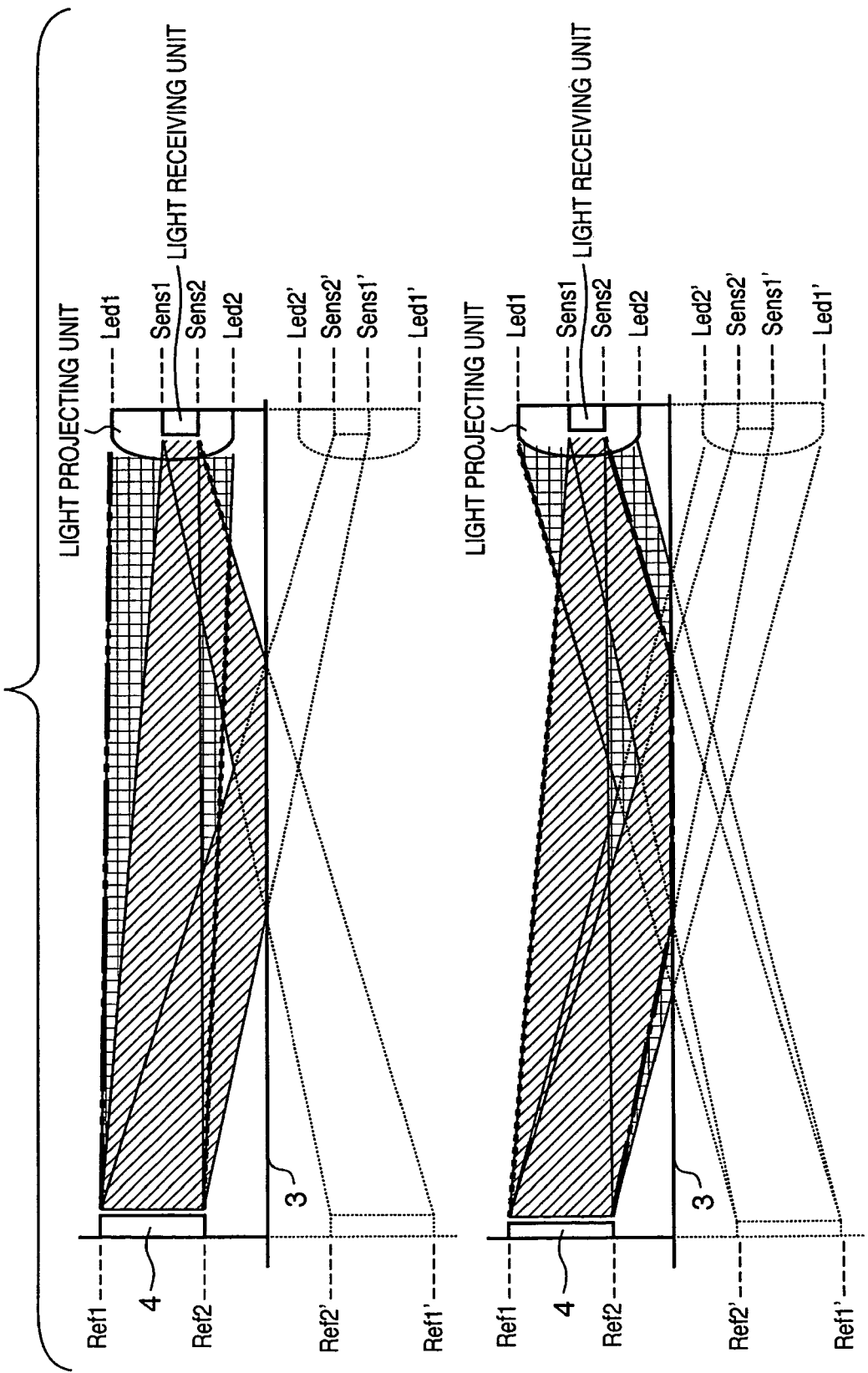
FIG. 73C shows views for explaining the concept of the light shielding detection region according to the sixth embodiment of the present invention.
Figure 74A:
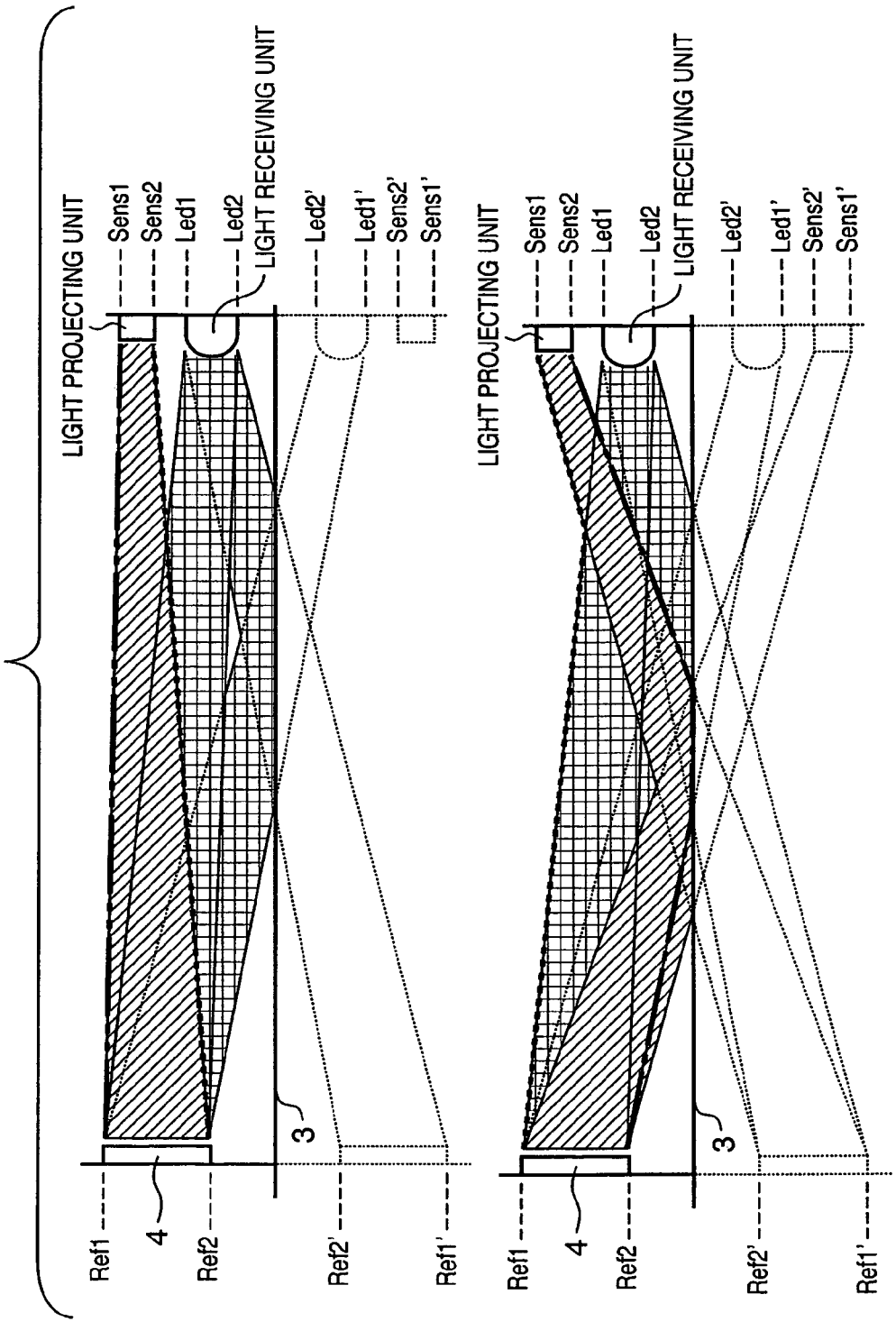
FIG. 74A shows views for explaining the concept of the light shielding detection region according to the sixth embodiment of the present invention.
Figure 74C:
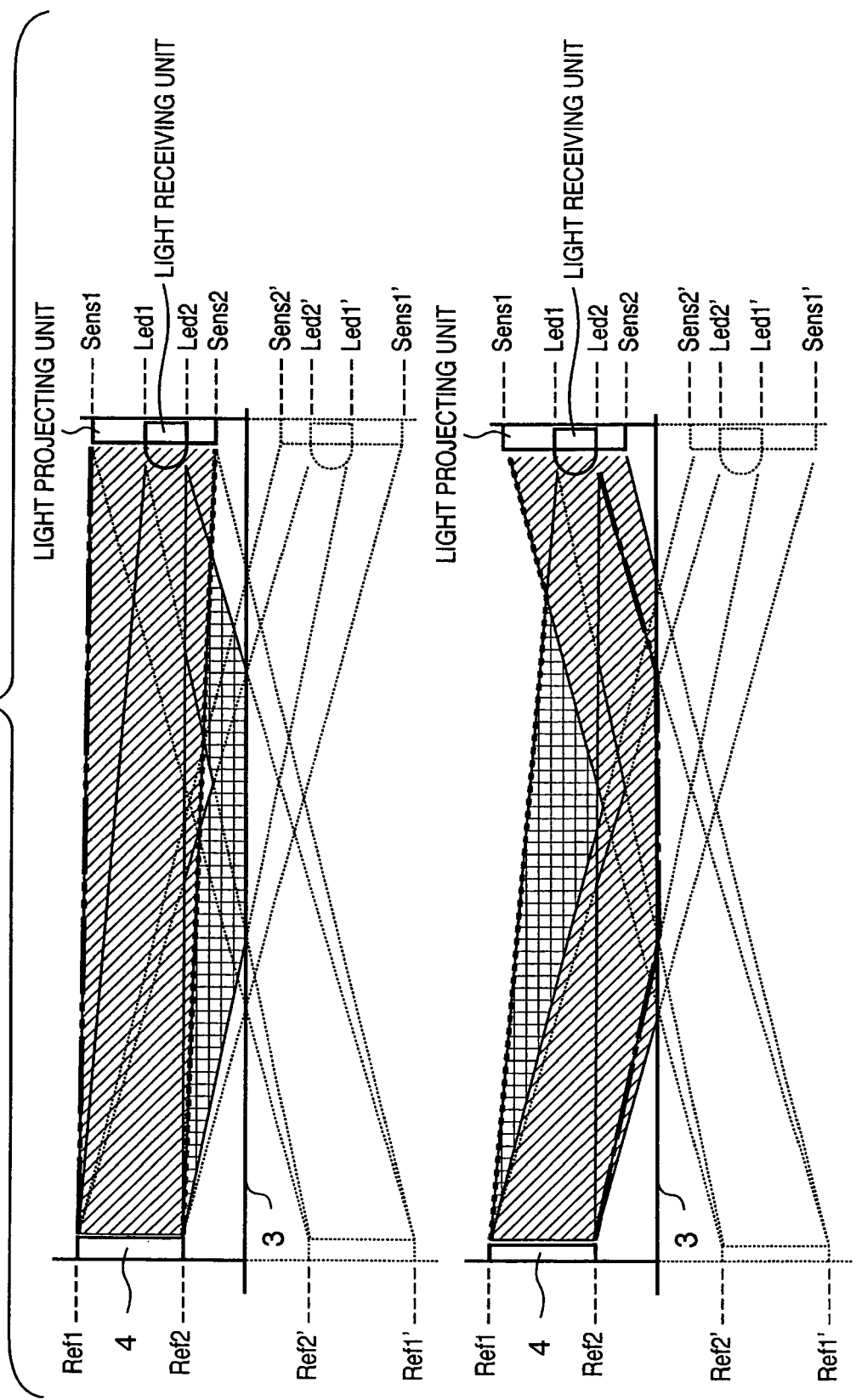
FIG. 74C shows views for explaining the concept of the light shielding detection region according to the sixth embodiment of the present invention.

FIGS. 73A to 73C show the optical paths 1 and 2 on the upper side and the optical paths 3 and 4 on the lower side. FIGS. 74A to 74C show the optical paths 1 and 3 on the upper side and the optical paths 2 and 4 on the lower side.

In all the associated drawings, the effective light passage region on the light projection side (from the light projecting unit to the retroreflecting member) is expressed by a mesh pattern, and the effective light passage region on the light reception side (from the retroreflecting member to the light receiving unit) is expressed by a gray pattern.

As for the positional relationship between the light projecting unit and the light receiving unit in the sensor unit, FIG. 73A shows a case wherein the light projecting unit is located above the light receiving unit without overlapping. FIG. 73B shows a case wherein the light projecting unit is located above the light receiving unit, and the units overlap each other. FIG. 73C shows a case wherein the light projecting unit includes the light receiving unit at a position in the height direction.

FIG. 74A shows a case wherein the light receiving unit is located above the light projecting unit without overlapping. FIG. 74B shows a case wherein the light receiving unit is located above the light projecting unit, and the units overlap each other. FIG. 74C shows a case wherein the light receiving unit includes the light projecting unit at a position in the height direction.

As is apparent from comparison of these drawings. FIGS. 73A to 73C and FIGS. 74A to 74C show the same patterns except that the mesh pattern and gray pattern replace each other.

In each of these cases, the positional relationship between the pointer and the light passage region to detect light shielding is determined. The determination results are generalized and unified, thereby deciding the sectional shapes of the light shielding detection regions on the left and right sides, i.e., the sectional shapes near the left and right sides of the three-dimensional light shielding detection region.

For the description, the following terms are defined.

Light shielding rate 0% boundary line: a boundary line at which light shielding detection starts when the pointer is inserted from the upper side in a predetermined optical path.

Light shielding rate 100% boundary line: a boundary line at which the light shielding rate reaches 100% when the pointer is inserted from the upper side in a predetermined optical path.

Each case will be described below.

FIG. 73A shows the optical paths 1 and 2 on the upper side and the optical paths 3 and 4 on the lower side.

In the upper view of FIG. 73A, the light shielding rate 0% boundary line is a line segment (Ref1,Led1) indicated by the alternate long and two short dashed line. The light shielding rate 100% boundary line is a line segment (Ref2,Led2) indicated by the dotted line.

In the upper view of FIG. 73A, the gray pattern, i.e., the retroreflection light reception portion of the optical paths 1 and 2 exists under the line segment (Ref2,Led2). However, this portion is not directly relevant to decision of the light shielding rate 100% boundary line because the optical path on the light projection side is completely cut off by the line segment (Ref2,Led2).

In the lower view of FIG. 73A, the light shielding rate 0% boundary line is a dotted line portion defined by a line segment (Ref1,Sens1) and a line segment (Ref2',Led1). The light shielding rate 100% boundary line is an alternate long and short dashed line portion defined by a line segment (Ref2, Sens1'), a line segment (Ref1',Led2), and the coordinate input effective region 3.

Under the alternate long and short dashed line, for example, the optical path on the light projection side is present on the retroreflection side, and the optical path on the light reception side is present on the sensor unit side. In the former, the optical path on the light reception side is completely cut off by the alternate long and short dashed line. In the latter, the optical path on the light projection side is completely cut off by the alternate long and short dashed line. Hence, the lower portion is not directly relevant to decision of the light shielding rate 100% boundary line.

Actually, the light shielding rate 100% boundary lines and light shielding rate 0% boundary lines in the optical paths 1 to 4 are decided in consideration of both the upper and lower views.

More specifically, the light shielding rate 0% boundary line of the optical paths 1 to 4 as a whole is decided to be one of the light shielding rate 0% boundary line of the optical paths 1 and 2 (upper view) and that of the optical paths 3 and 4 (lower view), which is located at a higher position. Similarly, the light shielding rate 100% boundary line of the optical paths 1 to 4 as a whole is decided to be one of the light shielding rate 100% boundary line of the optical paths 1 and 2 (upper view) and that of the optical paths 3 and 4 (lower view), which is located at a lower position.

That is, in each optical path, a position at which one of the optical path on the light projection side and that on the light reception side starts being cut off corresponds to the light shielding rate 0% boundary line at that location. In addition, a position at which one of the optical path on the light projection side and that on the light reception side is completely cut off corresponds to the light shielding rate 100% boundary line at that location.

That is, the light shielding rate 0% boundary line at the highest position in the optical paths is the light shielding rate 0% boundary line of the optical paths 1 to 4 as a whole at that location. In addition, the light shielding rate 100% boundary line at the lowest position in the optical paths is the light shielding rate 100% boundary line of the optical paths 1 to 4 as a whole at that location.

In FIG. 73A, the light shielding rate 0% boundary line of the optical paths 1 to 4 as a whole is indicated by an alternate long and two short dashed line, and the light shielding rate 100% boundary line of the optical paths 1 to 4 as a whole is indicated by an alternate long and short dashed line. Even in FIGS. 73B to 74C, the light shielding rate 0% boundary line of the optical paths 1 to 4 as a whole is indicated by an alternate long and two short dashed line, and the light shielding rate 100% boundary line of the optical paths 1 to 4 as a whole is indicated by an alternate long and short dashed line.

In these drawings, the light shielding rate 0% boundary line and light shielding rate 100% boundary line are expressed by combinations of Sens1, Sens2, Sens1', Sens2', Led1, Led2, Led1', Led2', Ref1, Ref2, Ref1', and Ref2'.

Terms are defined as follows.

Opt1=higher(Led1,Sens1)
Opt2=higher(Led2,Sens2)
Opt3=lower(Led1,Sens1)
Opt3'=mirror image of Opt3 where higher(*1,*2) indicates an operation of selecting one of *1 and *2, which is located at a higher position in the Z direction.

Figure 75A:
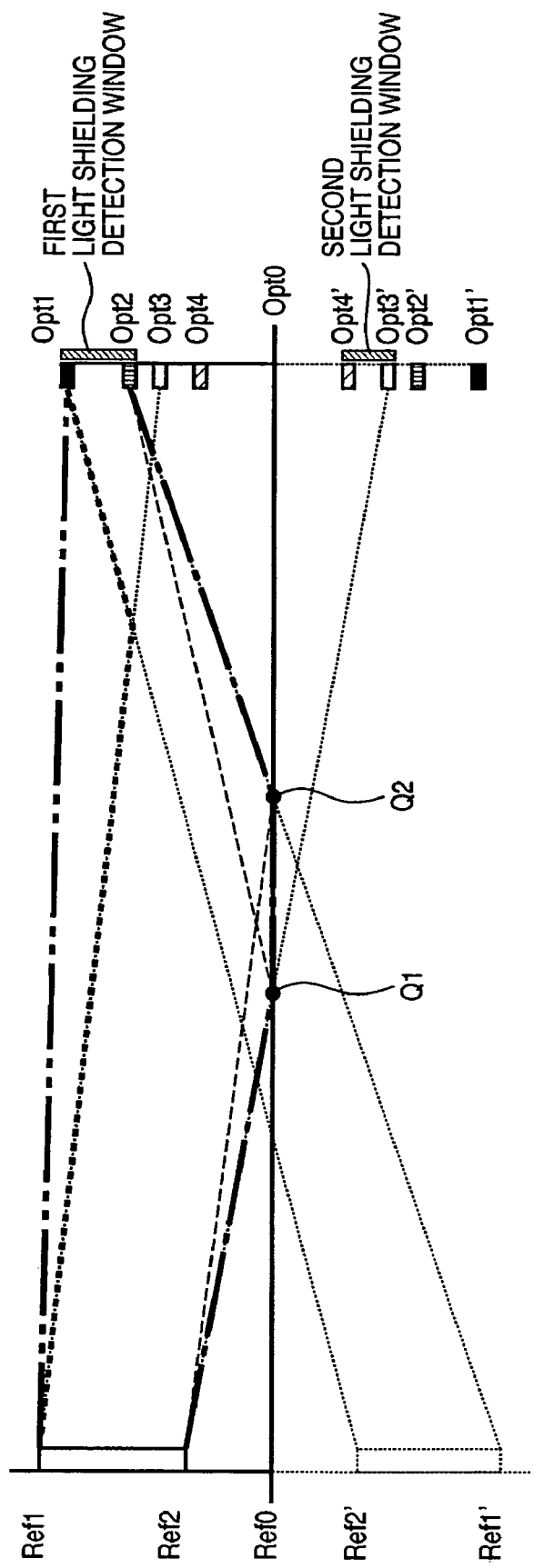
FIG. 75A is a view for explaining the concept of the light shielding detection region according to the sixth embodiment of the present invention.

With this definition, as shown in FIG. 75A, the light shielding rate 0% boundary line of the optical paths 1 to 4 as a whole is always a line segment (Ref1,Opt1), and the light shielding rate 100% boundary line is always a line segment (Ref2,Q1, Q2,Opt2).

Figure 75B:
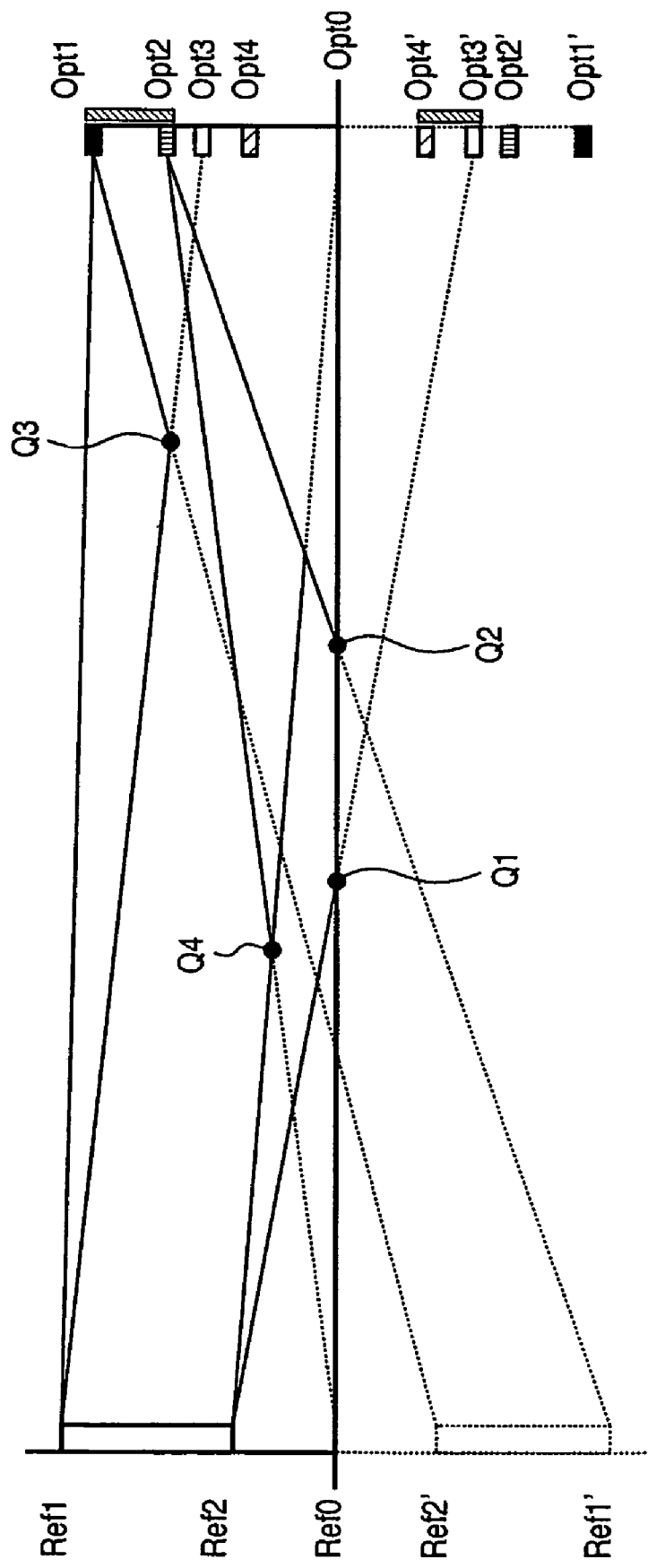
FIG. 75B is a view for explaining the concept of the light shielding detection region according to the sixth embodiment of the present invention.

As shown in FIG. 75B, a line segment (Ref1,Q3,Opt1) is defined as a third light shielding rate boundary line independently of the light shielding rate 0% boundary line and light shielding rate 100% boundary line. This boundary line generates a light shielding rate in which all the four optical paths 1 to 4 are effective. More specifically, between the light shielding rate 0% boundary line and the third light shielding rate boundary line, one of the optical paths 1 to 4 is cut off in accordance with the height of the pointer. Under the third boundary line, all the optical paths 1 to 4 are cut off in accordance with the height of the pointer.

The upper end of the first light shielding detection window is defined by Opt1, and the lower end is defined by Opt2. The upper end of the second light shielding detection window which is a mirror image of the first light shielding detection window with respect to the coordinate input effective region 3 is defined by Opt4', and the lower end is defined by Opt3'.

With this definition, the first light shielding detection window actually indicates the light shielding detection window in the real image of the sensor unit. The second light shielding detection window actually indicates the light shielding detection window in the mirror image of the sensor unit. Opt3, Opt4, Ref1, Ref1', Ref2, and Ref2' and the intersections Q1, Q2, and Q3 are parameters to decide the light shielding detection region.

In the above arrangement, the sectional shape of the three-dimensional light shielding detection region can be decided as a region sandwiched between the alternate long and two short dashed line (light shielding rate 0% boundary line) and the alternate long and short dashed line (light shielding rate 100% boundary line) in FIG. 75A.

In other words, the shape of the retroreflecting member which faces one of the plurality of sensor units 1L and 1R and does not face the other sensor unit is defined by the following conditions. That is, the shape is defined by 1) the other sensor unit, 2) the mirror image of the other sensor unit with respect to the coordinate input effective region, 3) the retroreflecting member which faces the other sensor unit, and 4) the mirror image of the retroreflecting member which faces the other sensor unit with respect to the coordinate input effective region. The three-dimensional light shielding detection region is defined such that the shape almost equals the sectional shape along the retroreflecting member which faces one sensor unit.

More specifically, the sectional shape can be expressed as follows.

Let Opt1 be the upper end of the first light shielding detection window as the real image, Opt2 be the lower end, Opt4' be the upper end of the second light shielding detection window as the mirror image, Opt3' be the lower end, and Opt0 be the position of the first light shielding detection window on the coordinate input effective region. Let Ref1 be the upper end of the real image of the opposite retroreflecting member, Ref2 be the lower end, Ref1' be the upper end of the mirror image of the opposite retroreflecting member, Ref2' be the lower, and Ref0 be the position of the retroreflecting member on the coordinate input effective region.

Let Q1 be the intersection between a line segment Ref2-Opt3' and a line segment Ref0-Opt0, Q2 be the intersection between a line segment Ref1'-Opt2 and the line segment Ref0-Opt0, Q3 be the intersection between a line segment Ref1-Opt3 and a line segment Ref2-Opt1', and Q4 be the intersection between a line segment Ref2-Opt0 and a line segment Ref0-Opt2.

In this case, the upper side of the section is located at a position lower than a line segment Ref1-Opt1 and higher than a line segment Ref1-Q3-Opt1. The lower side of the section is located at apposition lower than a line segment Ref2-Q4-Opt2 and higher than a line segment Ref2-Q2-Opt2.

<Practical Sectional Shape>

Figure 76:
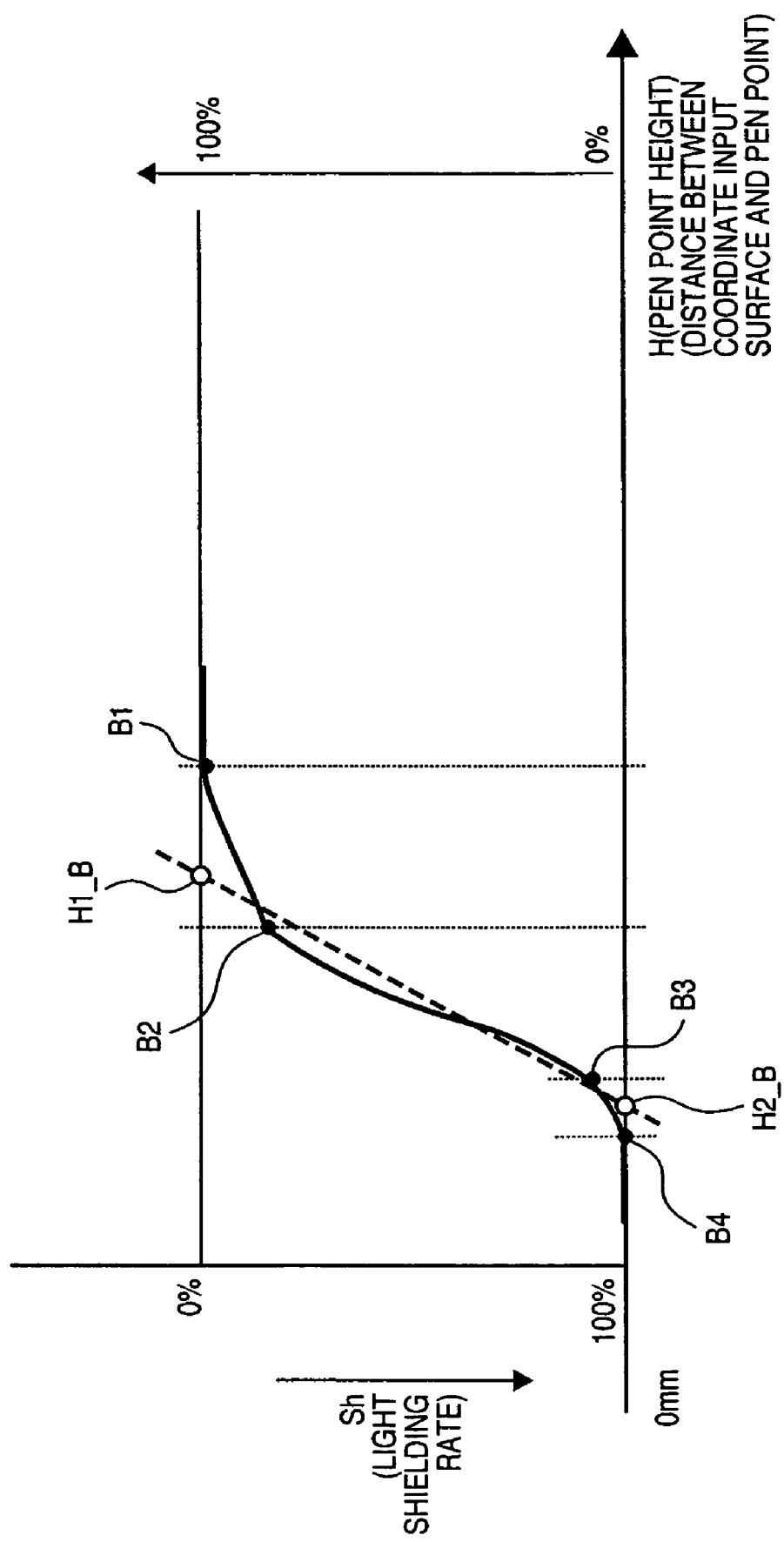
FIG. 76 is a graph for explaining a "pen-point-height vs. light shielding rate" characteristic according to the present invention.

A "pointer-height vs. light shielding rate" characteristic at a point B in FIG. 75A will be considered. FIG. 76 shows the "pointer-height vs. light shielding rate".

As described above, at the point B, it is sure that light shielding detection starts at a point B1 (the height of the light shielding rate 0% boundary line at the point B), and the light shielding rate reaches 100% at a point B4 (the height of the light shielding rate 0% boundary line at the point B).

At the point B, however, the relationship between the optical paths 1 to 4 and light shielding changes between the partial sections segmented by the points B1 to B4. For example, in the section between the points B1 and B2, only two of the optical paths 1 to 4 are related to light shielding. The number of optical paths related to light shielding can be smaller in the section between the points B3 and B4 than in the section between the points B2 and B3, although it depends on the case.

On the basis of these relationships, the actual "pointer-height vs. light shielding rate" characteristic at the point B exhibits a curve shown in FIG. 76. That is, the gradient is relatively moderate between the points B1 and B2 and between the points B3 and B4 but relatively steep between the points B2 and B3.

As already described above with reference to FIGS. 71A and 71B, making the section of the three-dimensional light shielding detection region almost equal to the retroreflecting member shape located on that section in the present invention indicates the following fact. The "pointer-height vs. light shielding rate" curve indicated by the broken line in FIGS. 71A and 71B is made similar to the "pointer-height vs. light shielding rate" curve indicated by the solid line by adjusting the retroreflecting member shape, and the shapes are also made to match.

This concept is applied to FIG. 76. To make the straight line indicated by the solid line equal to the curve indicated by the broke line as much as possible, a predetermined portion between the points B1 and B2 and a predetermined portion between the points B3 and B4 are preferably connected by a straight line instead of connecting the points B1 and B4 and the points B2 and B3 by straight lines.

Assume that a point H1_B in FIG. 76 belongs to the light shielding rate 0% boundary line in the practical sense, and a point H2_B belongs to the light shielding rate 100% boundary line in the practical sense. In this case, the practical light shielding rate 0% curve in FIG. 75A does not pass through not the alternate long and two short dashed line in FIG. 75A. Instead, the light shielding rate 0% curve passes slightly under the alternate long and two short dashed line as the distance from the points at the two ends, i.e., Ref1 and Opt1 increases. In addition, the practical light shielding rate 100% curve does not pass through not the alternate long and short dashed line in FIG. 75A. Instead, the light shielding rate 100% curve passes slightly above the alternate long and short dashed line as the distance from the points at the two ends, i.e., Ref2 and Opt2 increases.

<Extension of Definition of Common Three-Dimensional Light Shielding Detection Region>

As described above, the arrangement of the present invention proposes, e.g., how to form an identical space as the three-dimensional light shielding detection regions of the sensor units 1L and 1R. To do this, the retroreflecting member facing only one of the sensor units 1L and 1R is formed into almost the same shape as the sectional shape of the three-dimensional light shielding detection region corresponding to the other sensor unit along the retroreflecting member facing only one of the sensor units.

More specifically, the section of the three-dimensional light shielding detection region of the sensor unit 1L near the left side and the shape of the retroreflecting member 4b which faces the sensor unit 1R are formed into almost the same shape. Similarly, the section of the three-dimensional light shielding detection region of the sensor unit 1R near the right side and the shape of the retroreflecting member 4a which faces the sensor unit 1L are formed into almost the same shape.

Figure 77:
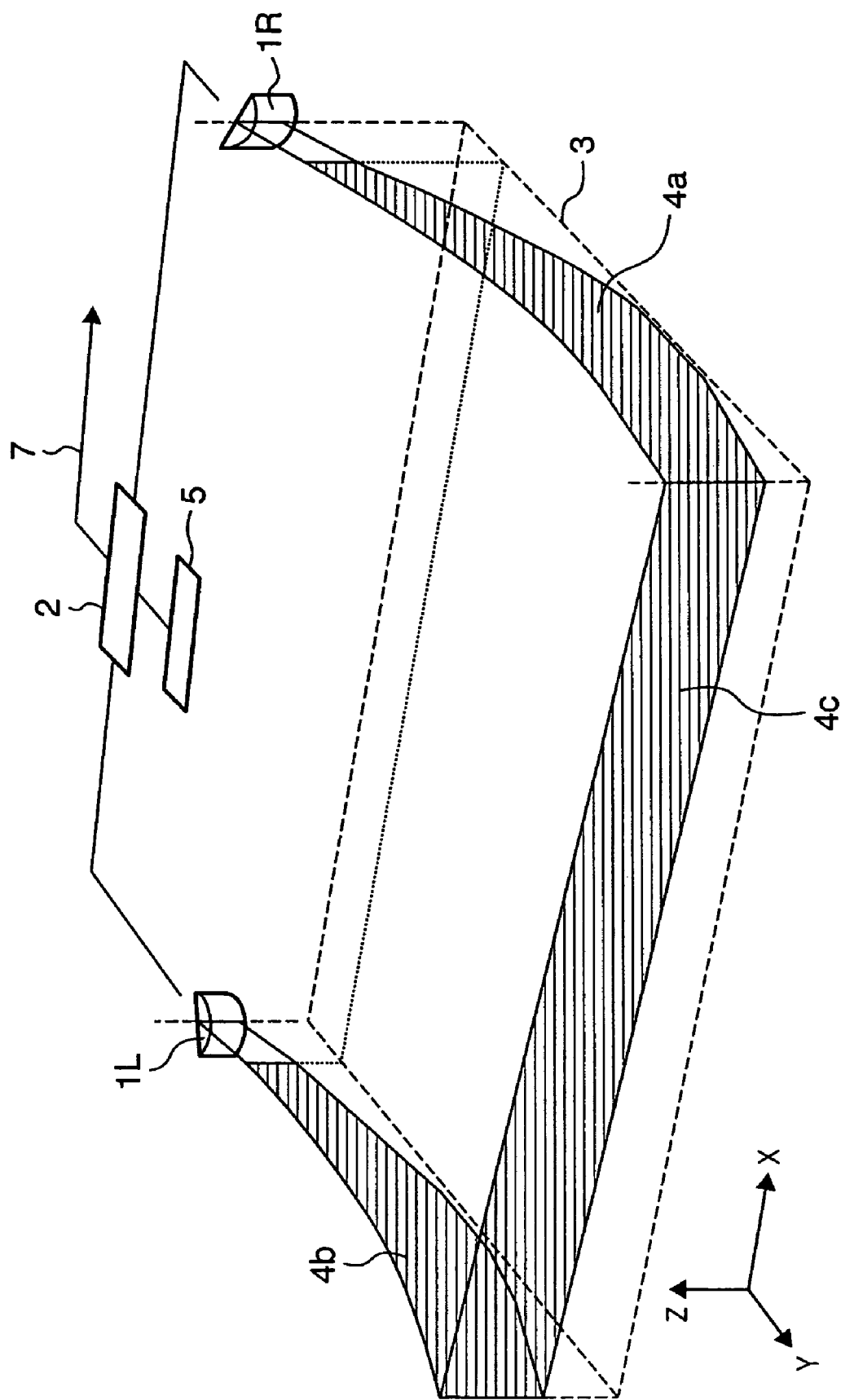
FIG. 77 is a view for explaining the three-dimensional light shielding detection region of each sensor unit according to the present invention.
Figure 78:
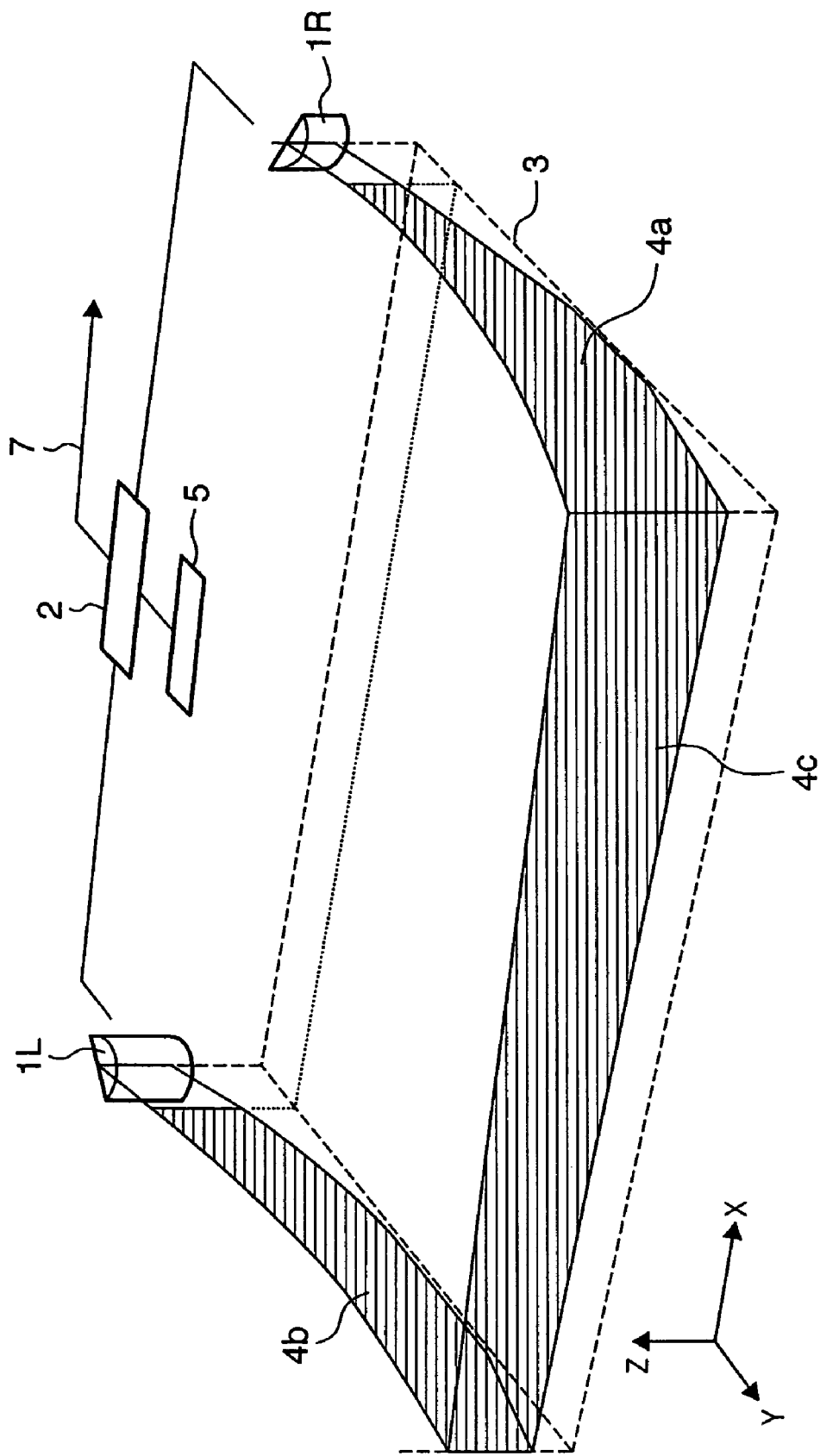
FIG. 78 is a view for explaining the three-dimensional light shielding detection region of each sensor unit according to the present invention.

The shapes of the retroreflecting members 4a and 4b need not always be bilaterally symmetrical, as shown in FIG. 67A. For example, when the sensor units 1L and 1R are located at different heights, as shown in FIG. 77, the two ends of the retroreflecting member 4c common to the sensor units may be located at different heights. Alternatively, when the light shielding detection windows of the sensor units 1L and 1R have different sizes, as shown in FIG. 78, the two ends of the retroreflecting member 4c common to the sensor units may be located at different heights.

Figure 79:
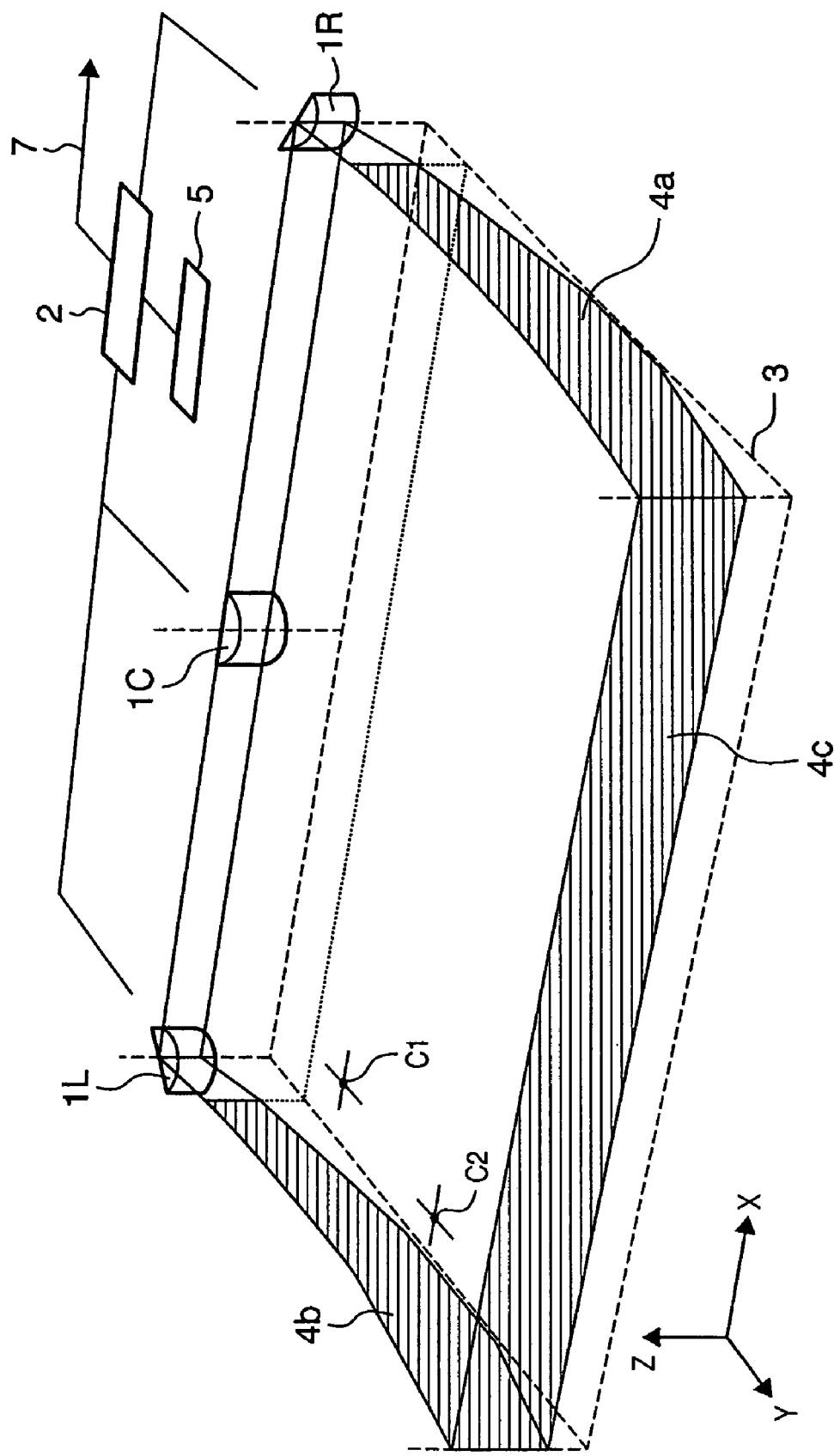
FIG. 79 is a view showing a layout example of sensor units of a coordinate input apparatus according to the seventh embodiment of the present invention.

This applies not only to the coordinate input apparatus including two sensor units but also to a coordinate input apparatus including a plurality of, i.e., three or more sensor units, as shown in FIG. 79.

With the above-described arrangement, the three-dimensional light shielding detection regions of the respective sensor units become almost the same common solid body (three-dimensional solid shape). The depths (light shielding rates) of light shielding shadows observed by the sensor units 1L and 1R are observed as almost the same value. In other words, a change in the position of the pointer in the height direction can be detected on the basis of the change rate of the observed light intensity.

The above-described conditions are not conditions to calculate correct coordinates but conditions that only allow all sensor units to observe almost the same value as the depths (light shielding rates) of shadows observed by the sensor units upon input by a pointer.

To calculate correct coordinates, the retroreflecting members and sensor units must be arranged in a plane with an appropriate relationship in the coordinate input surface direction.

The sixth embodiment of the present invention and the seventh embodiment to be described later satisfy the above-described conditions, as a matter of course.

As described above, according to the sixth embodiment, the retroreflecting members arranged around the coordinate input effective region are designed to satisfy the above-described feature conditions. Shadows detected by the sensor units in accordance with the same input are prevented from being detected with a level (light shielding rate) difference between the sensor units. The shadows can always be detected at almost the same level (light shielding rate).

Hence, input coordinate detection errors can be prevented in single point input, and detection of wrong coordinates different from input coordinates can be prevented to correctly calculate the number of input coordinates in multiple point input. Since the above-described problems which frequently arise when the pointer enters or leaves the coordinate input effective region upon input are avoided, stable coordinate input can be implemented.

Seventh Embodiment

In the seventh embodiment, an arrangement will be described in which a sensor unit 1C is newly added to the arrangement of the sixth embodiment shown in FIG. 67A, as shown in FIG. 63.

FIG. 63 shows multiple point input in points P12 and P21.

In this case, as shown in FIG. 64A, a sensor unit 1L detects shadows at positions θL1 and θL2. As shown in FIG. 64B, a sensor unit 1R detects shadows at positions θR1 and θR2. As shown in FIG. 64C, the sensor unit 1C detects shadows at positions θC1 and θC4. On the basis of the three sets of angle data, four coordinate candidate points P11, P12, P21, and P22 are calculated. When truth determination is executed for these coordinate candidate points by a certain means, for example, P11 and P22 are determined as real images, and P12 and P21 are determined as virtual images. Hence, the coordinate input points can be decided.

The sensor unit 1C shown in FIG. 63 has almost the same arrangement as the sensor unit 1L or 1R except the structure of the internal optical units (light receiving units and light projecting units). More specifically, the visual field range of the sensor units 1L and 1R in the direction of the coordinate input surface is about 90°. However, the visual field range of the sensor unit 1C is about 1800.

It is most important that the arrangement of the sensor units 1L, 1R, and 1C and the retroreflecting members arranged around a coordinate input effective region 3 satisfy the same conditions as those of the sensor units 1L and 1R according to the sixth embodiment. That is, it is necessary to satisfy a condition that the three-dimensional light shielding detection regions of the sensor units should be almost the same common three-dimensional light shielding detection region.

In the seventh embodiment, the three-dimensional light shielding detection region of the sensor unit 1C includes the common three-dimensional light shielding detection region of the sensor units 1L and 1R. The three-dimensional light shielding detection region of the sensor unit 1C need not match the three-dimensional light shielding detection region of the sensor units 1L and 1R. It is only necessary that the former includes the latter.

In this arrangement, when input is done by a pointer, the depths (light shielding rates) of light shielding shadows observed by the sensor units 1L, 1R, and 1C are observed as almost the same value. When two coordinate points are input, coordinate candidate points can correctly be detected without a detection error. In addition, since the three-dimensional light shielding detection region of the sensor unit 1C includes that of the sensor units 1L and 1R, the shadows of the coordinate candidate points are always observed by the sensor unit 1C. True coordinates can be selected from the coordinate candidate points on the basis of angles corresponding to the observed shadows.

Hence, correct coordinates can always be detected on the basis of the positional relationship between the sensor units, 1L, 1R, and 1C. Especially, even when the pointer enters or leaves the coordinate input effective region or ends input, stable coordinate calculation can be executed without a light shielding shadow recognition error.

In the seventh embodiment, coordinate candidate points are detected by the sensor units 1L and 1R. On the basis of the positional relationship between the coordinate candidate points and shadows detected by the sensor unit 1C, real input points are determined from the coordinate candidate points (so-called truth determination is performed), and two input coordinates are finally decided.

For example, in FIG. 63, the sensor units 1L and 1R observe the four coordinate candidate points P11, P12, P21, and P22. Of these coordinate candidate points, coordinate candidate points observed by the sensor unit 1C in a predetermined direction are the coordinate candidate points of real input points. These points are finally output as two input coordinate points. Especially in the case shown in FIG. 63, since the sensor unit 1C observes only the shadows at the positions θC1 and θC4, P11 and P22 are the coordinates of the real input points.

Coordinate calculation processing according to the seventh embodiment is the same as in the fifth embodiment, and a description thereof will be omitted.

As described above, according to the seventh embodiment, in addition to the effects described in the sixth embodiment, truth determination for coordinate calculation can be done more efficiently and accurately by providing the sensor unit 1C.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-118971, filed Apr. 15, 2005, 2005-118979, filed Apr. 15, 2005 and 2005-264426, filed Sep. 12, 2005 which are hereby incorporated by reference herein in their entirety.

What is claimed is:

1. A coordinate input apparatus for detecting a point position on a coordinate input region, comprising:
a plurality of sensor means each of which includes a light projecting unit to project light to the coordinate input region and a light receiving unit to receive arrival light, wherein each of the plurality of sensor means is provided around the coordinate input region;
reflection means, provided at a periphery of the coordinate input region, for retroreflecting incident light; and
determination means for determining a point state of pointing means in the coordinate input region on the basis of a number and intensities of shadows which are present in light intensity distributions obtained from said plurality of sensor means in accordance with pointing by the pointing means.

2. The apparatus according to claim 1, wherein said determination means determines, in an arbitrary set of said plurality of sensor means, the number of input points on the basis of the number and intensities of shadows obtained from one sensor means and determines presence/absence of overlap of shadows obtained from the other sensor means on the basis of the number and intensities of shadows obtained from each of said one sensor means and said other sensor means of the set of sensor means.

3. The apparatus according to claim 2, wherein said determination means comprises:
setting means for setting a first threshold value to determine a level of a relatively low intensity and a second threshold value to determine a level of a relatively high intensity; and
detection means for detecting, by using the first threshold value and the second threshold value set by said setting means, the number and intensities of shadows which are present in the light intensity distributions,
wherein said determination means determines the point state of the pointing means in the coordinate input region on the basis of the number and intensities of shadows detected by said detection means.

4. The apparatus according to claim 3, further comprising calculation means for calculating point position coordinates on the coordinate input region on the basis of the point state of the pointing means in the coordinate input region, which is determined by said determination means, and the light intensity distributions obtained from said plurality of sensor means.

5. The apparatus according to claim 3, wherein when one sensor means in the arbitrary set of said plurality of sensor means which outputs a light intensity distribution containing a larger number of shadows exceeding the first threshold value is defined as first sensor means, and the other sensor means is defined as second sensor means, and the number of shadows exceeding the first threshold value is 2 in each of the light intensity distributions for said first sensor means and said second sensor means, said determination means determines that four coordinate candidate points are present.

6. The apparatus according to claim 3, wherein when one sensor means in the arbitrary set of said plurality of sensor means which outputs a light intensity distribution containing a larger number of shadows exceeding the first threshold value is defined as first sensor means, and the other sensor means is defined as second sensor means, and the number of shadows exceeding the second threshold value is 2 in the light intensity distribution for said first sensor means, and the number of shadows exceeding the first threshold value is 1 in the light intensity distribution for said second sensor means, said determination means determines that two coordinate input points are arranged substantially linearly when viewed from said second sensor means.

7. The apparatus according to claim 3, wherein when one sensor means in the arbitrary set of said plurality of sensor means which outputs a light intensity distribution containing a larger number of shadows exceeding the first threshold value is defined as first sensor means, and the other sensor means is defined as second sensor means, and the number of shadows exceeding the second threshold value is 1 in the light intensity distribution for said first sensor means, and the number of shadows exceeding the first threshold value is 1 in the light intensity distribution for said second sensor means, said determination means determines that one coordinate input point is present.

8. The apparatus according to claim 3, wherein a ratio of the first threshold value to the second threshold value is larger than a ratio of a maximum value to a minimum value of shadows assumed in the light intensity distributions for said sensor means of the arbitrary set.

9. The apparatus according to claim 1, wherein said sensor means comprises one optical unit including the light projecting unit and the light receiving unit.

10. The apparatus according to claim 1, wherein said sensor means comprises two optical units each including the light projecting unit and the light receiving unit.

11. A control method of a coordinate input apparatus for detecting a point position on a coordinate input region by using a plurality of sensor means each of which includes a light projecting unit to project light to the coordinate input region and a light receiving unit to receive arrival light, wherein each of the plurality of sensor means is provided around the coordinate input region, comprising:
an acquisition step of acquiring light intensity distributions obtained from the plurality of sensor means in accordance with pointing by pointing means; and
a determination step of determining a point state of the pointing means in the coordinate input region on the basis of a number and intensities of shadows which are present in the light intensity distributions obtained from the plurality of sensor means and acquired in the acquisition step.

12. A computer-readable recording medium on which is stored a computer-executable program which causes a computer to execute control of a coordinate input apparatus by detecting a point position on a coordinate input region by using a plurality of sensor means each of which includes a light projecting unit to project light to the coordinate input region and a light receiving unit to receive arrival light, wherein each of the plurality of sensor means is provided around the coordinate input region, and wherein said computer-executable program causes the computer to execute:
   an acquisition step of acquiring light intensity distributions obtained from the plurality of sensor means in accordance with pointing by pointing means; and
   a determination step of determining a point state of the pointing means in the coordinate input region on the basis of a number and intensities of shadows which are present in the light intensity distributions obtained from the plurality of sensor means and acquired in the acquisition step.

13. A coordinate input apparatus for detecting a point position on a coordinate input region, comprising:
   a plurality of sensor means; and
   determination means for determining a point state of pointing means in the coordinate input region on the basis of a number and intensities of shadows or images which are present in light intensity distributions obtained from said plurality of sensor means in accordance with pointing by the pointing means.

14. A coordinate input apparatus for detecting a point position on a coordinate input region, comprising:
   a plurality of sensor means each of which includes a light projecting unit to project light to the coordinate input region and a light receiving unit to receive arrival light, wherein each of the plurality of sensor means is provided around the coordinate input region;
   a plurality of retroreflection means, provided at a periphery of the coordinate input region, for retroreflecting incident light; and
   calculation means for calculating coordinates of a point position of pointing means on the basis of light amount distributions obtained from said plurality of sensor means in accordance with pointing by the pointing means,
   wherein three-dimensional light shielding detection regions of said plurality of sensor means have a common three-dimensional solid shape corresponding to the coordinate input region.

15. The apparatus according to claim 14, wherein the three-dimensional light shielding detection region is a three-dimensional solid defined by a shape of said retroreflection means facing said sensor means and a light shielding detection window serving as a light shielding detection range of said sensor means.

16. The apparatus according to claim 15, wherein an upper side of a member included in said retroreflection means forms a common first plane, and a lower side of the member forms a common second plane, wherein an upper end of the light shielding detection window is substantially located on the first plane, and a lower end of the light shielding detection window is substantially located on the second plane, and wherein the three-dimensional solid shape is a space sandwiched between the first plane and the second plane.

17. The apparatus according to claim 14, wherein the light shielding detection window is defined by setting a lower end to a higher one of a lower end of a light projecting window serving as a light projecting range of the light projecting unit included in said sensor means and a lower end of a light receiving window serving as a light receiving range of the light receiving unit included in said sensor means, and by setting an upper end to a higher one of an upper end of the light projecting window and an upper end of the light receiving window.

18. The apparatus according to claim 14, wherein in said sensor means, a visual field range of the light projecting unit includes retroreflection means related to said sensor means, and a visual field range of the light receiving unit includes retroreflection means related to said sensor means in a direction perpendicular to the coordinate input region.

19. The apparatus according to claim 14, wherein said sensor means comprises one optical unit including the light projecting unit and the light receiving unit.

20. The apparatus according to claim 14, wherein said sensor means comprises two optical units each including the light projecting unit and the light receiving unit.

21. A control method of a coordinate input apparatus which comprises a plurality of sensor means each including a light projecting unit to project light to a coordinate input region and a light receiving unit to receive arrival light, wherein each of the plurality of sensor means is provided around the coordinate input region and detects a point position on the coordinate input region, comprising:
   a calculation step of calculating coordinates of a point position of pointing means on the basis of light amount distributions obtained from the plurality of sensor means in accordance with pointing by the pointing means; and
   an output step of outputting the coordinates calculated in the calculation step, wherein three-dimensional light shielding detection regions of the plurality of sensor means have a common three-dimensional solid shape corresponding to the coordinate input region.

22. A computer-readable recording medium on which is stored a computer-executable program which causes a computer to execute control of a coordinate input apparatus which comprises a plurality of sensor means each including a light projecting unit to project light to a coordinate input region and a light receiving unit to receive arrival light, wherein each of the plurality of sensor means is provided around the coordinate input region and detects a point position on the coordinate input region, and wherein said computer-executable program causes the computer to execute:
   a calculation step of calculating coordinates of a point position of pointing means on the basis of light amount distributions obtained from the plurality of sensor means in accordance with pointing by the pointing means; and
   an output step of outputting the coordinates calculated in the calculation step,
   wherein three-dimensional light shielding detection regions of the plurality of sensor means have a common three-dimensional solid shape corresponding to the coordinate input region.

23. A coordinate input apparatus for detecting a point position on a coordinate input region, comprising:
   a plurality of sensor means each of which includes a light projecting unit to project light to the coordinate input region and a light receiving unit to receive arrival light, wherein each of the plurality of sensor means is provided around the coordinate input region;
   a plurality of retroreflection means, provided at a periphery of the coordinate input region, for retroreflecting incident light; and
   calculation means for calculating coordinates of a point position of pointing means on the basis of light amount distributions obtained from said plurality of sensor means in accordance with pointing by the pointing means, wherein three-dimensional light shielding detection regions of said plurality of sensor means have a common three-dimensional solid shape corresponding to the coordinate input region, and the three-dimensional light shielding detection region is defined as a three-dimensional region in which a height-direction change in the position of the pointing means can be detected on the basis of a change rate of an observed light intensity.

24. The apparatus according to claim 23, wherein a shape of said retroreflection means which faces one sensor means of said plurality of sensor means but does not face the other sensor means is defined by said other sensor means, a mirror image of said other sensor means with respect to the coordinate input region, said retroreflection means facing said other sensor means, and a mirror image of said retroreflection means facing said other sensor means with respect to the coordinate input region, and wherein the three-dimensional solid shape is defined as a three-dimensional solid in which the shape substantially equals a shape of a section along said retroreflection means facing said one sensor means.

25. The apparatus according to claim 24, wherein letting Opt1 be an upper end of a first light shielding detection window as a real image, Opt2 be a lower end, Opt4' be an upper end of a second light shielding detection window as a mirror image, Opt3' be a lower end, Opt0 be a position of the first light shielding detection window on the coordinate input effective region, Ref1 be an upper end of a real image of said opposite retroreflection means, Ref2 be a lower end, Ref1' it be an upper end of a mirror image of said retroreflection means, Ref2' be a lower end, Ref0 be a position of said retroreflection means on the coordinate input effective region, Q1 be an intersection between a line segment Ref2-Opt3' and a line segment Ref0-Opt0, Q2 be an intersection between a line segment Ref1'-Opt2 and the line segment Ref0-Opt0, Q3 be an intersection between a line segment Ref1-Opt3 and a line segment Ref2-Opt1', and Q4 be an intersection between a line segment Ref2-Opt0 and a line segment Ref0-Opt2, and wherein an upper side of the section is located at a position lower than a line segment Ref1-Opt1 and higher than a line segment Ref1-Q3-Opt1, and a lower side of the section is located at a position lower than a line segment Ref2-Q4-Opt2 and higher than a line segment Ref2-Q2-Opt2.

26. The apparatus according to claim 25, wherein the Opt1 is a selected higher one of an upper end of a light projecting window serving as a light projecting range of the light projecting unit of said sensor means and an upper end of a light receiving window serving as a light receiving range of the light receiving unit, the Opt2 is a selected higher one of a lower end of the light projecting window serving as the light projecting range of the light projecting unit of said sensor means and a lower end of the light receiving window serving as the light receiving range of the light receiving unit, the Opt4' is a mirror image, with respect to the coordinate input region, of a selection result of a lower one of the lower end of the light projecting window serving as the light projecting range of the light projecting unit of said sensor means and the lower end of the light receiving window serving as the light receiving range of the light receiving unit, and the Opt3' is a mirror image, with respect to the coordinate input region, of a selection result of a lower one of the upper end of the light projecting window serving as the light projecting range of the light projecting unit of said sensor means and the upper end of the light receiving window serving as the light receiving range of the light receiving unit.

27. A coordinate input apparatus for detecting a point position on a coordinate input region, comprising:

two sensor means provided substantially at two ends of one side of a periphery of the coordinate input region, each of said sensor means including a light projecting unit to project light to the coordinate input region and a light receiving unit to receive arrival light;

a plurality of retroreflection means, provided on remaining sides of the periphery of the coordinate input region except said one side, for retroreflecting incident light; and calculation means for calculating coordinates of a point position of pointing means on the basis of light amount distributions obtained from said two sensor means in accordance with pointing by the pointing means, wherein in a shape of retroreflection means which faces only one sensor means of said two sensor means but does not face the other sensor means, a substantial extension of one end of said retroreflection means substantially matches a light shielding detection window of said other sensor unit, a side of the other end substantially matches a side of an end of retroreflection means which commonly faces said two sensor means, and at least a lower side of said retroreflecting member curves downward and comes close to the coordinate input surface at a midpoint.

28. The apparatus according to claim 27, wherein the light shielding detection window is a portion in a range defined by setting an upper end to a higher one of an upper end of a light projecting window serving as a portion effectively contributing to light projection in said sensor means and an upper end of a light receiving window serving as a portion effectively contributing to light reception, and by setting a lower end to a higher one of a lower end of the light projecting window and a lower end of the light receiving window.

29. The apparatus according to claim 23, wherein said sensor means comprises one optical unit including the light projecting unit and the light receiving unit.

30. The apparatus according to claim 23, wherein said sensor means comprises two optical units each including the light projecting unit and the light receiving unit.

31. The apparatus according to claim 27, wherein said sensor means comprises one optical unit including the light projecting unit and the light receiving unit.

32. The apparatus according to claim 27, wherein said sensor means comprises two optical units each including the light projecting unit and the light receiving unit.

* * * * *